United States Patent [19]

Osada

[11] Patent Number: 5,757,740
[45] Date of Patent: May 26, 1998

[54] RECORDING AND/OR REPRODUCING APPARATUS USING CARTRIDGES WITHIN WHICH RECORDING MEDIA ARE ACCOMMODATED AND LOADING DEVICE FOR CARTRIDGE

[75] Inventor: Yasuo Osada, Saitama, Japan

[73] Assignee: Sony Corporation, Tokyo, Japan

[21] Appl. No.: 718,317

[22] PCT Filed: Feb. 1, 1996

[86] PCT No.: PCT/JP96/00209

§ 371 Date: Sep. 25, 1996

§ 102(e) Date: Sep. 25, 1996

[87] PCT Pub. No.: WO96/24133

PCT Pub. Date: Aug. 8, 1996

[30] Foreign Application Priority Data

Feb. 1, 1995 [JP] Japan ................... 7-034698

[51] Int. Cl.$^6$ .................................................. G11B 17/22
[52] U.S. Cl. .................................................. 369/36
[58] Field of Search ............... 369/36, 34, 191–192, 369/258, 178, 270–271; 360/98.04, 99.05, 98.06, 99.12, 98.08

[56] References Cited

U.S. PATENT DOCUMENTS 5,267,225 11/1993 Fukasawa et al. ................... 369/36

Primary Examiner—Stuart S. Levy
Assistant Examiner—Allen Cao
Attorney, Agent, or Firm—Limbach & Limbach L.L.P.

[57] ABSTRACT

A recording and/or reproducing apparatus, for disc cartridges within which optical discs are respectively accommodated, having a recording and/or reproduction unit for carrying out recording and/or reproduction of information signals with respect to the optical discs, an accommodating body that accommodates plural disc cartridges therewithin and has opening portions formed at plane surfaces opposite to each other, a taking-out mechanism for selectively taking out disc cartridges from the accommodating body, a carrying mechanism for loading the cartridge taken out by the taking-out mechanism into the recording and/or reproduction unit, and a vertical movement mechanism for vertically moving the accommodating body relative to the taking-out mechanism. The taking-out mechanism includes a first movement operation mechanism that inserts into the accommodating body through one of the opening portions to move one of the cartridges accommodated within the accommodating body in a direction parallel to the principal surfaces thereof. The carrying mechanism is disposed between the accommodating body and the recording and/or reproduction unit to allow the cartridge taken out by the taking-out mechanism to undergo loading into the recording and/or reproduction unit.

15 Claims, 139 Drawing Sheets

RECORDING AND/OR REPRODUCING APPARATUS USING CARTRIDGES WITHIN WHICH RECORDING MEDIA ARE ACCOMMODATED AND LOADING DEVICE FOR CARTRIDGE

TECHNICAL FIELD

This invention relates to a recording and/or reproducing apparatus using cartridges within which recording media are accommodated, and more particularly to a recording and/or reproducing apparatus provided with a loading mechanism adapted for selectively taking out one cartridge from an accommodating body within which a plurality of cartridges are accommodated to allow the cartridge thus taken out to undergo loading into a recording and/or reproduction unit provided within the apparatus.

BACKGROUND ART

Hitherto, there have been used recording and/or reproducing apparatuses adapted for accommodating in advance, within an accommodating body, plural disc cartridges within which there are respectively accommodated discs such as optical disc, etc. which are a recording medium on which information signals are recorded to selectively take out a desired disc cartridge from the accommodating body to allow it to undergo loading into the recording and/or reproduction unit to permit continuous recording and/or reproduction of information signals.

As the recording and/or reproducing apparatus of this kind, there are recording and/or reproducing apparatuses adapted for allowing an accommodating body within which plural disc cartridges are accommodated in a multi-step manner so that their principal surfaces are in parallel to each other to undergo movement operation in a direction perpendicular to the principal surface of the accommodated disc cartridges by using a movement operation mechanism to thereby allow any one of the disc cartridges accommodated within the accommodating body to be located at the position caused to correspond to the recording and/or reproduction unit to take out the disc cartridge which has been moved to the position corresponding to the recording and/or reproduction unit toward the outward of the accommodating body by using the movement operation mechanism to allow it to undergo loading into the recording and/or reproduction unit.

The disc cartridge which has been selectively taken out from the accommodating body and has been loaded into the recording and/or reproduction unit is caused to undergo recording and/or reproduction of information signals with respect to the disc accommodated therewithin, and is then accommodated into the accommodating body through the taking-out mechanism for a second time.

The recording and/or reproducing apparatuses of this kind conventionally used are provided with a movement operation mechanism in which there are provided movement operation members for allowing disc cartridges to undergo movement operation every accommodating portions within which respective disc cartridges are accommodated within the accommodating body. This movement operation mechanism allow the movement operation member to be engaged with the disc cartridge accommodated within the accommodating body to allow it to undergo movement operation extending over the inside and the outside of the accommodating body to thereby take out the disc cartridge from the accommodating body to allow it to undergo loading into the recording and/or reproduction unit, or to allow the disc cartridge loaded in the recording and/or reproduction unit to be accommodated into the accommodating portion constituted within the accommodating body for a second time.

Since the recording and/or reproducing apparatuses conventionally used are of a structure in which movement operation members are disposed every accommodating portions within which plural disc cartridges are respectively accommodated, the accommodating body is caused to be large-sized. As a result, the recording and/or reproducing apparatus itself in which the accommodating body is disposed would be also large-sized.

In addition, since the movement operation members caused to undergo movement operation extending over the inside and the outside of the accommodating body every accommodating portions are disposed, it is necessary to provide, every accommodating portions, opening portions adapted so that movement operation members are inserted thereinto and are withdrawn (disengaged) therefrom. Namely, since it is necessary to provide opening portions for carrying out insertion/withdrawal of the movement operation members in addition to the opening portions for carrying out insertion/withdrawal of the disc cartridges, the opening areas of opening portions provided at respective accommodating portions are enlarged (increased), with the resulting that the mechanical strength of the accommodating body is lowered.

DISCLOSURE OF THE INVENTION

An object of this invention is to provide a recording and/or reproducing apparatus and a loading device used in such a recording and/or reproducing apparatus which can simplify a mechanism for selectively carrying out taking-out operation of one disc cartridge from an accommodating body within which there are accommodated plural cartridges within which recording media on which information signals are recorded such as optical disc, etc. are accommodated to allow the disc cartridge thus taken out to undergo loading operation into the recording and/or reproduction unit, thus permitting the apparatus itself to be compact.

Another object of this invention is to provide a recording and/or reproducing apparatus and a loading device used in such a recording and/or reproducing apparatus which can guarantee strength of the accommodating body for accommodating plural cartridges.

A further object of this invention is to provide a recording and/or reproducing apparatus and a loading device used in such a recording and/or reproducing apparatus which can securely carry out loading operation to allow one disc cartridge to selectively undergo taking-out operation from an accommodating body within which plural cartridges are accommodated to allow the disc cartridge thus taken out to undergo loading operation into the recording and/or reproduction unit.

A recording and/or reproducing apparatus according to this invention proposed in order to attain objects as described above uses, as a recording medium, a cartridge within which a recording medium such as optical disc or magneto-optical disc, etc. is accommodated. This recording and/or reproducing apparatus comprises a recording and/or reproduction unit for carrying out recording and/or reproduction of information signals with respect to a recording media respectively accommodated within cartridges; an accommodating body within which the plural cartridges within which the respective recording media are accommodated are accommodated so that their principal surfaces of the respective cartridges are in parallel to each other, opening portions for allowing the cartridge to undergo movement operation in a direction in parallel to the principal surface thereof being provided at plane surfaces opposite to each other of the accommodating body; a taking-out mechanism for selectively taking out the disc cartridge from the accommodating body; a carrying mechanism for loading the disc cartridge taken out by the taking-out mechanism into the recording and/or reproduction unit; and a vertical movement mechanism for allowing the accommodating body and the taking-out mechanism to relatively undergo vertical movement. In this case, the taking-out mechanism includes a first movement operation mechanism inserted into the accommodating body through the opening portion provided at the accommodating body to move any one of the cartridges accommodated within the accommodating body in a direction in parallel to the principal surface thereof. The carrying mechanism comprises a second movement operation mechanism disposed between the accommodating body and the recording and/or reproduction unit, and adapted for allowing the cartridge taken out by the taking-out mechanism after undergone movement between the accommodating body and the recording and/or reproduction unit to further undergo movement operation.

Moreover, at the carrying mechanism, there is provided a prevention mechanism for preventing taking-out operation of other cartridges from the accommodating body when the second movement operation mechanism allows the cartridge to undergo movement operation in a direction in parallel to its principal surface from the accommodating body.

Further, the taking-out mechanism comprises an operation mechanism for withdrawing the first movement operation mechanism from the opening portion of the accommodating body when the cartridge is caused to be moved in a direction in parallel to its principal surface from the accommodating body by the second movement operation mechanism means of the carrying mechanism. This operation mechanism comprises a position detection mechanism for carrying out position detection of the first movement operation mechanism.

The recording and/or reproducing apparatus according to this invention further comprises control means for detecting on the basis of a detection output from the position detection mechanism whether or not the disc cartridge is accommodated within the accommodating body, and for detecting on the basis of the detection result whether or not the inserted cartridge is correctly inserted to allow the inserted cartridge to undergo movement operation in a direction to eject it from the accommodating body on the basis of the detection result thereof.

The carrying mechanism further comprises a further vertical movement mechanism for allowing the carrying mechanism to undergo movement in a horizontal direction and vertical movement with respect to the recording and/or reproduction unit.

Moreover, the recording and/or reproduction unit comprises a head for carrying out recording or reproduction of information signals with respect to the recording medium accommodated within the cartridge, and the further vertical movement mechanism means for allowing the carrying mechanism to undergo vertical movement operation allows the carrying portion of the disc cartridge to undergo loading into the recording and/or reproduction unit thereafter to allow the head of the recording and/or reproduction unit to undergo movement operation up to the recordable or reproducible position (by the movement operation).

The recording and/or reproducing apparatus according to this invention further comprises elastic supporting mechanism means for elastically supporting the recording and/or reproduction unit with respect to the apparatus body, and limiting means for limiting movement with respect to the apparatus body of the recording and/or reproduction unit by the elastic supporting mechanism in the state where the cartridge is drawn out by the first and/or second movement operation mechanisms from the accommodating body. This limiting means is composed of at least one engagement projection provided at either one of the accommodating body and the carrying mechanism, and an engaged portion provided at the other, whereby the engagement projection and the engaged portion are engaged so that relative movement between the accommodating body and the carrying mechanism is limited. In this case, the engagement between the engagement portion and the engaged portion is released as the result of the fact that the carrying mechanism is moved in a direction in parallel to the principal surface of the cartridge with respect to the accommodating body.

A loading mechanism for cartridge according to this invention comprises an accommodating body within which plural cartridges within which recording media are respectively accommodated are accommodated in such a manner that the principal surfaces of the respective cartridges are in parallel to each other, opening portions for allowing the cartridge to undergo movement operation in a direction in parallel to the principal surface being provided on plane surfaces opposite to each other of the accommodating body; a taking-out mechanism for selectively taking out any one of the disc cartridges from the accommodating body; a carrying mechanism for allowing the disc cartridge taken out by the taking-out mechanism to further undergo movement operation, and a vertical movement mechanism for allowing the accommodating body and the taking-out mechanism to relatively undergo vertical movement. In this case, the taking-out mechanism includes a first movement operation mechanism inserted into the accommodating body through the opening portions provided at the accommodating body to move any one of the cartridges accommodated within the accommodating body in a direction in parallel to the principal surface thereof. The carrying mechanism includes a second movement operation mechanism for allowing the cartridge which has been taken out by the taking-out mechanism to further undergo movement operation.

The first movement operation mechanism constituting the loading device comprises a first movement operation member engaged with an engaged portion of the cartridge accommodated within the accommodating body and a second movement operation member in contact with the side surface of the cartridge, thus to allow the first and second movement operation members to undergo inserting operation from one opening portion of the accommodating body to thereby allow them to be selectively engaged with the cartridge within the accommodating body to allow the cartridge to undergo movement operation in a direction in parallel to the principal surface thereof.

Moreover, the taking-out mechanism comprises operation means for withdrawing the first movement operation mechanism from the opening portion of the accommodating body when the cartridge is caused to undergo movement operation in a direction in parallel to the principal surface thereof from the accommodating body by the second movement operation mechanism. This operation means comprises a position detecting mechanism for carrying out position detection of the first movement operation mechanism.

The loading device according to this invention further comprises control means for detecting on the basis of a detection output from the position detecting mechanism whether or not the cartridge accommodated into the accommodating body is correctly inserted to allow the inserted cartridge to undergo movement operation in a direction to eject it from the accommodating body on the basis of the detection result.

Moreover, the carrying mechanism is further provided with the second movement operation mechanism, and comprises a further drawing-out mechanism provided so that it can be moved with respect to the carrying mechanism. This further drawing-out mechanism comprises a prevention mechanism for preventing taking-out operation of other cartridges from the accommodating body when the second movement operation mechanism allows the cartridge of the accommodating body to undergo movement operation up to the position where movement operation.

Furthermore, a recording and/or reproducing apparatus according to this invention comprises a recording and/or reproduction unit disposed at the back side of the apparatus body, and adapted for carrying out recording and/or reproduction of information signals with respect to recording media accommodated within the cartridges; an accommodating body adapted so that plural disc cartridges are accommodated therewithin, opening portions for allowing the disc cartridge to undergo movement operation being formed at plane surfaces opposite to each other of the accommodating body, the accommodating body being disposed at the front side of the apparatus body; a taking-out mechanism for selectively any one of the cartridges from the accommodating body; a carrying mechanism for loading the cartridge which has been taken out by the taking-out mechanism into the recording and/or reproduction unit; and a vertical movement mechanism for allowing the accommodating body and the taking-out mechanism to relatively undergo vertical movement. In this case, the taking-out mechanism comprises a first movement operation mechanism inserted into the accommodating body through the opening portion provided at the accommodating body to move any one of the cartridges accommodated within the accommodating body in a direction in parallel to the principal surface thereof. The carrying mechanism is disposed between the accommodating body and the recording and/or reproduction unit, and allows the cartridge which has been taken out by the taking-out mechanism after undergone movement between the accommodating body and the recording and/or reproduction unit to undergo movement operation by the second movement operation mechanism to allow it to undergo loading into the recording and/or reproduction unit.

This recording and/or reproducing apparatus is further provided with a guide mechanism disposed between the apparatus body and the accommodating body, and adapted to guide the cartridge inserted into the apparatus body to accommodate it into the accommodating body.

Other objects of this invention and advantages obtained will become more clear from the description of embodiments given below with reference to the attached drawings.

BRIEF DESCRIPTION OF THE DRAWINGS

FIG. 120 is a plan view showing the state where disc cartridge is accommodated into the accommodating body and first detection lever is admitted into the accommodating body by operation lever.

FIG. 121 is a plan view showing the state where eject operation from the accommodating body of the disc cartridge by first detection lever is started.

FIG. 122 is a plan view showing the middle state of eject operation from the accommodating body of the disc cartridge by the first detection lever.

FIG. 123 is a plan view showing the middle state of eject operation from the accommodating body of the disc cartridge by the first detection lever where the second detection lever is admitted into the accommodating body.

FIG. 124 is a plan view showing the middle state of eject operation from the accommodating body of the disc cartridge by the first detection lever where the second detection lever starts pressing of the disc cartridge.

FIG. 125 is a plan view showing the middle state of eject operation from the accommodating body of the disc cartridge by the first detection lever where the first detection lever starts withdrawal from the accommodating body.

FIG. 126 is a plan view showing the middle state of eject operation from the accommodating body of the disc cartridge by the first detection lever where the first detection lever is withdrawn from the accommodating body.

FIG. 127 is a plan view showing the state where eject operation from the accommodating body of the disc cartridge is completed, and the second detection lever begins returning to the initial position.

FIG. 128 is a plan view showing the middle state where the second detection lever is returning to the initial position.

FIG. 129 is a plan view showing the state where eject operation from the accommodating body of the disc cartridge is completed so that the second detection lever has returned to the initial position.

FIG. 130 is a circuit diagram showing connection relationship of first and second detection switches.

FIG. 131 is a time chart showing outputs of first and second detection switches when the disc cartridge is caused to undergo insertion operation into the accommodating body in a regular (normal) direction.

Figure 132:
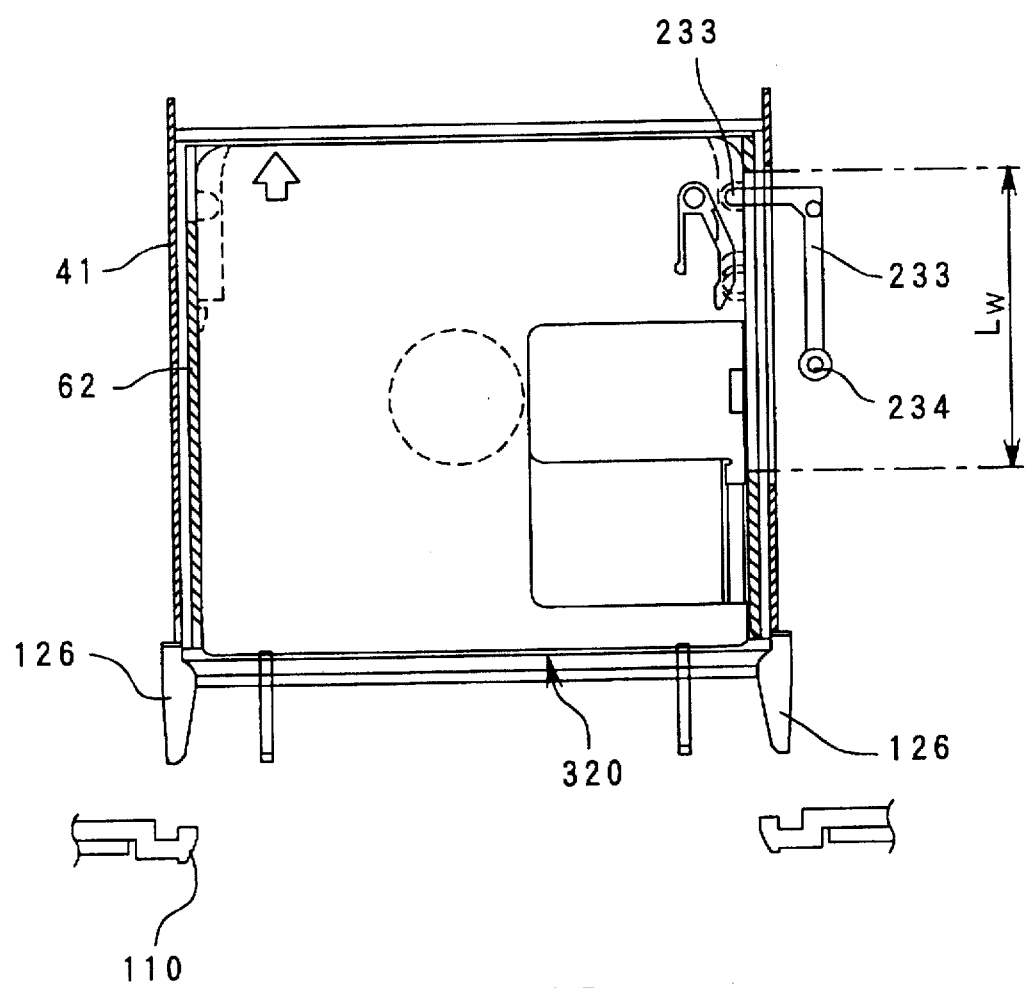

FIG. 132 is a plan view showing another example of the cartridge taking-out mechanism.

Figure 133:
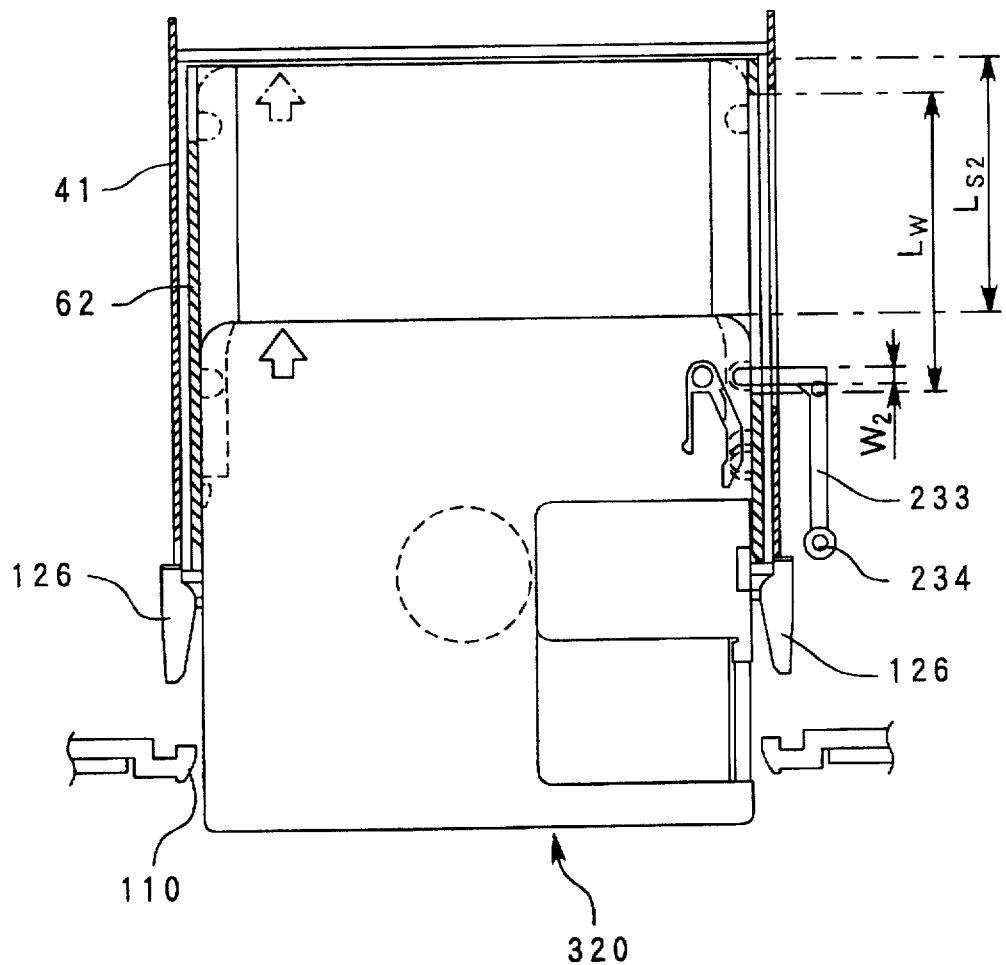

FIG. 133 is a plan view showing the state where movement operation lever constituting the above-mentioned mechanism starts movement operation of the disc cartridge.

Figure 134:
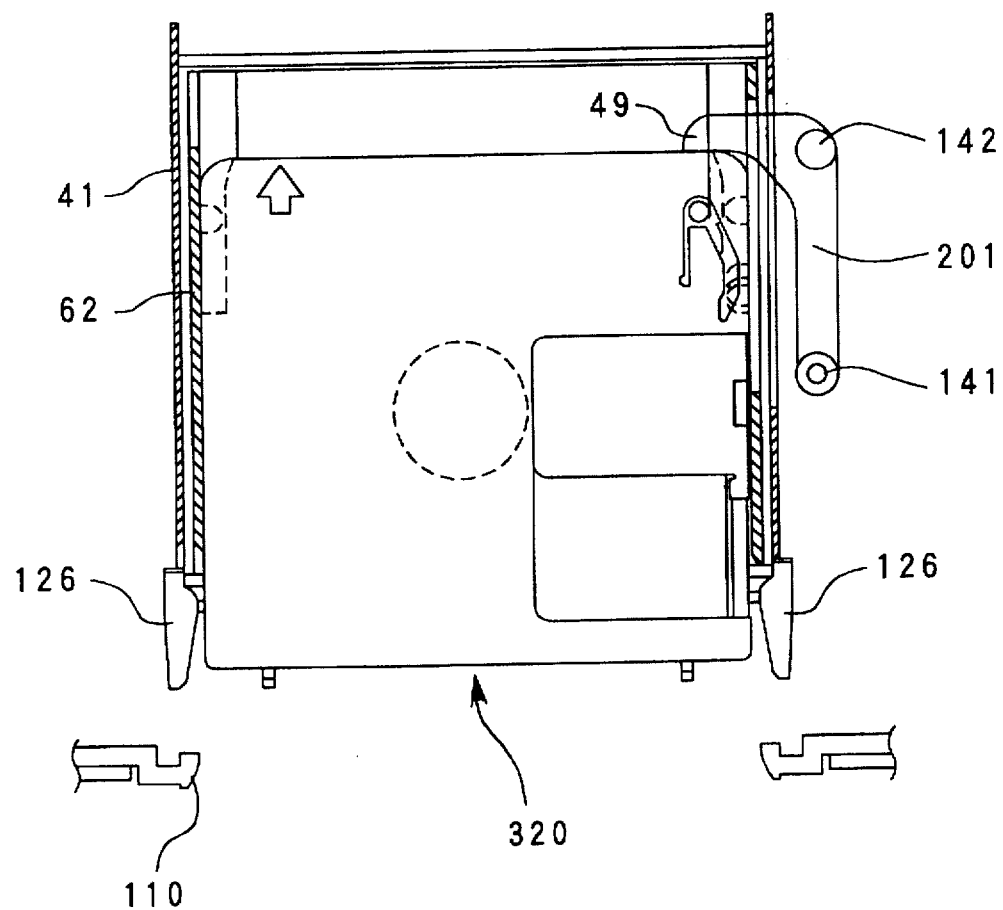

FIG. 134 is a plan view showing another example where the stopper lever is used as movement operation member of the disc cartridge.

Figure 135:
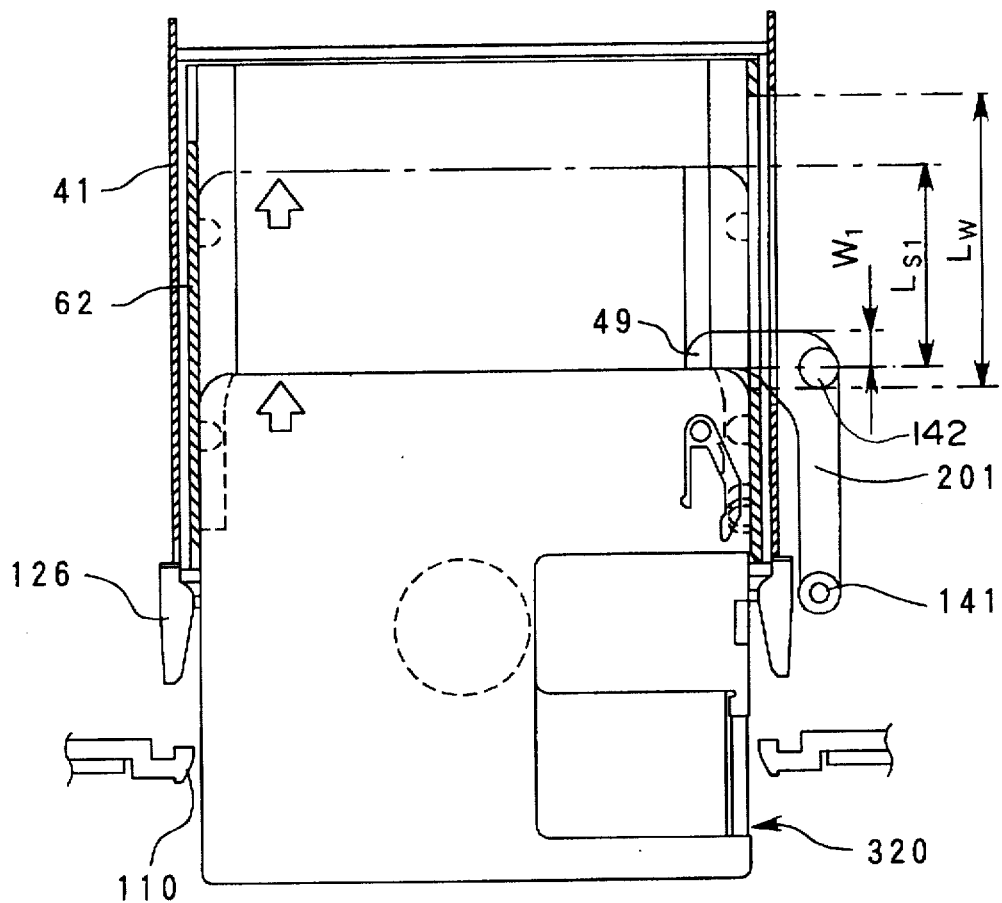

FIG. 135 is a plan view showing movement operation distance with respect to the accommodating body of the disc cartridge in the above-mentioned example.

Figure 136:
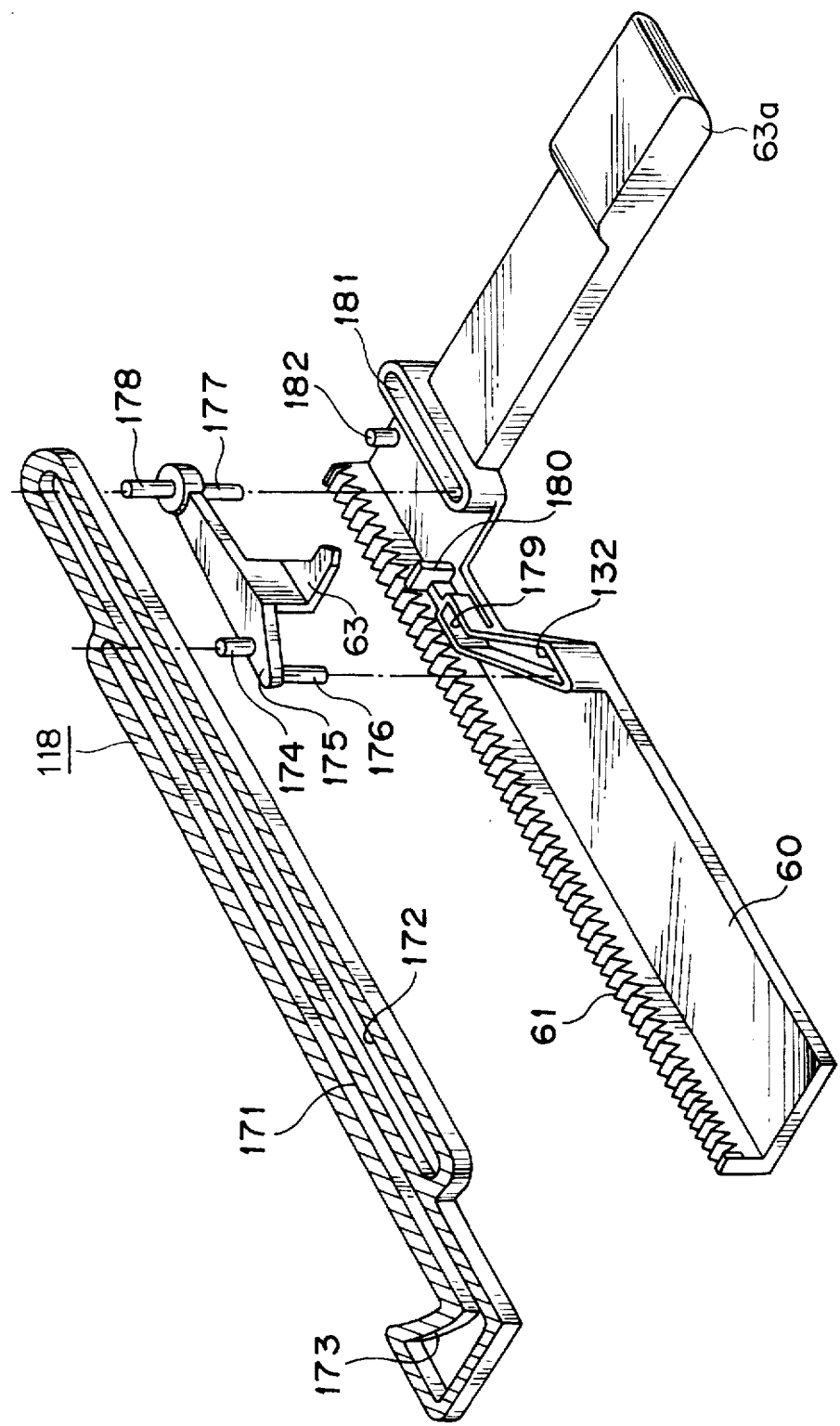

FIG. 136 is an exploded perspective view showing cartridge carrying mechanism of the recording/reproducing apparatus according to this invention.

Figure 137:
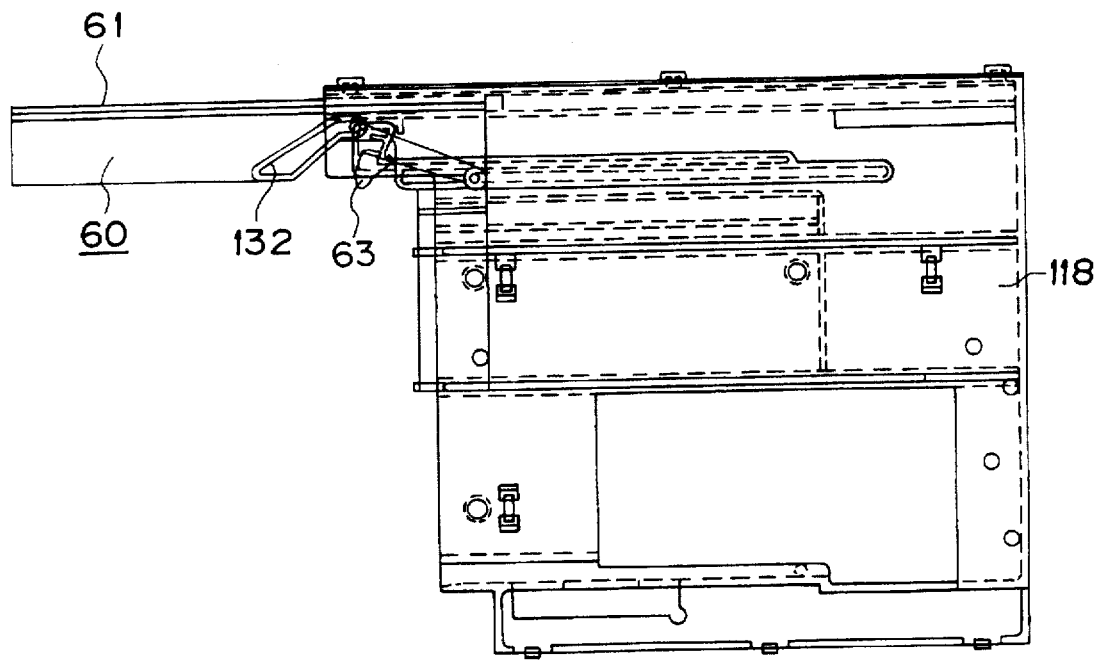

FIG. 137 is a plan view when the cartridge carrying mechanism is located at the initial position.

Figure 138:
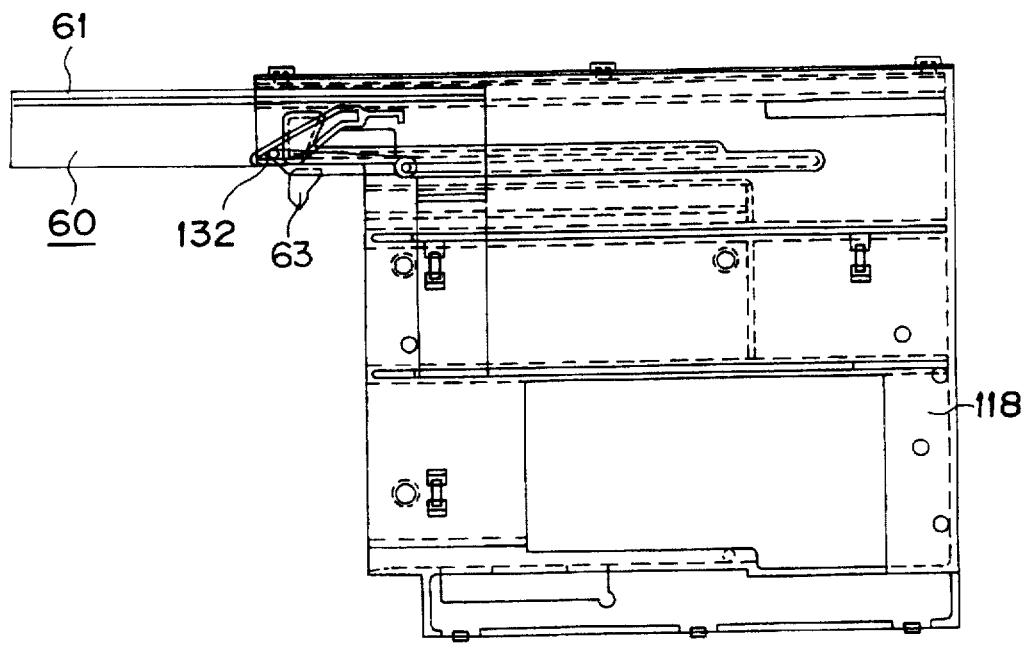

FIG. 138 is a plan view of cartridge carrying mechanism in the course of carrying the disc cartridge.

Figure 139:
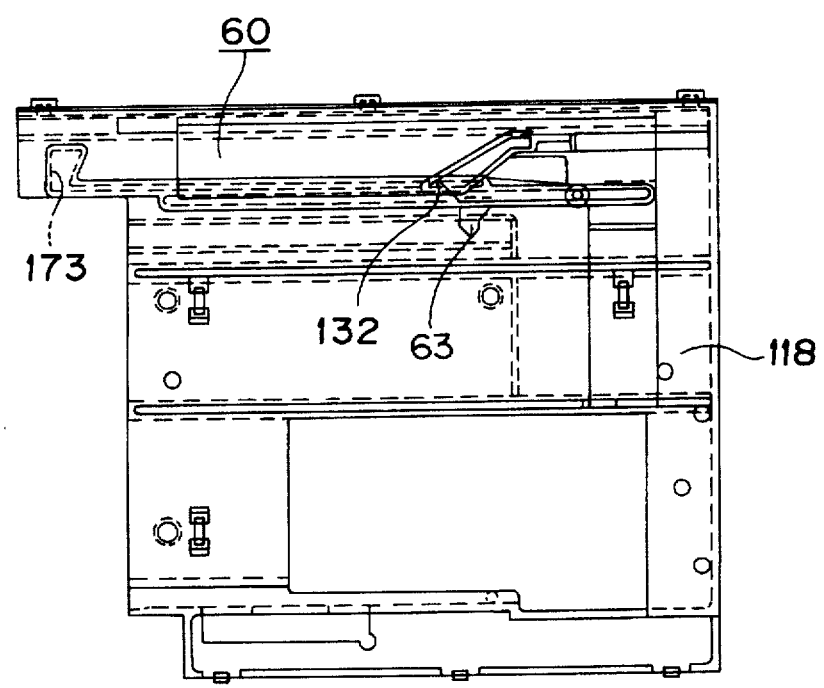

FIG. 139 is a plan view of cartridge carrying mechanism in the state where the disc cartridge is carried to the recording/reproduction unit side.

Figure 140:
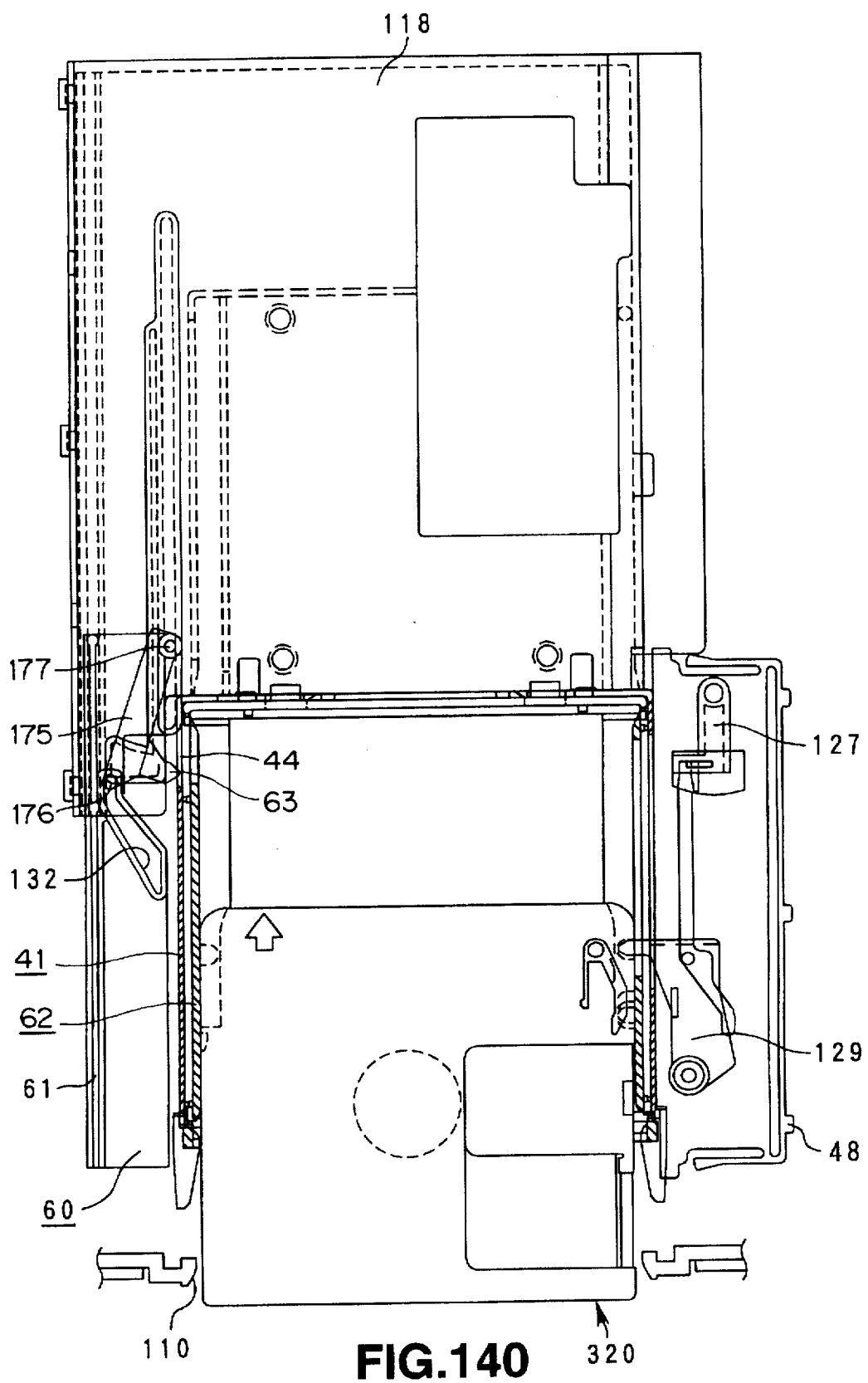

FIG. 140 is a plan view showing the state where the disc cartridge is inserted into the cartridge holder.

Figure 141:
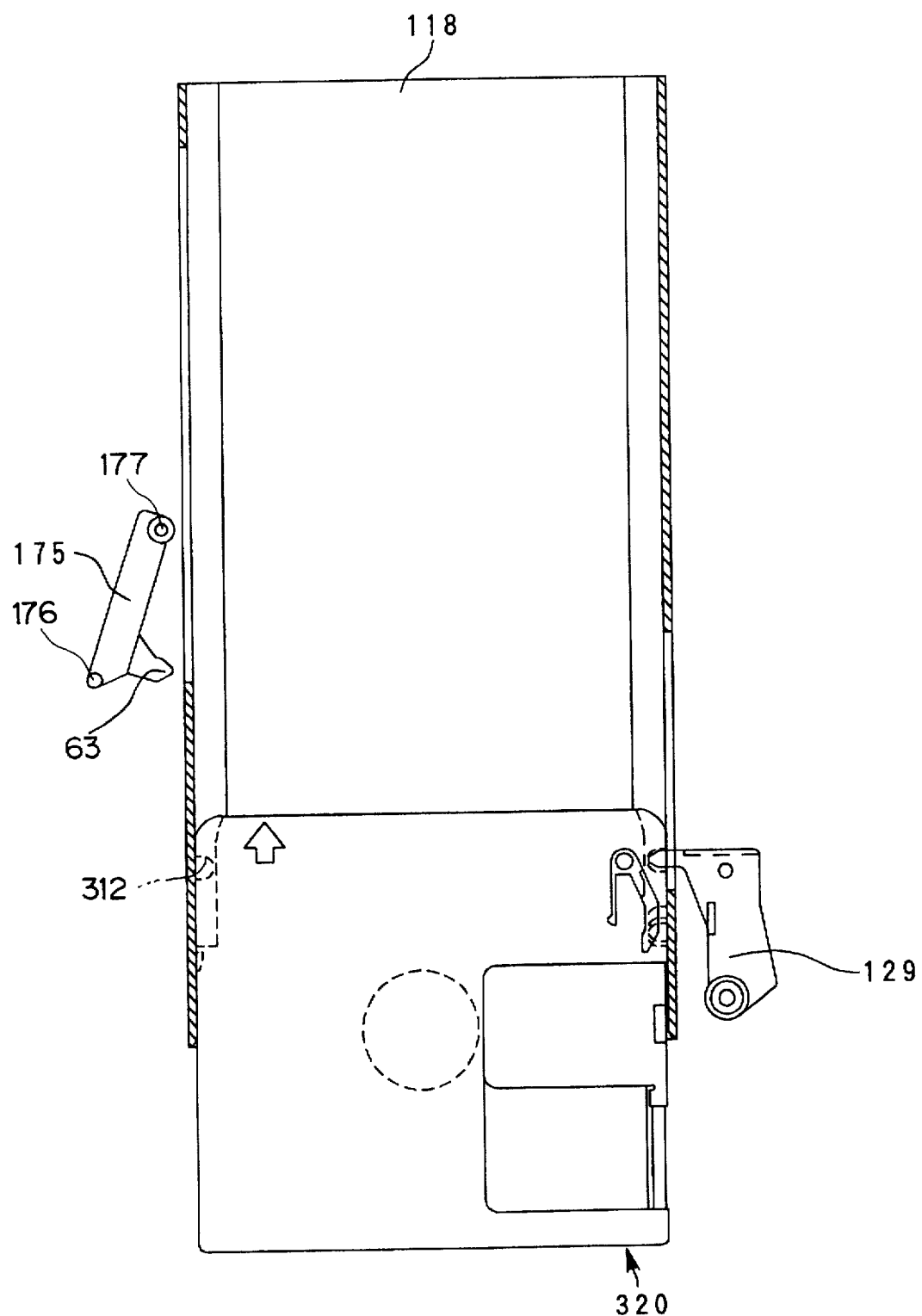

FIG. 141 is a plan view showing movement operation lever when movement of the disc cartridge is started from the accommodating body to the cartridge holder.

Figure 142:
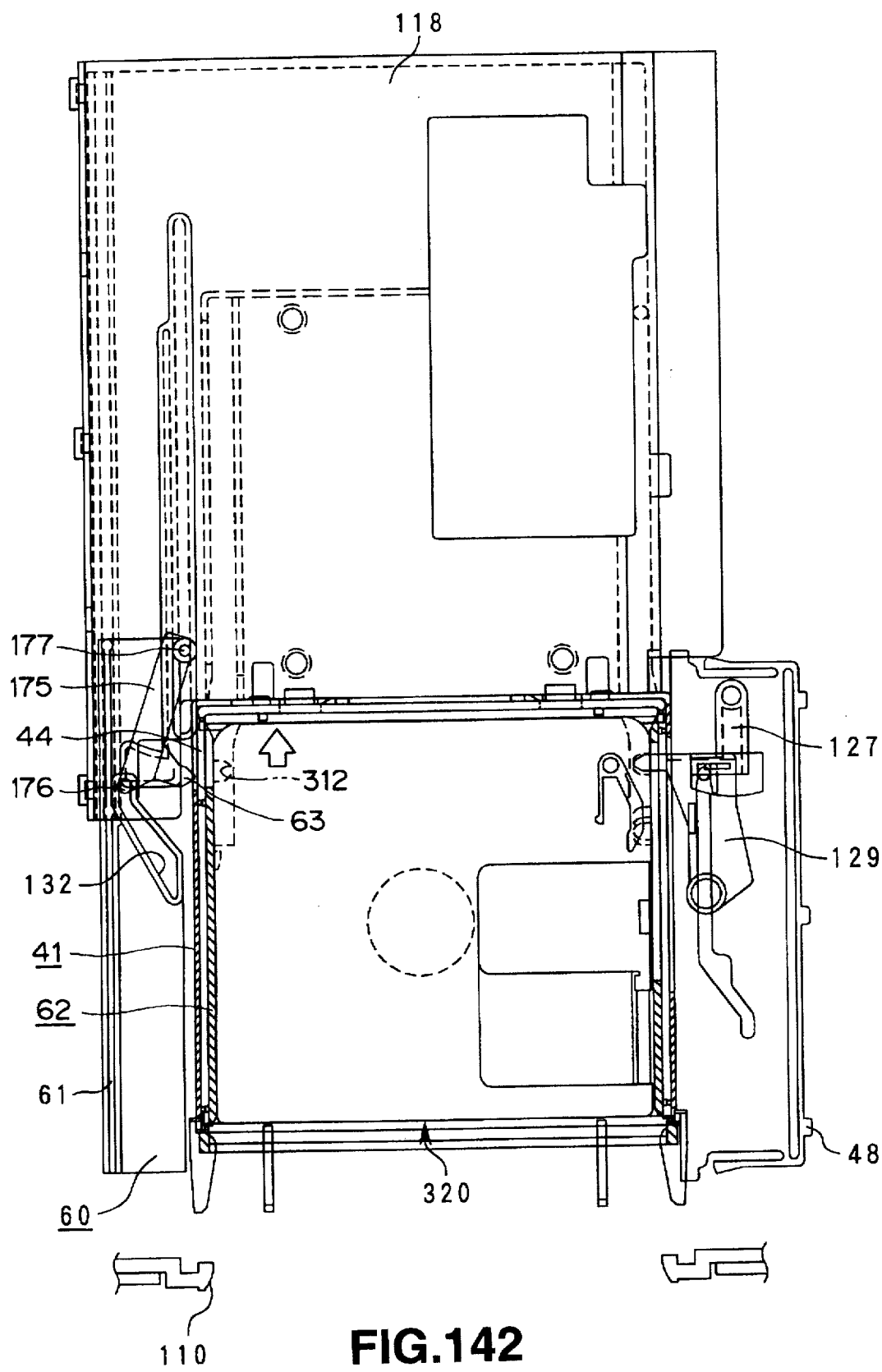

FIG. 142 is a plan view showing the state where disc cartridge is carried into the accommodating body by the cartridge carrying mechanism.

Figure 143:
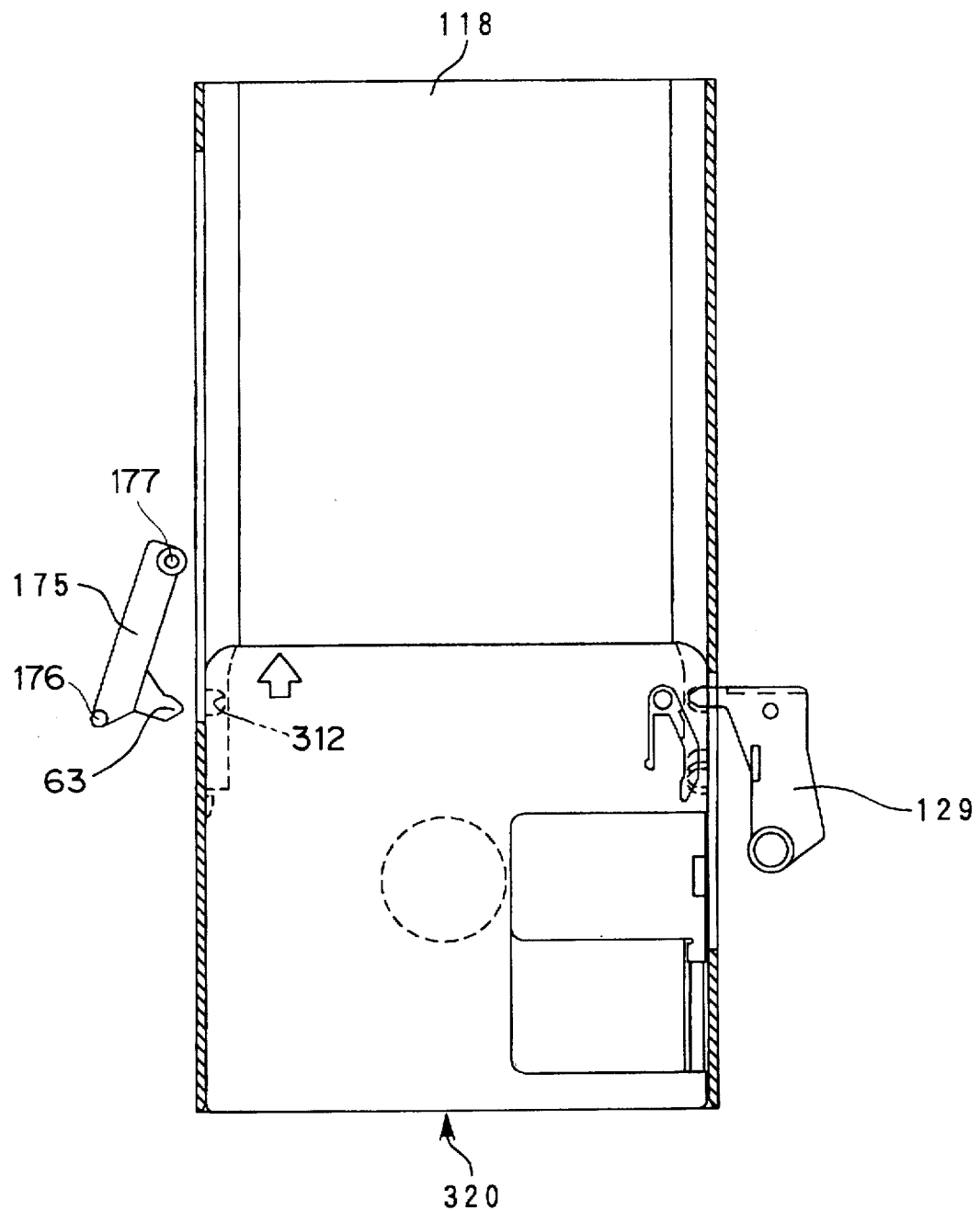

FIG. 143 is a plan view of cartridge carrying mechanism and cartridge movement operation mechanism when the disc cartridge is accommodated into the accommodating body.

Figure 144:
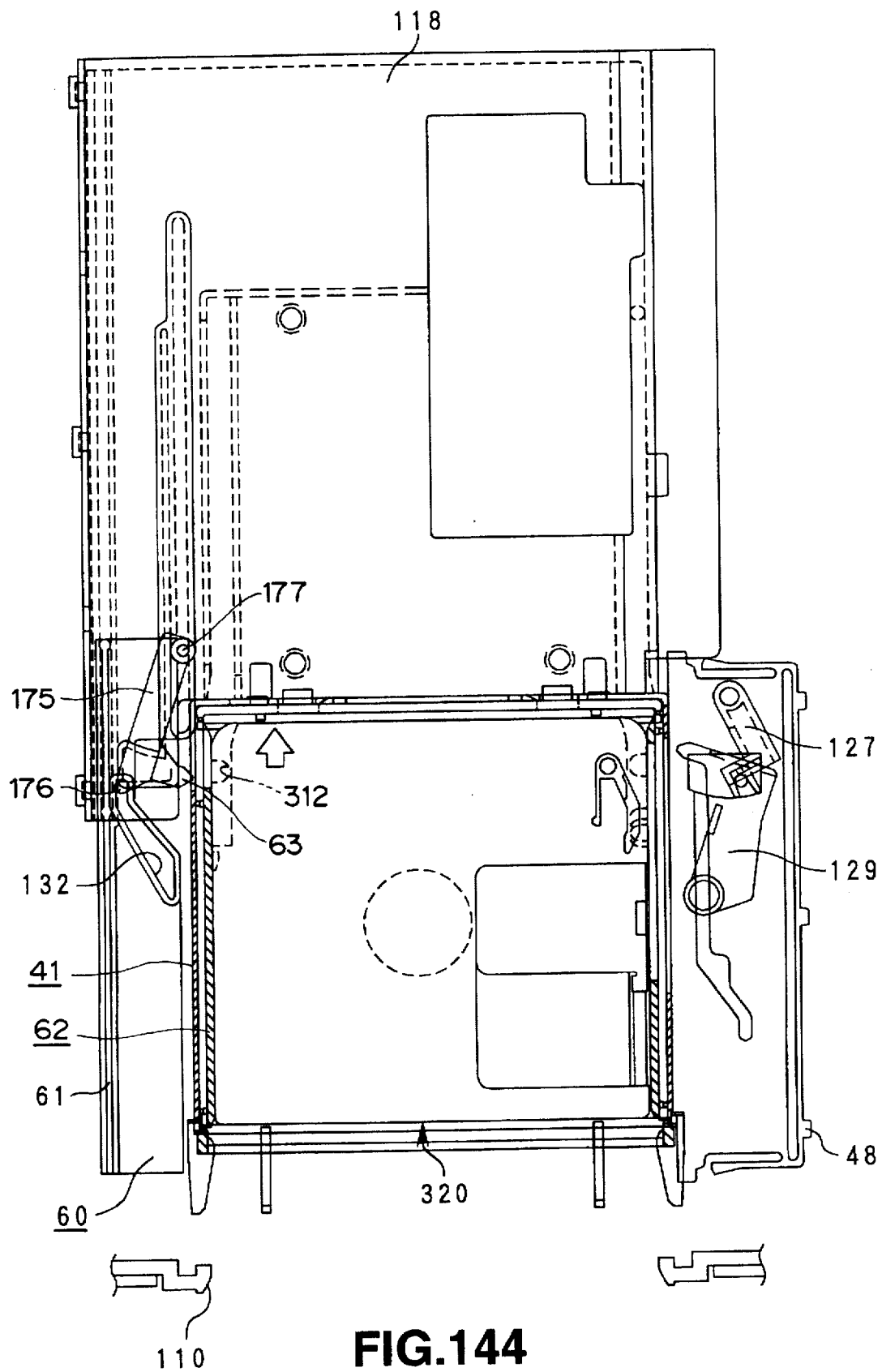

FIG. 144 is a plan view showing the state where the disc cartridge is accommodated into the accommodating body, and movement operation lever of the cartridge carrying mechanism is withdrawn from the accommodating body.

Figure 145:
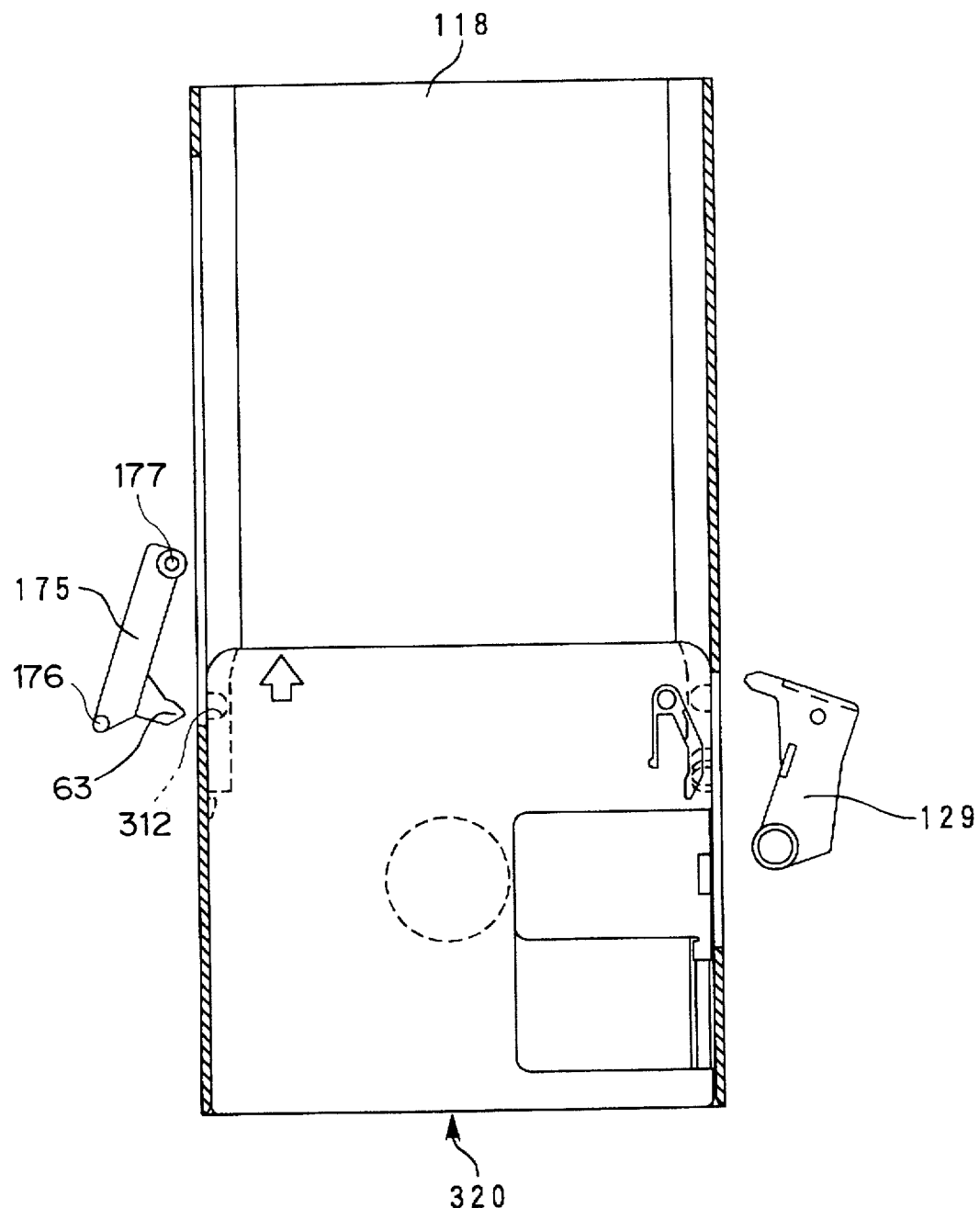

FIG. 145 is a plan view when the disc cartridge is accommodated into the accommodating body and the first detection lever is withdrawn from the accommodating body.

Figure 146:
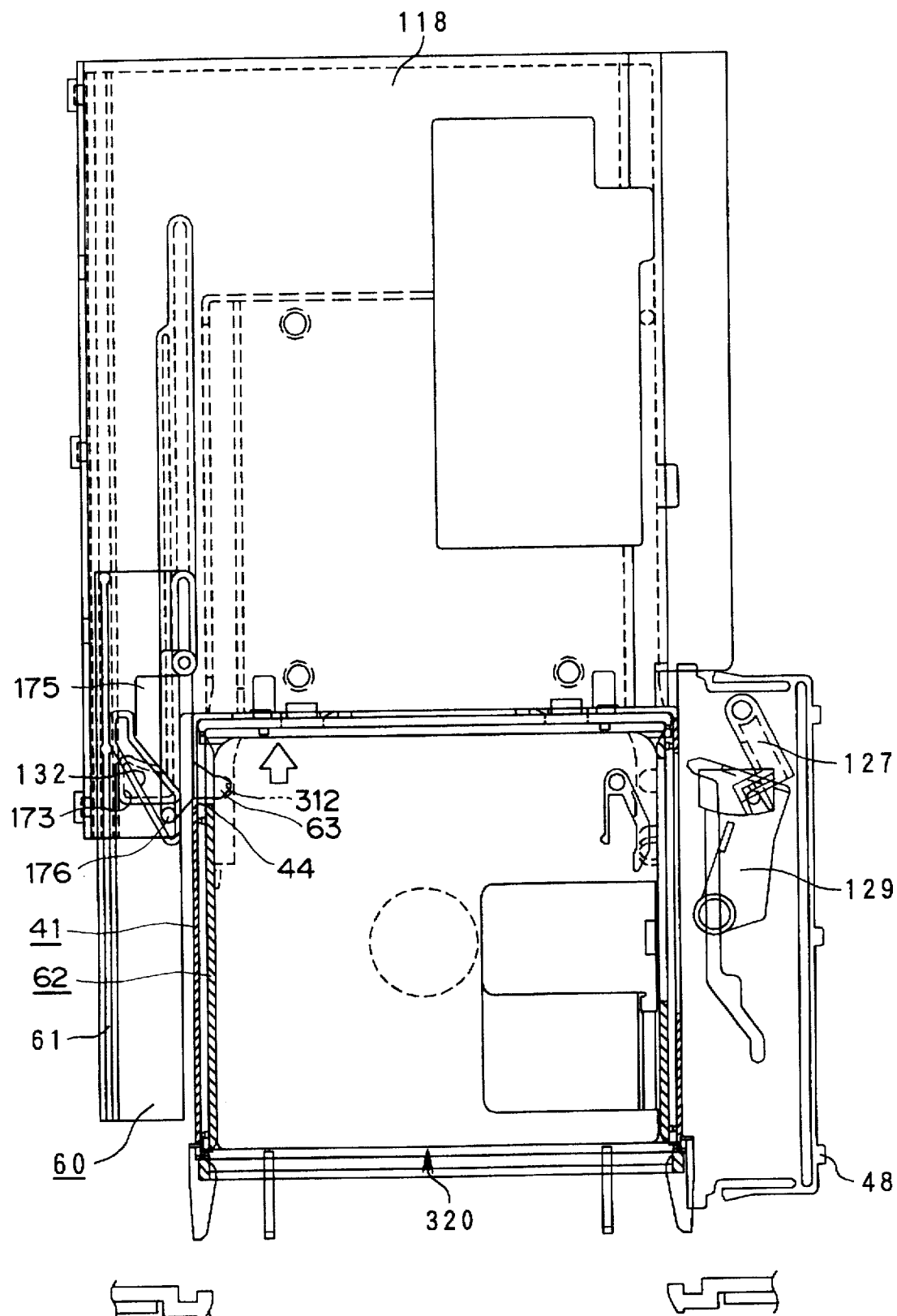

FIG. 146 is a plan view showing the state where disc cartridge is accommodated into the accommodating body and movement operation lever is engaged with the disc cartridge.

Figure 147:
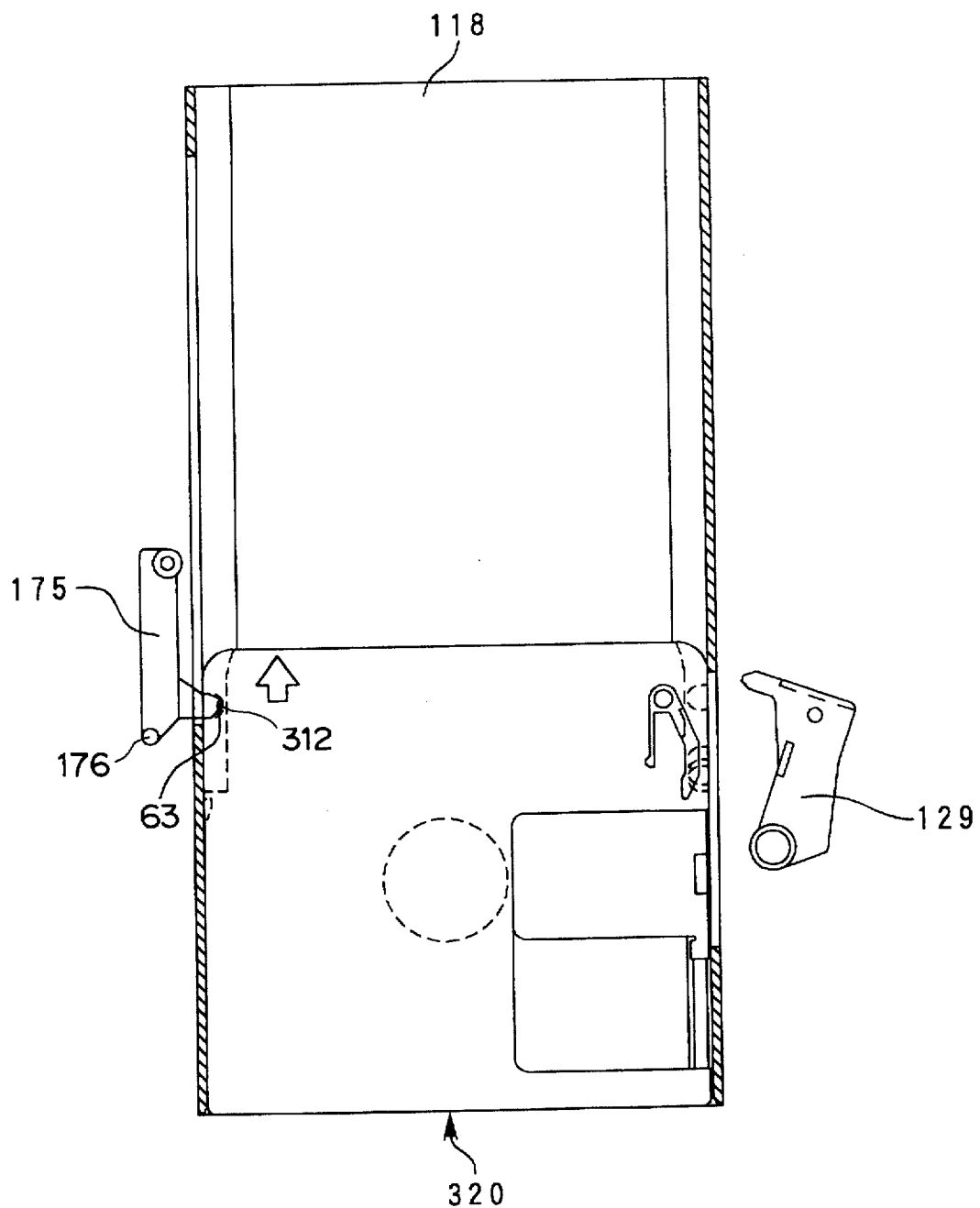

FIG. 147 is a plan view showing the state of second detection lever when disc cartridge is accommodated into the accommodating body and movement operation lever is engaged with disc cartridge.

Figure 148:
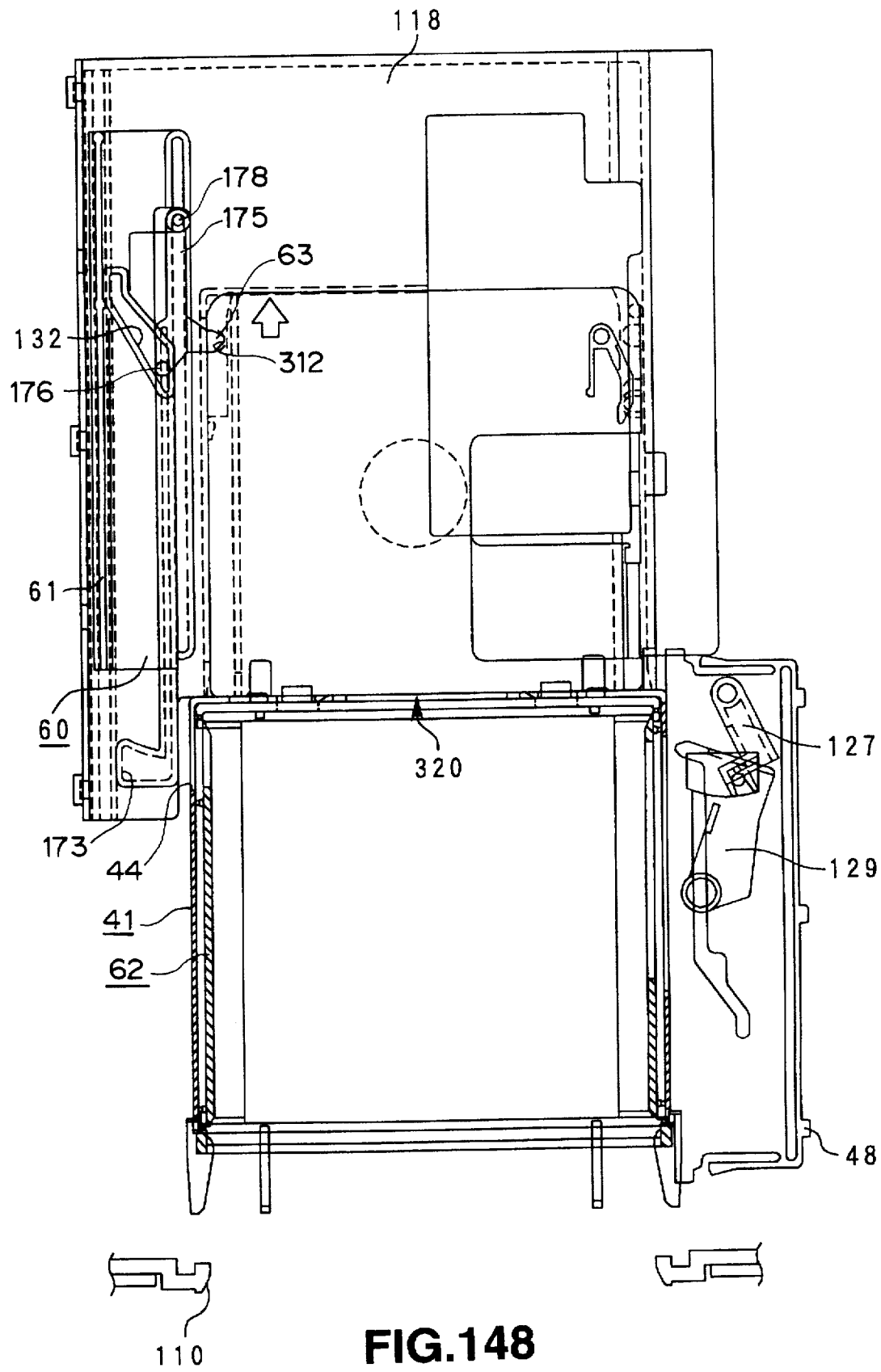

FIG. 148 is a plan view showing the state where disc cartridge is inserted into the cartridge holder by cartridge carrying mechanism.

Figure 149:
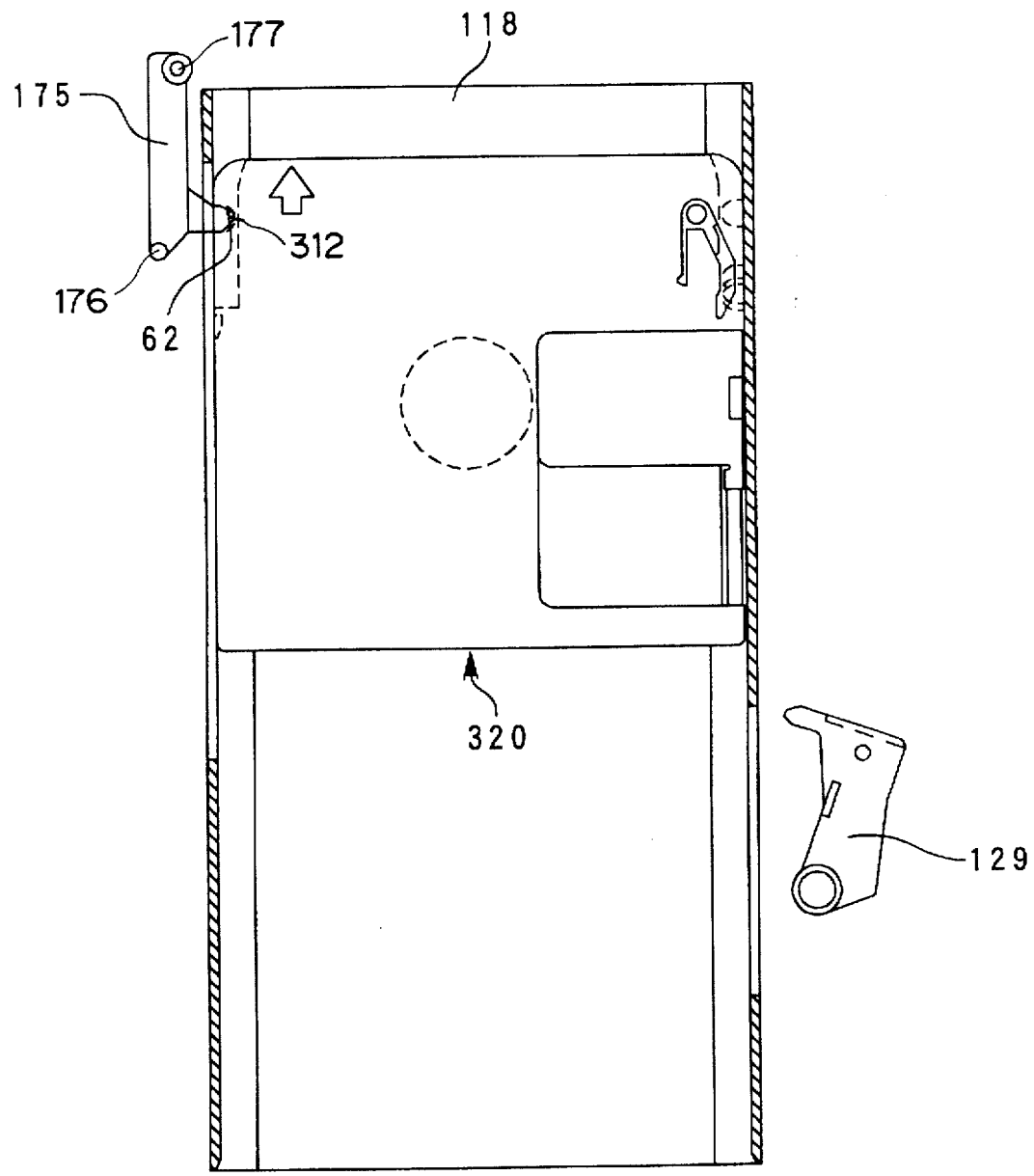

FIG. 149 is a plan view showing the state of movement operation lever and second detection lever when disc cartridge is inserted into the cartridge holder by cartridge carrying mechanism.

Figure 150:
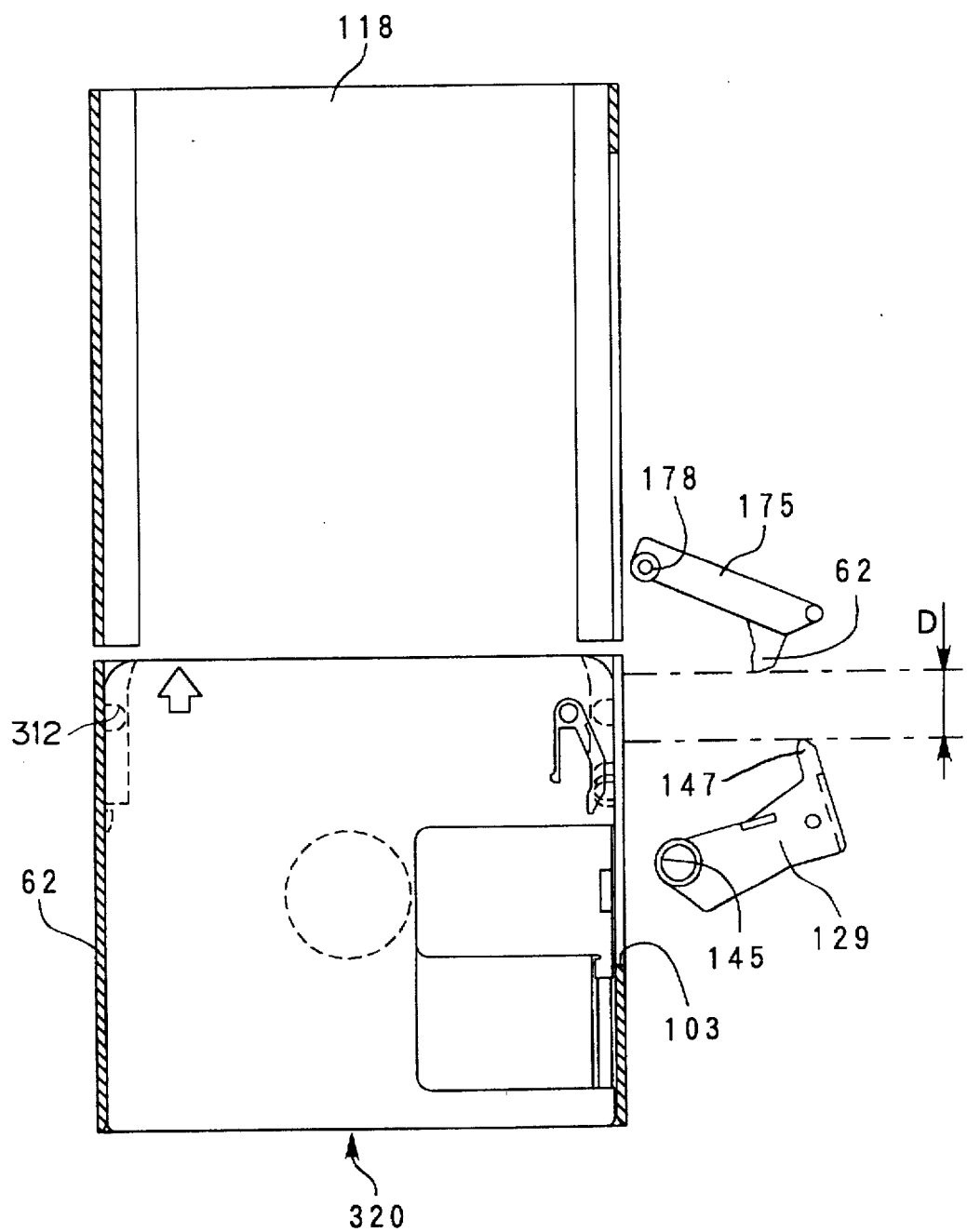

FIG. 150 is a plan view showing the state where cartridge carrying mechanism and cartridge movement operation mechanism are disposed at the same side with respect to the disc cartridge.

Figure 151:
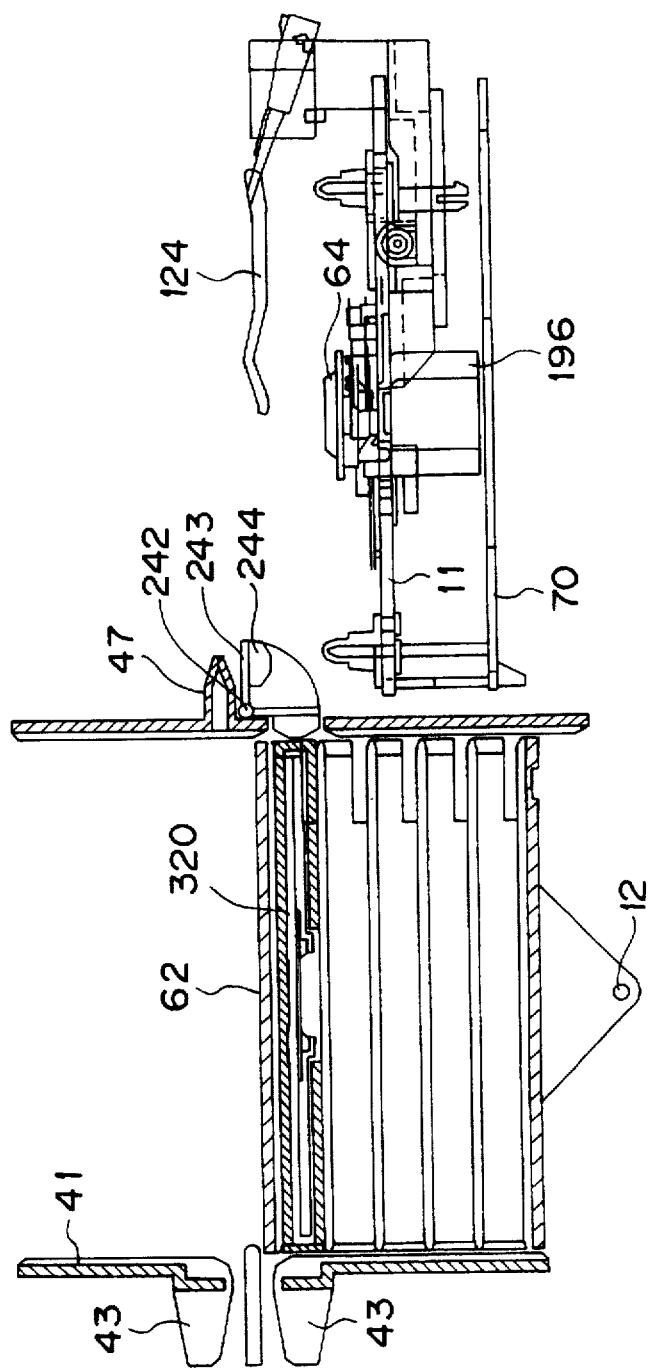

FIG. 151 is a side view showing, partially in broken manner, another example of the configuration of closing member for closing opening portion of the accommodating body.

Figure 152:
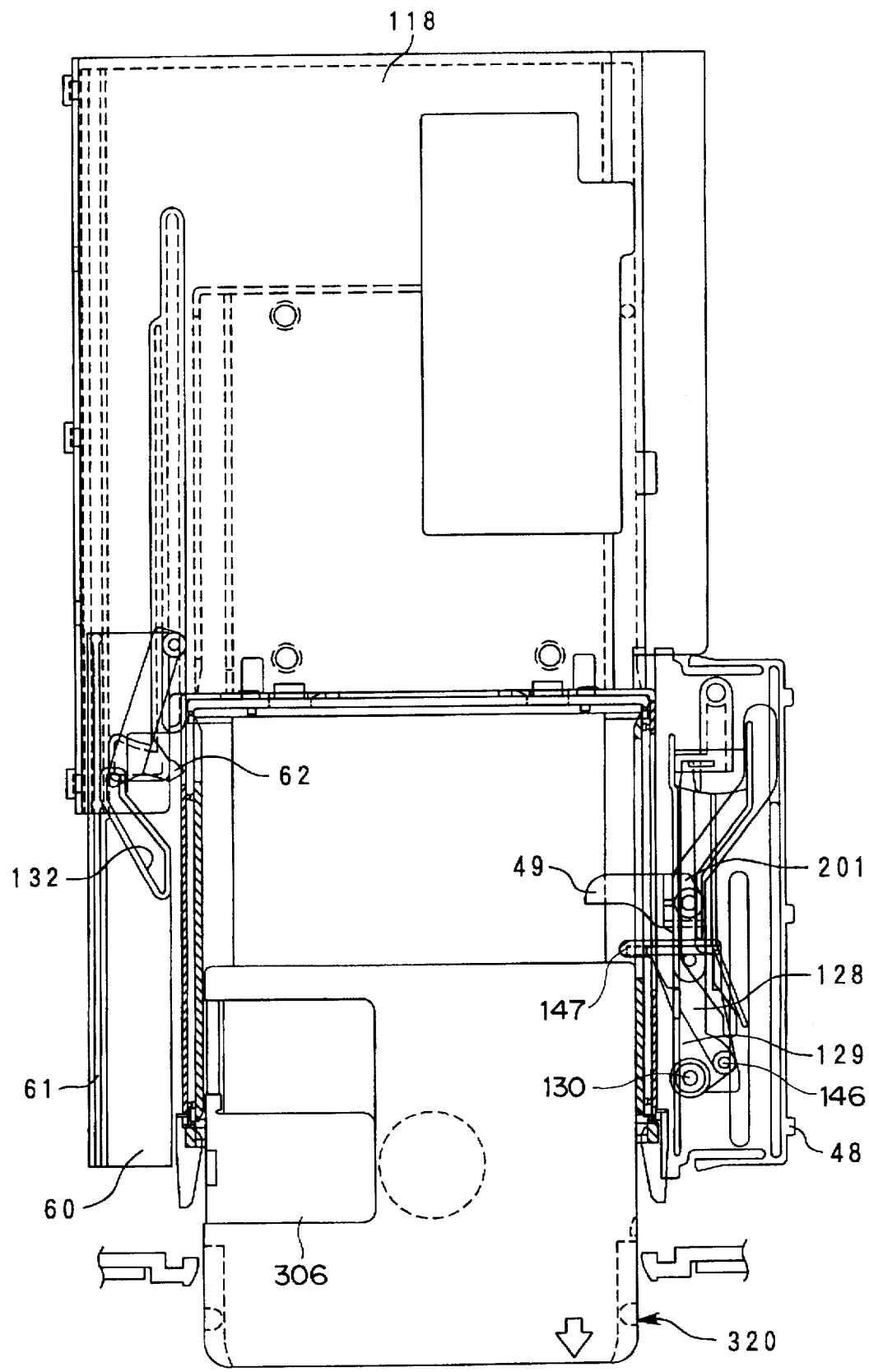

FIG. 152 is a plan view showing the state where the disc cartridge is caused to undergo insertion operation into the accommodating body in the opposite state with respect to forward and backward directions.

Figure 153:
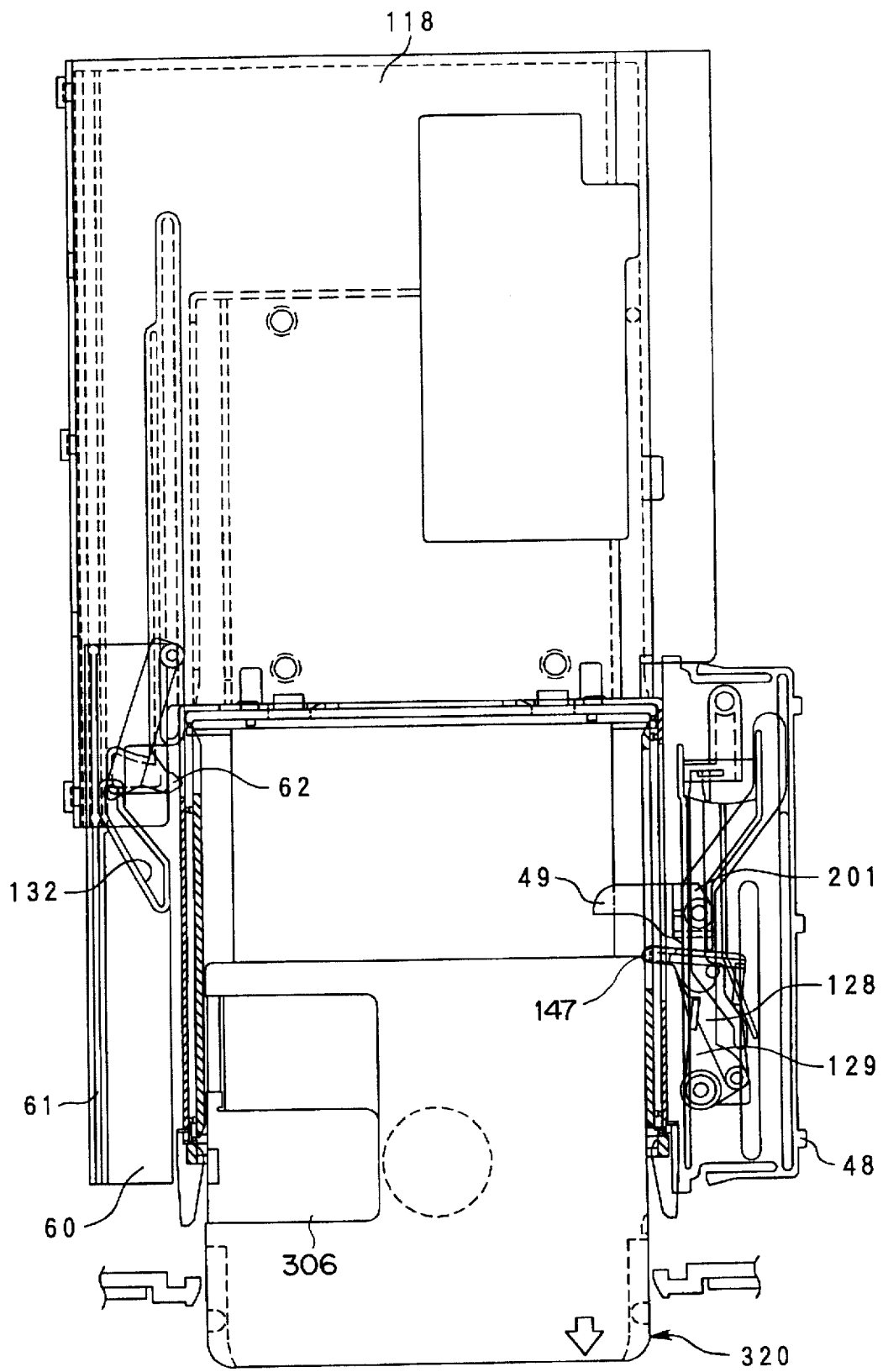

FIG. 153 is a plan view showing the state where the disc cartridge is in contact with the detection mechanism when the disc cartridge is caused to undergo insertion operation into the accommodating body in the opposite state with respect to forward and backward directions.

Figure 154:
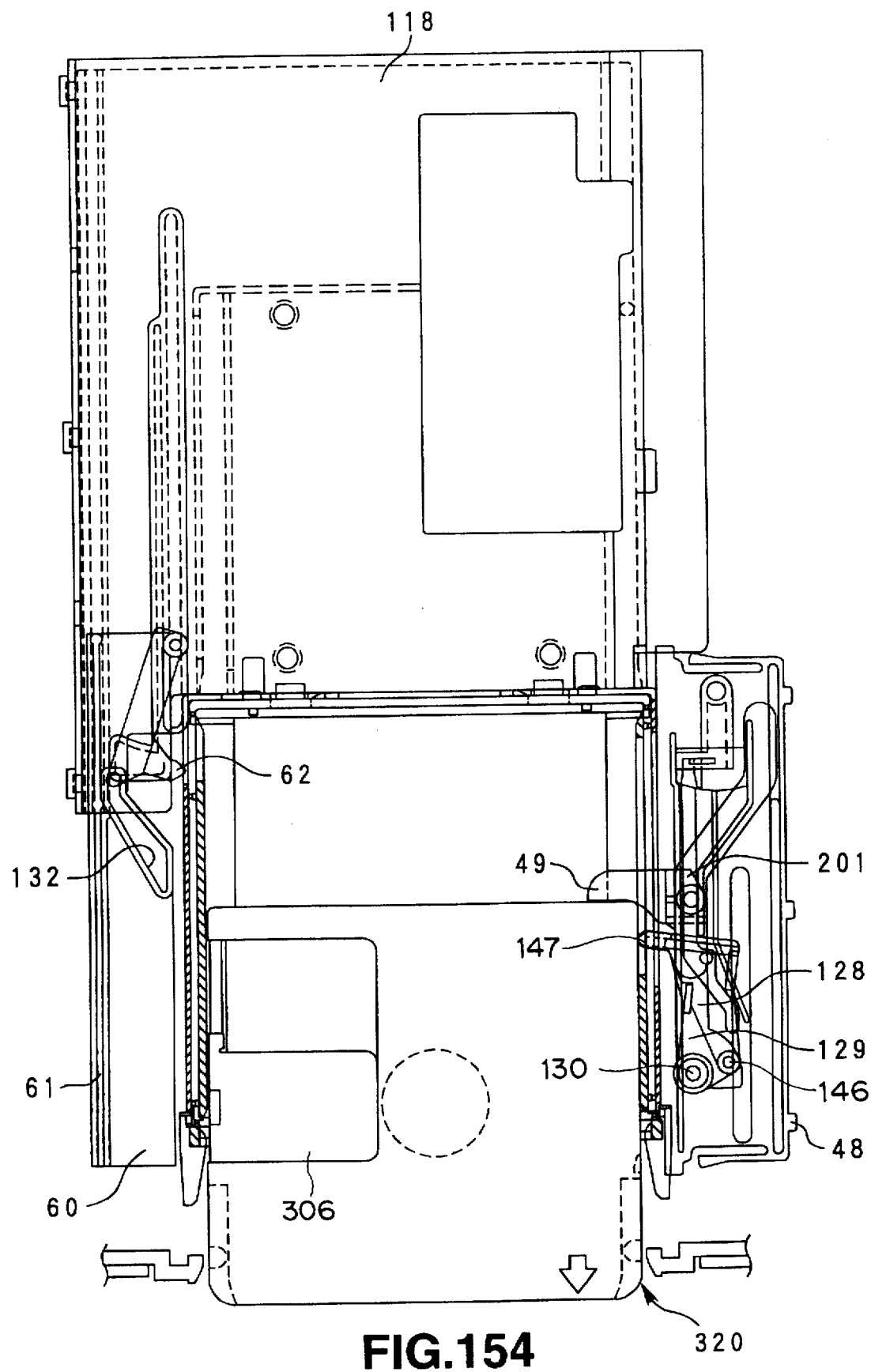

FIG. 154 is a plan view showing the state where the second detection lever is rotated by the disc cartridge when the disc cartridge is caused to undergo insertion operation into the accommodating body in the opposite state with respect to the forward and backward directions.

Figure 155:
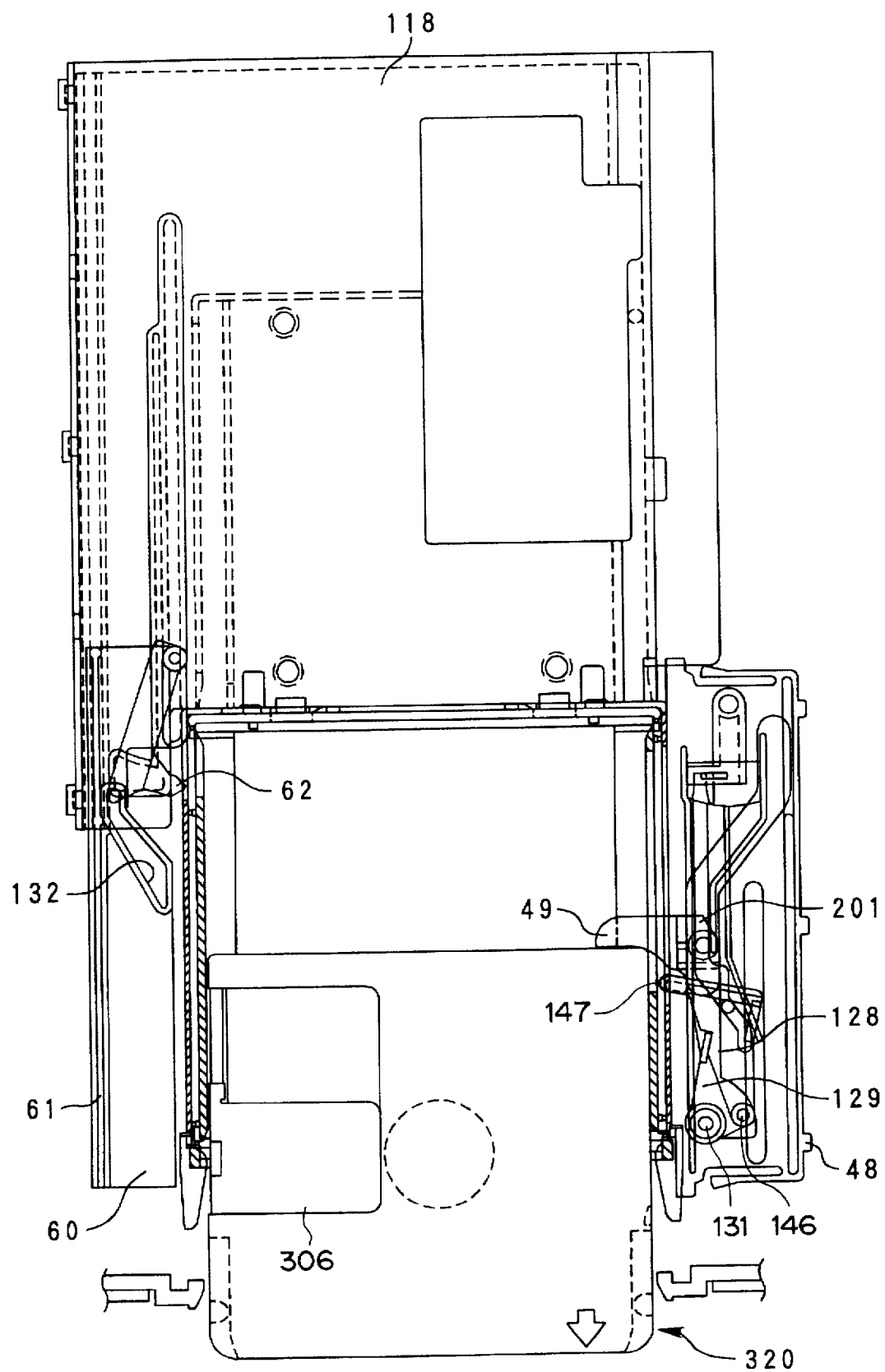

FIG. 155 is a plan view showing the state where the disc cartridge is ejected from the accommodating body when the disc cartridge is caused to undergo insertion operation into the accommodating body in the opposite state with respect to the forward and backward directions.

Figure 156:
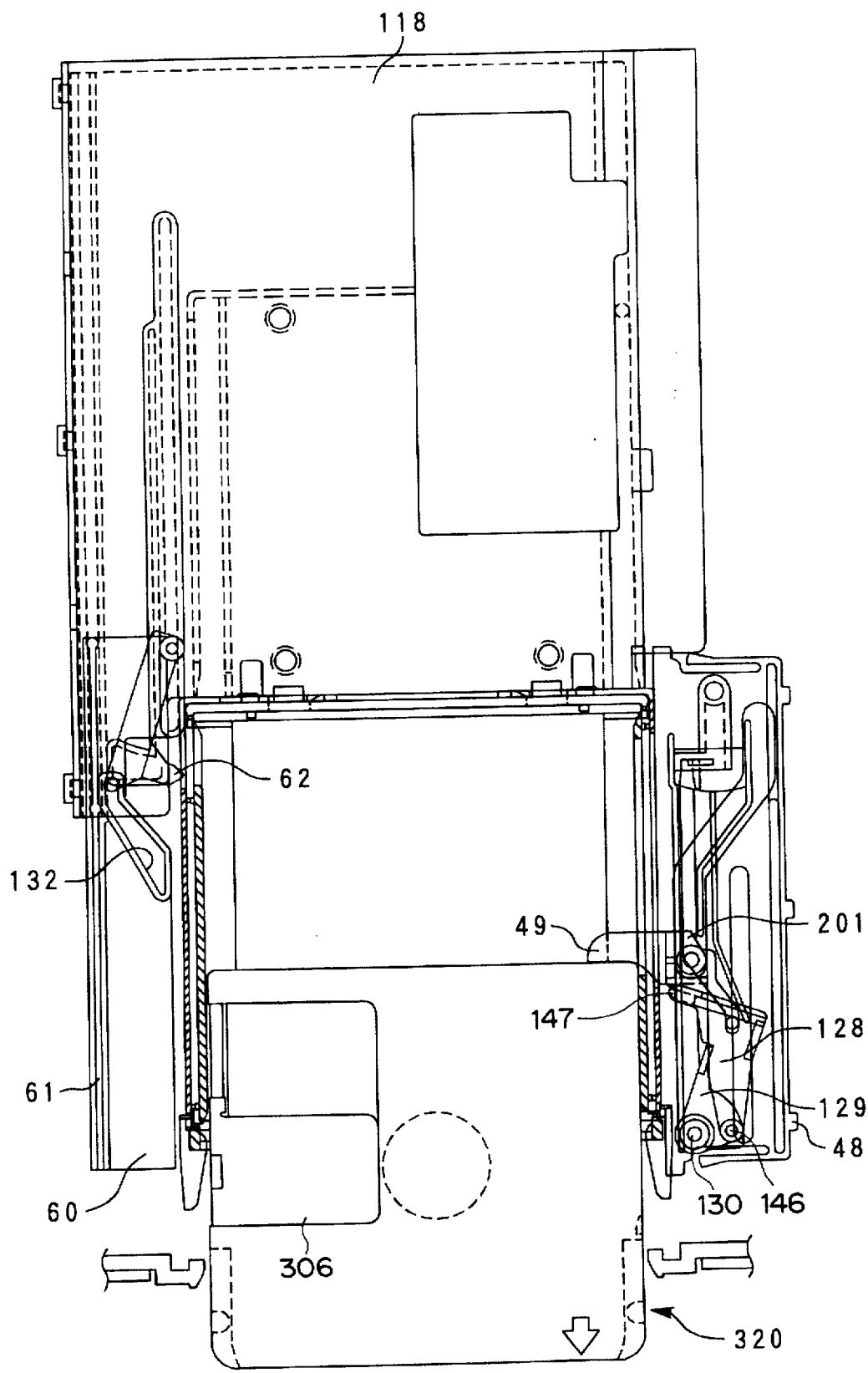

FIG. 156 is a plan view showing the middle state where the disc cartridge is being ejected from the accommodating body when the disc cartridge is caused to undergo insertion operation into the accommodating body in the opposite state with respect to the forward and backward directions.

Figure 157:
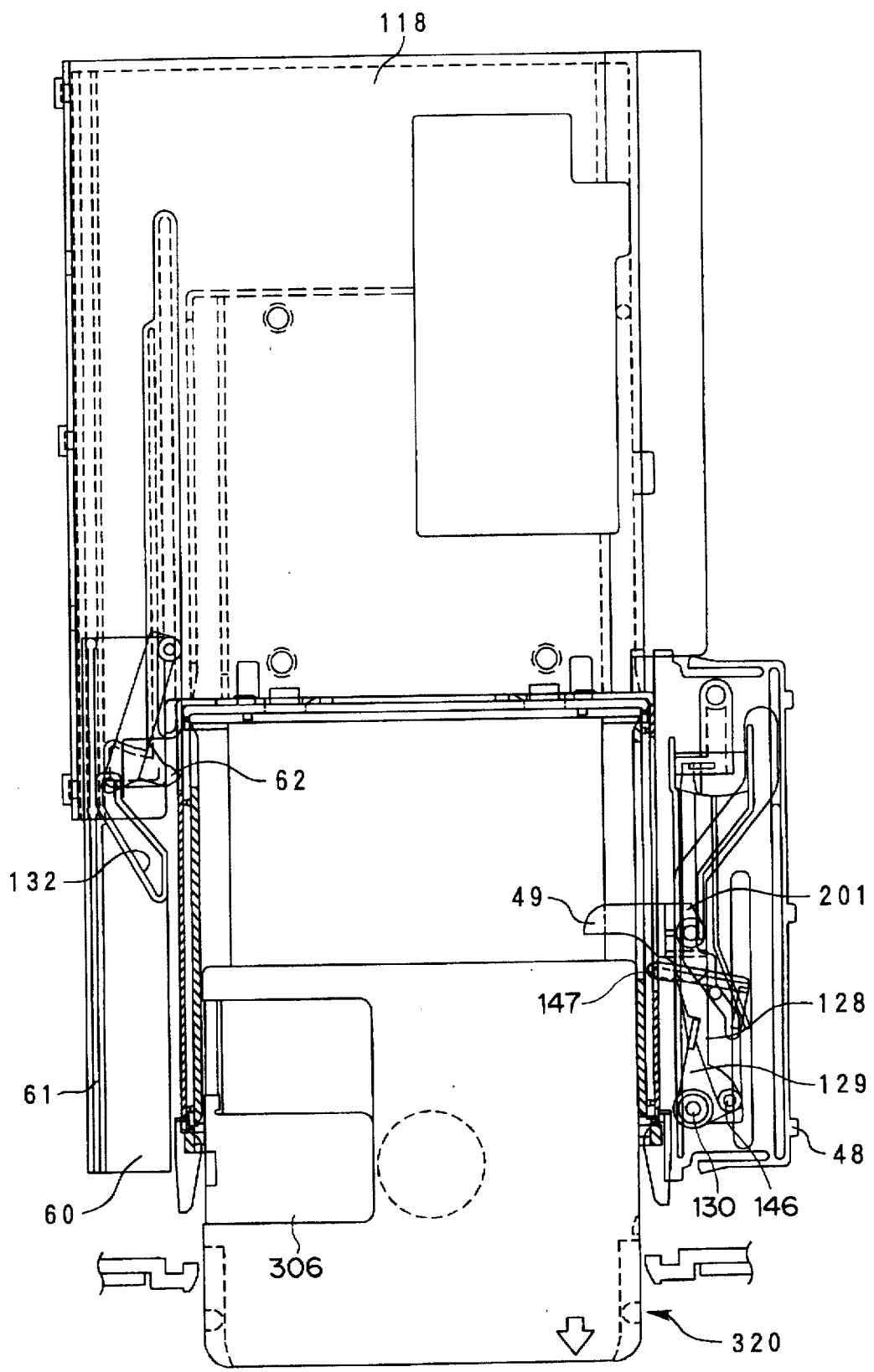

FIG. 157 is a plan view showing the state where the disc cartridge is caused to undergo insertion operation into the accommodating body in the opposite state with respect to forward and backward directions, and is then ejected from the accommodating body by the second detection lever after undergone detection of erroneous insertion.

Figure 158:
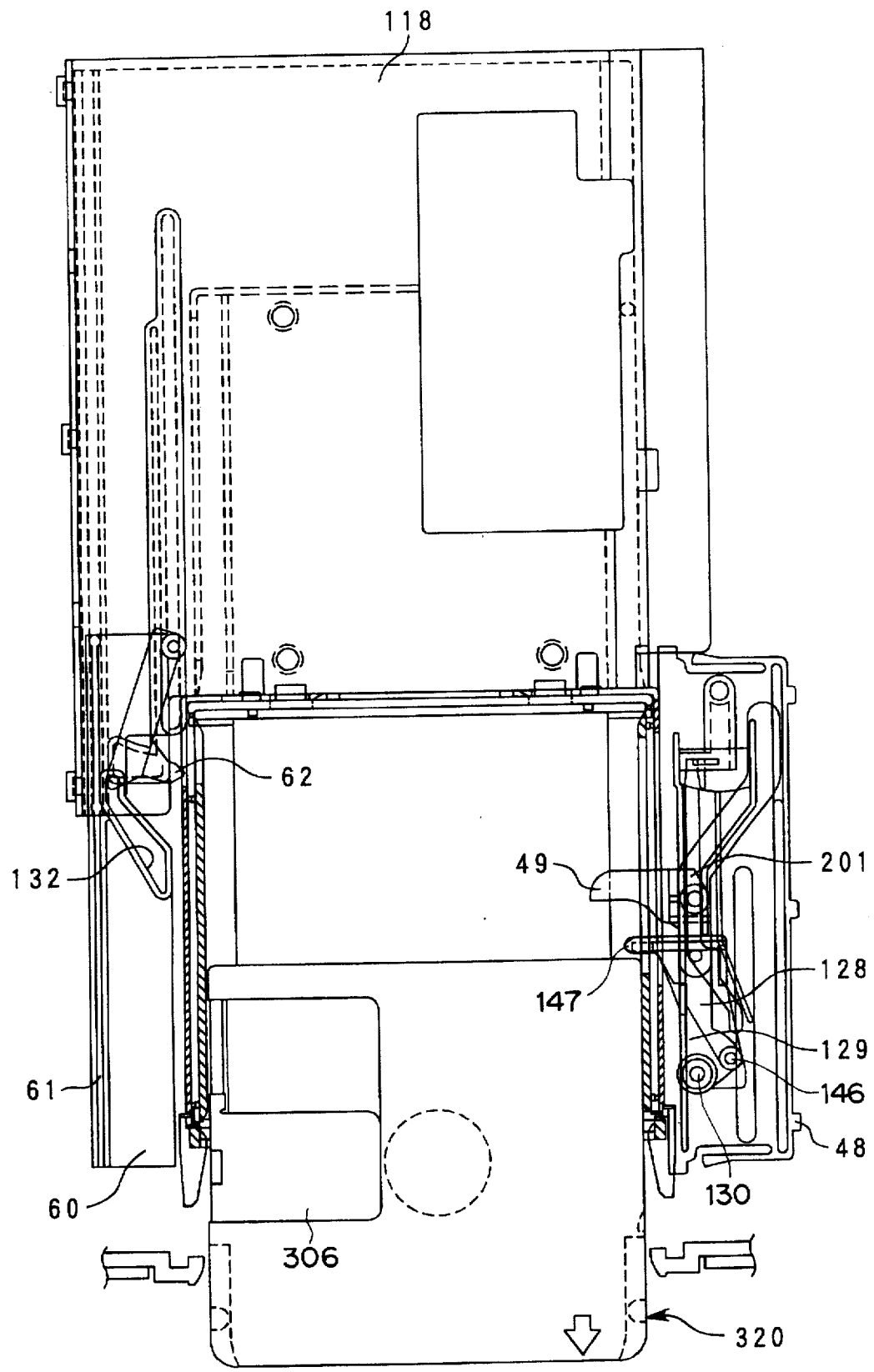

FIG. 158 is a plan view showing the state where the disc cartridge is caused to undergo insertion operation into the accommodating body in the opposite state with respect to the forward and backward directions, and the second detection lever which has ejected the disc cartridge then has returned to the initial position.

Figure 159:
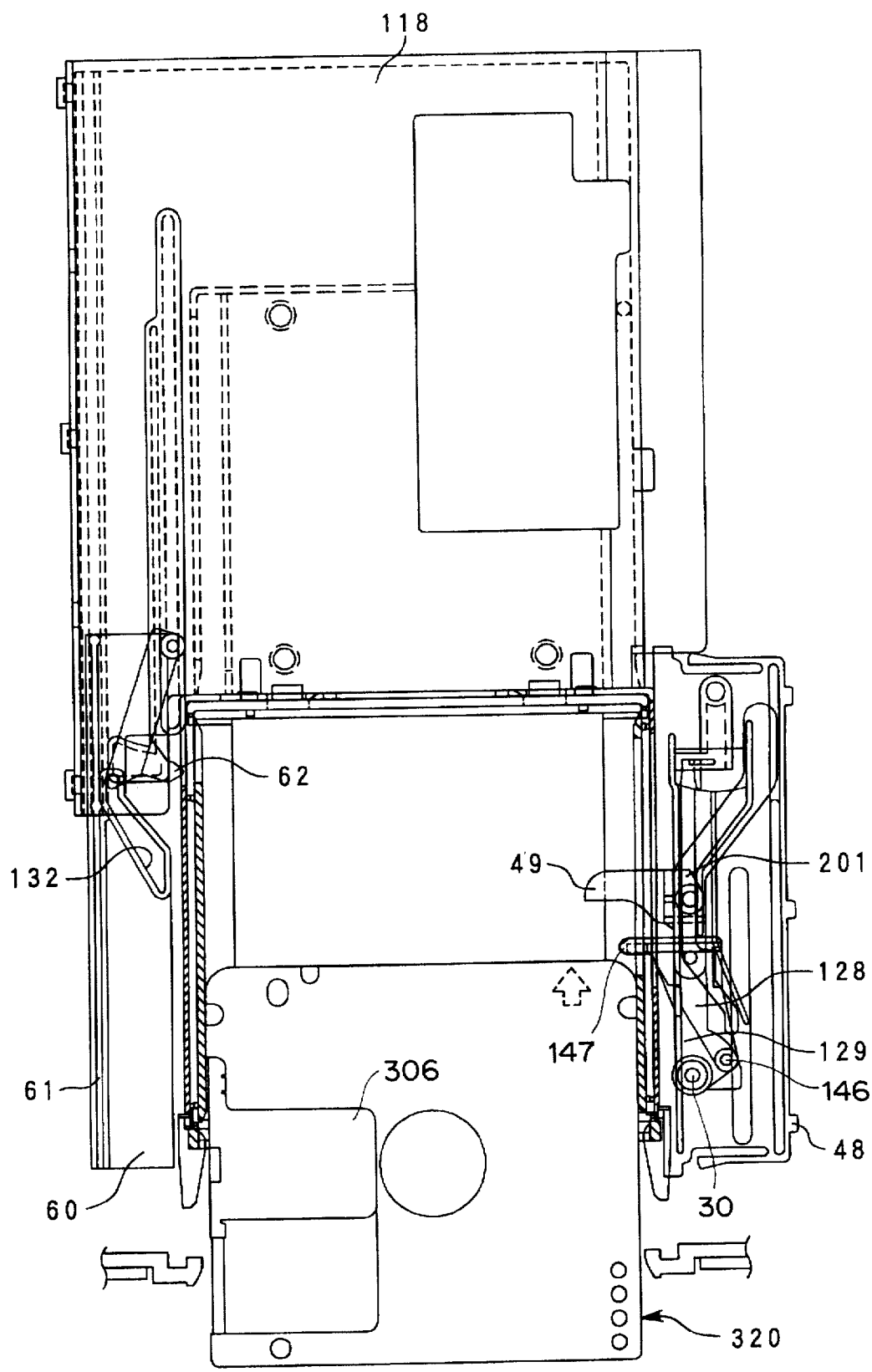

FIG. 159 is a plan view showing the state where insertion operation into the accommodating body is started in the opposite state with respect to the face and back of the disc cartridge.

Figure 160:
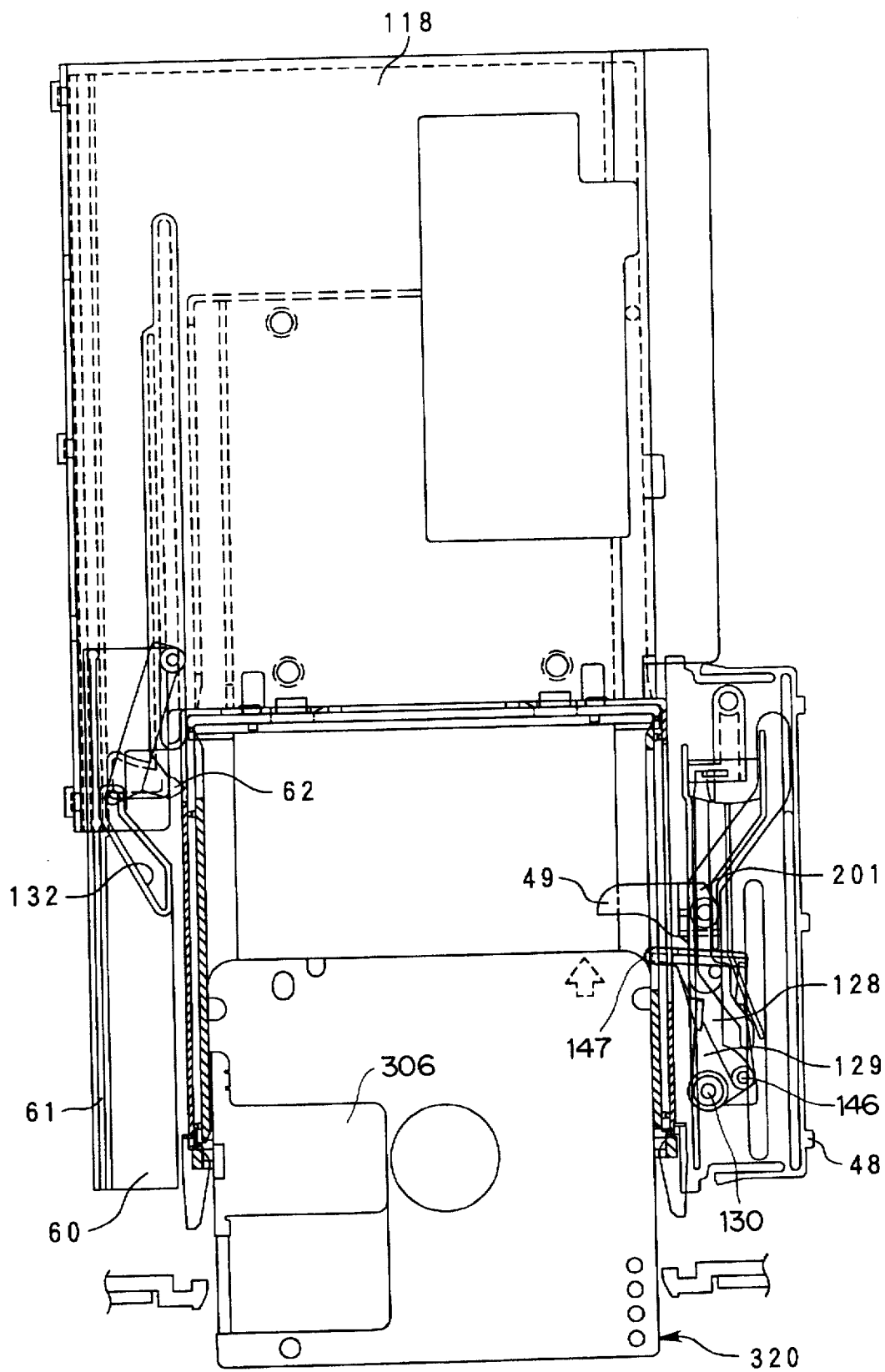

FIG. 160 is a plan view showing the middle state where the disc cartridge is caused to undergo insertion operation into the accommodating body in the opposite state with respect to the face and back of the disc cartridge, wherein the disc cartridge is in contact with the detection mechanism.

Figure 161:
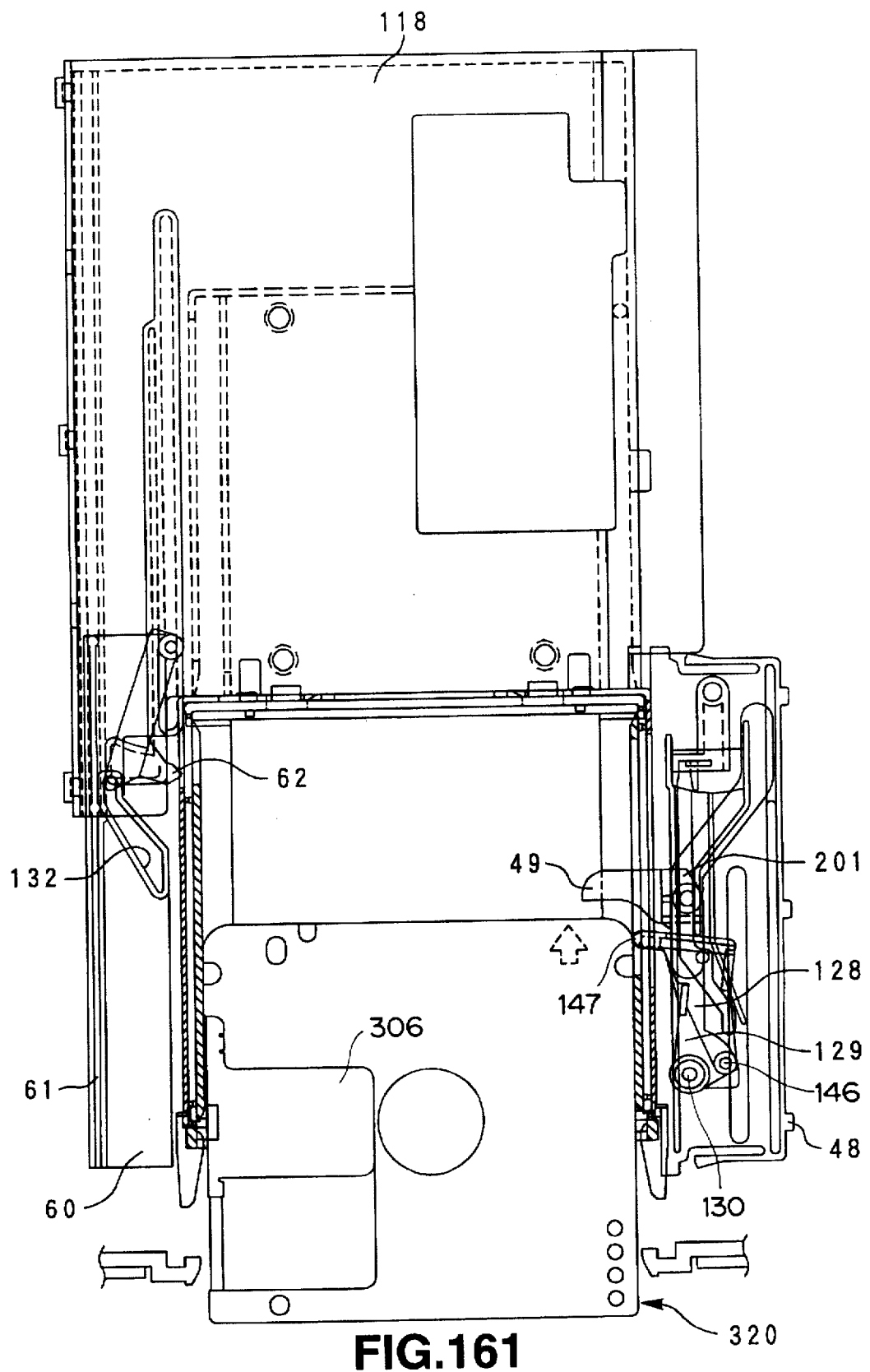

FIG. 161 is a plan view showing the middle state where the disc cartridge is caused to undergo insertion operation into the accommodating body in the opposite state with respect to the face and back of the disc cartridge, wherein the disc cartridge has rotated the second detection lever.

Figure 162:
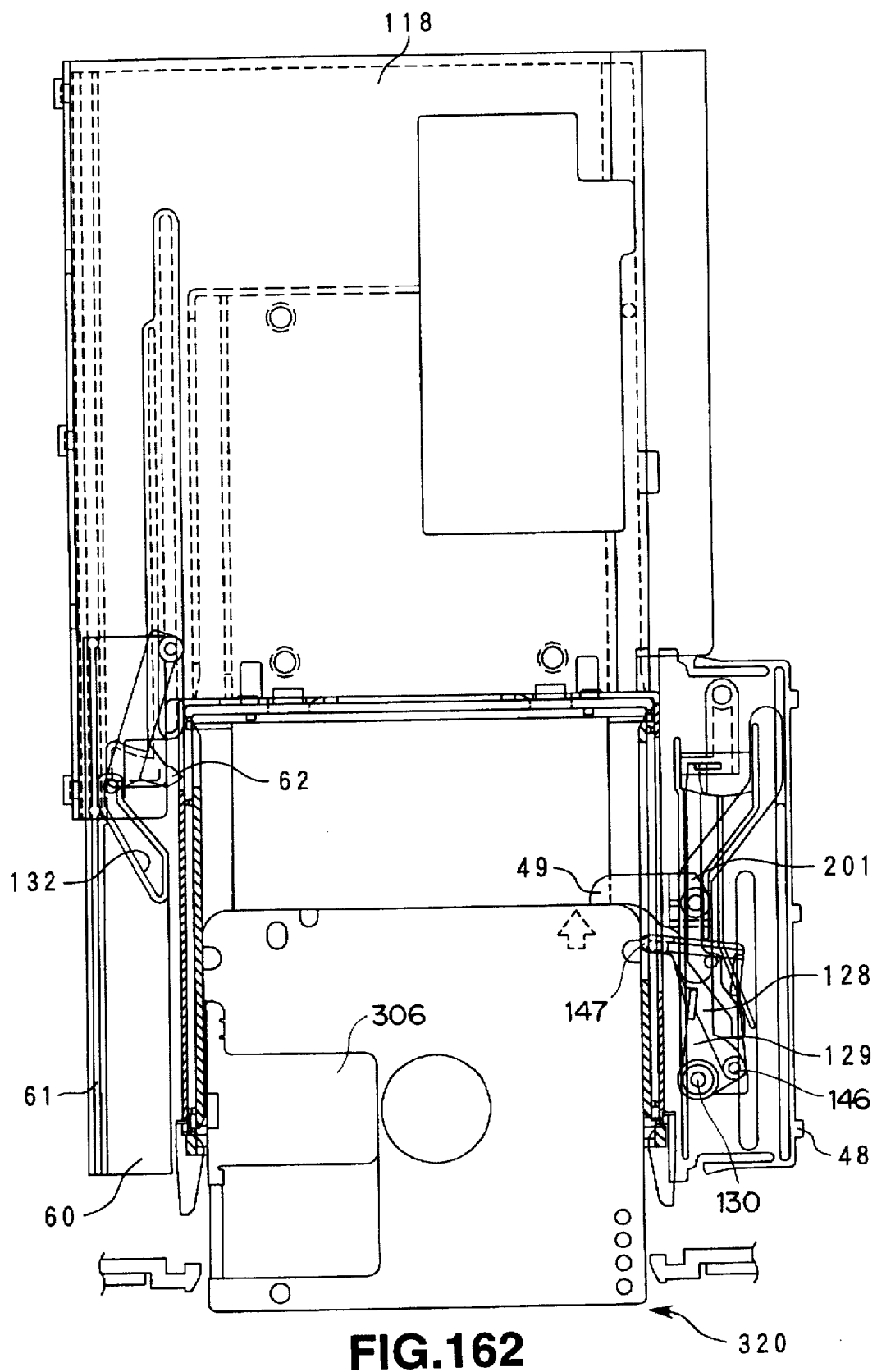

FIG. 162 is a plan view showing the middle state where the disc cartridge is caused to undergo insertion operation into the accommodating body in an opposite manner with respect to the face and back thereof, wherein the stopper lever begins ejecting the disc cartridge after undergone detection of erroneous insertion.

Figure 163:
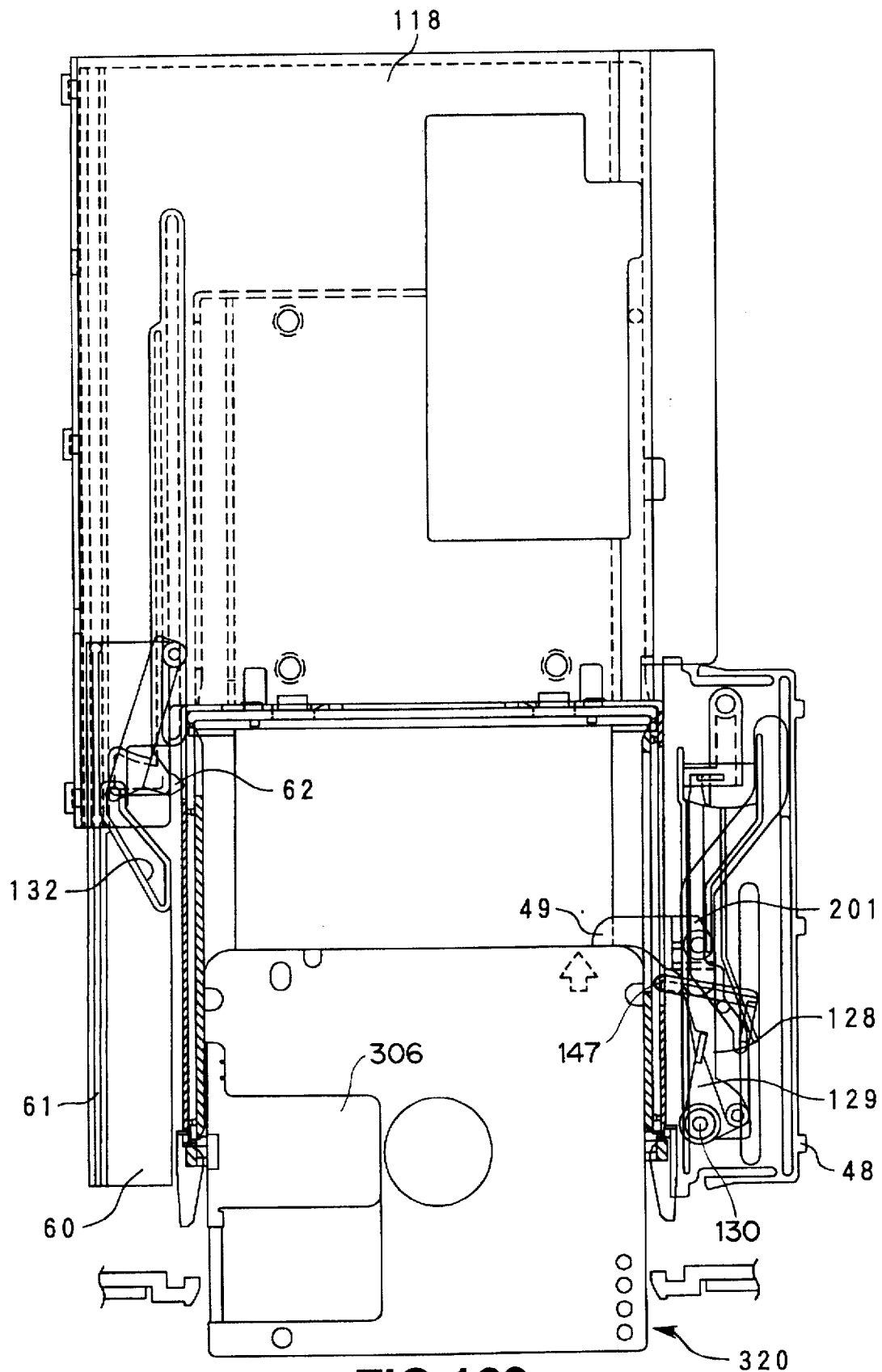

FIG. 163 is a plan view showing the middle state where the disc cartridge is caused to undergo insertion operation into the accommodating body in the opposite state with respect to the face and back of the disc cartridge, wherein the disc cartridge in which erroneous insertion has been detected is being ejected from the accommodating body.

Figure 164:
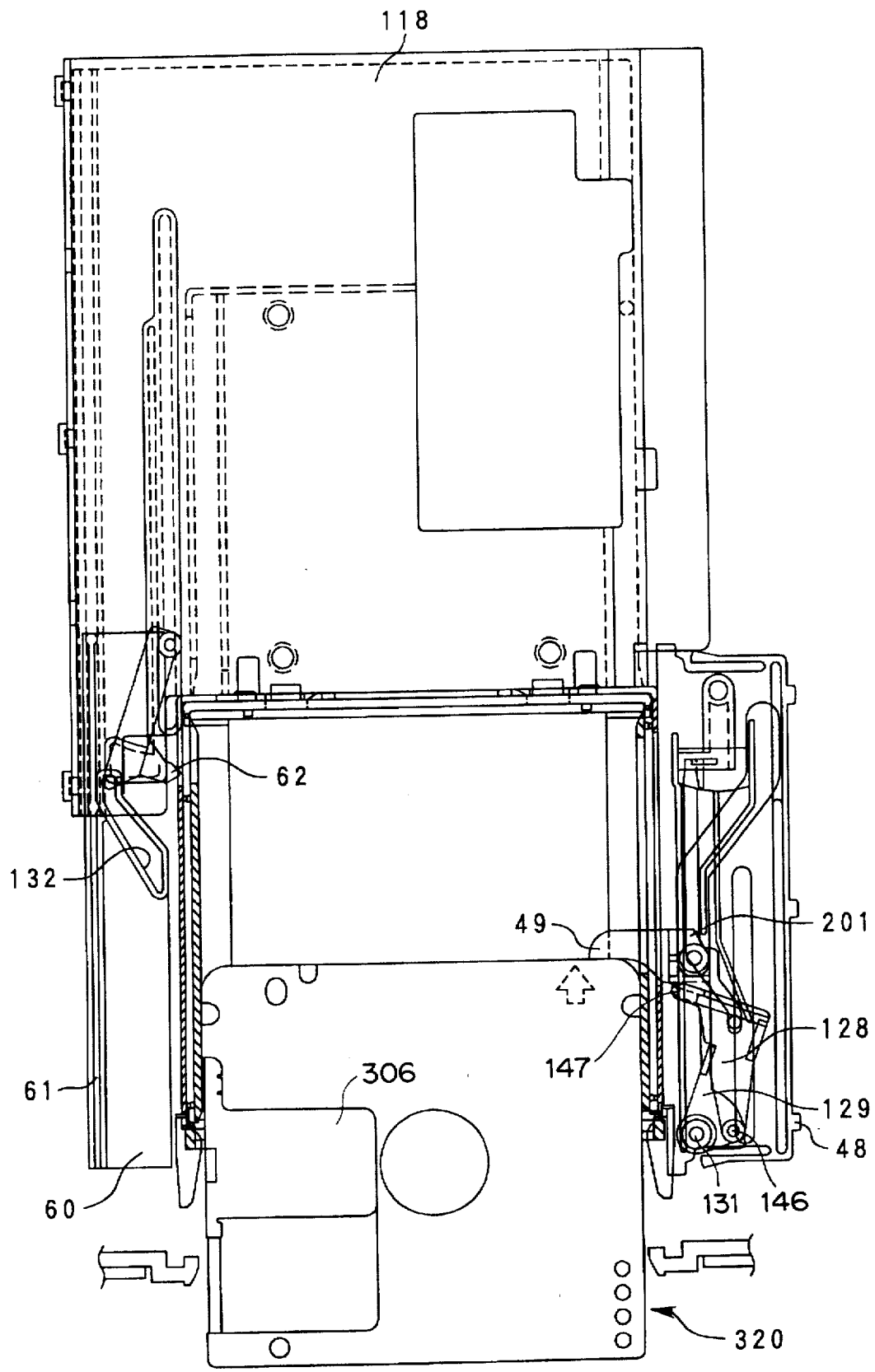

FIG. 164 is a plan view showing the state where after the disc cartridge is inserted into the accommodating body in the opposite state with respect to the face and back of the disc cartridge, ejection by the stopper lever has been completed after undergone detection of erroneous insertion.

Figure 165:
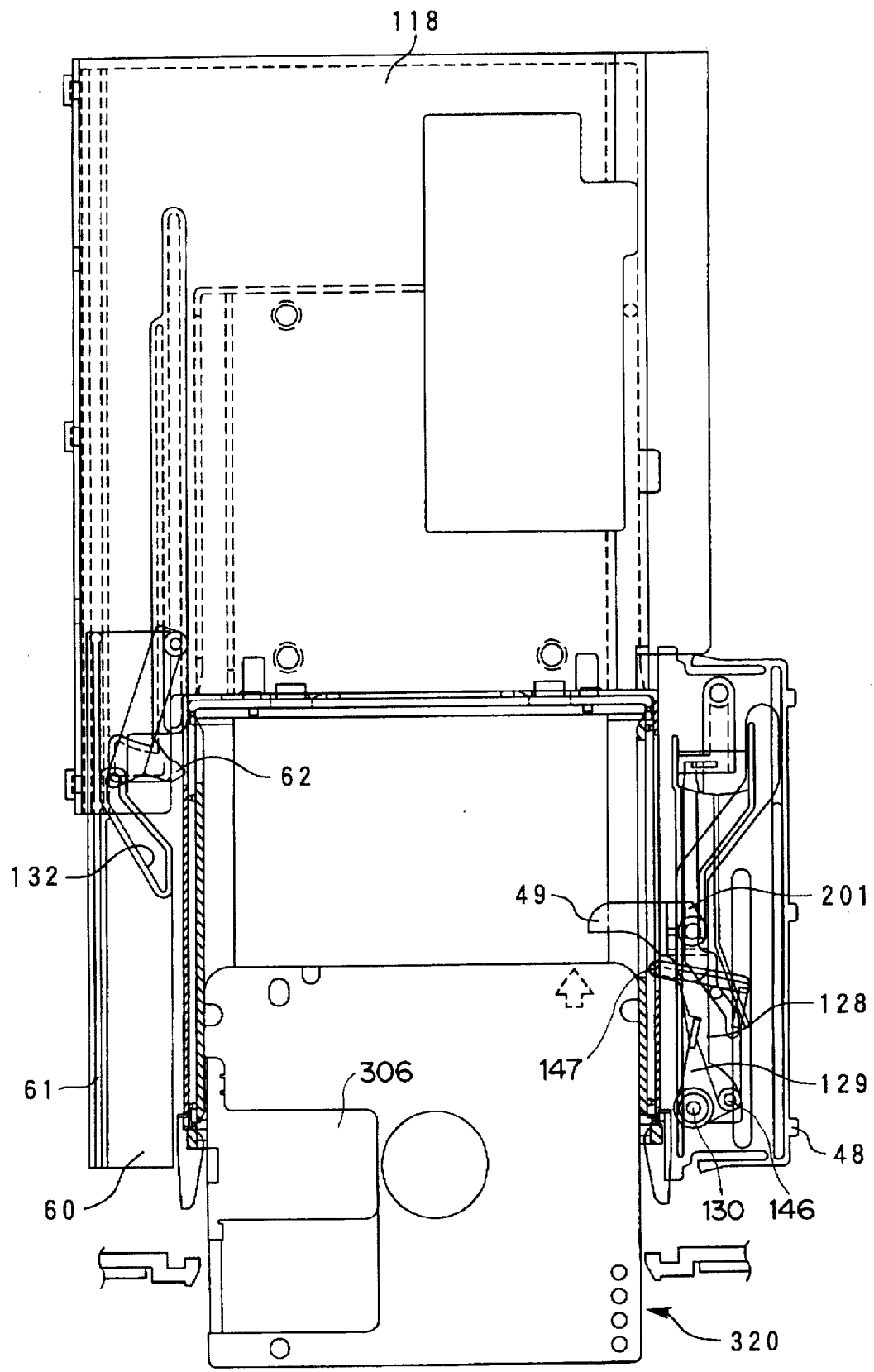

FIG. 165 is a plan view showing the state where after the disc cartridge is inserted into the accommodating body in the opposite state with respect to the face and back thereof, the stopper lever which has caused the disc cartridge to undergo eject operation begins returning to the initial position.

Figure 166:
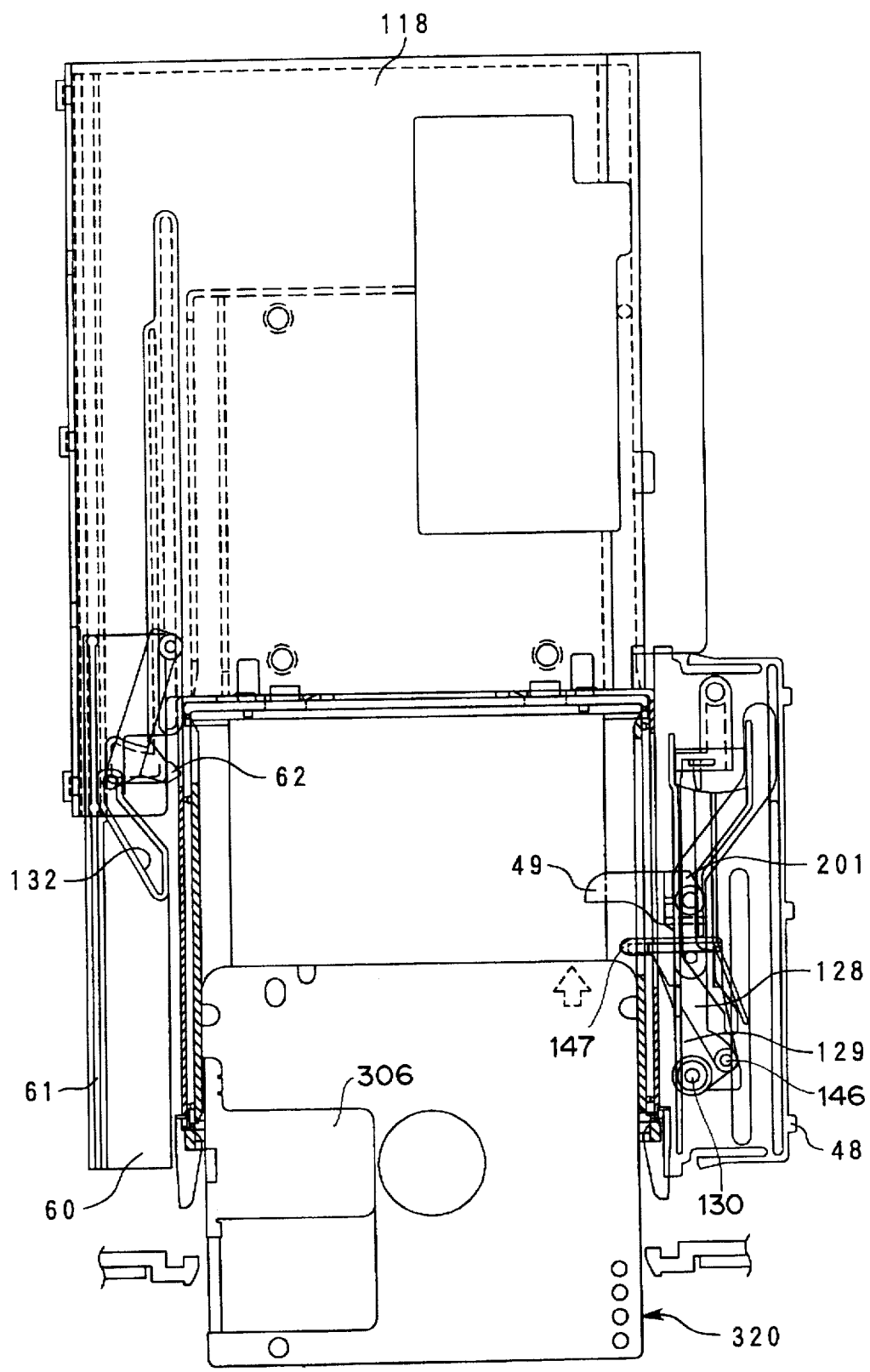

FIG. 166 is a plan view showing the state where after the disc cartridge is inserted into the accommodating body in the opposite state with respect to the face and back thereof, the stopper lever which has caused the disc cartridge to undergo eject operation has returned to the initial position.

Figure 167:
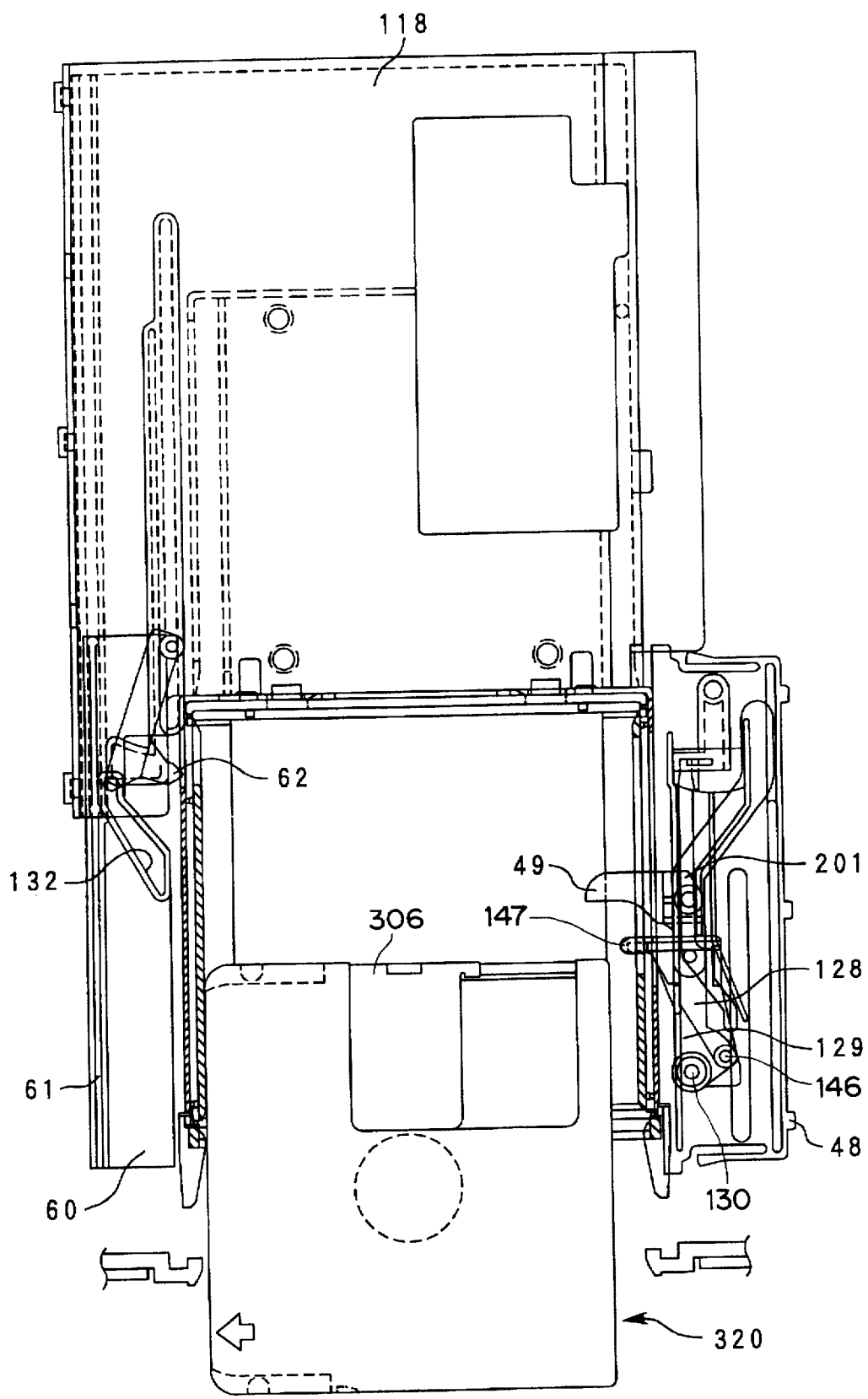

FIG. 167 is a plan view showing the state where insertion operation into the accommodating body with the insertion end of the disc cartridge facing to the left is started.

Figure 168:
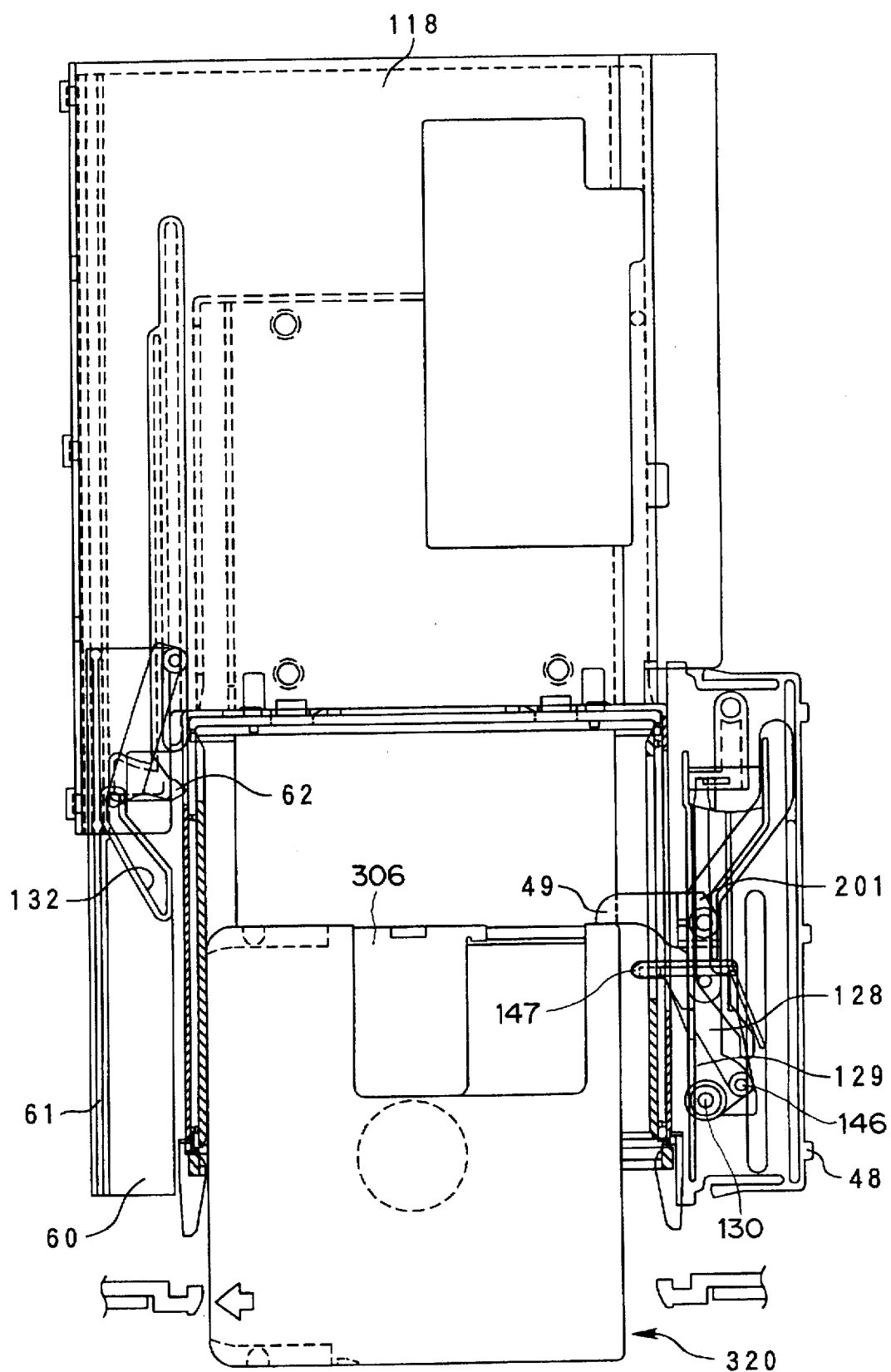

FIG. 168 is a plan view showing the middle state where the disc cartridge is caused to undergo insertion operation into the accommodating body with the insertion end thereof facing to the left, wherein the disc cartridge is in contact with the stopper lever.

Figure 169:
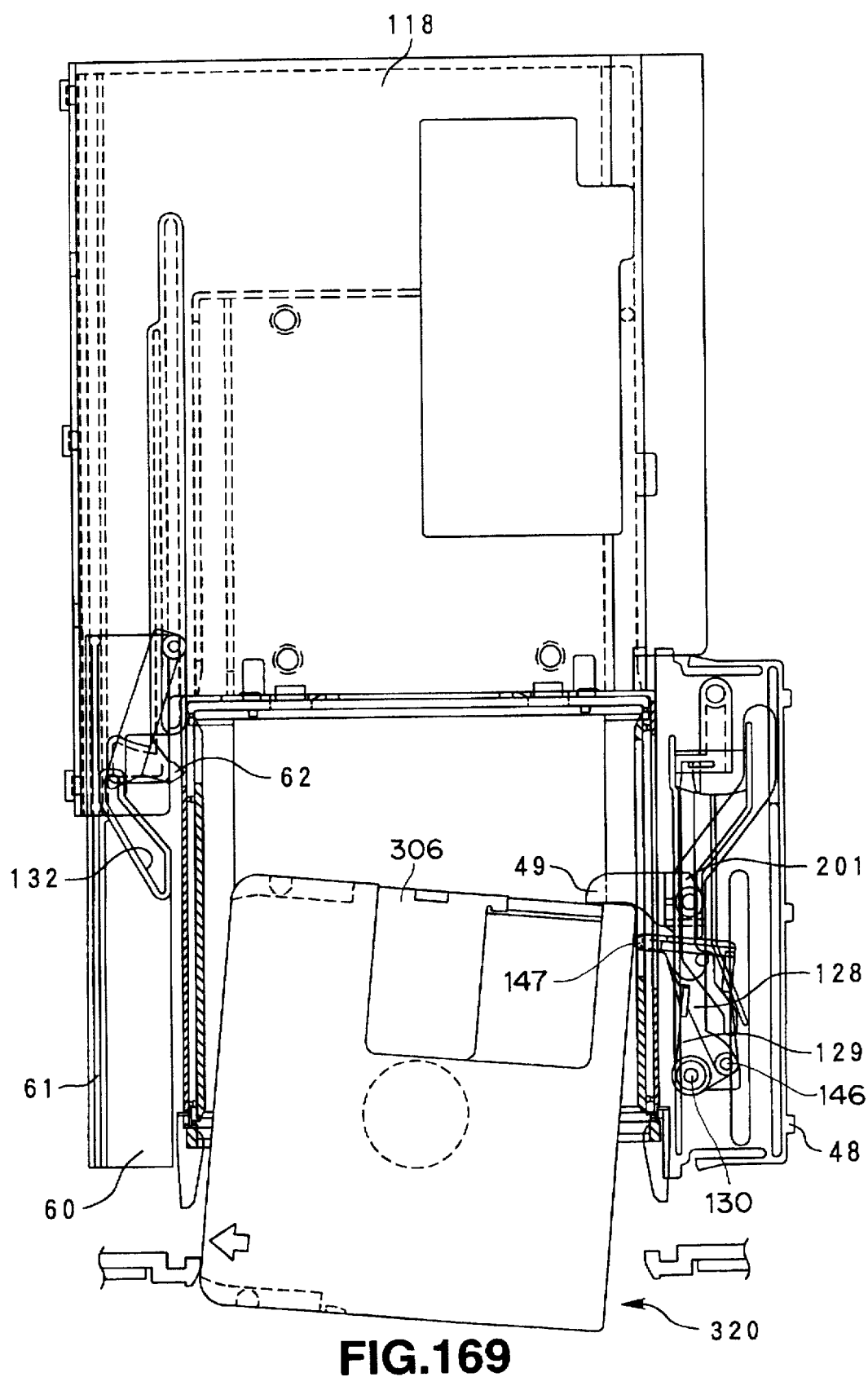

FIG. 169 is a plan view showing the middle state where the disc cartridge is caused to undergo insertion operation into the accommodating body with the insertion end thereof facing to the left, wherein the disc cartridge has rotated the second detection lever in the state inclined to the right.

Figure 170:
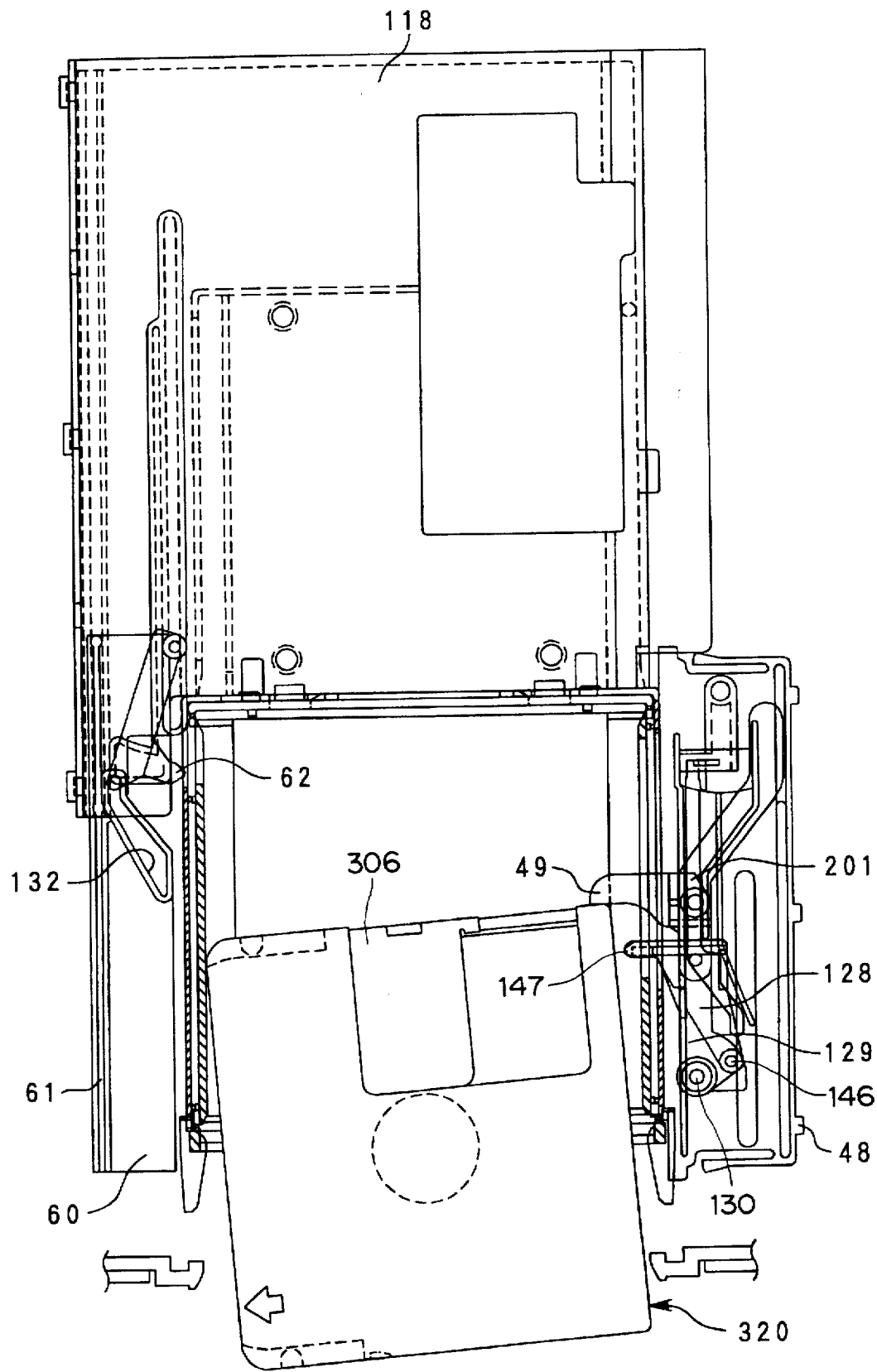

FIG. 170 is a plan view showing the middle state where the disc cartridge is caused to undergo insertion operation into the accommodating body with the insertion and thereof facing to the left, wherein the disc cartridge is spaced from the second detection lever in the state inclined to the left.

Figure 171:
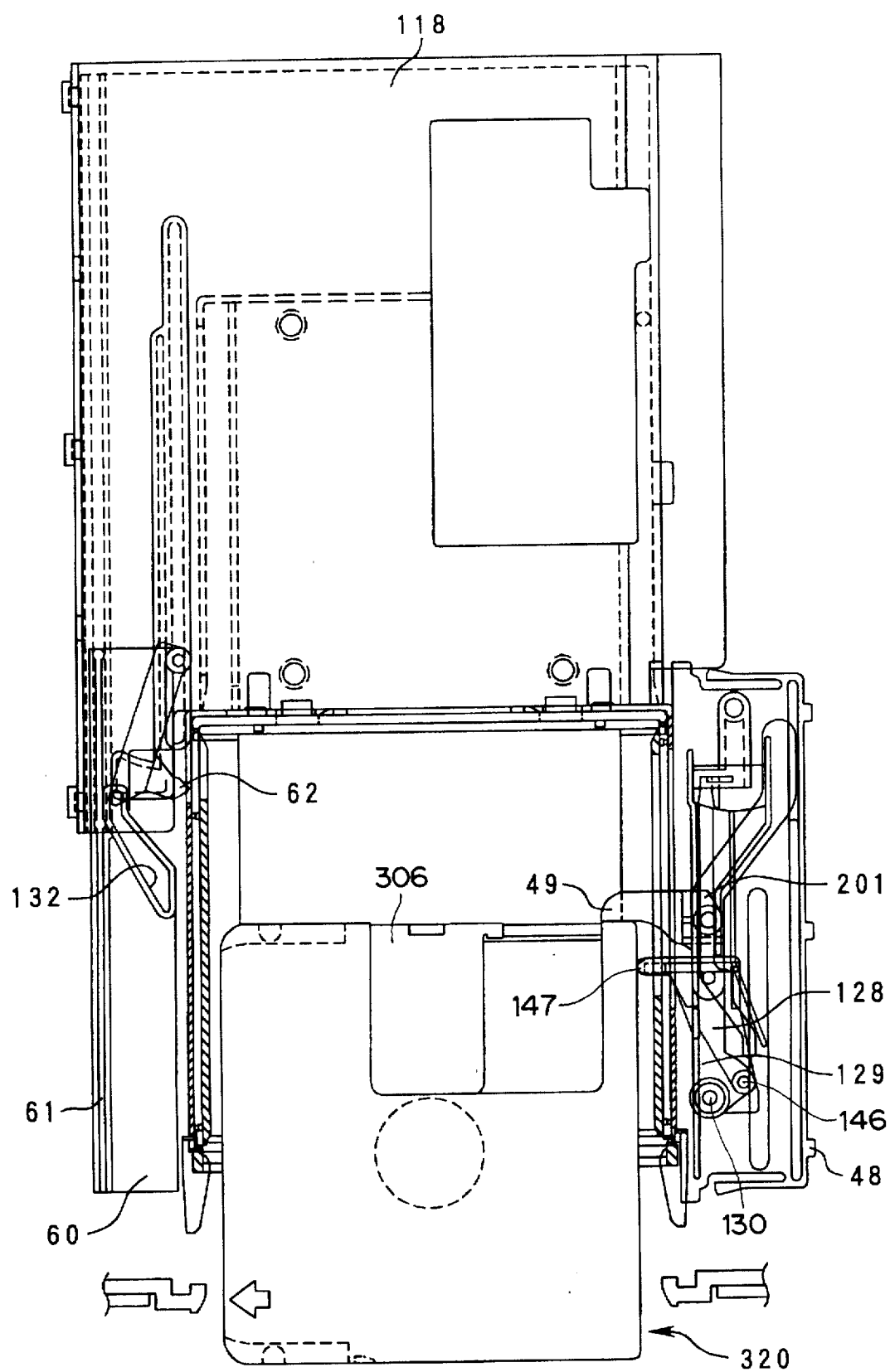

FIG. 171 is a plan view showing the middle state where the disc cartridge is caused to undergo insertion operation into the accommodating body with the insertion end thereof facing to the left, wherein the stopper lever begins ejecting the disc cartridge.

Figure 172:
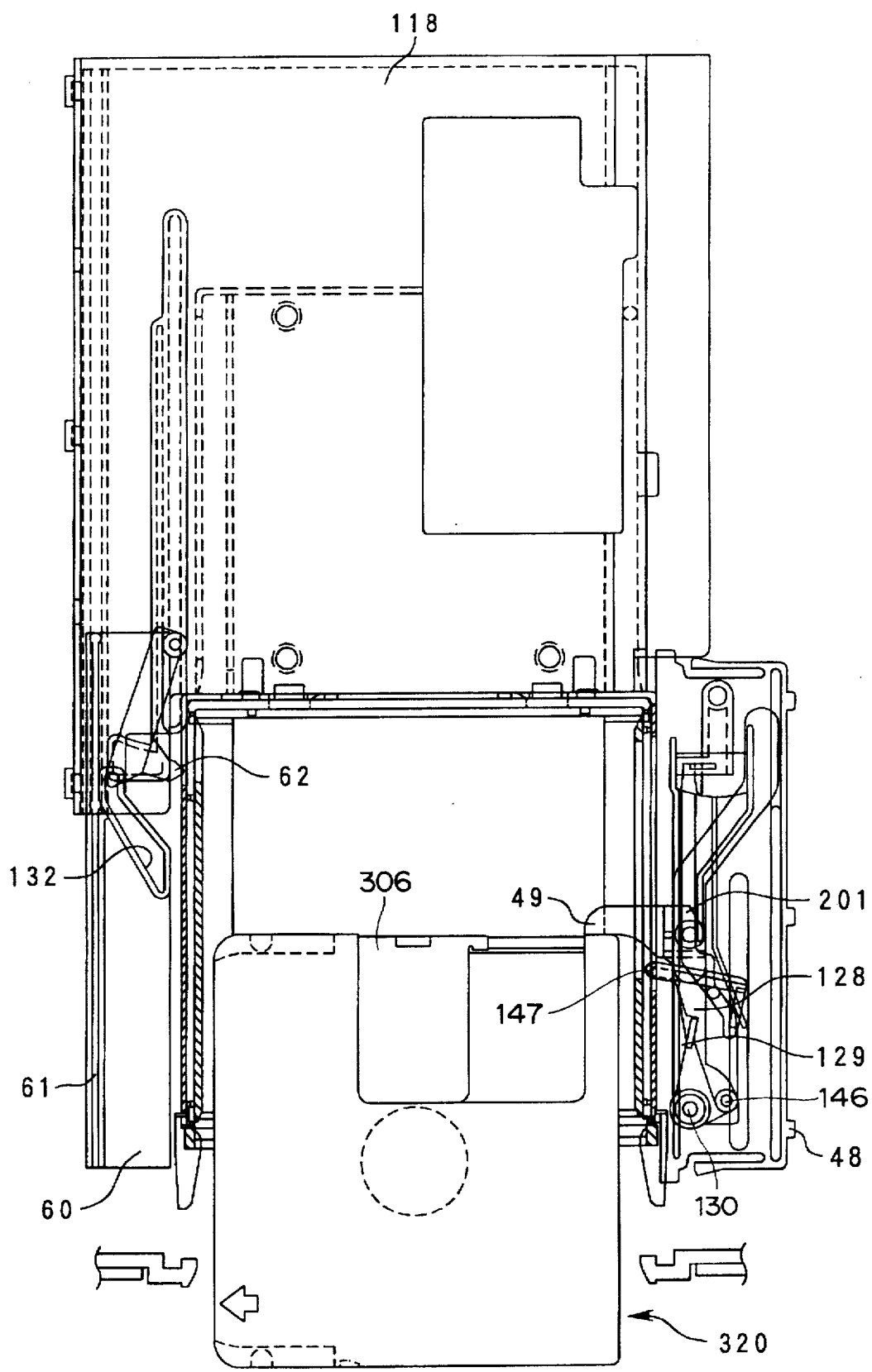

FIG. 172 is a plan view showing the middle state where the disc cartridge is caused to undergo insertion operation into the accommodating body with the insertion end thereof facing to the left, wherein the stopper lever is ejecting the disc cartridge after undergone detection of erroneous insertion.

Figure 173:
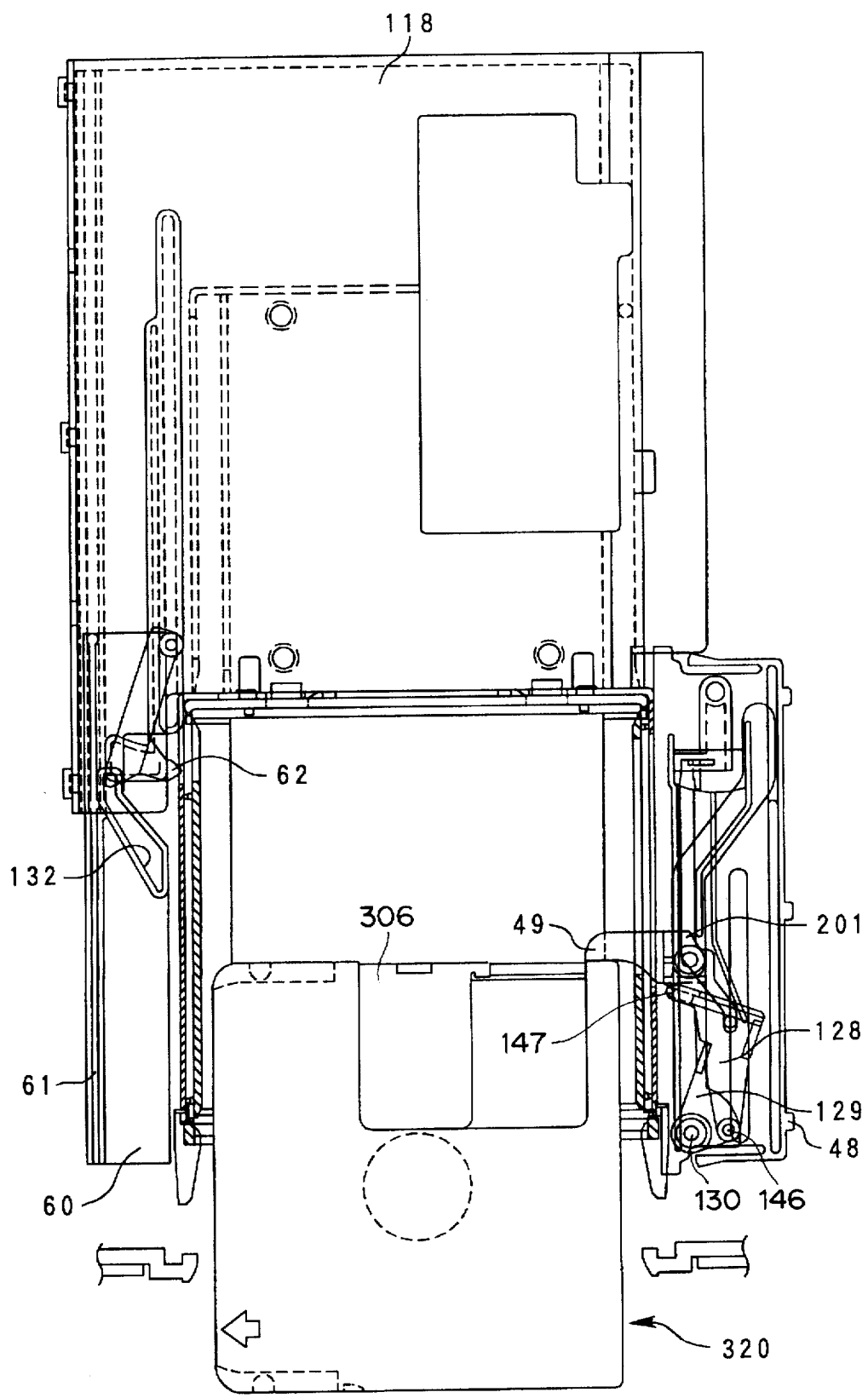

FIG. 173 is a plan view showing the state where after the disc cartridge is caused to undergo insertion operation into the accommodating body with the insertion end thereof facing to the left, ejection of the disc cartridge by the stopper lever has been completed after undergone detection of erroneous insertion.

Figure 174:
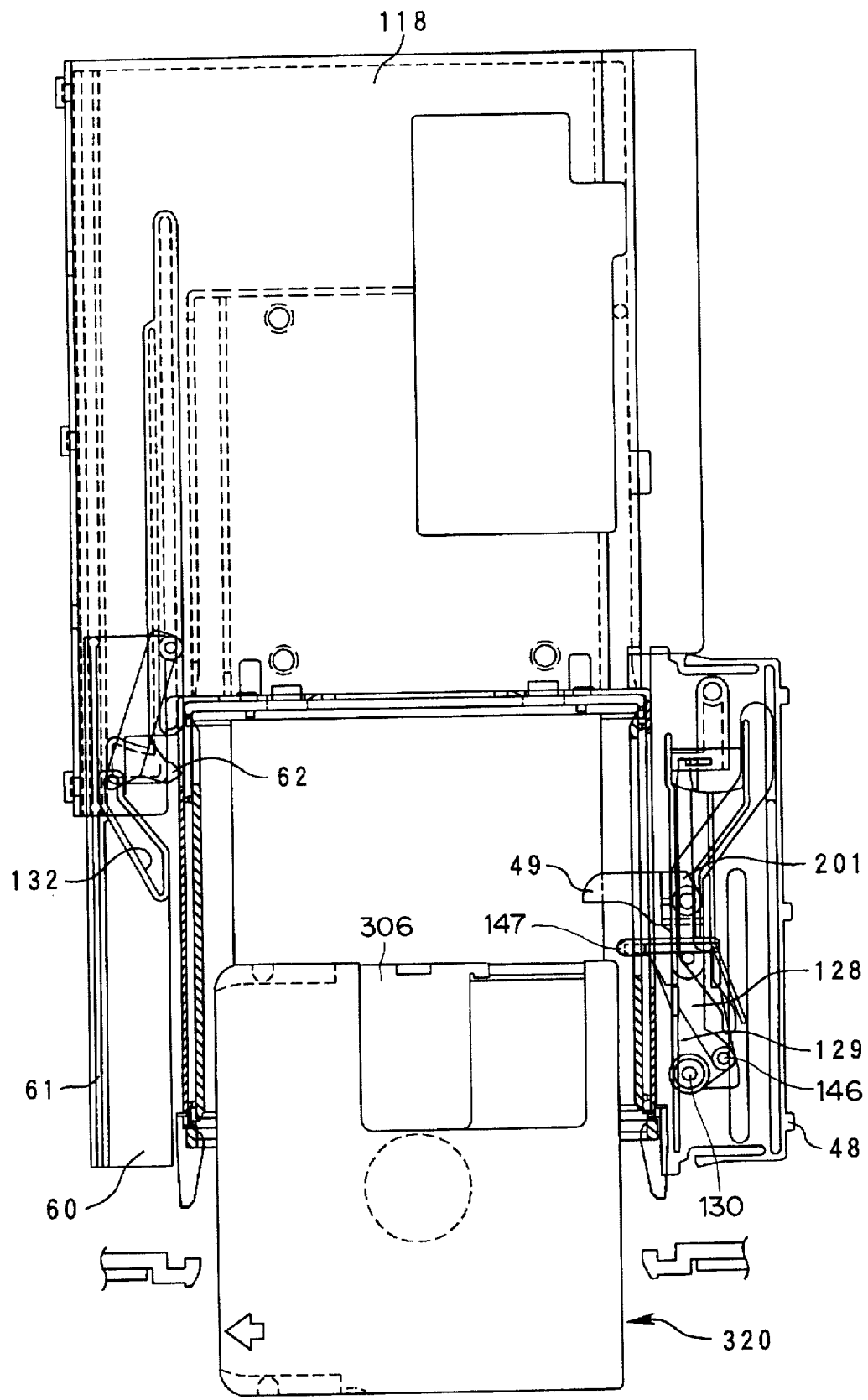

FIG. 174 is a plan view showing the state where after the disc cartridge is caused to undergo insertion operation into the accommodating body with the insertion end thereof facing to the left, the stopper lever which has caused the disc cartridge to undergo eject operation has returned to the initial position.

Figure 175:
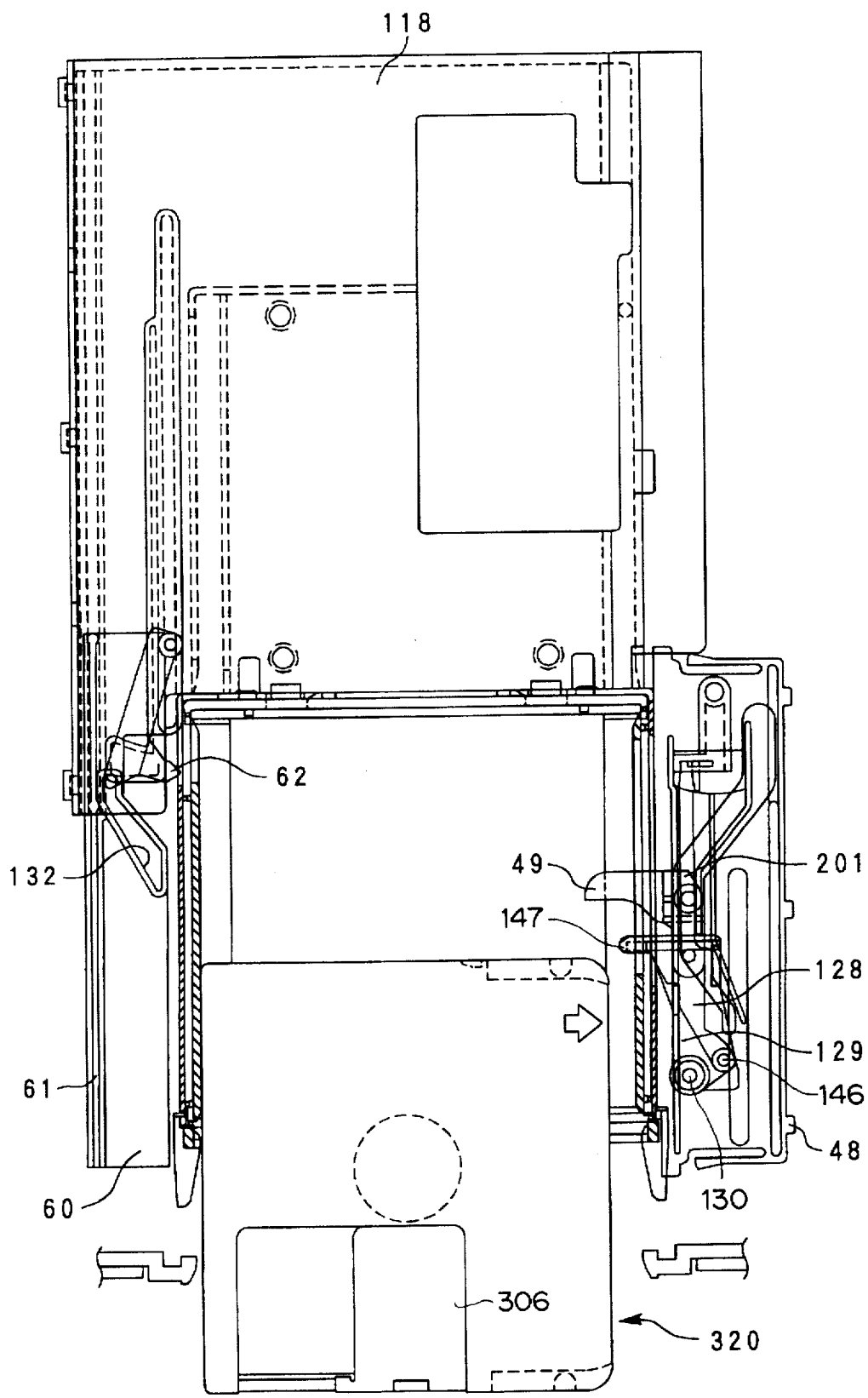

FIG. 175 is a plan view showing the state where insertion operation into the accommodating body of the disc cartridge with the insertion end thereof facing to the right is started.

Figure 176:
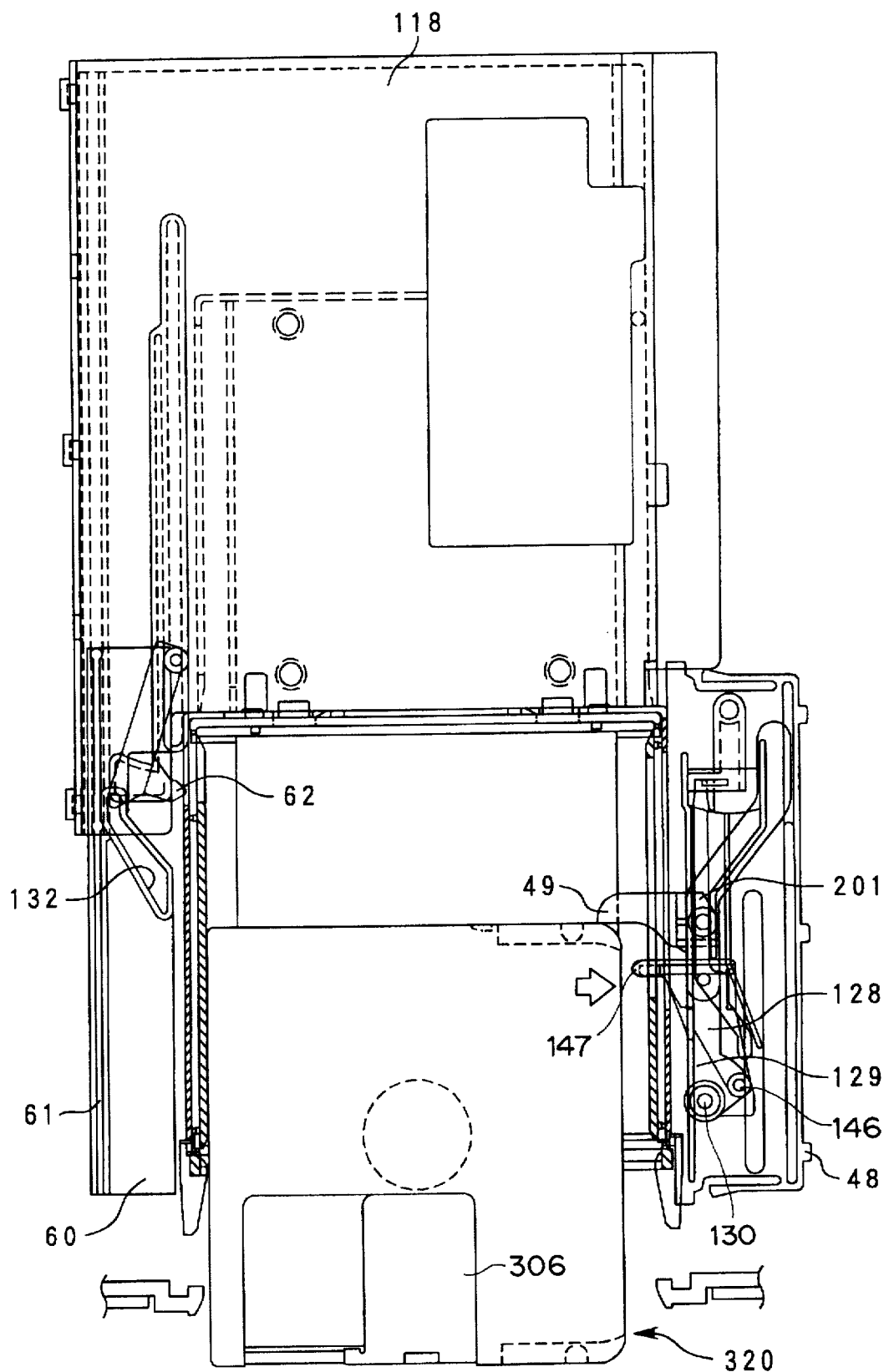

FIG. 176 is a plan view showing the middle state where the disc cartridge is caused to undergo insertion operation into the accommodating body with the insertion end thereof facing to the right, wherein the disc cartridge is in contact with the stopper lever.

Figure 177:
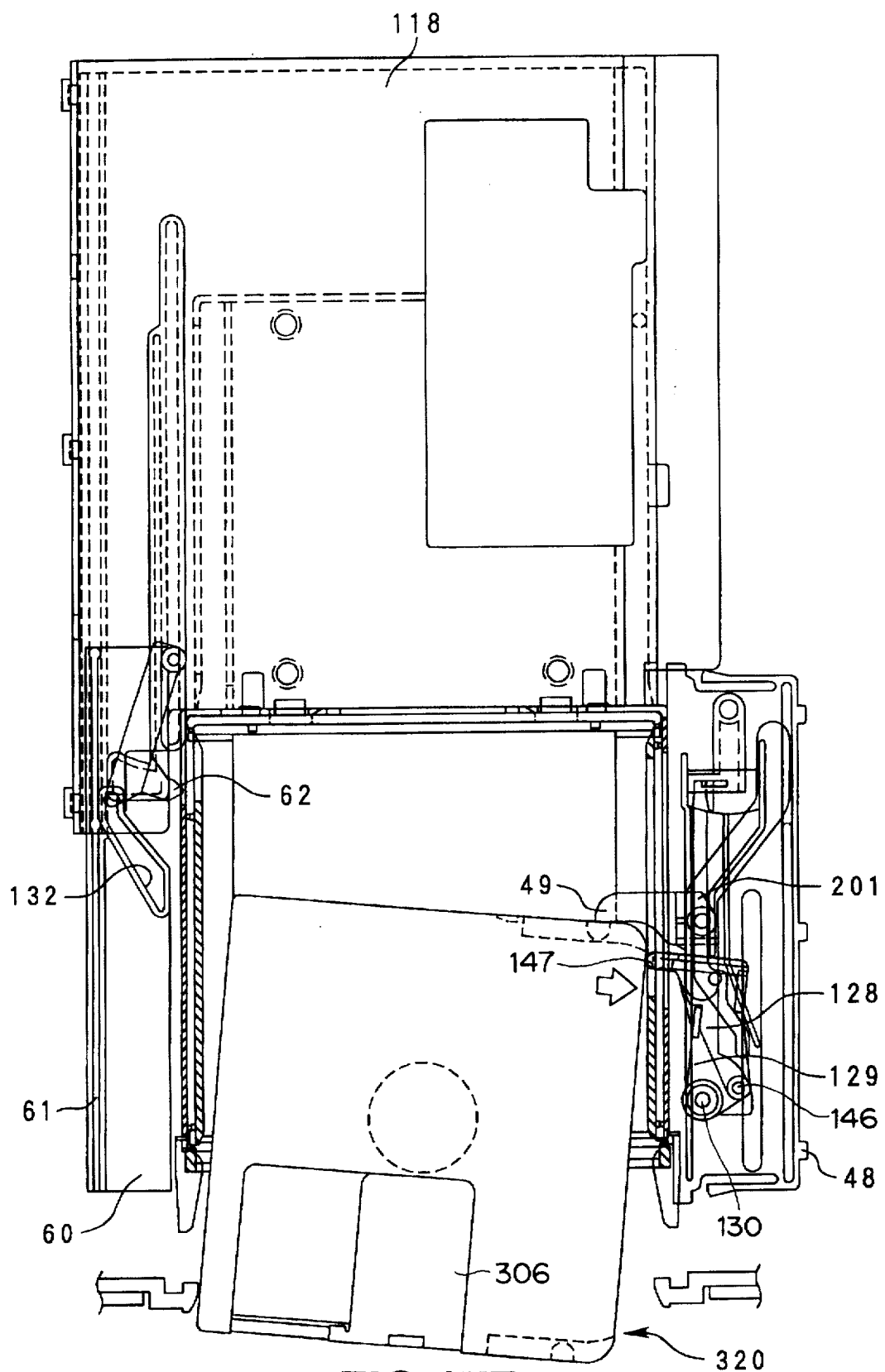

FIG. 177 is a plan view showing the middle state where the disc cartridge is caused to undergo insertion operation into the accommodating body with the insertion end thereof facing to the right, wherein the disc cartridge is inclined to the right side to rotate the second detection lever.

Figure 178:
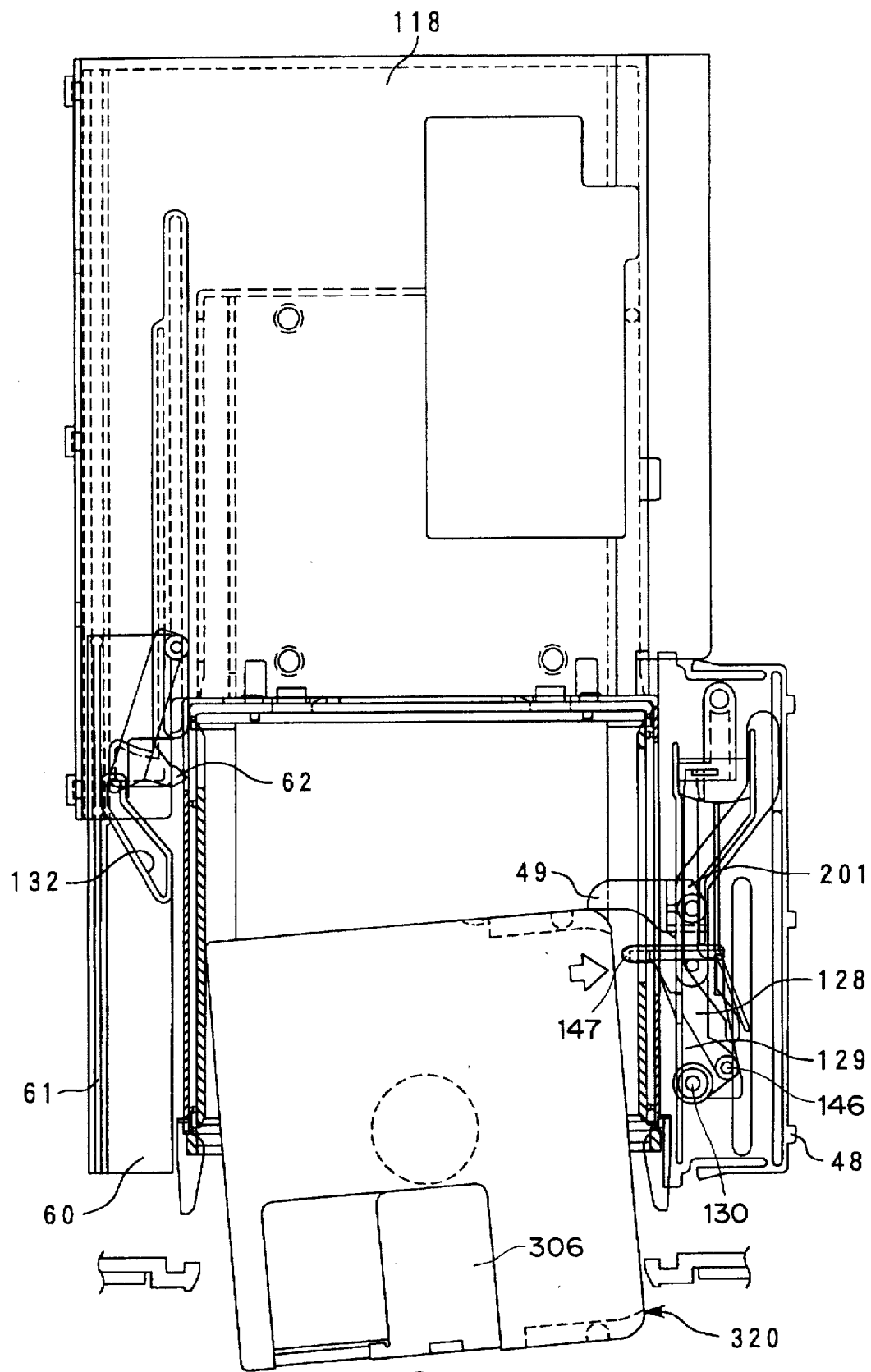

FIG. 178 is a plan view showing the middle state where the disc cartridge is caused to undergo insertion operation into the accommodating with the insertion end thereof facing to the right, wherein the disc cartridge is inclined to the left side so that it is spaced from the second detection lever.

Figure 179:
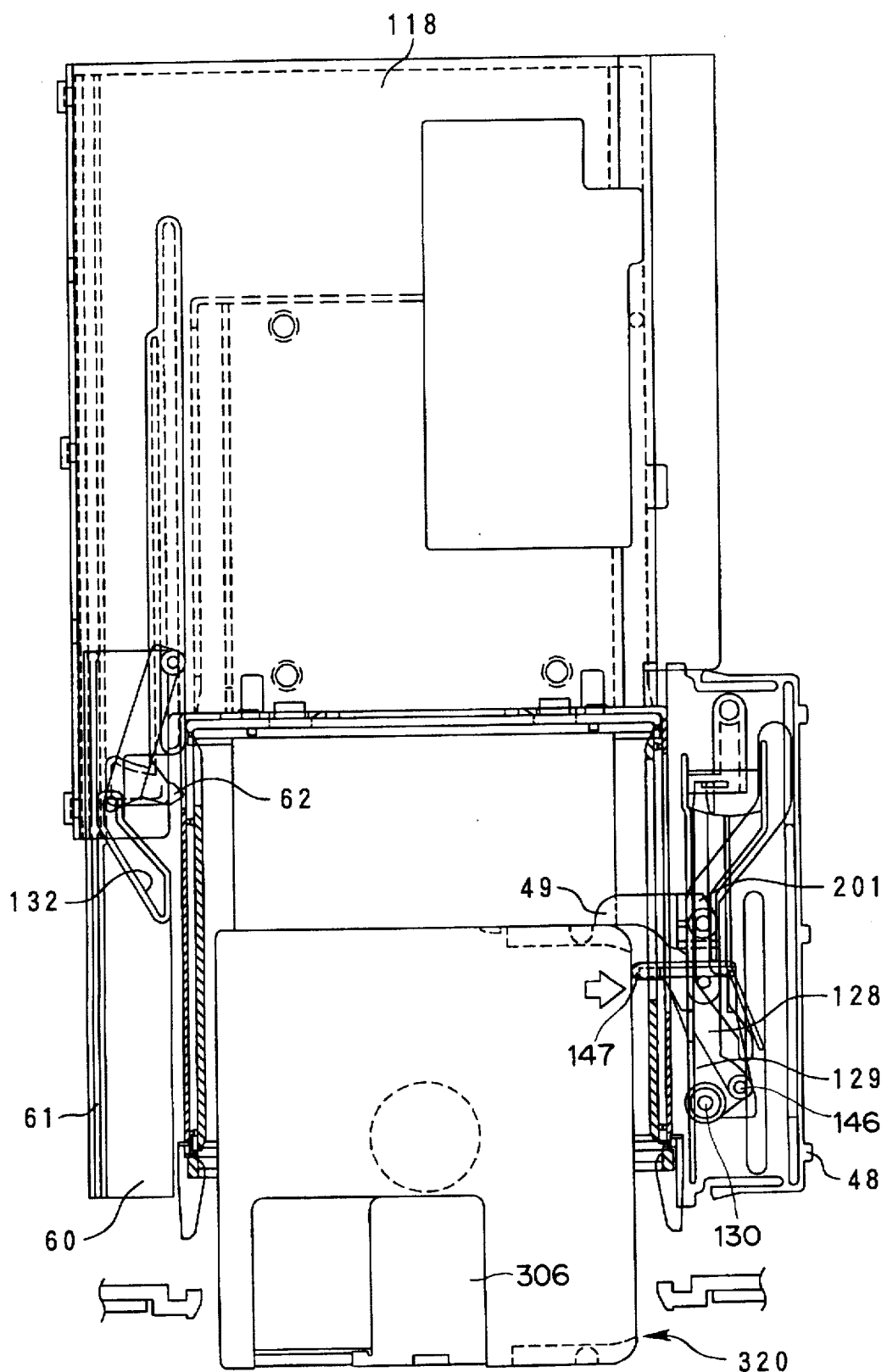

FIG. 179 is a plan view showing the middle state where the disc cartridge is caused to undergo insertion operation into the accommodating body with the insertion end thereof facing to the right, wherein the stopper lever begins ejecting the disc cartridge.

Figure 180:
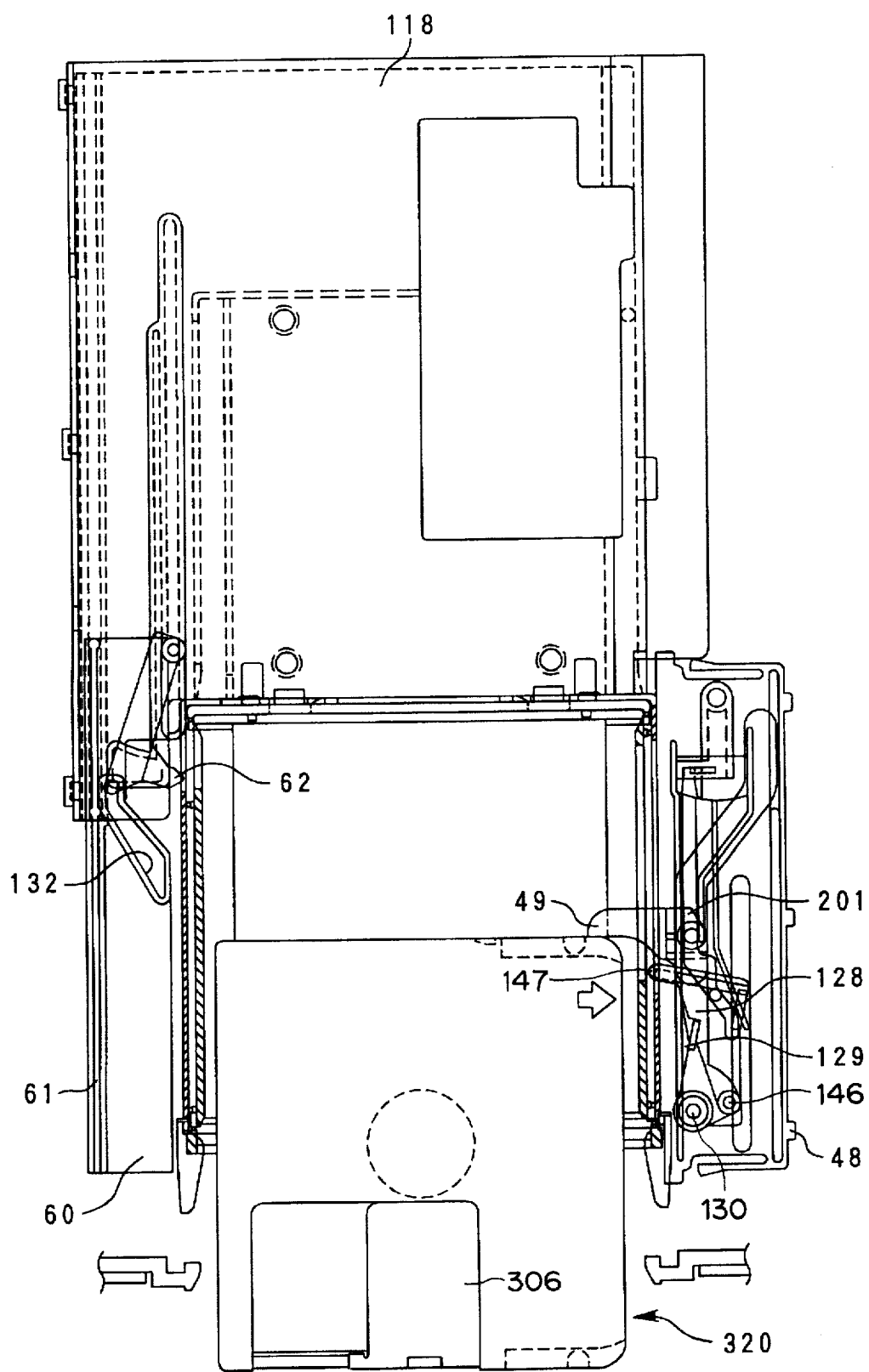

FIG. 180 is a plan view showing the middle state where the disc cartridge is caused to undergo insertion operation into the accommodating body with the insertion end thereof facing to the right, wherein the stopper lever is ejecting the disc cartridge after undergone detection of erroneous insertion.

Figure 181:
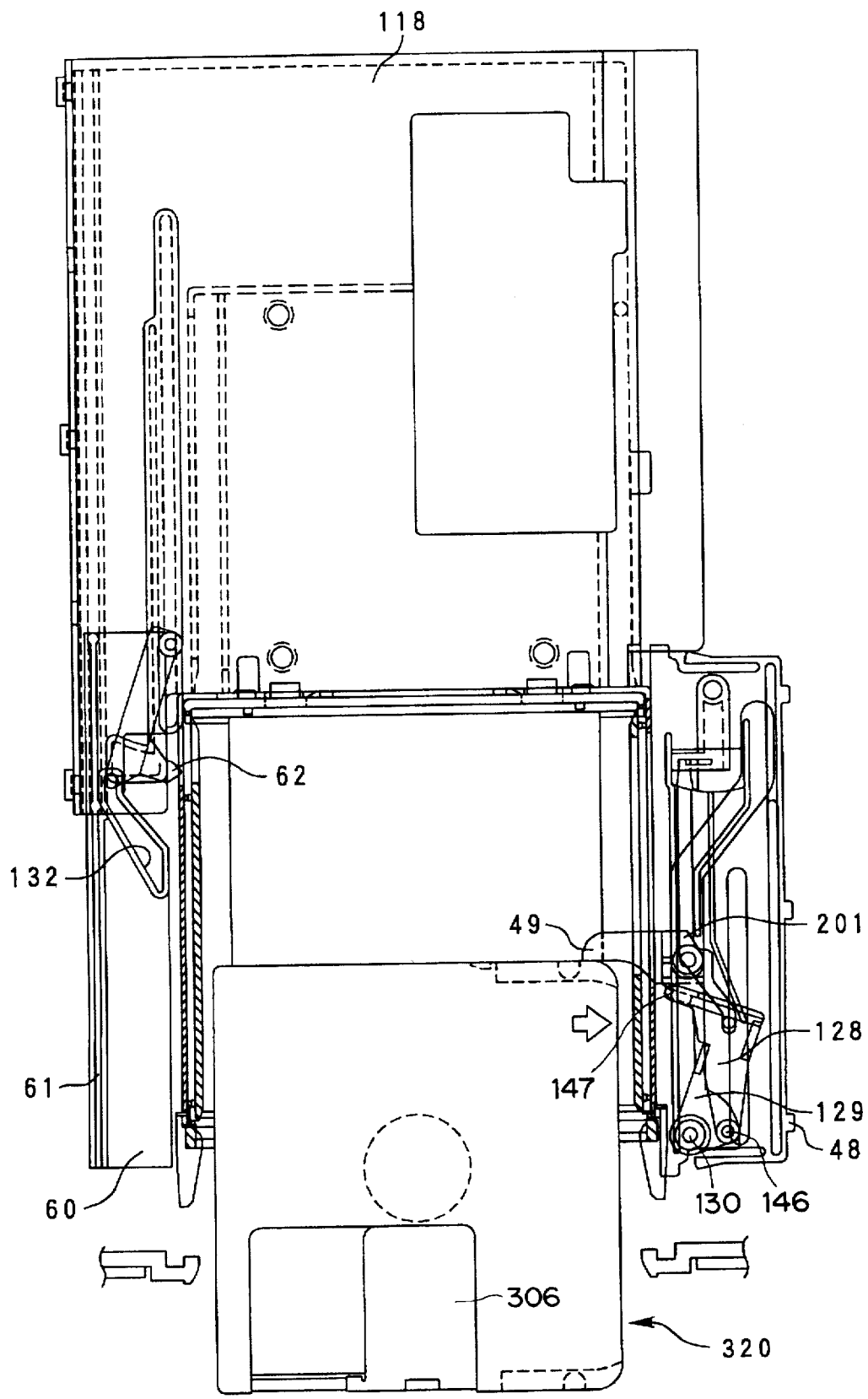

FIG. 181 is a plan view showing the state where after the disc cartridge is caused to undergo insertion operation into the accommodating body with the insertion end thereof facing to the right, ejection of the disc cartridge by the stopper lever is completed after undergone detection of erroneous insertion.

Figure 182:
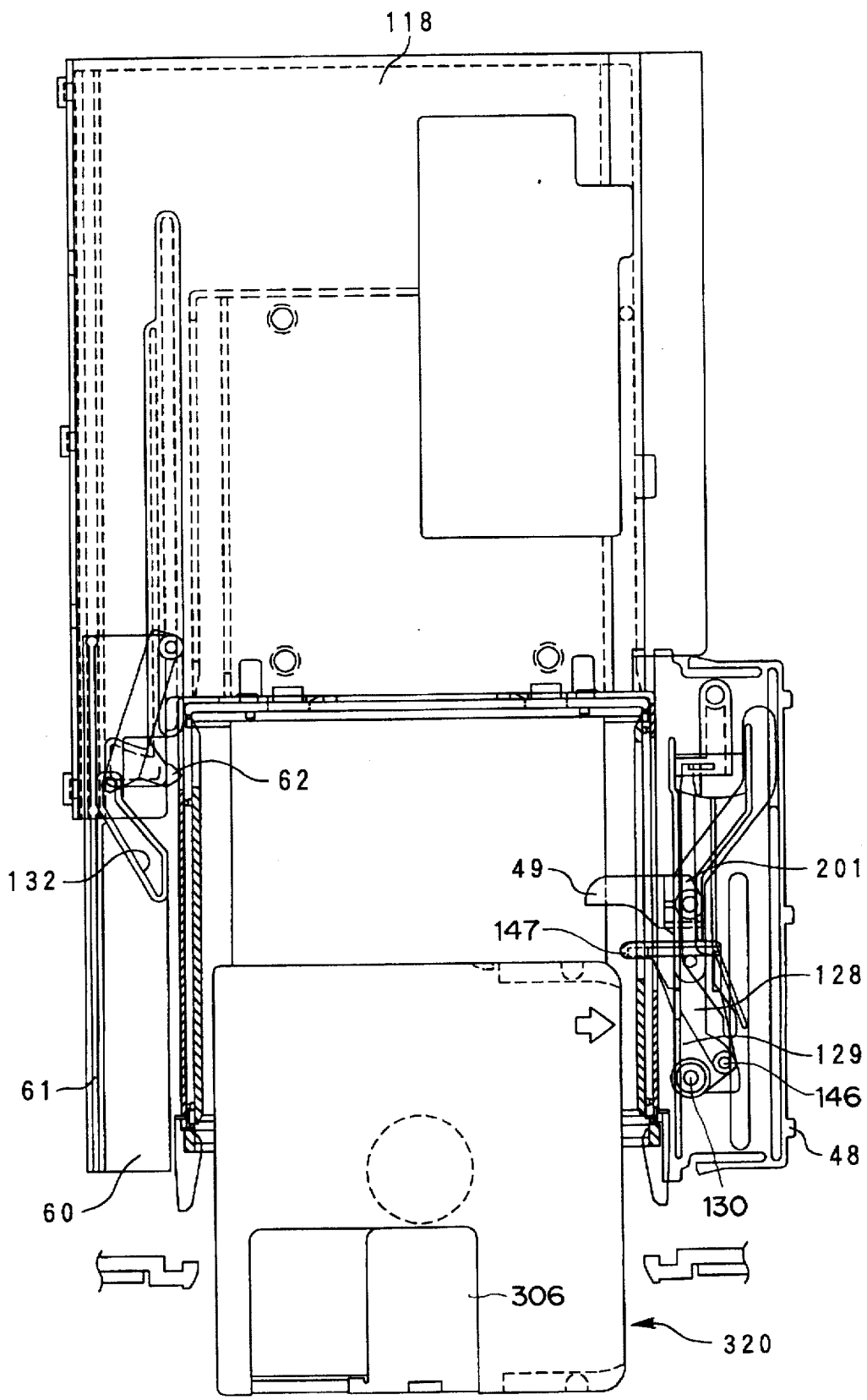

FIG. 182 is a plan view showing the state where after the disc cartridge is caused to undergo insertion operation into the accommodating body with the insertion end thereof facing to the right, the stopper lever which has caused the disc cartridge to undergo eject operation has returned to the initial position.

Figure 183:
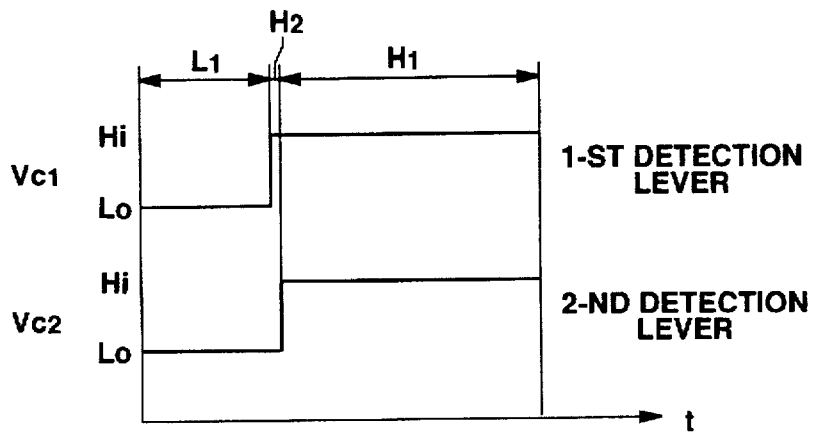

FIG. 183 is a time chart showing outputs of first and second detection switches when the disc cartridge is caused to undergo insertion operation into the accommodating body in opposite state with respect to forward and backward directions.

Figure 184:
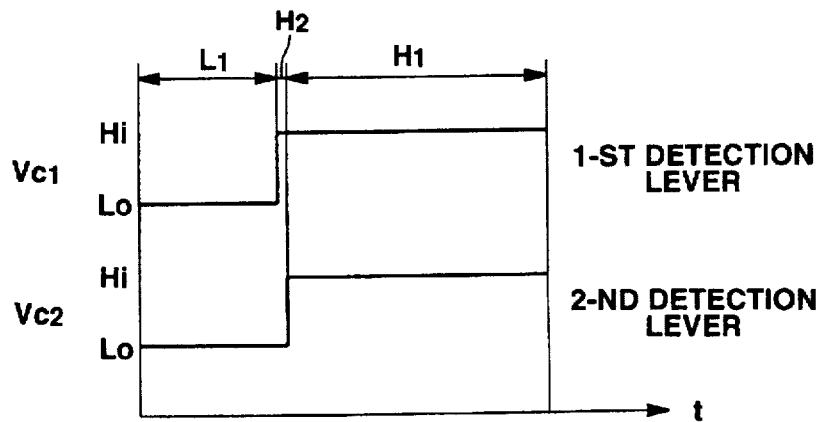

FIG. 184 is a time chart showing outputs of first and second detection switches when the disc cartridge is caused to undergo insertion operation into the accommodating body in a reversed manner.

Figure 185:
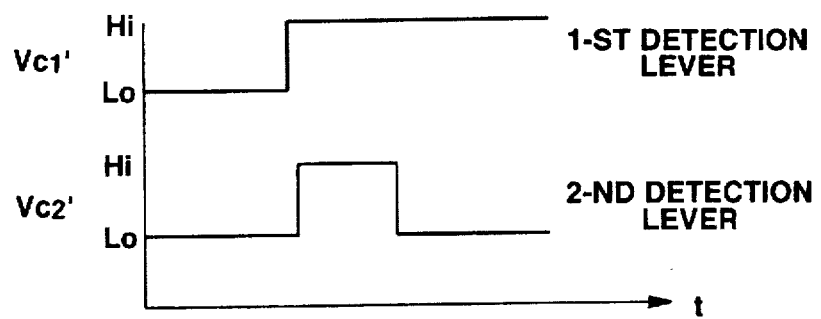

FIG. 185 is a time chart showing outputs of first and second detection switches when shapes of the first and second detection levers are changed.

Figure 186:
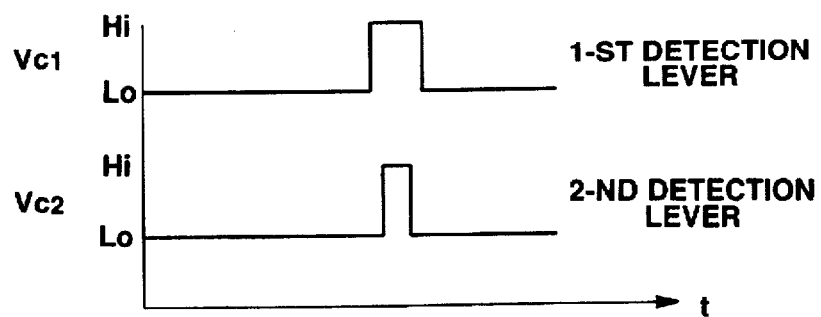

FIG. 186 is a time chart showing outputs of the first and second detection switches when the disc cartridge is caused to undergo insertion operation into the accommodating body with the insertion end thereof facing to the left or in facing to the right.

Figure 187:
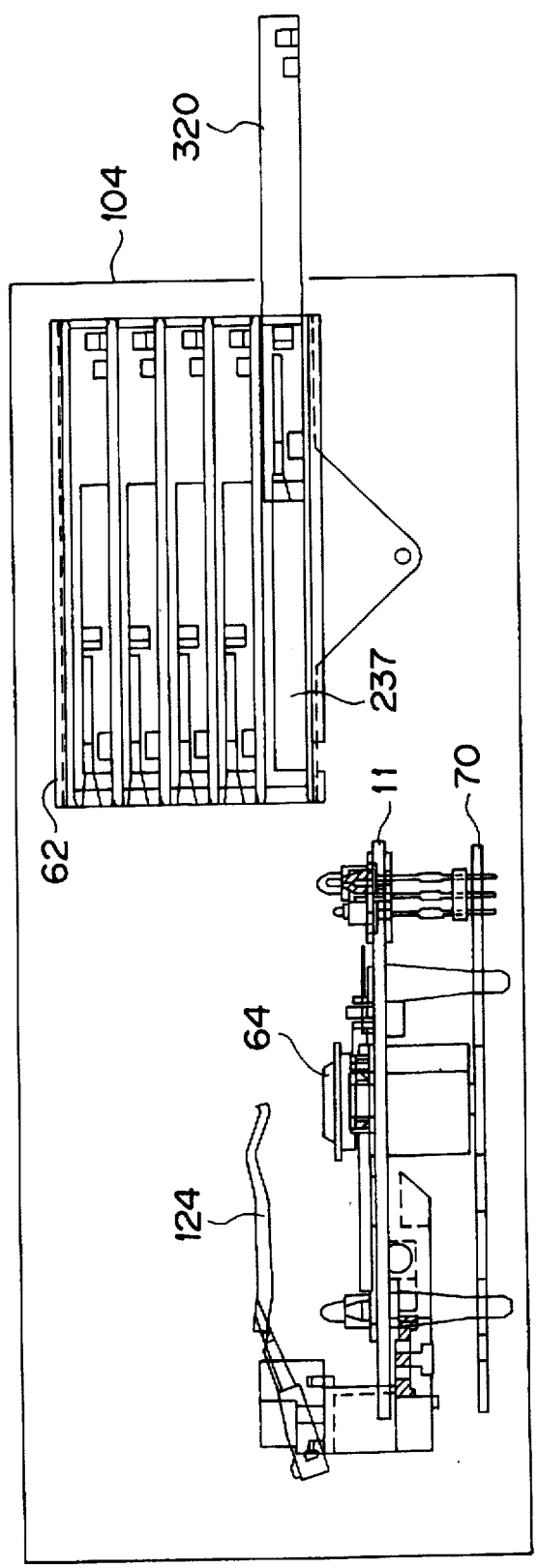

FIG. 187 is a side view showing another configuration of the cartridge movement operation mechanism for allowing the disc cartridge to undergo movement operation with respect to the accommodating body.

Figure 188:
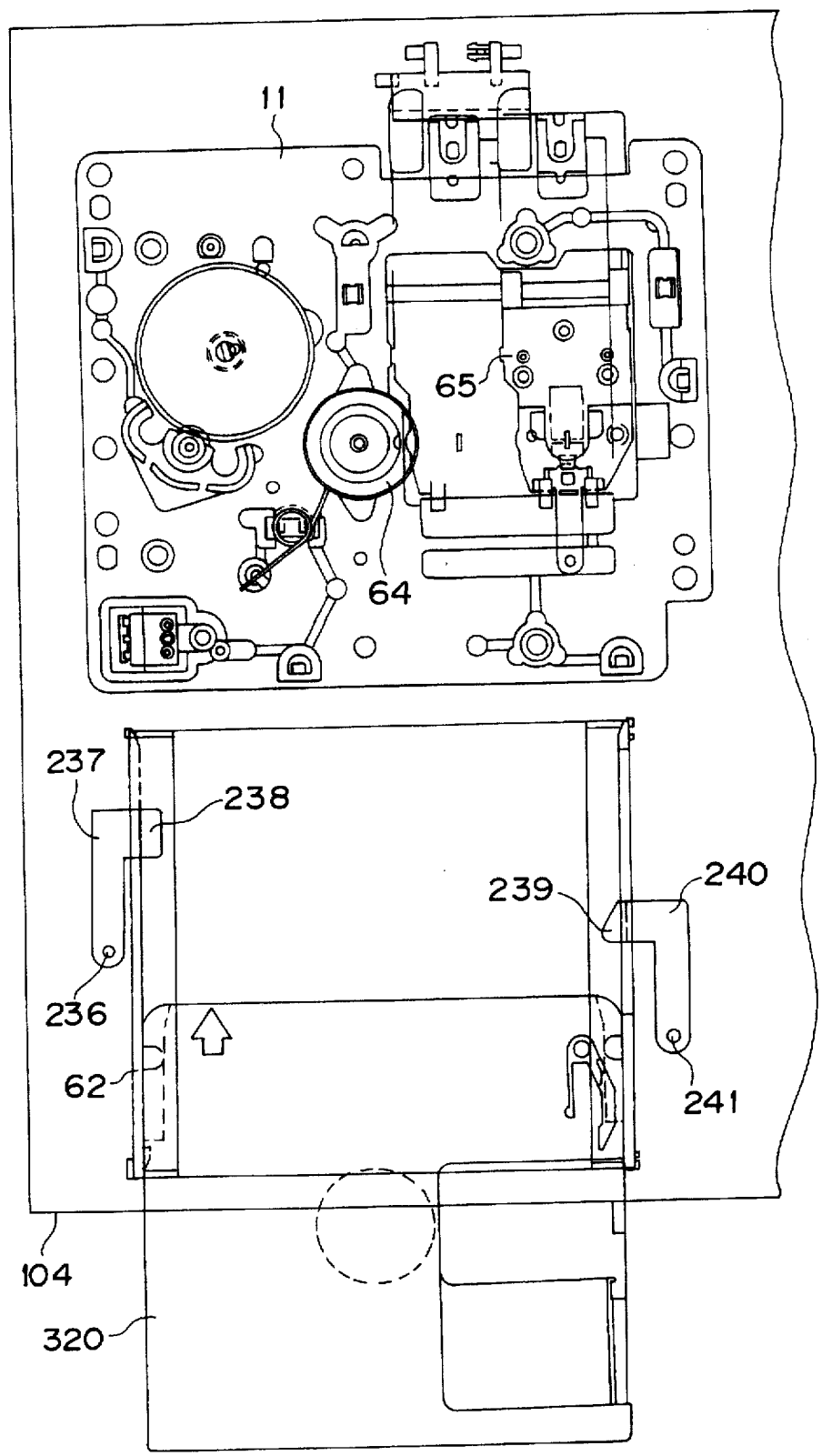

FIG. 188 is a plan view showing the movement operation mechanism.

Figure 189:
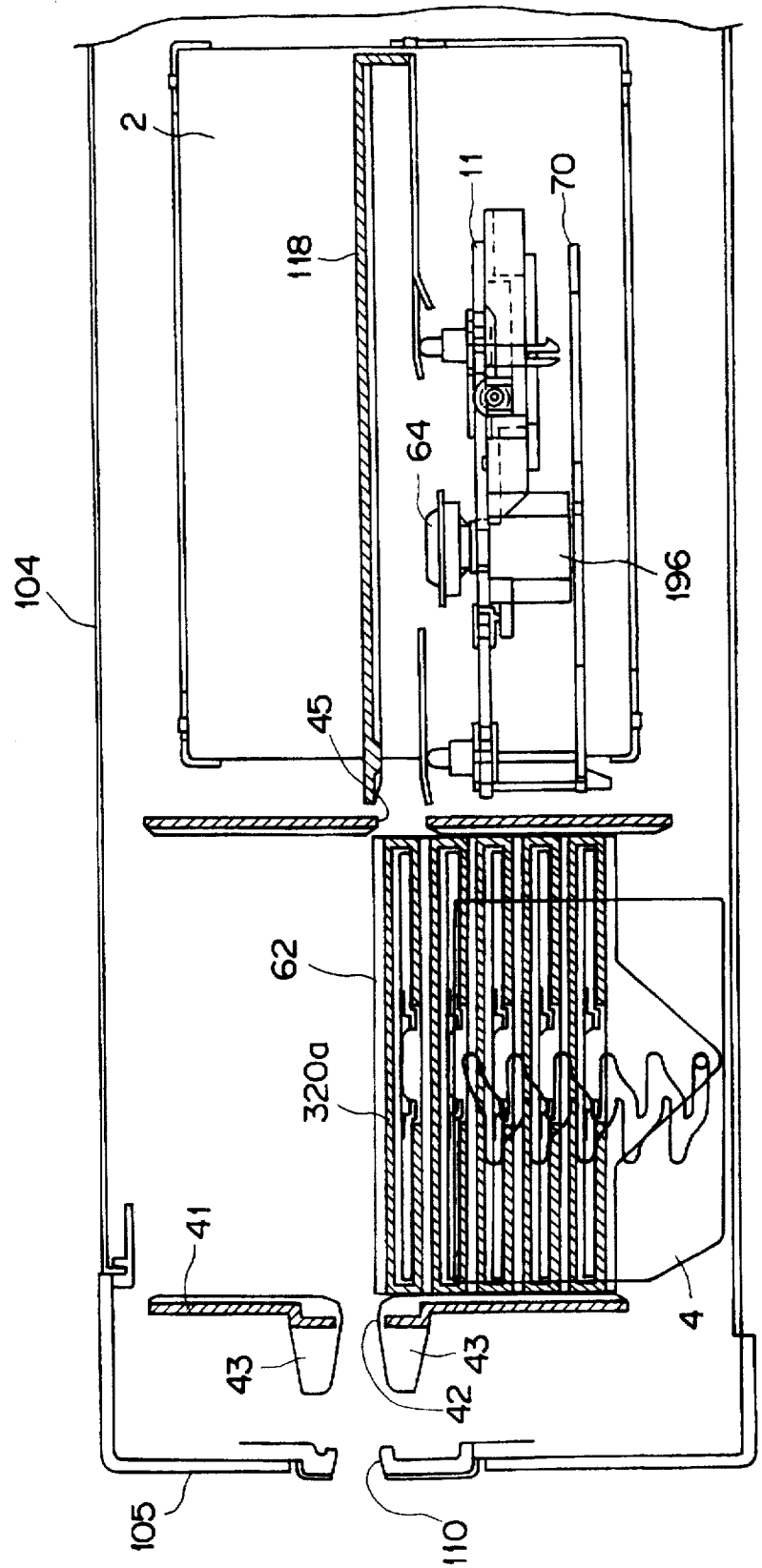

FIG. 189 is a longitudinal cross sectional view showing the state where five disc cartridges are held within the accommodating body.

Figure 190:
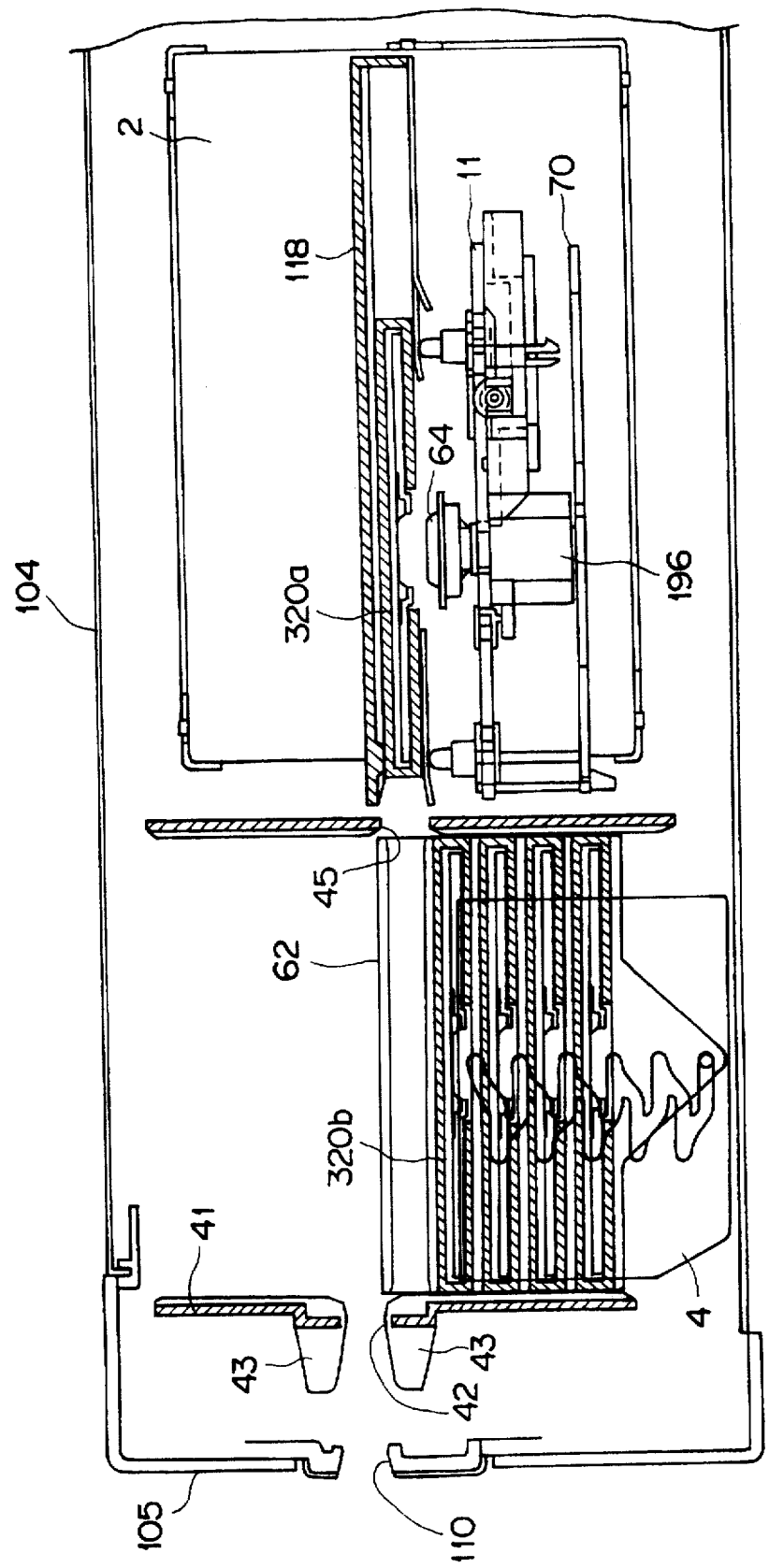

FIG. 190 is a longitudinal cross sectional view showing the state where the first disc cartridge of the five disc cartridges within the accommodating body is inserted into the cartridge holder.

Figure 191:
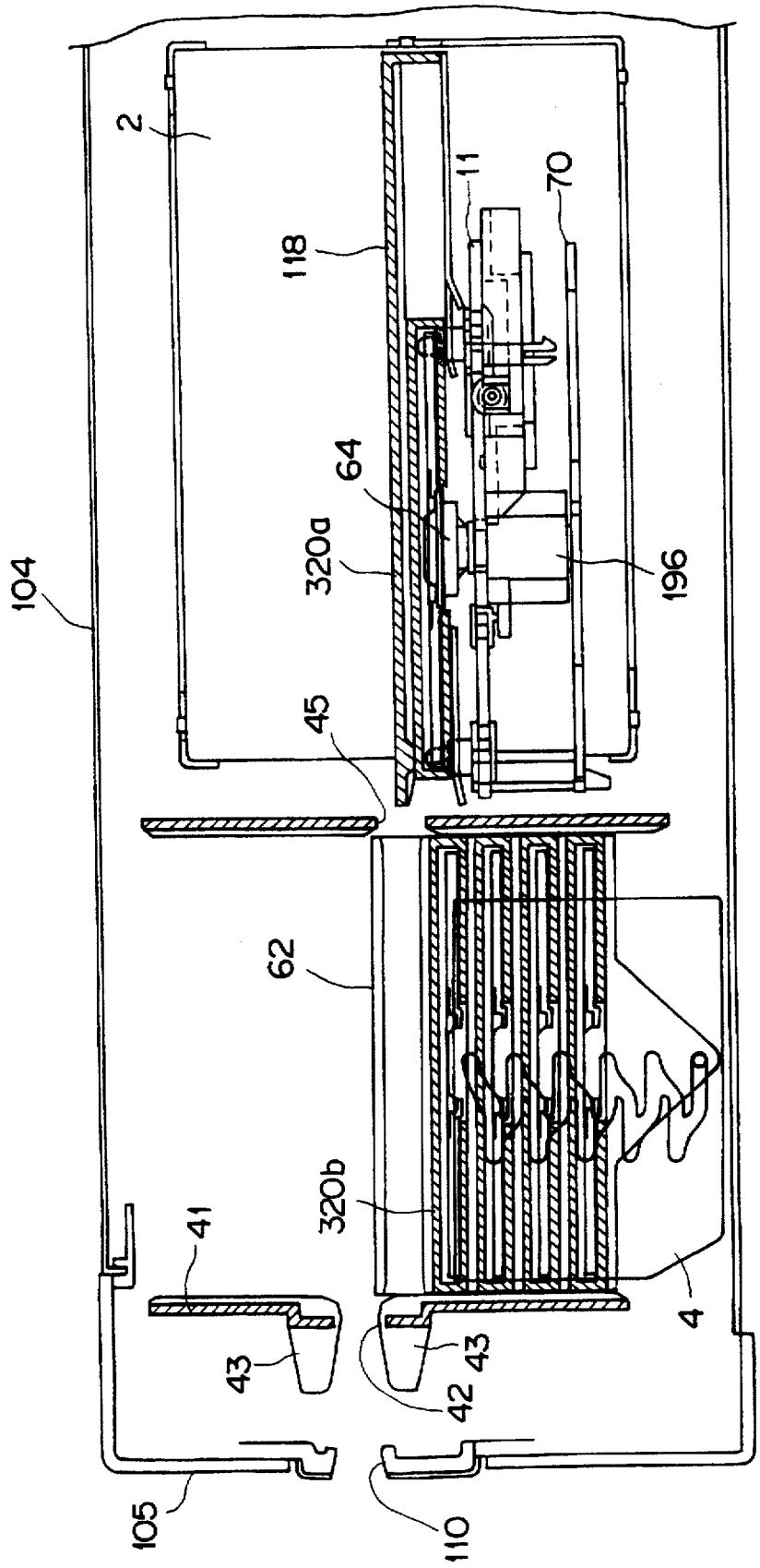

FIG. 191 is a longitudinal cross sectional view showing the state where the first disc cartridge is loaded into the recording/reproduction unit.

Figure 192:
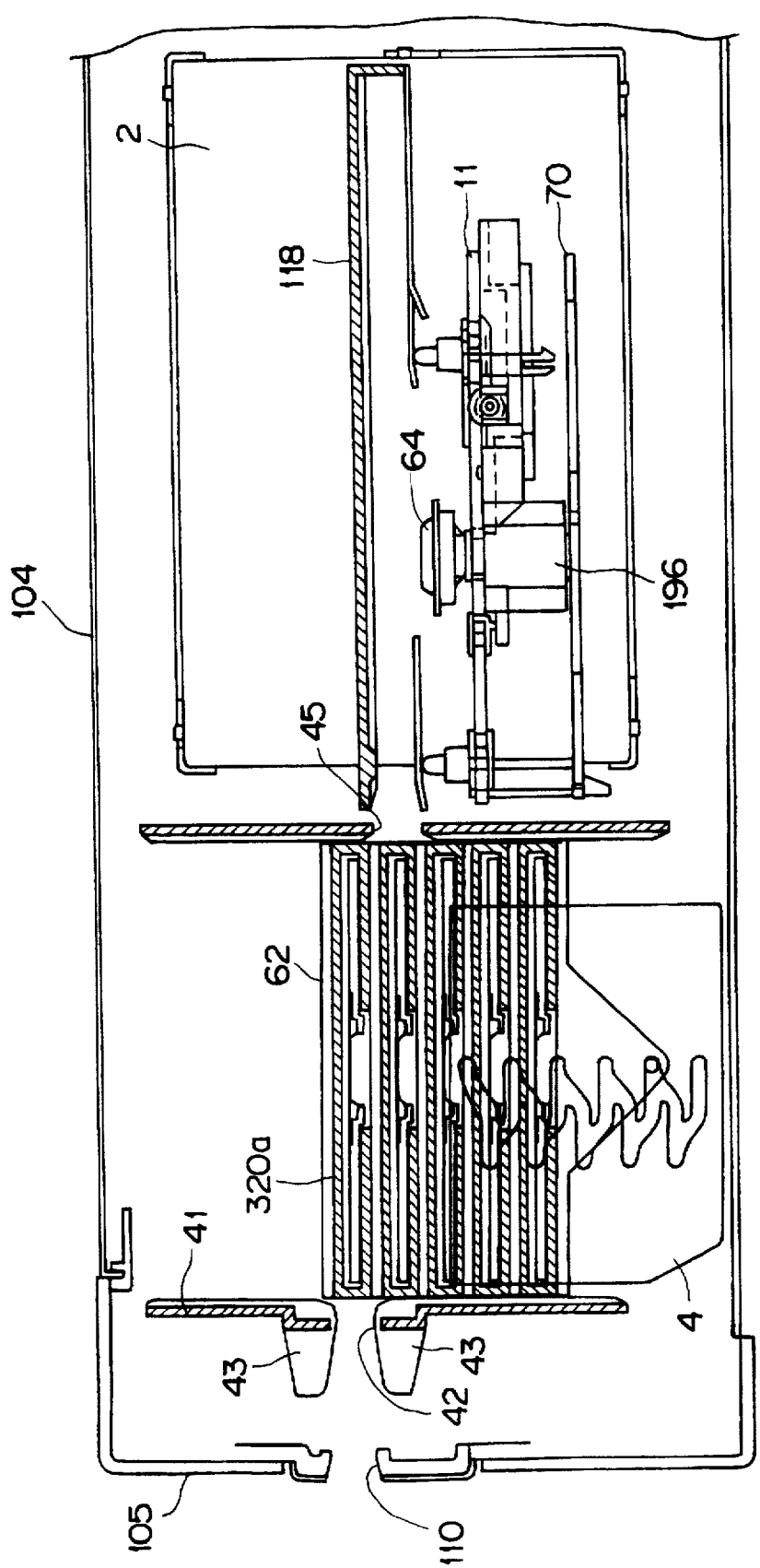

FIG. 192 is a longitudinal cross sectional view showing the state where the first disc cartridge is returned into the accommodating body and the accommodating body is caused to underto movement operation.

Figure 193:
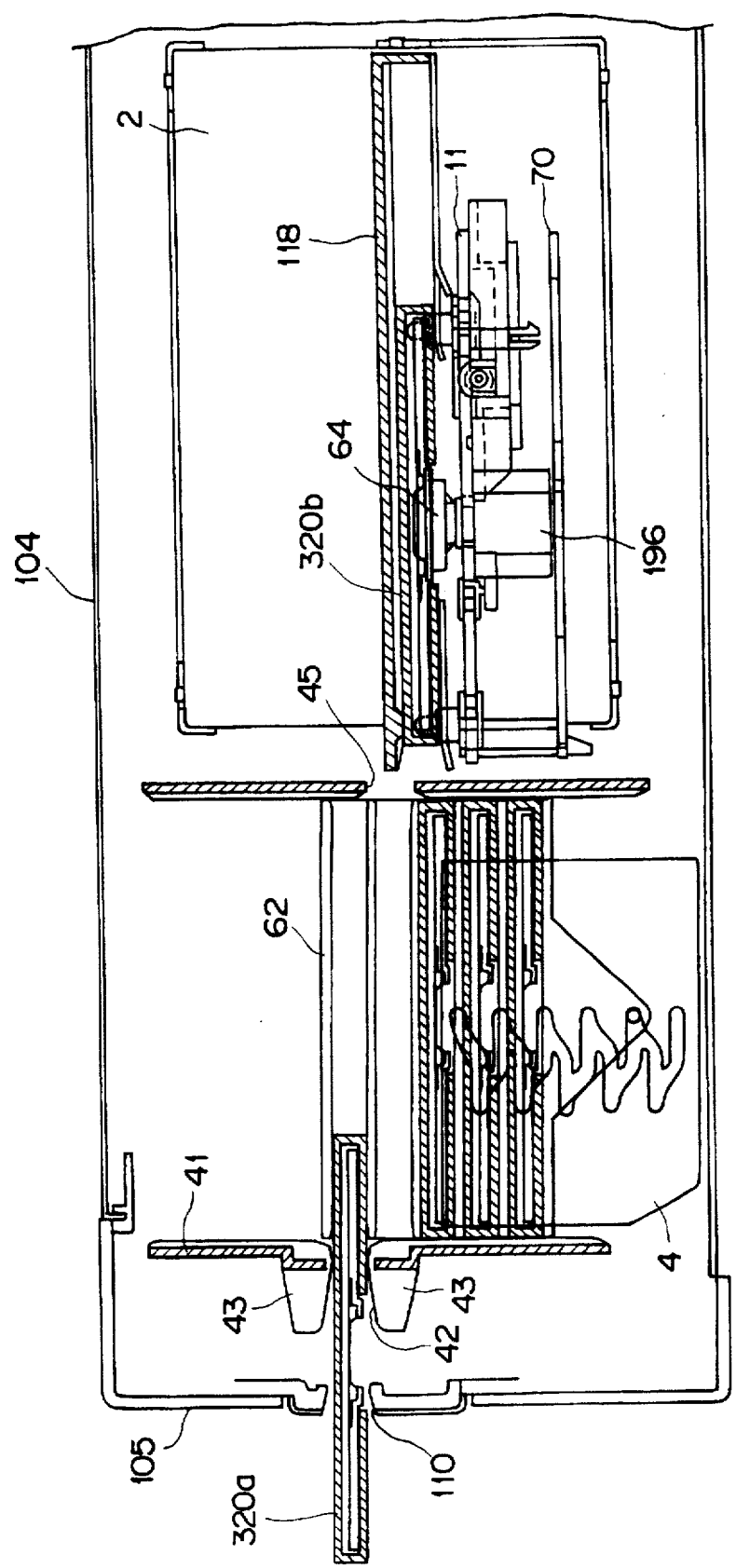

FIG. 193 is a longitudinal cross sectional view showing the state where the first disc cartridge is ejected from the accommodating body and the second disc cartridge is loaded into the recording/reproduction unit.

Figure 194:
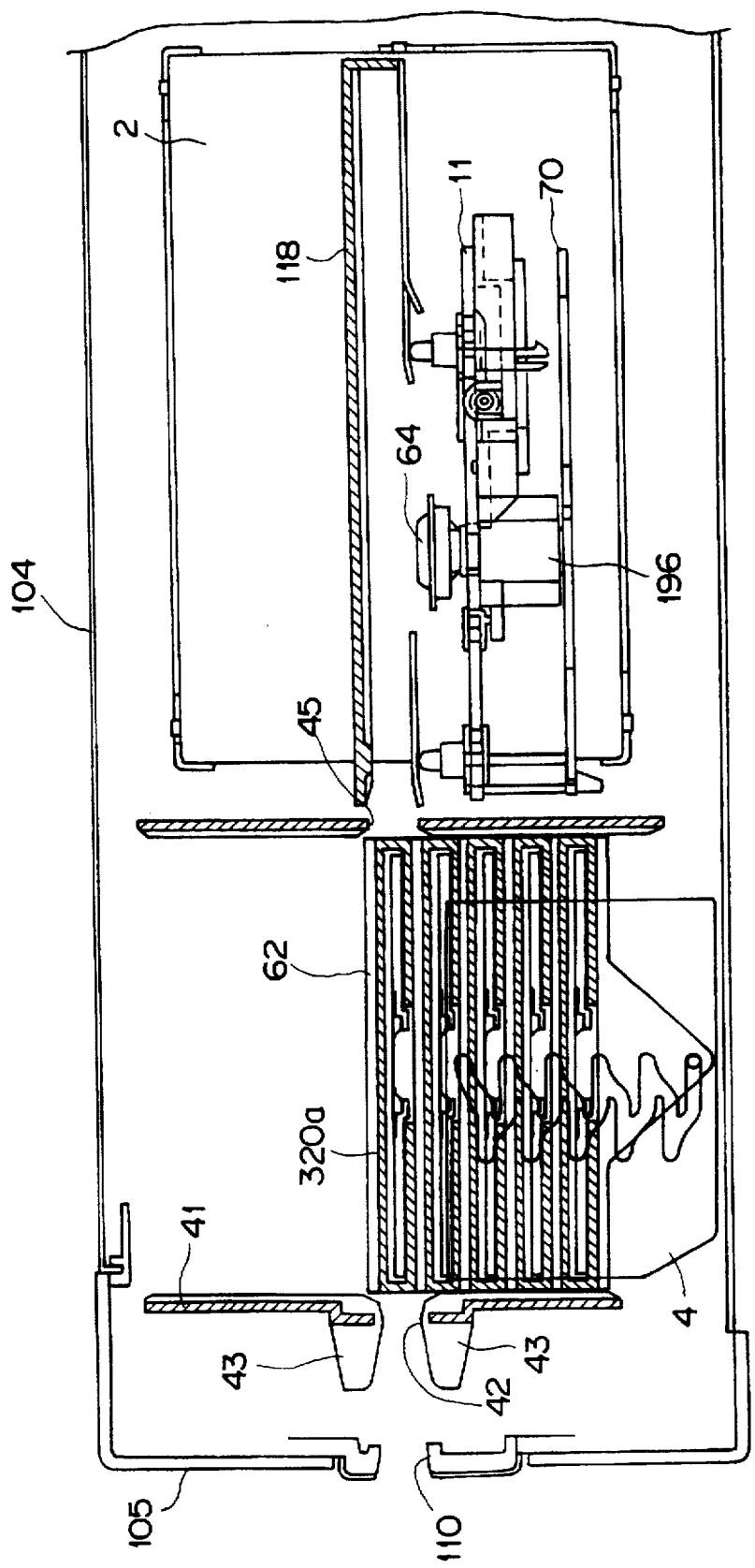

FIG. 194 is a longitudinal cross sectional view showing the state where in the case where height of insertion/ withdrawal hole of the accommodating body which carries out insertion/withdrawal of the disc cartridge and that of the cartridge holder are caused to be the same, five disc cartridges are held within the accommodating body.

Figure 195:
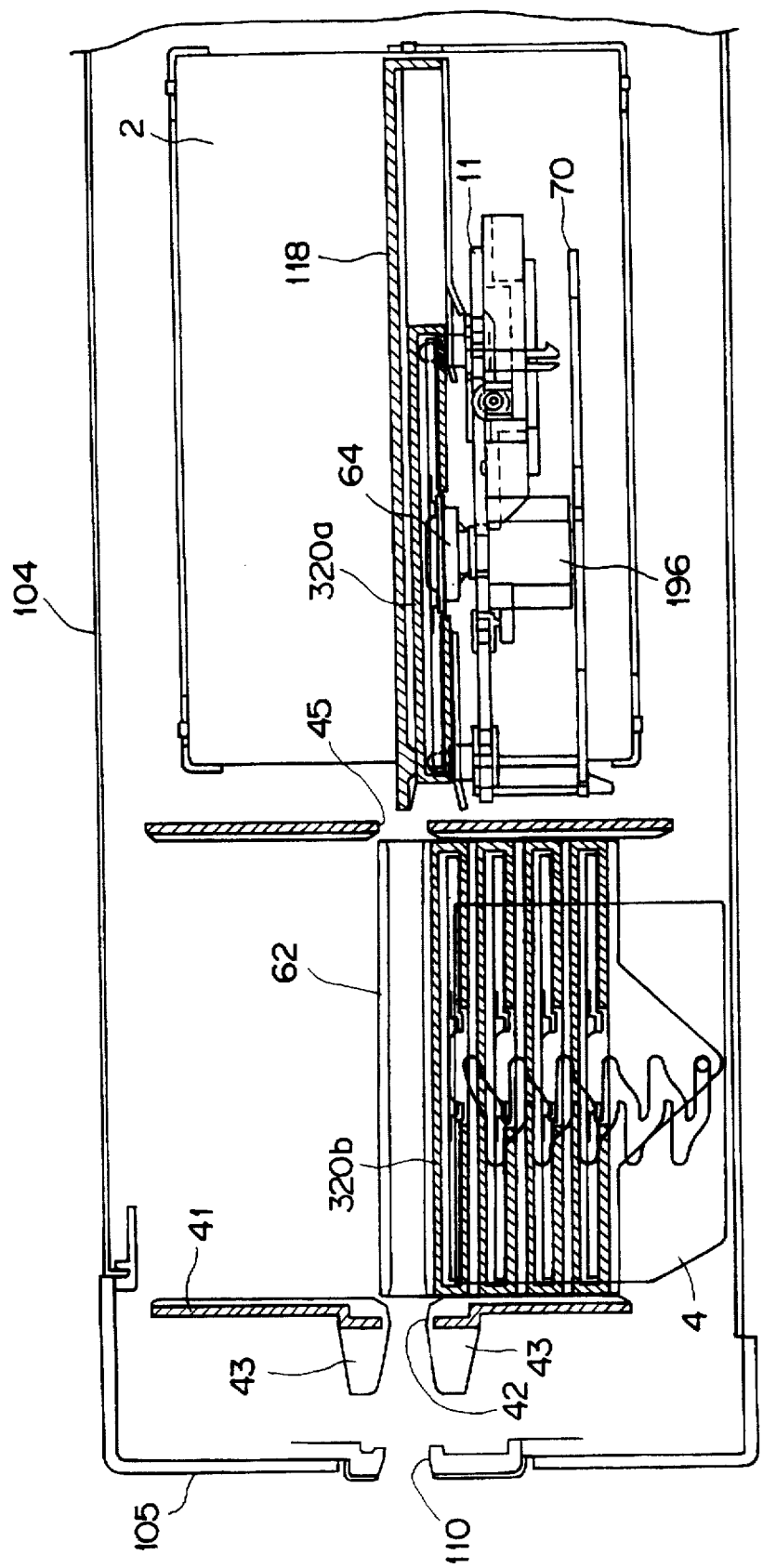

FIG. 195 is a longitudinal cross sectional view showing the state where in the case where height of the insertion/withdrawal hole of the accommodating body which carries out insertion/withdrawal of the disc cartridge and that of the cartridge holder are caused to be the same, the first disc cartridge of the five disc cartridges within the accommodating body is inserted into the cartridge holder.

Figure 196:
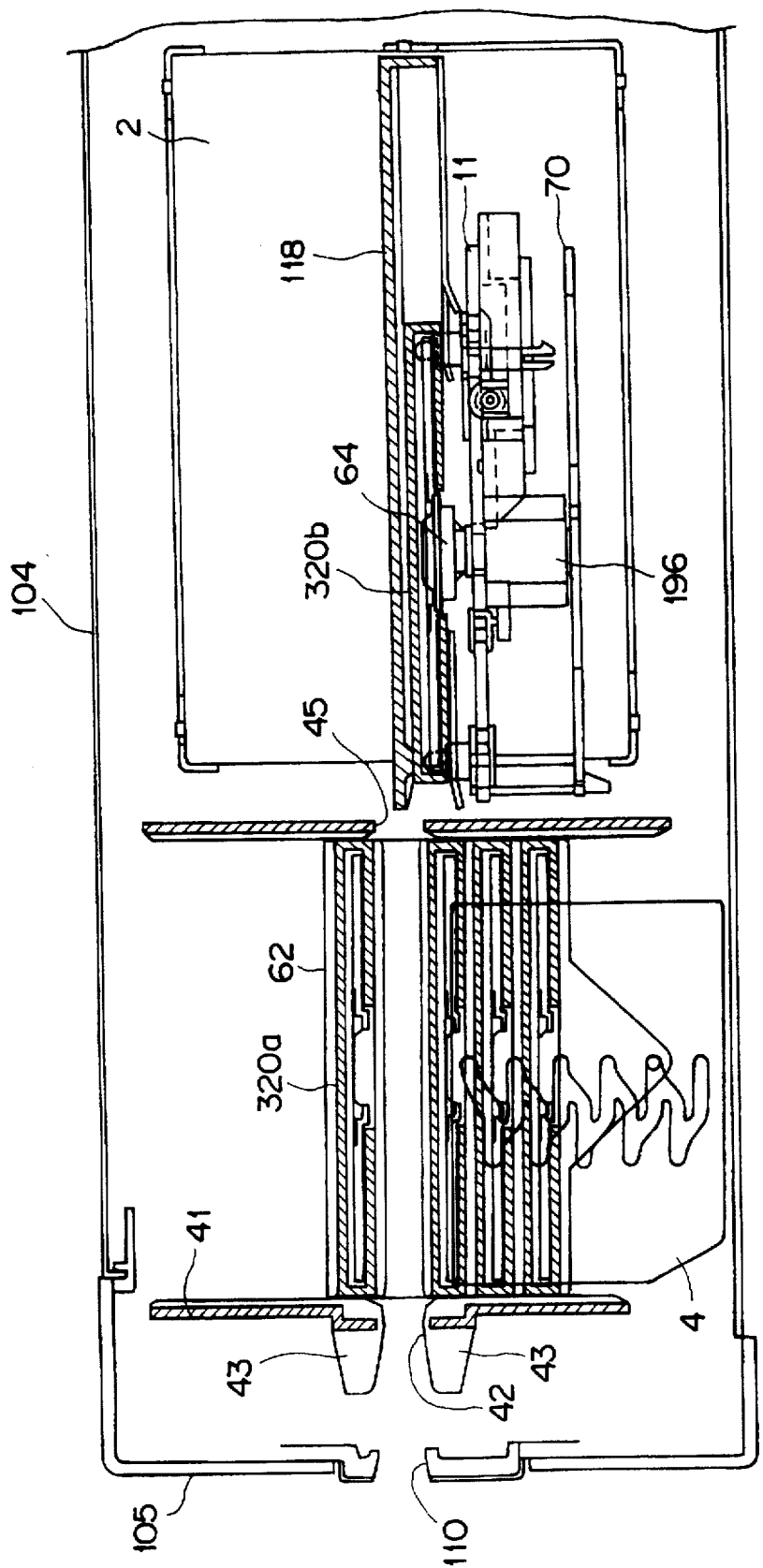

FIG. 196 is a longitudinal cross sectional view showing the state where in the case where height of the insertion/withdrawal hole of the accommodating body which carries out insertion/withdrawal of the disc cartridge and that of cartridge holder are caused to be the same, the first disc cartridge is returned into the accommodating body, the accommodating body is caused to be moved, and the second disc cartridge is loaded into the recording/reproduction unit.

Figure 197:
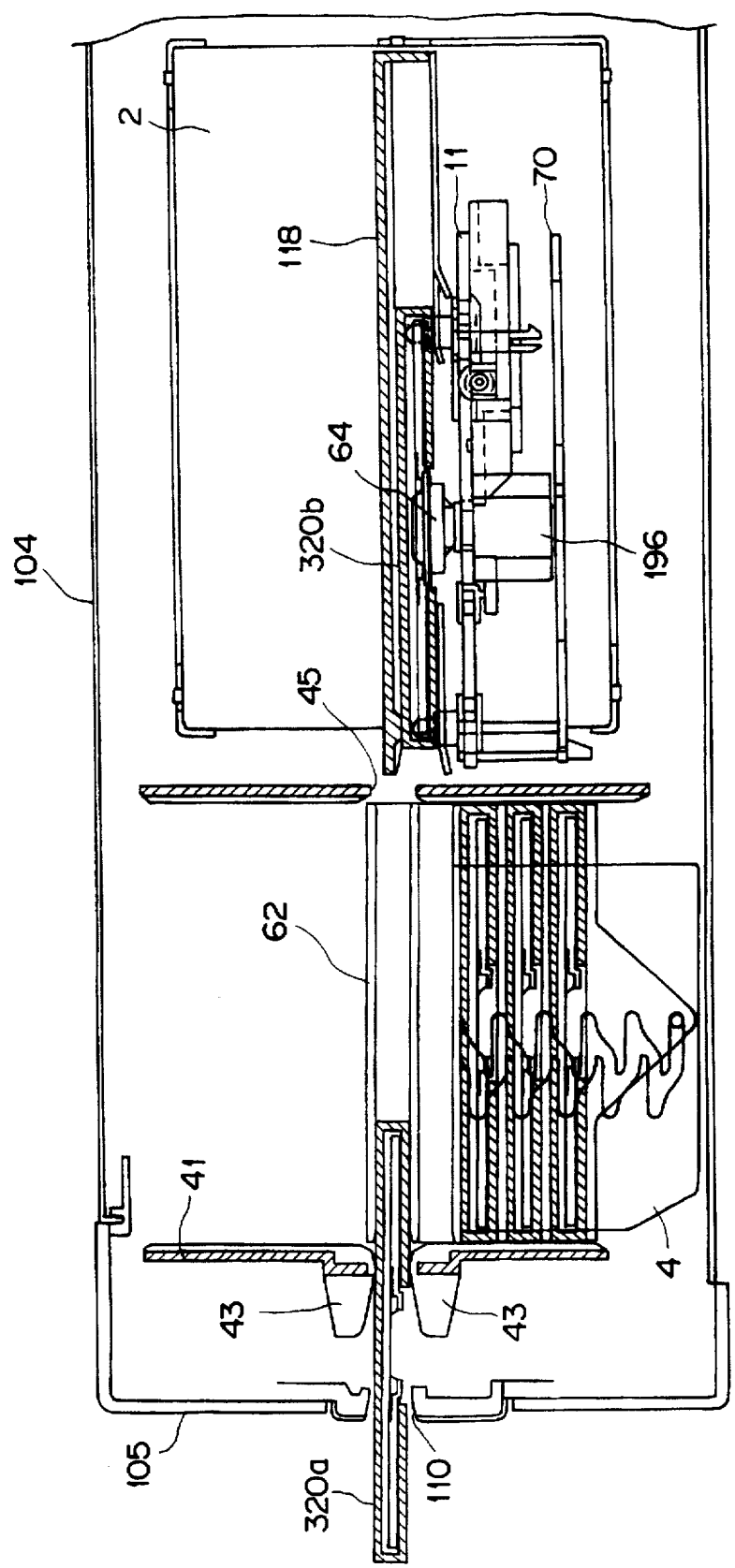

FIG. 197 is a longitudinal cross sectional view showing the state where in the case where height of the insertion/withdrawal hole of the accommodating body which carries out insertion/withdrawal of the disc cartridge and that of the cartridge holder are caused to be the same, after the second disc cartridge is loaded into the recording/reproduction unit, the accommodating body is caused to be moved, and the first disc cartridge is ejected from the accommodating body.

Figure 198:
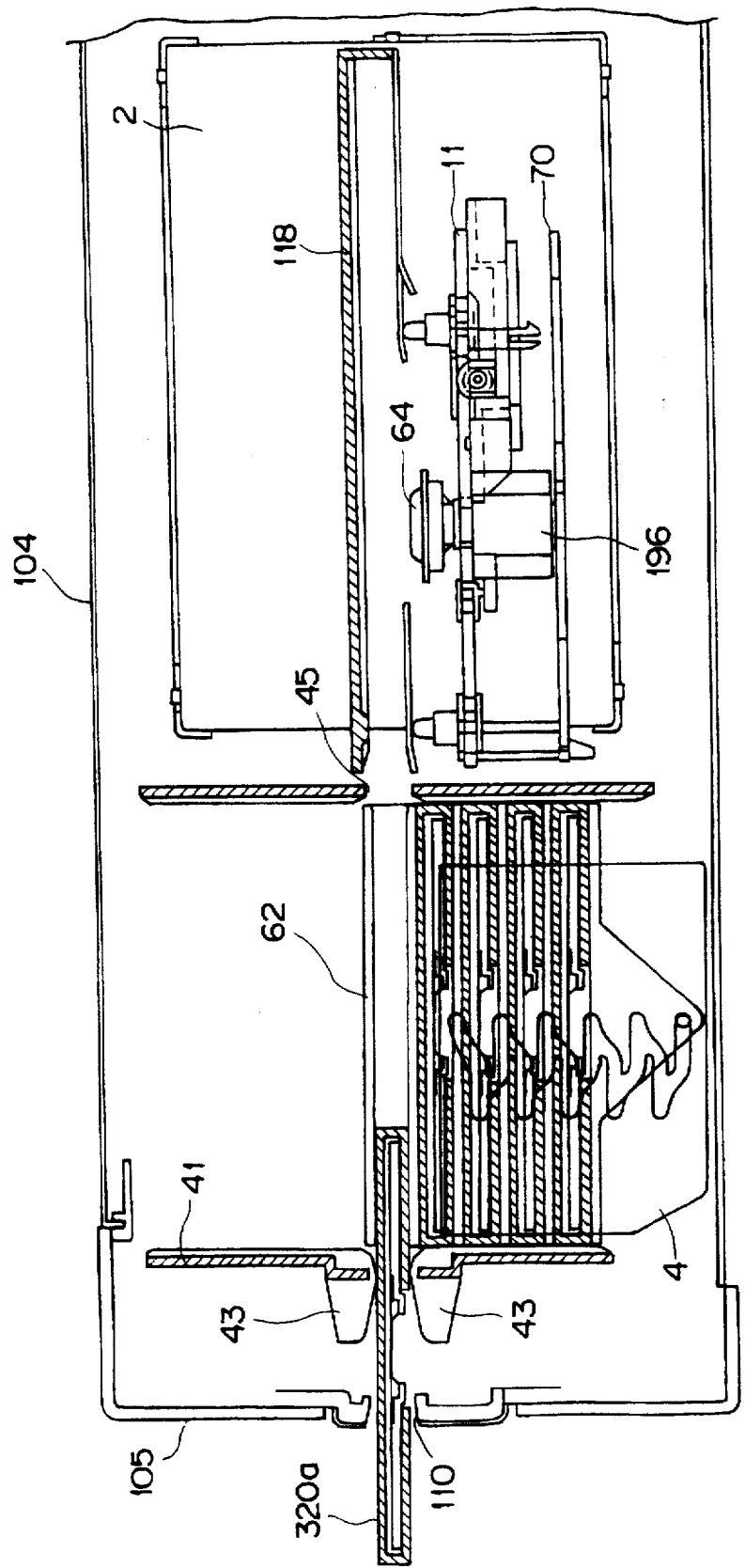

FIG. 198 is a longitudinal cross sectional view showing the state where in the case where height of insertion/withdrawal hole of the accommodating body which carries out insertion/withdrawal of the disc cartridge and that of cartridge holder are caused to be the same, the first disc cartridge is returned into the accommodating body, and the first disc cartridge is ejected from the accommodating body.

BEST MODE FOR CARRYING OUT THE INVENTION

This invention will now be described by taking the example where it is applied to a recording/reproducing apparatus in which plural disc cartridges within which optical discs serving as a recording medium on which information signals are recorded are accommodated within an accommodating body to selectively take out desired disc cartridge from the accommodating body to allow it to undergo loading into the recording/reproduction unit thus to permit continuous recording/reproduction of information signals.

1 Disc cartridge (see FIGS. 1 to 9)

Prior to explaining the recording/reproducing apparatus to which this invention is applied, disc cartridge used as a recording medium for the recording/reproducing apparatus will be described.

Figure 1:
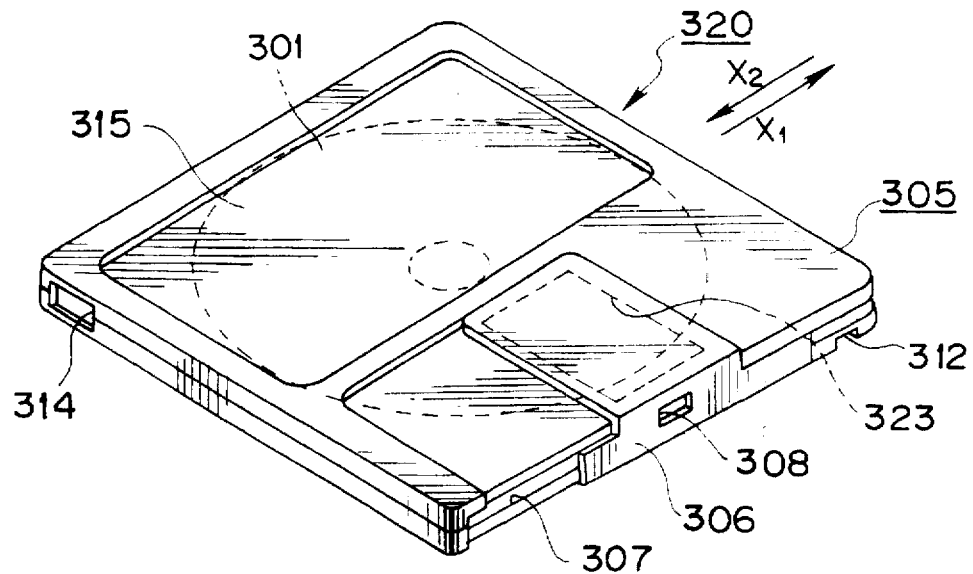
FIG. 1 is a perspective view when a disc cartridge of the recording/reproduction type used in a recording/reproducing apparatus according to this invention is viewed from the upper surface side.
Figure 2:
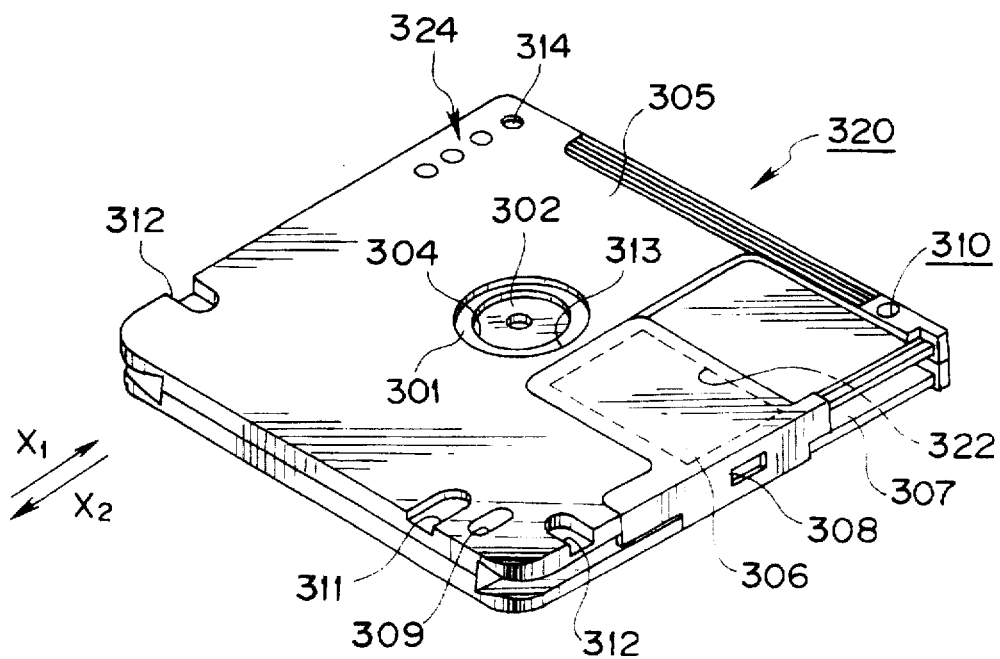
FIG. 2 is a perspective view when the disc cartridge is viewed from the lower surface side.
Figure 3:
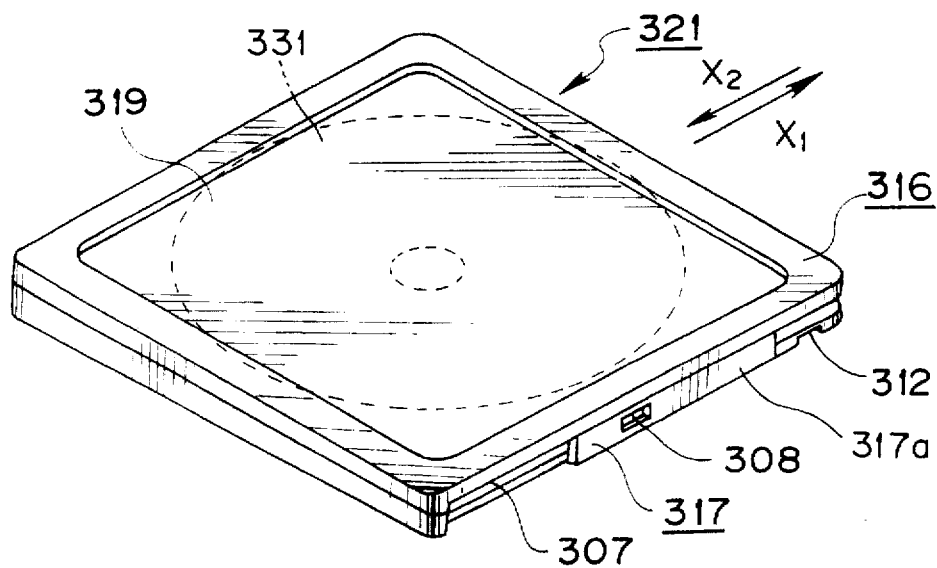
FIG. 3 is a perspective view when a disc cartridge of the reproduction only type is viewed from the upper surface side.
Figure 4:
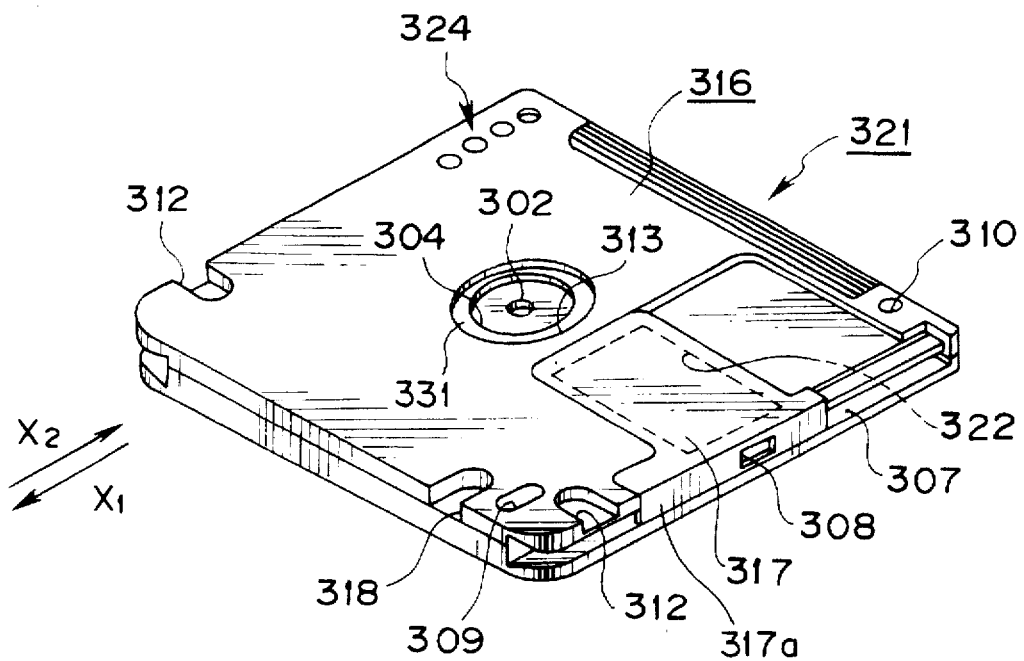
FIG. 4 is a perspective view when the disc cartridge is viewed from the lower surface side.

As the disc cartridge used here, there are used a disc cartridge constituted as shown in FIGS. 1 and 2 within which a magneto-optical disc which can carry out re-recording of information signals such as music signal, etc. is accommodated, and a disc cartridge constituted as shown in FIGS. 3 and 4 within which optical disc of the reproduction only type used only for reproduction of the recorded information signals is accommodated.

Magneto-optical disc 301 which can carry out re-recording of information signals is of a structure in which a signal recording layer comprised of perpendicular magnetization film is deposited and formed on a disc base (substrate) consisting of transparent synthetic resin material like polycarbonate having diameter of, e.g., about 64 mm.

This signal recording layer is locally heated by light beams emitted from a light source of an optical pick-up device so that temperature is more than Curie temperature, and an external magnetic field is applied to the heated portion, whereby recording of information signals is carried out. Read-out operation of the information signals recorded in this way is carried out by irradiating linearly polarized light beams onto the signal recording layer to detect, by a photo detector, rotation of polarization direction by the Kerr effect of return light reflected from the signal recording layer.

Moreover, optical disc 331 of the reproduction only type is of a structure in which a reflection layer consisting of metal material like aluminum is deposited and formed on a disc base (substrate) similar to the disc base of the magneto-optical disc 301. Fine pit trains corresponding to information signals are formed on the optical disc, whereby recording of information signals is fixedly carried out. Recording of information signals onto the optical disc 331 is carried out as the result of the fact that pit trains formed in advance are transferred onto a stamper loaded within a metal mold unit in molding the disc base. Moreover, information signals recorded on the optical disc 331 of the reproduction only type is read out by irradiating light beams emitted from a light source of the optical pick-up device onto pit trains to detect return light reflected from the optical disc by a photo-detector.

Further, the magneto-optical disc 301 and the optical disc 331 are both rotatably accommodated within cartridge bodies 305, 316 as shown in FIGS. 1 and 2, and FIGS. 3 and 4 to constitute disc cartridges 320 and 321, respectively.

The disc cartridge 320 of the recording type which permits re-recording of information signals, within which magneto-optical disc 301 is accommodated, includes a cartridge body 305 in square form such that the outside diameter of the magneto-optical disc 301 is caused to be substantially inscribed circle as shown in FIGS. 1 and 2. At the upper surface side of the cartridge body 305, there is formed an opening portion 323 for magnetic head to allow a portion of the signal recording area of the accommodated magneto-optical disc 301 to be faced to the outward extending over inner and outer circumferences as shown in FIG. 1. Moreover, at the lower surface side of the cartridge body 305, there is formed an opening portion 322 for the optical pick-up device to allow a portion of the signal recording area of the magneto-optical disc 301 to be similarly faced to the outward extending over inner and outer circumferences in a manner opposite to the opening portion 323 for magnetic head. Further, at the central portion of the lower surface side of the cartridge body 305, there is formed a central opening portion 313 to take circular shape, into which a disc table constituting a disc rotation operation mechanism which rotationally operates the magneto-optical disc 301 accommodated within the cartridge body 305 is admitted.

Further, at the cartridge body 305 of the disc cartridge 320 of the recording type, a shutter member 306 which opens and closes the respective opening portions 323, 322 is attached. This shutter member 306 is formed by punching and bending a thin metal plate. The shutter member 306 is composed of shutter plates having dimensions sufficient to cover the respective opening portions 323, 322 and a connecting portion which connects the base end portions of these shutter plates, and is formed channel-shaped in cross section. It is to be noted that a shutter member formed by molding synthetic resin may be also used as the shutter member 306. The shutter member 306 is attached to the front side of the cartridge body 305 in such a manner that the shutter plates respectively cover the opening portions 323, 322, and it moves along the front side to thereby open and close respective opening portions 323, 322. With respect to the shutter member 306, stable linear movement thereof is guaranteed in the state where engagement piece provided at the connecting portion is guided by movement guide groove 307 by engaging the engagement piece into a movement guide groove 307 formed at the front side of the cartridge body 305.

The disc cartridge 320 of the recording type constituted as described above is subjected to insertion/withdrawal with respect to the recording/reproducing apparatus with one side surface perpendicular to the front side where the shutter member 306 moves being as insertion end. Namely, the disc cartridge is subjected to insertion/withdrawal with respect to the recording/reproducing apparatus with the direction indicated by arrow $X_1$ and the direction indicated by arrow $X_2$ in FIGS. 1 and 2 being as insertion/withdrawal direction.

On the other hand, the disc cartridge 321 within which the optical disc 331 of the reproduction only type is accommodated also includes a cartridge body 316 in a rectangular form in which the outside diameter of the optical disc 331 is caused to be substantially inscribed circle as shown in FIGS. 3 and 4 similarly to the disc cartridge 320 of the recording type. Since this disc cartridge 321 is not required that the magnetic head used for recording information signals is opposed to the optical disc 331, the upper surface side of the cartridge body 316 is closed. At the lower surface side of the cartridge body 316, there is formed opening portion 322 adapted to allow a portion of the signal recording area of the optical disc 331 to be faced to the outward extending over inner and outer circumferences and adapted so that the optical pick-up device for irradiating light beams onto the optical disc 331 to read out information signals recorded on the optical disc 331 is faced to the opening portion 322. Further, at the central portion of the lower surface side of the cartridge body 316, there is formed central opening portion 313 to take circular shape, into which the disc table constituting the disc rotation operation mechanism which rotationally operates the optical disc 331 accommodated within the cartridge body 316 is admitted.

Also at the disc cartridge 321 of the reproduction only type, a shutter member 317 which opens/closes the opening portion 322 is attached. This shutter member 317 includes a shutter plate of dimensions sufficient to close the opening portion 322, and is provided at the base end portion side of the shutter plate with a supporting portion 317a channel-shaped in cross section for supporting the shutter member 317 by the cartridge body 316 so that it can be moved. The shutter member 317 is attached in such a manner that a portion of the supporting portion 317a is engaged with a movement guide groove 307 formed at the front side of the cartridge body 316, and a portion of the cartridge body 316 is held between respective portions constituting the supporting portion 317a. The shutter member 317 attached in this way is caused to undergo movement operation in a direction to open/close the opening portion 323 along the front side of the cartridge body 316.

The disc cartridge 321 of the reproduction only type constituted as described above is also subjected to insertion/withdrawal with respect to the recording/reproducing apparatus with one side surface perpendicular to the front side where the shutter member 317 moves being as insertion end similarly to the disc cartridge 320 of the recording type. Namely, the disc cartridge 321 is subjected to insertion/withdrawal with respect to the recording/reproducing apparatus with the direction indicated by arrow $X_1$ and the direction indicated by arrow $X_2$ in FIGS. 3 and 4 being as insertion/withdrawal direction.

Substantially at the central portion of the connecting portion of the shutter member 306 attached at the disc cartridge 320 of the recording type and the supporting portion of the shutter member 317 attached at the disc cartridge 321 of the reproduction only type, there is opened an engagement hole 308 with which there is engaged a shutter closing operation member provided at the apparatus side which allows shutter members 306, 317 moved to the position where respective opening portions 322, 323 are opened to undergo movement operation in a position direction where respective opening portions 322, 323 are closed in carrying out eject operation of the disc cartridge 320 or 321 from the recording/reproducing apparatus.

Meanwhile, at the central portion of the magneto-optical disc 301 and the optical disc 331 accommodated within respective disc cartridges 320, 321, a center hole 304 for positioning which takes circular shape is formed. At the central portion where the center hole 304 is formed, a chucking plate 302 is attached in a manner to close the center hole 304. This chucking plate 302 is formed by metallic plate having magnetism which can be attracted by magnet. The center hole 304 and the chucking plate 302 are faced to the outward of the cartridge bodies 305, 316 through the central opening portion 313 provided at the cartridge bodies 305, 316.

Moreover, at the lower surface side of cartridge bodies 305, 316 constituting respective disc cartridges 320, 321, there are provided a pair of positioning holes 309, 310 with which positioning pins provided at the loading portion side are engaged when these disc cartridges 320, 321 are loaded into the loading portion within the recording/reproducing apparatus. These positioning holes 309, 310 are provided in the state positioned on the both sides of the front side of the cartridge bodies 305, 316 by which shutter members 306, 317 are supported as shown in FIGS. 2 and 4. Namely, these positioning holes 309, 310 are provided in such a manner that the opening portion 322 is put therebetween. In this example, one positioning hole 309 is formed with the movement direction of the shutter members 306, 317 being as length direction, and the engagement position with respect to the positioning pin can be adjusted within the range of the length direction. In addition, the other positioning hole 310 is formed as complete round and serves to limit the engagement position with respect to the positioning pin.

Further, at the back side opposite to the front side where positioning holes 309, 310 of the lower surface side of cartridge bodies 305, 316 are provided, plural discrimination holes 324 are formed as shown in FIGS. 2 and 4. These discrimination holes 324 indicates kind or state of the disc accommodated within the cartridge body 305, 306, e.g., as to whether or not recording of information signals can be made. Further, one discrimination hole 324 provided at the disc cartridge 320 of the recording type is used as detection hole for prevention of erroneous recording, and is opened/closed by an erroneous recording preventing member 314 attached within the cartridge body 305 so that it can be moved. Namely, the discrimination hole 324 used as detection hole for prevention of erroneous recording is such that the erroneous recording preventing member 314 is caused to undergo movement operation so that depth of the discrimination hole 324 is changed to thereby carry out switching between recordable state and non-recordable state of information signals with respect to the magneto-optical disc 301. Furthermore, at the both sides of one side surface side serving as insertion end side into the recording/reproducing apparatus of the cartridge bodies 305, 316, there are formed engagement recessed portions 312 with which a portion of the drawing-in mechanism to draw the disc cartridges 320, 321 into the recording/reproducing apparatus is engaged.

Further, at the cartridge bodies 305, 316 constituting the disc cartridges 320, 321, a magneto-optical disc discrimination recessed portion 311 and an optical disc discrimination recessed portion 318 indicating that these disc cartridges 320, 321 are of the recording type or reproduction only type are respectively formed as shown in FIGS. 2 and 4. These discrimination recessed portions 311, 318 are provided in the state positioned at the insertion end side into the recording/reproducing apparatus of the lower surface side of the cartridge bodies 305, 316. It is to be noted that respective disc discrimination recessed portions 311, 318 are formed so that their depths are different from each other. By difference of the depth, whether the respective disc cartridges 320, 321 are of the recording type or the reproduction only type is indicated.

Figure 5:
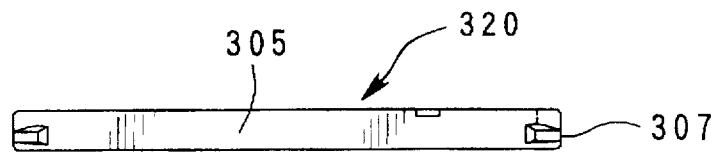
FIG. 5 is a front view of the disc cartridge of the recording/reproduction type.

Meanwhile, the movement guide groove 307 provided at the front side of the cartridge body 305 or 316 is also serves, in allowing the disc cartridge 320 or 321 to undergo loading operation into the recording/reproducing apparatus, as the portion into which shutter releasing operation piece provided at the apparatus side which carries out releasing operation of the shutter member 306 or 317 is inserted. Namely, the disc cartridge 320 or 321 used in the recording/ reproducing apparatus according to this invention is adapted so that the shutter releasing operation member is inserted into the movement guide groove 307 in relation to the loading operation into recording/reproducing apparatus, whereby releasing operation of the shutter member 306 or 317 is carried out. Therefore, the movement guide groove 307 is formed at the front side of the cartridge body 305 or 316 in the state where the opening end is faced to one side surface side serving as insertion end side into the recording/ reproducing apparatus of the disc cartridge 320 or 321 as shown in FIGS. 2, 4 and 5. Since the movement guide groove 307 is formed in this way, when the disc cartridge 320 or 321 is caused to undergo loading operation into the recording/reproducing apparatus, the shutter releasing operation member is immediately inserted into the movement guide groove 307, whereby the opening operation of the shutter member 306 or 317 is carried out.

Figure 6:
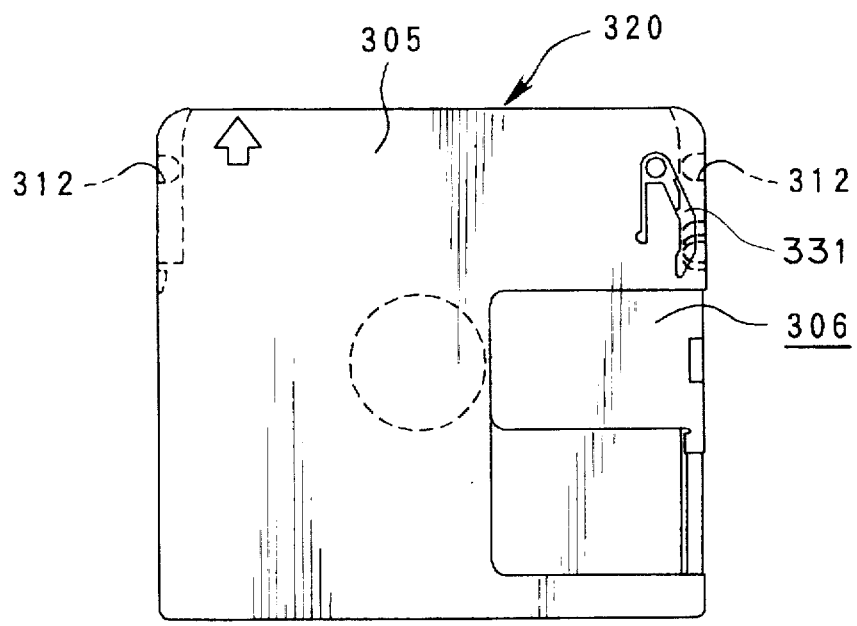
FIG. 6 is a plan view of the disc cartridge.

Moreover, within the cartridge body 305 or 316, a lock member 331 which locks the shutter member 306 or 317 located at the position where opening portion 322, or 333 is closed is provided as shown in FIG. 6.

Figure 7:
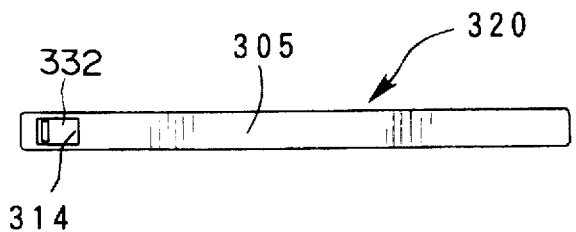
FIG. 7 is a back view of the disc cartridge.
Figure 8:
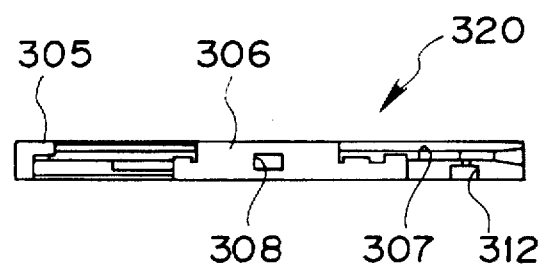
FIG. 8 is a left side view of the disc cartridge.
Figure 9:
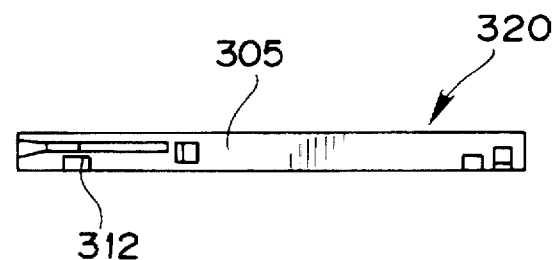
FIG. 9 is a right side view of the disc cartridge.

Further, the error recording preventing member 314 is disposed within the cartridge body 305 in such a manner to project an operation piece 333 into a through-hole 332 provided at the back side of the cartridge body 306 as shown in FIG. 7. Accordingly, this error recording preventing member 314 is caused to undergo movement operation in a direction to open/close the discrimination hole 324 through the operation piece 333 projected into the through-hole 332.

2 Outline of the recording and/or reproducing apparatus (see FIGS. 10 to 19)

Figure 10:
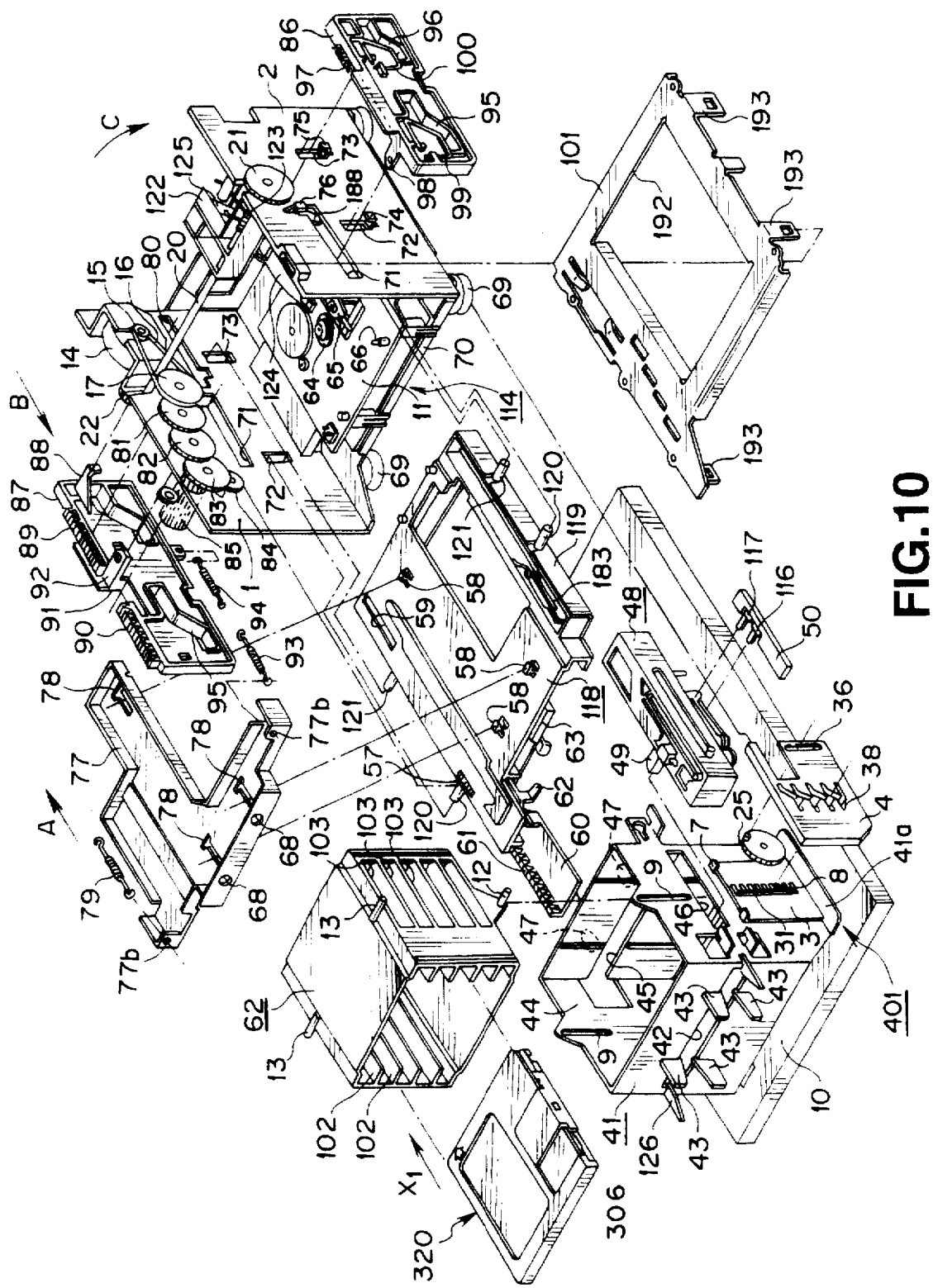
FIG. 10 is an exploded perspective view of a recording/reproducing apparatus using, as a recording medium, the disc cartridge according to this invention.

The recording/reproducing apparatus to which this invention is applied is provided with, as shown in FIG. 10, an accommodating body 62 adapted so that plural disc cartridges 320, 321 constituted as described above are accommodated in a manner in parallel to each other in the state where their principal surfaces are opposite to each other. Respective disc cartridges 320, 321 are inserted into the accommodating body 62 from the surface side positioned in the left direction in FIG. 10 which is the front side of the accommodating body 62. At this time, respective disc cartridges 320, 321 are caused to undergo insertion operation in the direction indicated by arrow $X_1$ in FIG. 10 with the one side surface side perpendicular to the front side where the shutter members 306, 317 move, which serves as insertion end into the recording/reproducing apparatus, being as insertion end, and are thus accommodated into the accommodating body 62.

Figure 11:
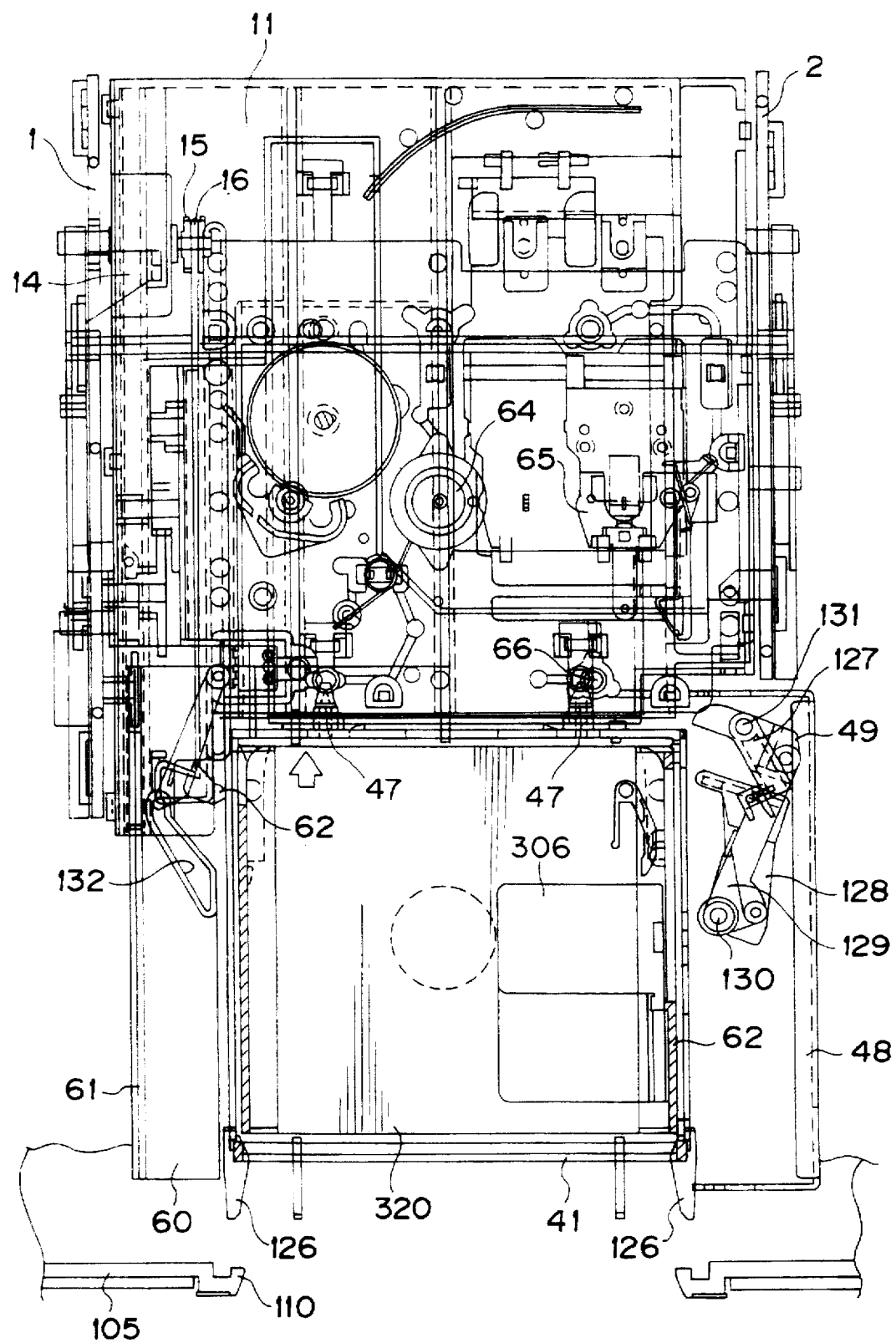
FIG. 11 is a plan view of the recording/reproducing apparatus.
Figure 12:
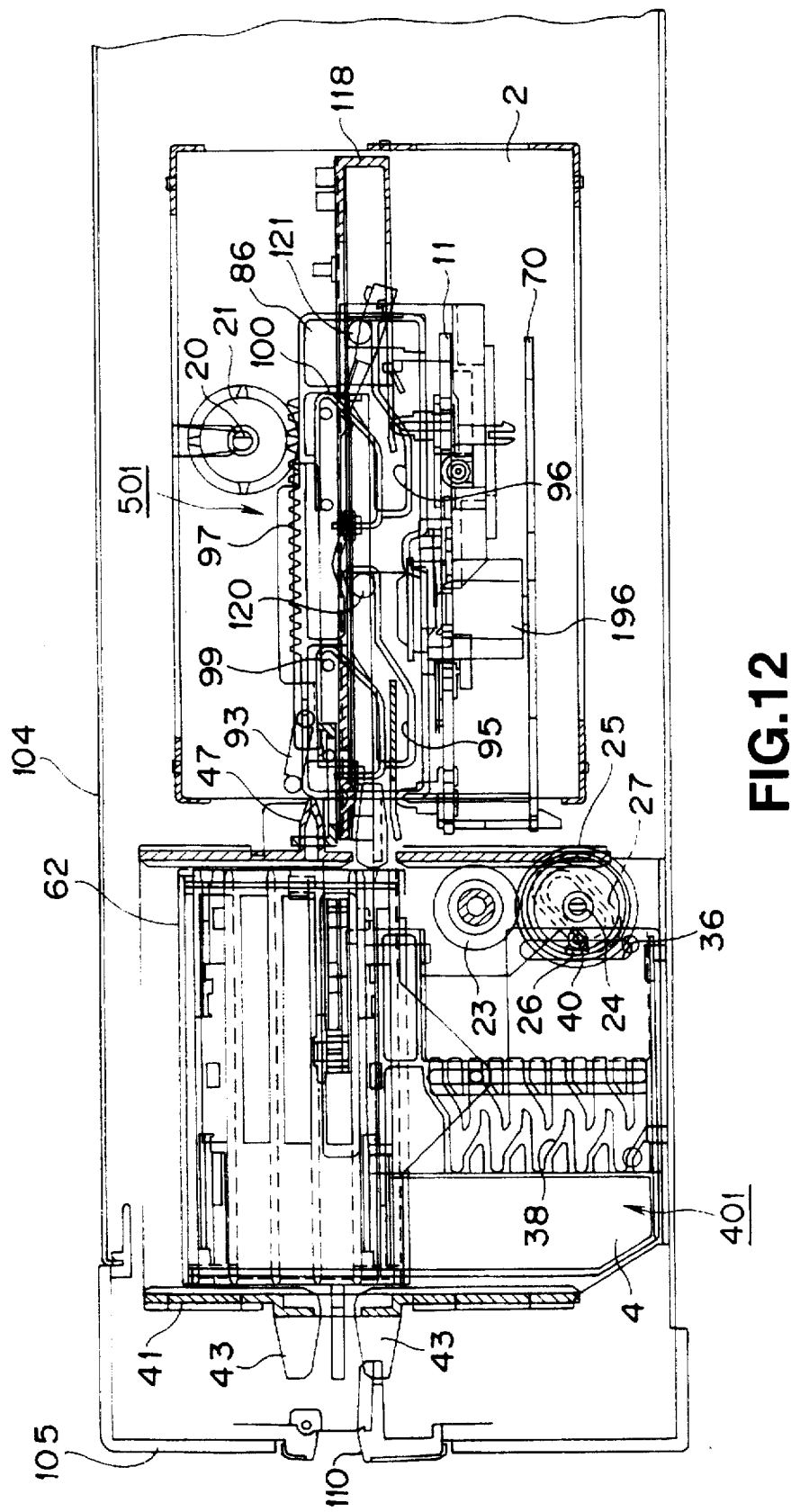
FIG. 12 is a right side view of the recording/reproducing apparatus.
Figure 16:
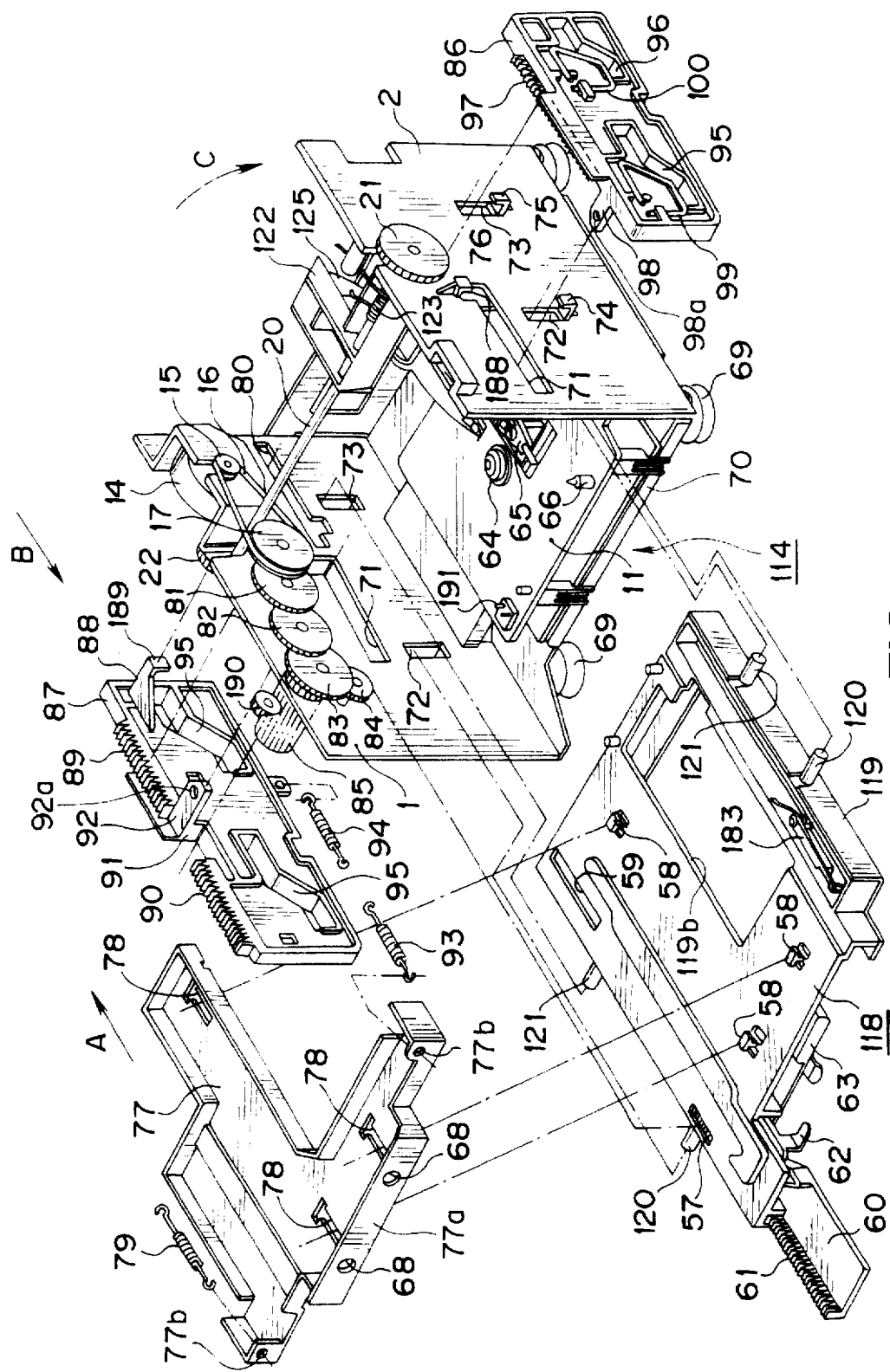
FIG. 16 is an exploded perspective view showing cartridge holder and vertical movement mechanism for the cartridge holder.

In this recording/reproducing apparatus, a recording/ reproduction unit 114 is disposed, as shown in FIGS. 10, 11 and 12, at the backward side of the accommodating body 62 in such a manner opposite to the accommodating body 62. This recording/reproduction unit 114 includes an attachment base 11 which takes rectangular shape as shown in FIG. 16, and a disc rotational operation mechanism having an optical pick-up device 65 and a disc table 64 is attached through the attachment base 11.

Figure 13:
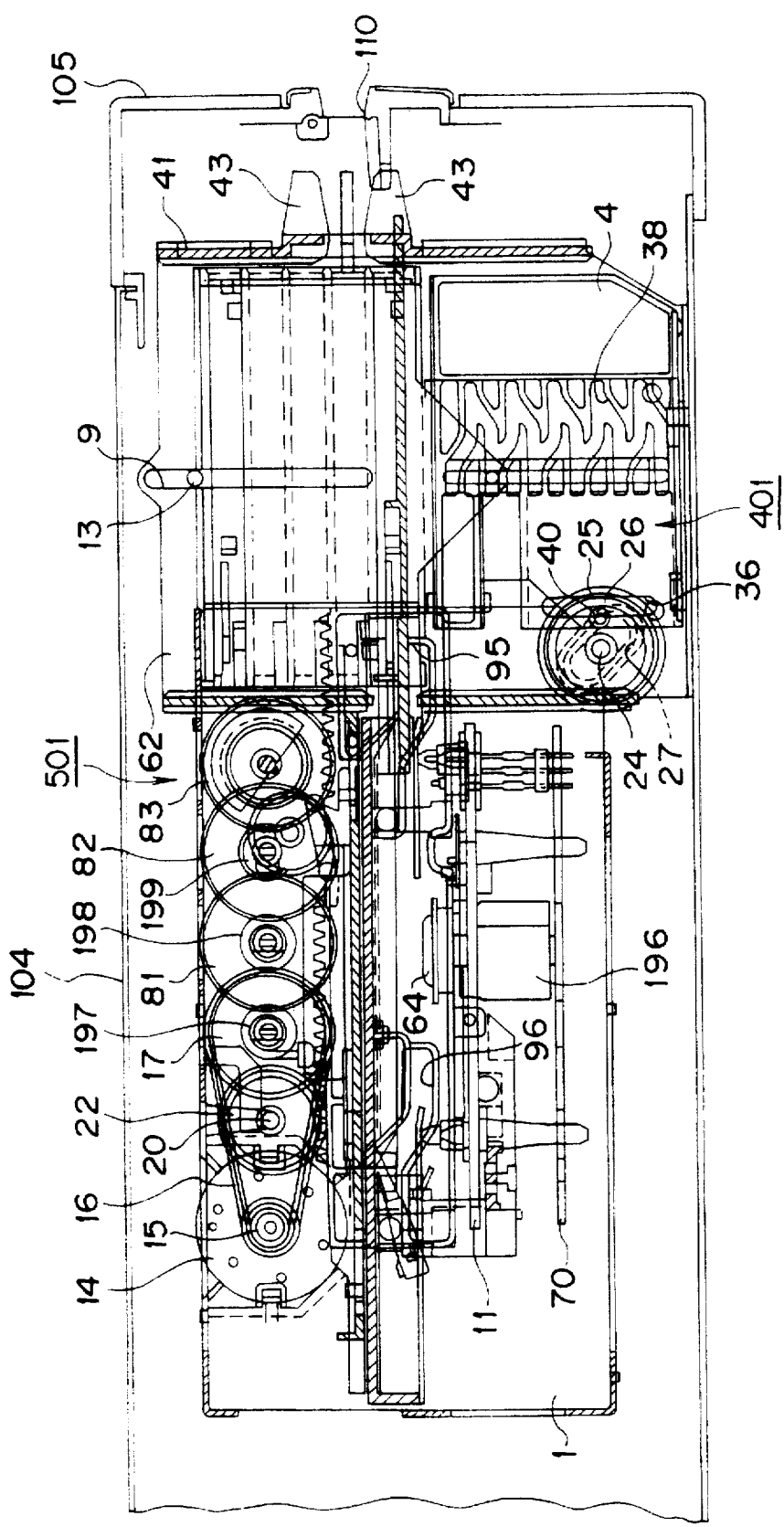
FIG. 13 is a left side view of the recording/reproducing apparatus.

Moreover, the recording/reproducing apparatus is provided, as shown in FIGS. 10, 12 and 13, with a vertical movement operation mechanism 401 for allowing the accommodating body 62 within which disc cartridges 320, 321 are accommodated to undergo vertical movement operation in upper and lower directions perpendicular to the principal surfaces of the accommodated disc cartridges 320, 321. Further, in this recording/reproducing apparatus, there is disposed a cartridge carrying mechanism 501 for carrying (transferring) the disc cartridges 320, 321 accommodated within the accommodating body 62 extending over the accommodating body 62 and the recording/reproduction unit 114. This cartridge carrying mechanism 501 is provided within a cartridge holder 118 disposed at the upper side of the recording/reproduction unit 114 as shown in FIGS. 12 and 13. This cartridge holder 118 holds disc cartridges 320, 321 carried by the cartridge carrying mechanism 501, and is caused to undergo movement operation in upper and lower directions which are directions to become close to the recording/reproduction unit 114 and to become away therefrom to allow the held disc cartridges 320, 321 to undergo loading/unloading with respect to the recording/ reproduction unit 114.

The accommodating body 62 is disposed on the base plate 10, as shown in FIG. 10, through a vertical movement guide body 41 and the vertical movement operation mechanism 401 which support the accommodating body 62 so that it can be moved in a direction perpendicular to the principal surfaces of the disc cartridges 320, 321 accommodated therewithin. The attachment base 11 is disposed on a supporting base 70 elastically and displacably supported through plural dumpers 69 with respect to the base plate 10. The cartridge holder 118 is supported between a pair of side walls 1, 2 vertically provided in a manner opposite to each other toward the upper direction side at the both sides of the supporting base 70 as shown in FIGS. 10 and 16. At the upper end side of these side walls 1, 2, a top plate 101 is attached in such a manner that it bridges across these side walls 1, 2.

Figure 14:
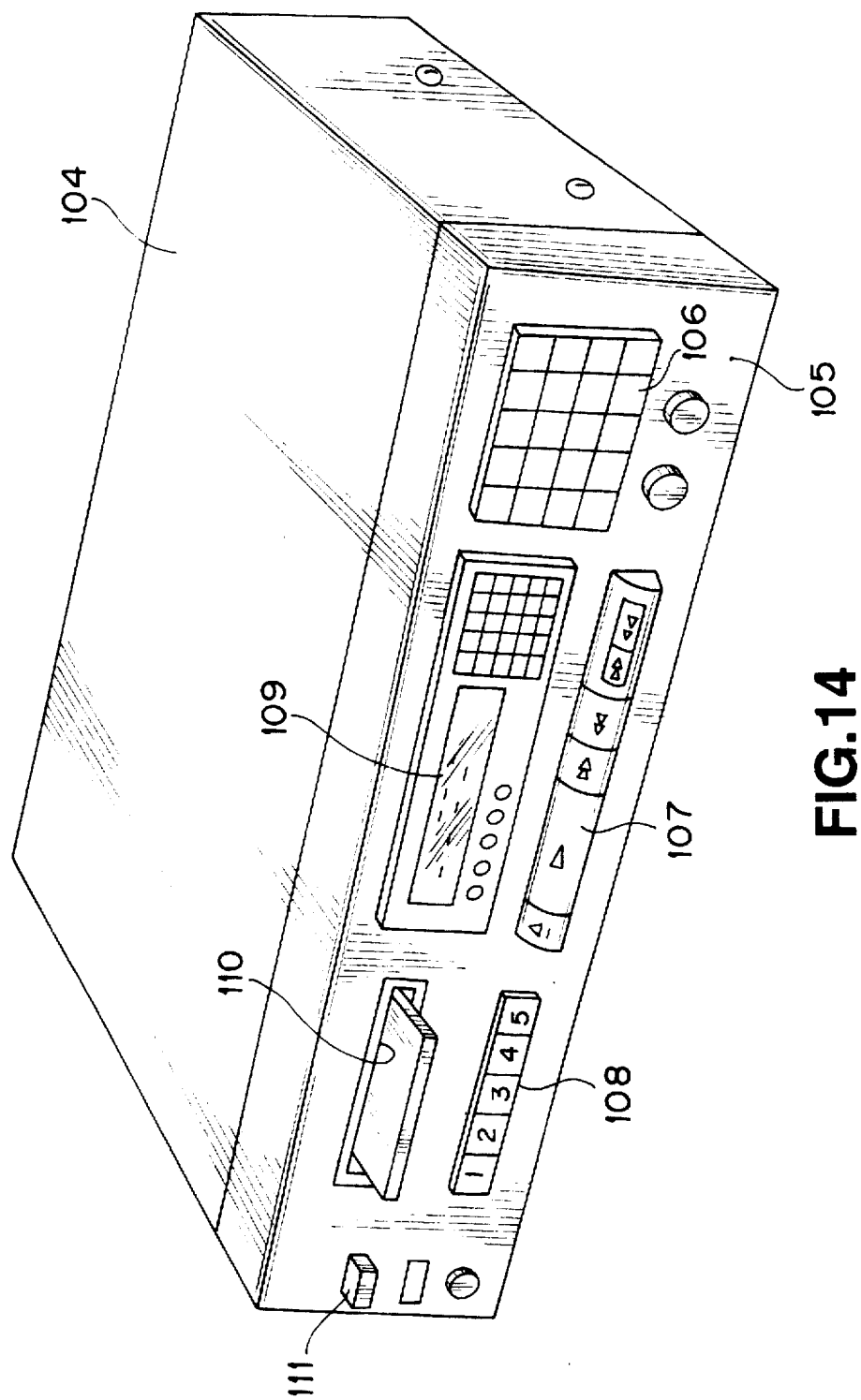
FIG. 14 is a perspective view showing appearance of the recording/reproducing apparatus.

Further, the base plate 10, the accommodating body 62, the recording/reproduction unit 114 and the cartridge holder 118 are accommodated within an outer casing 104 constituting the apparatus body as shown in FIG. 14. At the front side of the outer casing 104, a front panel 105 is attached. At the front panel 105, a power switch 111, plural operation switches 106, 107, 108, a display section 109 and a cartridge insertion/withdrawal hole 110 for carrying out insertion/ withdrawal of the disc cartridges 320, 321 are provided. At the backward side of the cartridge insertion/withdrawal hole 110, the accommodating body 62 is oppositely disposed.

Figure 15:
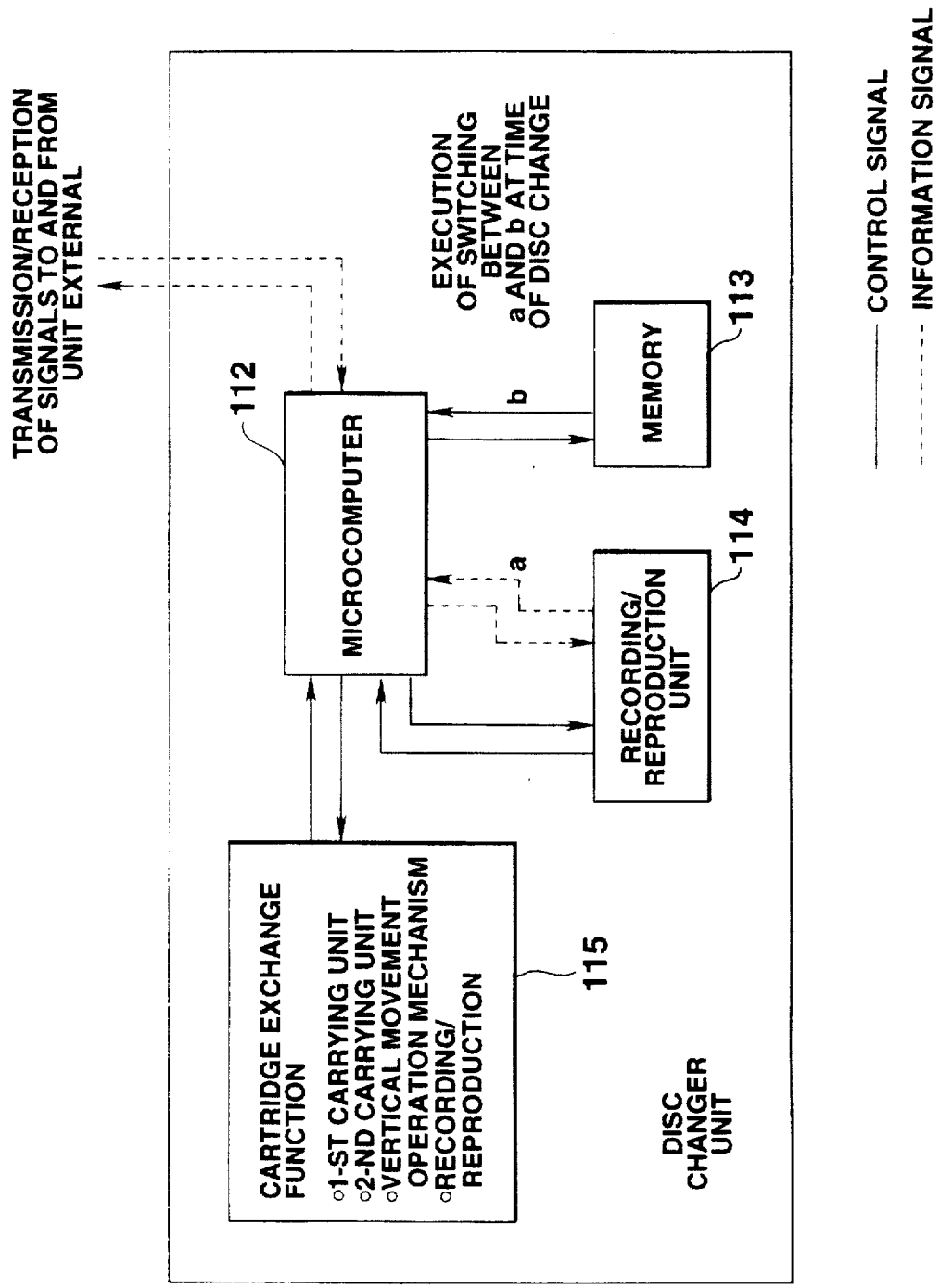
FIG. 15 is a block circuit diagram of the recording/reproducing apparatus.

In this recording/reproducing apparatus, as shown in FIG. 15, control of the motor, respective detection switches and the recording/reproduction unit 114 constituting respective mechanical groups 115 which will be described below and/or transmission and reception of information signals to and from these circuit components are carried out by a microcomputer 112 serving as control means which becomes operative in accordance with operations of the respective operation switches 106, 107, 108 on the front panel 105.

Moreover, a memory 113 for temporarily storing information signals which have been read out from the magneto-optical disc 301 or the optical disc 331 accommodated within the disc cartridge 320, 321 or information signals which will be recorded onto the magneto-optical disc 301 is connected to the microcomputer 112. As this memory 113, semiconductor memory element is used.

3 Configuration of the accommodating body (see FIGS. 18, 20 to 36)

The accommodating body 62 constituting the recording/reproducing apparatus according to this invention will now be described.

This accommodating body 62 accommodates and holds plural disc cartridges 320, 321 in such a manner that they are stacked in the state where their principal surfaces are opposite to each other in parallel to each other.

The accommodating body 62 is formed as a casing which takes rectangular shape in which the front side and the back side which are opposite to each other are opened. The accommodating body 62 is movably supported in upper and lower directions by the vertical movement guide body 41 disposed at the position of the front side of the base plate 10, i.e., the position opposite to the front side of the recording/reproduction unit 114.

Figure 18:
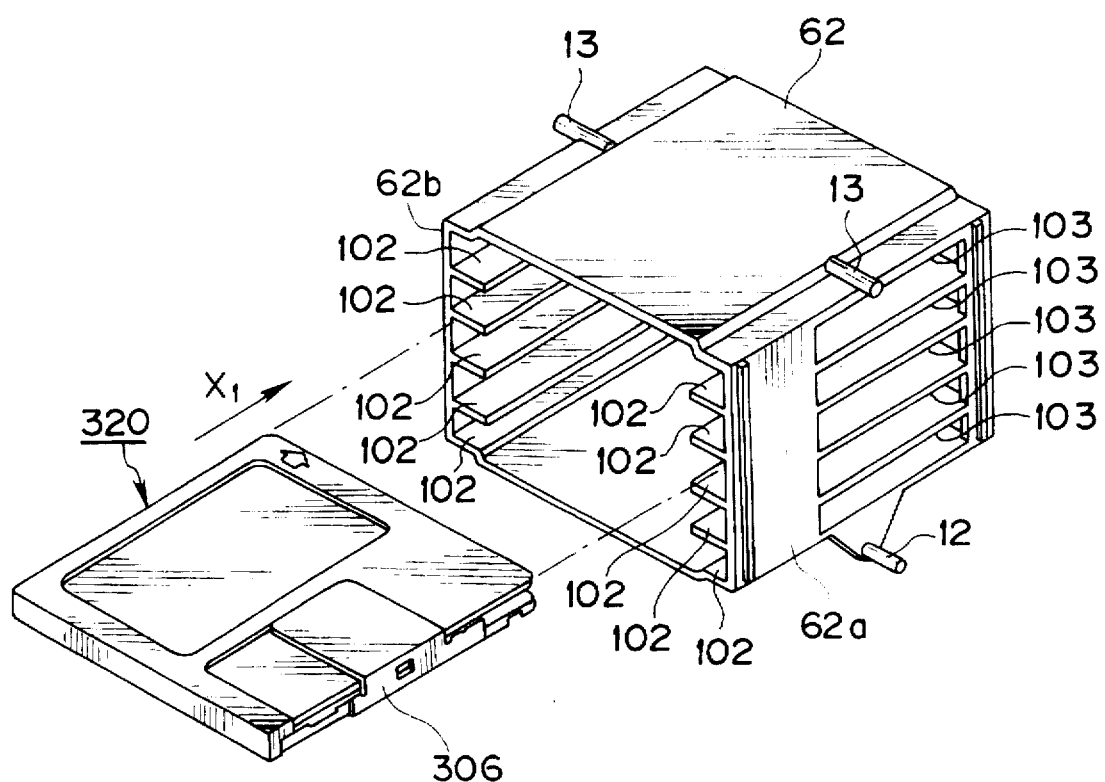
FIG. 18 is an exploded perspective view showing accommodating body constituting the recording/reproducing apparatus.
Figure 19:
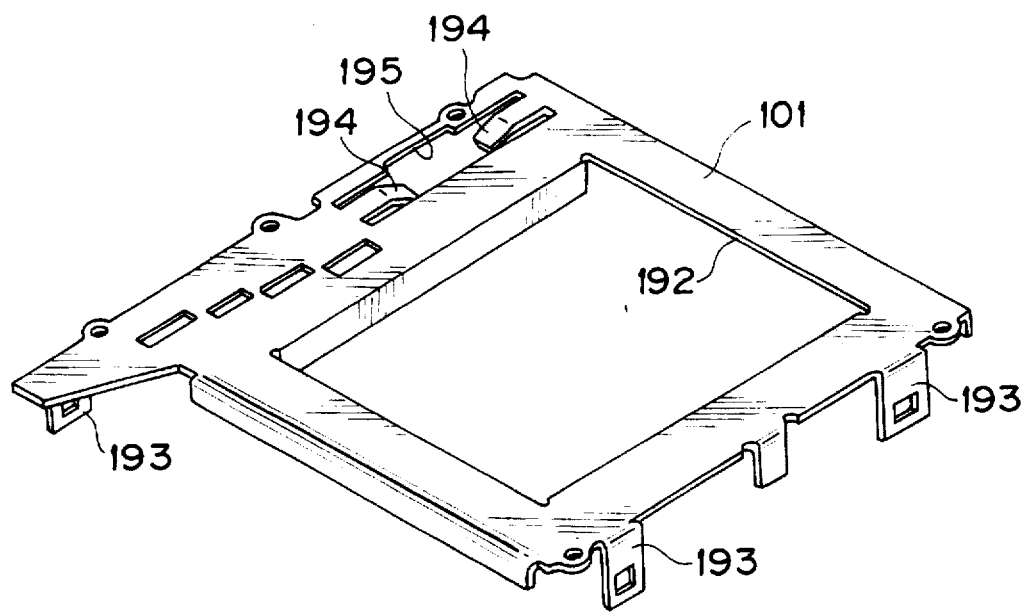
FIG. 19 is a perspective view showing top plate portion constituting the recording/reproducing apparatus.

Distance between side walls 62a, 62b opposite to each other, i.e., width of the accommodating body 62 is caused to take dimension corresponding to the width of the disc cartridges 320, 321 accommodated therewithin. At the inner surfaces opposite to each other of the both side walls 62a, 62b of the accommodating body 62, plural supporting projecting pieces 102 which takes flange shape are projected in parallel to each other in a height direction as shown in FIGS. 18. These supporting projecting pieces 102 are such that respective pairs of projecting pieces 102 are formed in a manner opposite to each other at the same height position between both side walls 62a, 62b of the accommodating body 62. Moreover, these supporting projecting pieces 102 are formed extending from the front side of the accommodating body 62 to the back side thereof.

Further, the disc cartridges 320, 321 are inserted into the accommodating body 62 through the opened portion of the front side. The disc cartridges 320, 321 accommodated within this accommodating body 62 are accommodated extending over both side walls 62a, 62b of the accommodating body 62 in the state where their both sides are supported by respective pairs of supporting projecting pieces 102 opposite to each other.

At one side wall 62a of the accommodating body 62, plural opening portions 103 for movement operation are opened at the positions opposite to the front of the respective disc cartridges 320, 321 supported on respective supporting projecting pieces 102. These opening portions 103 are formed in a rectangular form in a laterally elongated manner extending from the position slightly toward the front side with respect to the central portion extending forward and backward directions of the accommodating body 62 toward the position in the vicinity of the back side of the accommodating body 62. These opening portions 103 for movement operation allow a portion of the front side of the disc cartridges 320, 321 held by the accommodating body 62 to be faced to the outward side of the accommodating body 62.

In this example, respective five supporting projecting pieces 102 are stacked and formed at the both side walls 62a, 62b of the accommodating body 62. Namely, this accommodating body 62 is formed so that as far as five disc cartridges 320, 321 can be accommodated therewithin.

Figure 20:
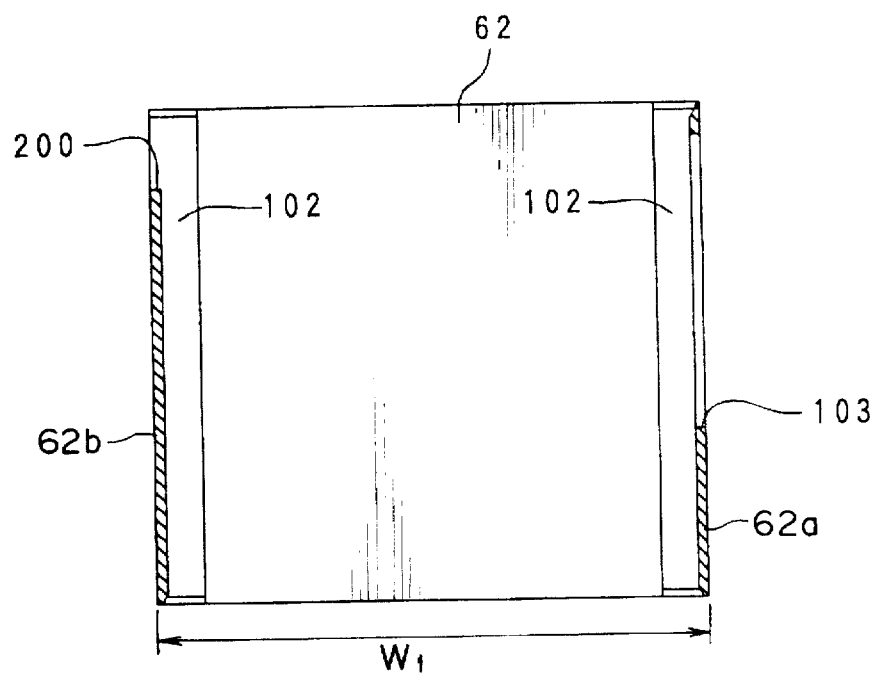
FIG. 20 is a lateral cross sectional view of accommodating body.
Figure 21:
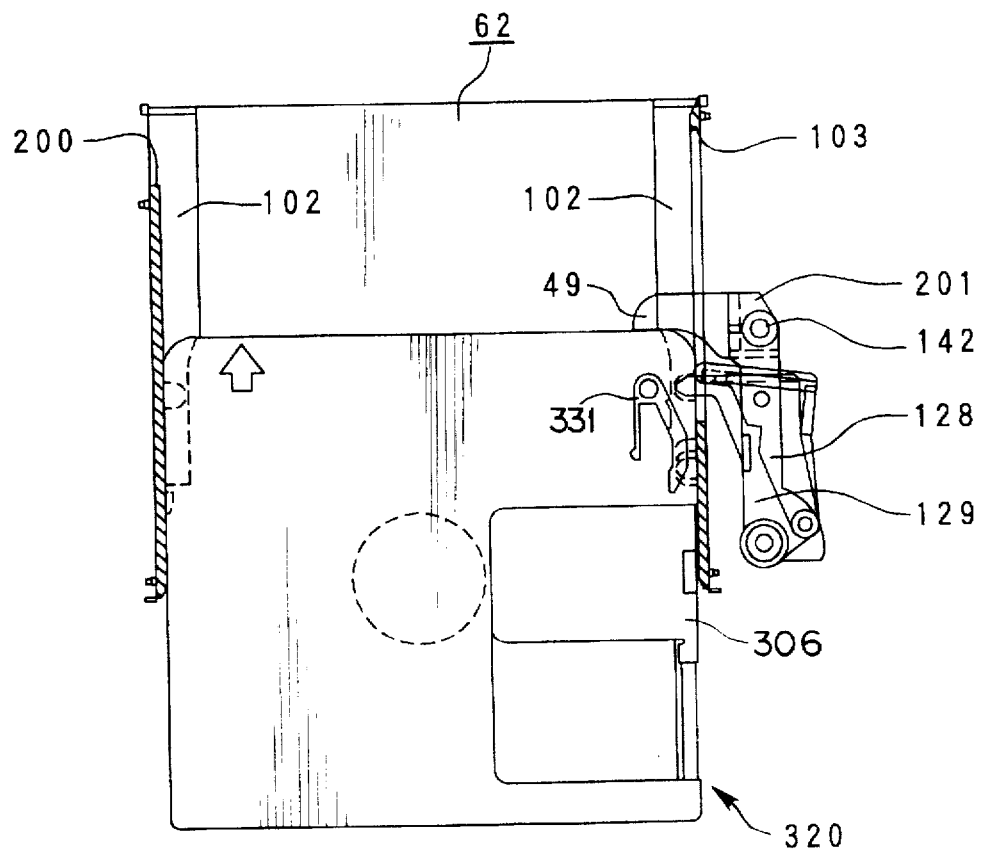
FIG. 21 is a lateral cross sectional view showing the middle state where the disc cartridge is inserted into the accommodating body.
Figure 22:
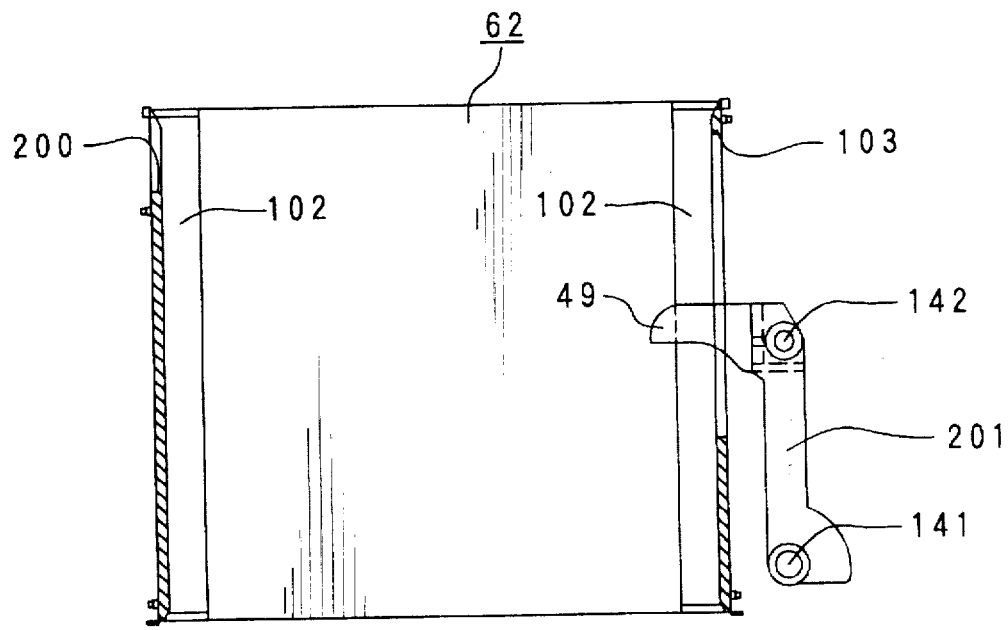
FIG. 22 is a lateral cross sectional view showing the relationship between accommodating body and stopper lever.
Figure 23:
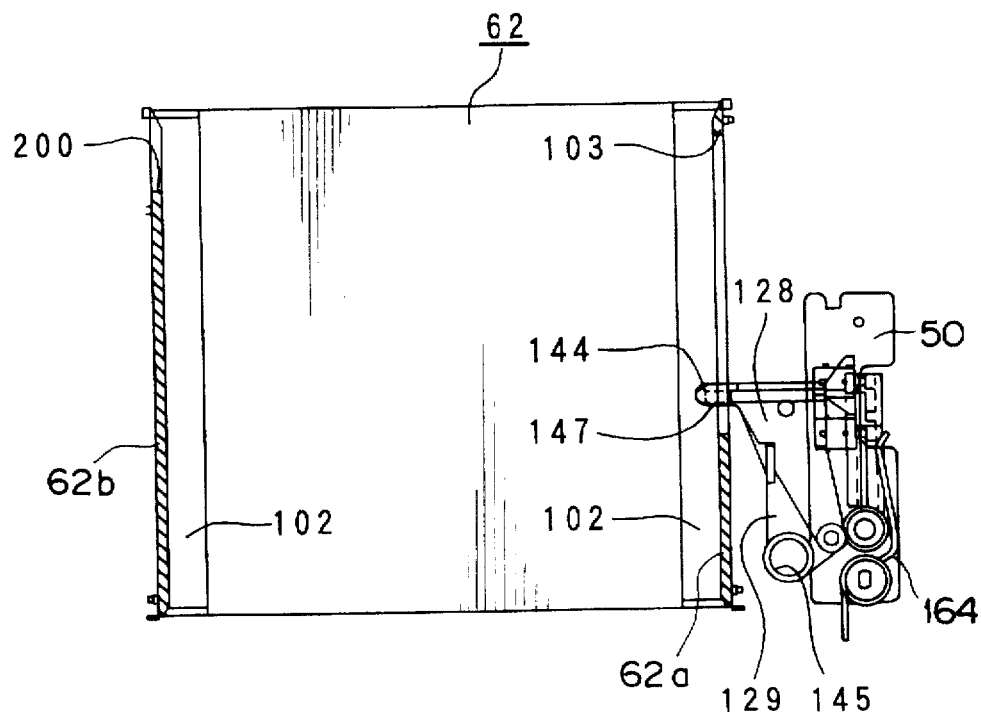
FIG. 23 is a lateral cross sectional view showing the relationship between the accommodating body and first and second detection levers.
Figure 24:
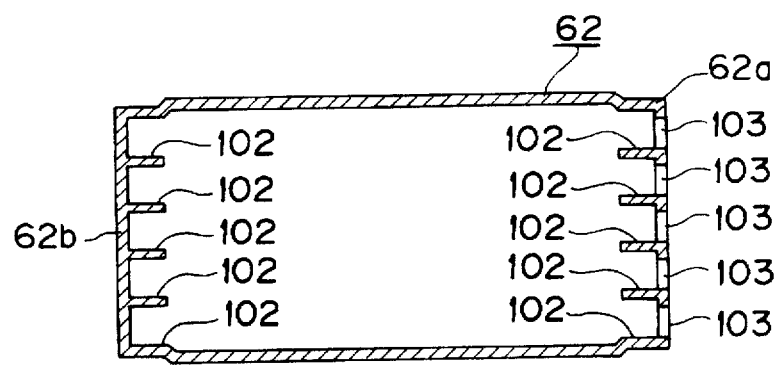
FIG. 24 is a longitudinal cross sectional view of the accommodating body.
Figure 25:
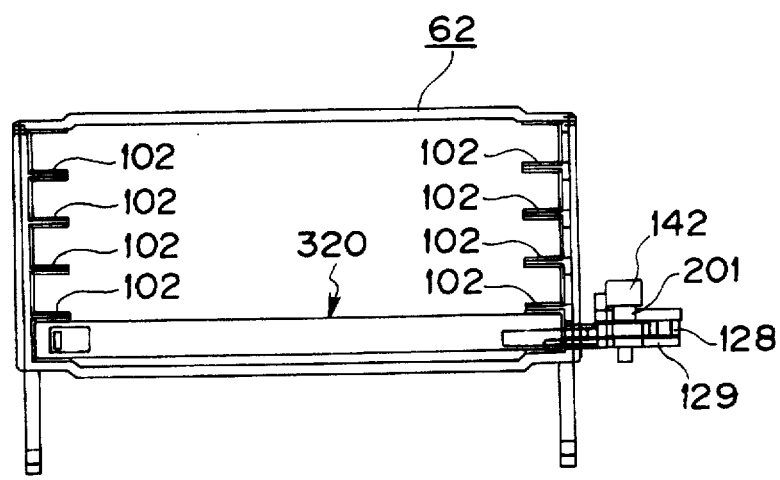
FIG. 25 is a front view showing the relationship of accommodating stopper lever of the accommodating body within which disc cartridge is accommodated.
Figure 26:
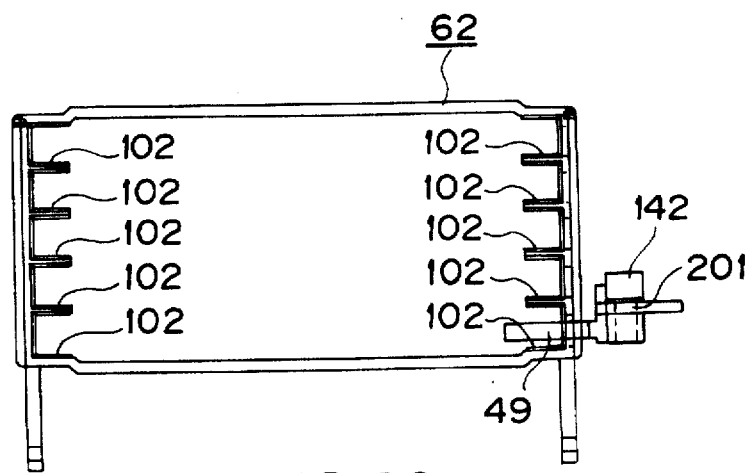
FIG. 26 is a front view showing the relationship of accommodating stopper lever of the accommodating body within which disc cartridge is to be accommodated.
Figure 27:
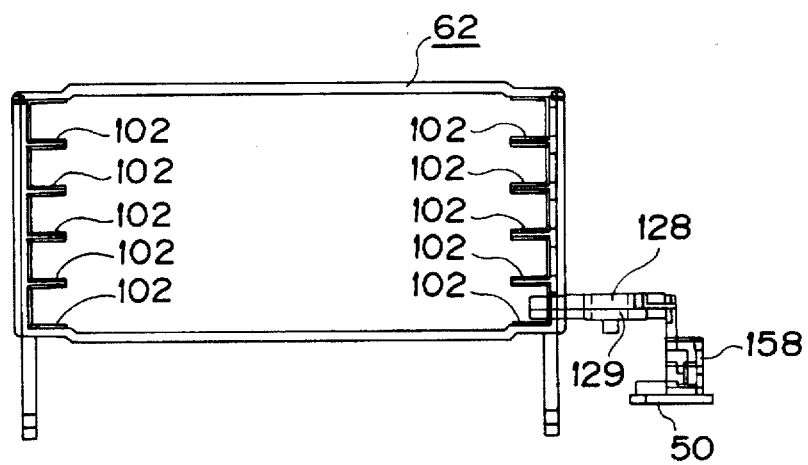
FIG. 27 is a front view showing the relationship between the accommodating body and first and second detection levers.
Figure 28:
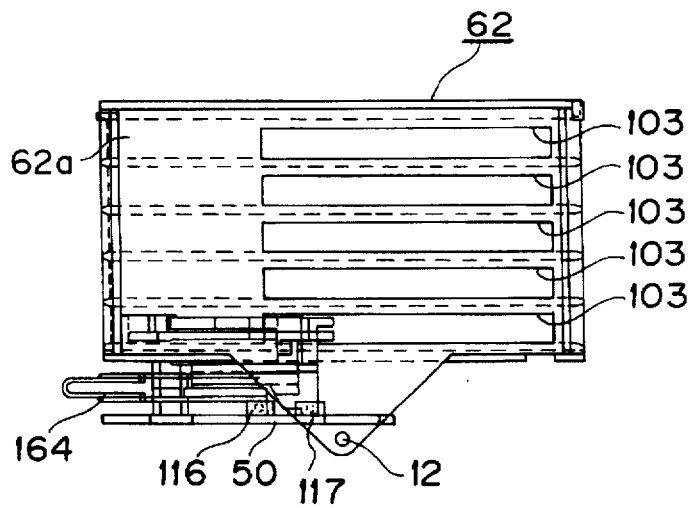
FIG. 28 is a side view showing the relationship between the accommodating body and the first and second detection levers.
Figure 29:
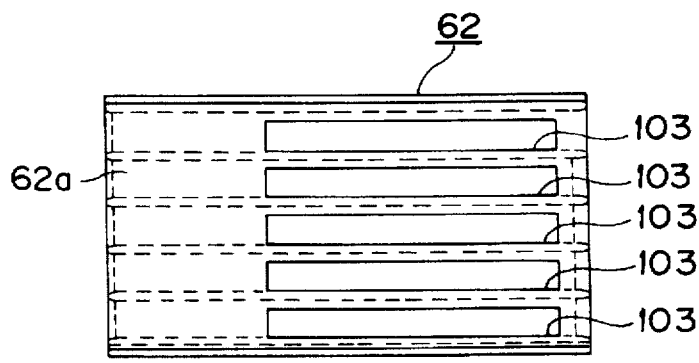
FIG. 29 is a side view of the accommodating body.
Figure 30:
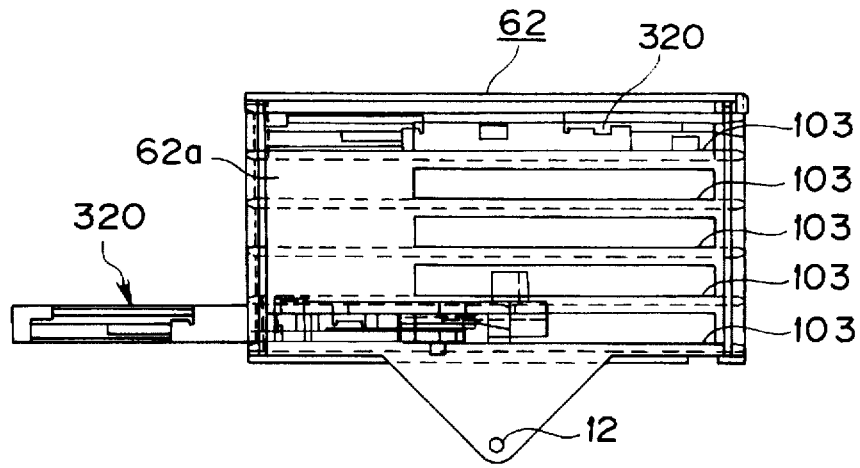
FIG. 30 is a side view showing the middle state where disc cartridge is being inserted into the accommodating body.
Figure 31:
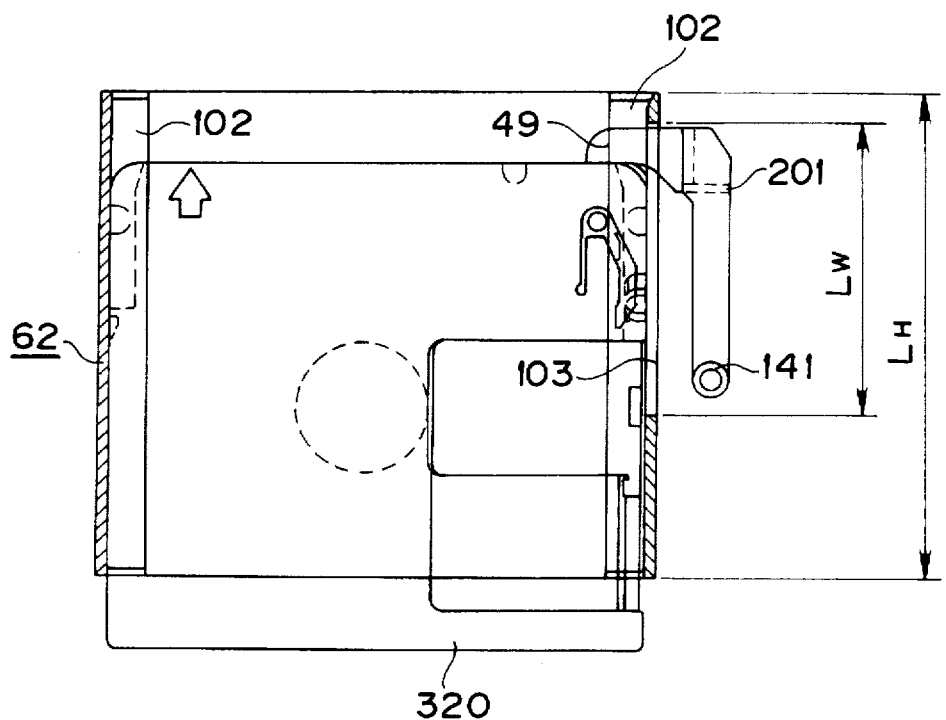
FIG. 31 is a plan view showing the positional relationship between disc cartridge accommodated within the accommodating body and the stopper lever.
Figure 32:
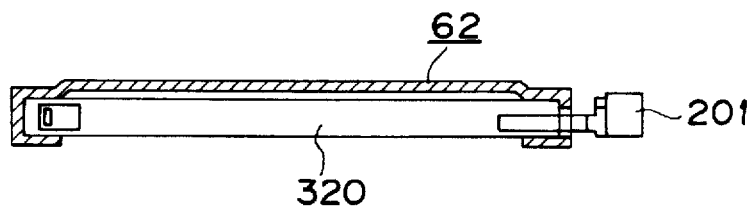
FIG. 32 is a front view showing the positional relationship between the disc cartridge of which insertion into the accommodating body has been completed and the stopper lever.
Figure 33:
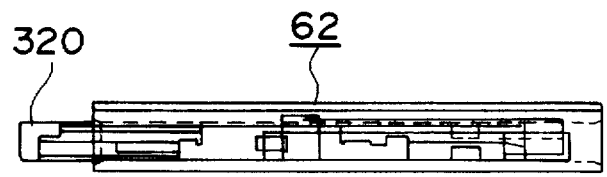
FIG. 33 is a side view showing the state where the disc cartridge is accommodated into the accommodating body.
Figure 34:
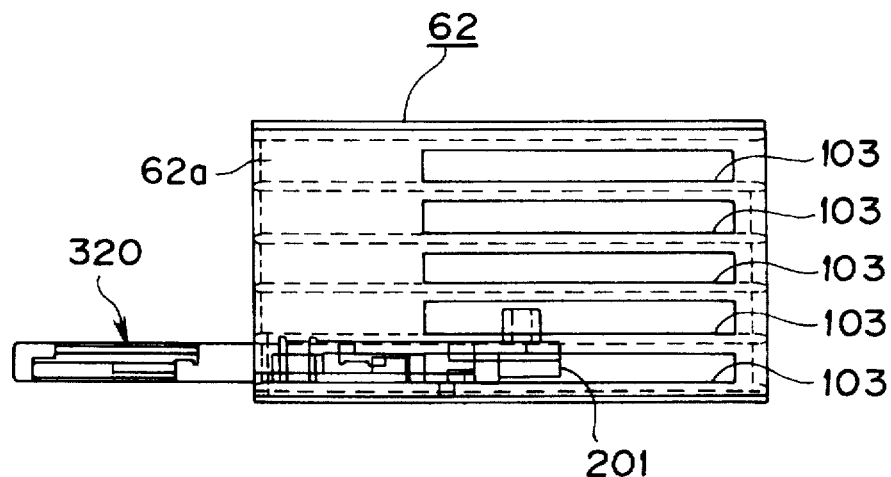
FIG. 34 is a side view showing the positional relationship between the disc cartridge being inserted into the accommodating body and the stopper lever.
Figure 35:
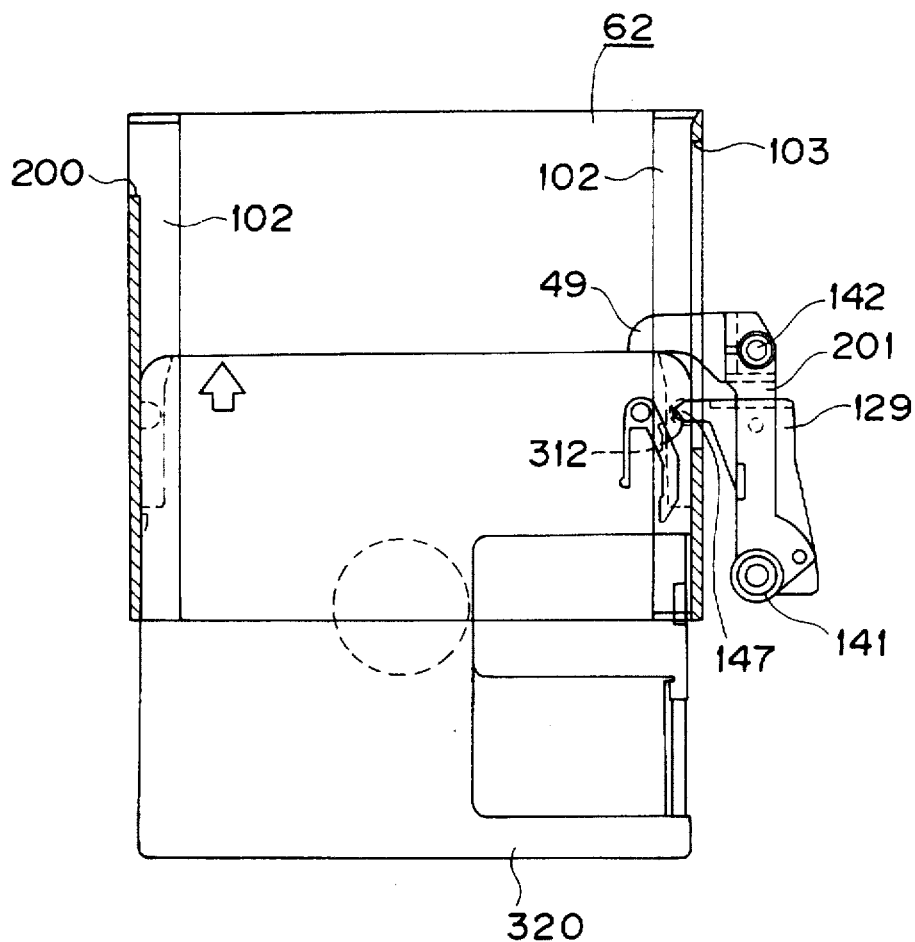
FIG. 35 is a plan view showing the positional relationship between the disc cartridge of which insertion into the accommodating body has been completed and the stopper lever.
Figure 36:
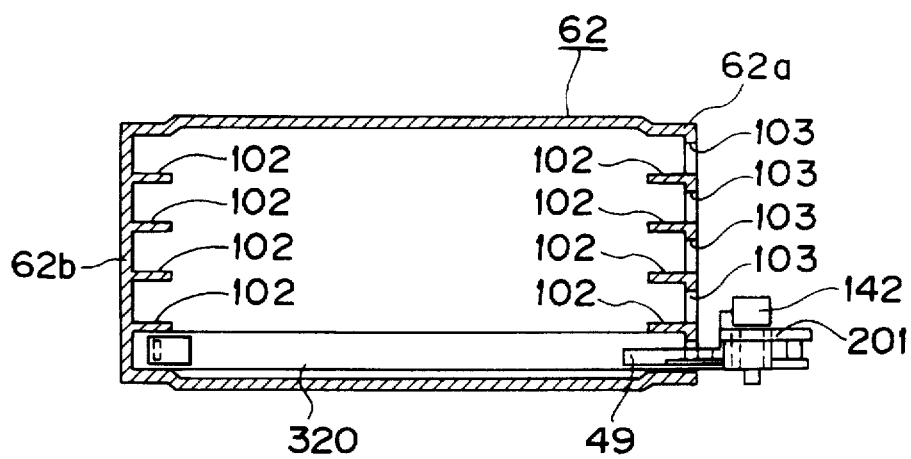
FIG. 36 is a front view showing the positional relationship between the disc cartridge of which insertion into the accommodating body is completed and the stopper lever.

Moreover, at the other side wall 62b of the accommodating body 62, plural opening portions 200 for carrying are provided in correspondence with upper surfaces of the respective supporting projecting pieces 102 as shown in FIG. 20, for example. These opening portions 200 for carrying are formed in such a manner that the backward side is opened in the state positioned in the vicinity of the backward side of the accommodating body 62.

At the upper edge side of the both side walls 62a, 62b of the accommodating body 62, a pair of left and right guide pins 13, 13 are provided in a manner to project toward the outward as shown in FIG. 18. Moreover, at the lower edge side of the both side walls 62a, 62b of the accommodating body 62, a pair of left and right supporting pins 12, 12 are provided in a manner to project toward the outward as shown in FIG. 18.

Figure 17:
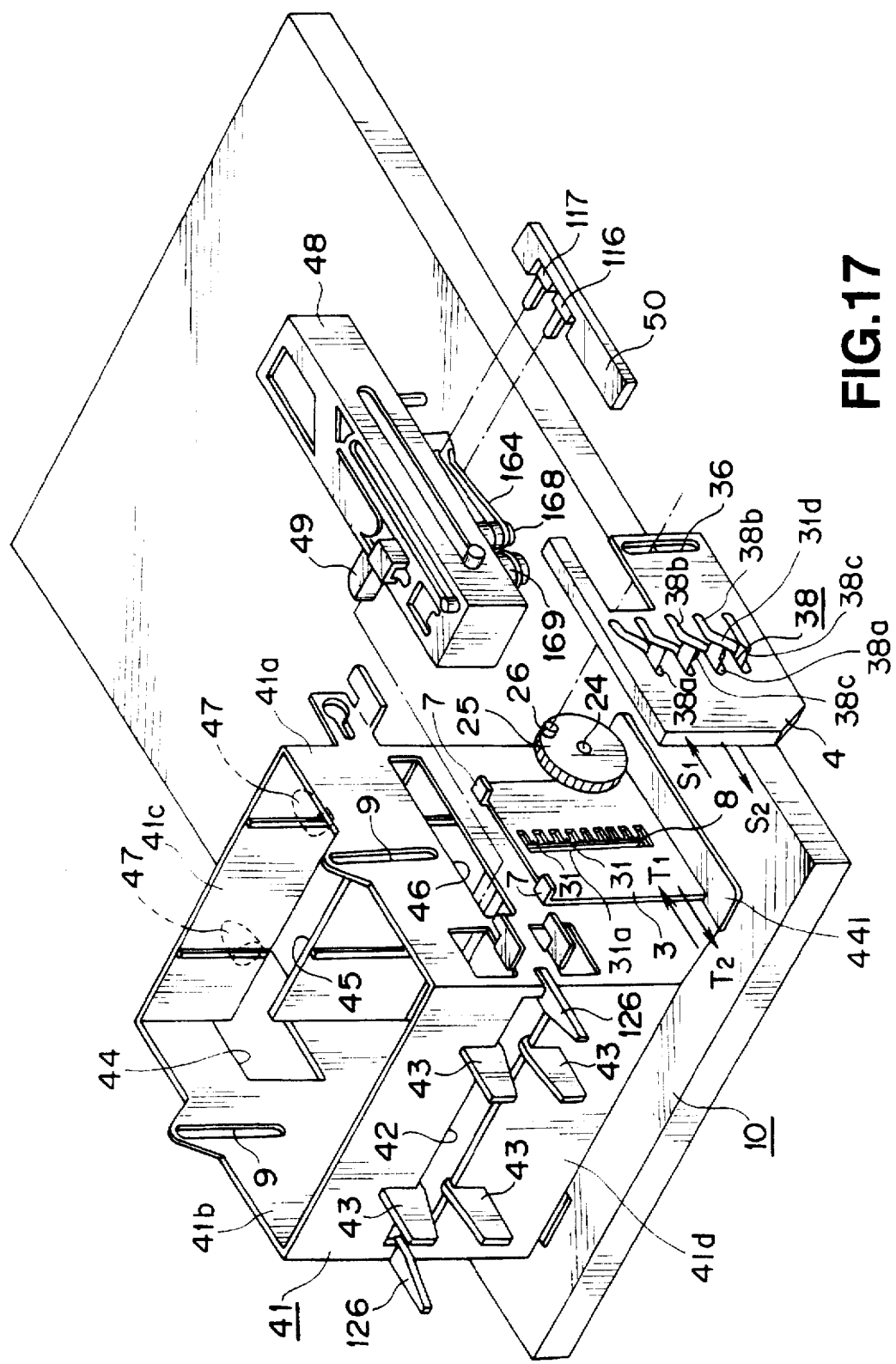
FIG. 17 is an exploded perspective view showing vertical movement operation mechanism constituting the recording/reproducing apparatus.

On the other hand, the vertical movement guide body 41 is formed so as to take a square tubular shape corresponding to dimensions of the accommodating body 62 in a manner to surround the outer periphery of the accommodating body 62 as shown in FIG. 17. This vertical movement guide body 41 is such that the upper surface side and the lower surface side are opened, and is attached in the state where an attachment piece 441 projected at the periphery of the lower surface side is fixed on the base plate 10. This vertical movement guide body 41 supports the accommodating body 62 so that it can be moved only in a vertical direction perpendicular to the principal surface of the disc cartridge accommodated within the accommodating body 62, i.e., in upper and lower directions.

Further, at the upper side of the both side walls 41a, 41b opposite to each other of the vertical movement guide body 41, there are formed a pair of left and right first vertical movement guide grooves 9, 9 adapted so that the respective guide pins 13, 13 provided at the accommodating body 62 are inserted and engaged with respect thereto. These first vertical movement guide grooves 9, 9 are formed in a direction perpendicular to the base plate, i.e., in upper and lower directions. Moreover, at the lower side of the both side walls 41a, 41b of the vertical movement guide body 41, there are formed a pair of left and right second vertical movement guide grooves 8, 8 adapted so that the respective supporting pins 12, 12 provided at the accommodating body are inserted and engaged with respect thereto. These second vertical movement guide grooves 8, 8 are formed in a direction perpendicular to the base plate 10, i.e., in upper and lower directions similarly to the first guide grooves 9, 9. Further, the accommodating body 62 supported by the vertical movement guide body 41 in the state where guide pins 13, 13 and 12, 12 are respectively supported by first and second vertical movement guide grooves 9, 9 and 8, 8 can be moved in upper and lower directions within the range of respective vertical movement guide grooves 8, 8 and 9, 9 within the vertical movement guide body 41.

Moreover, at a back wall 41c of the vertical movement guide body 41, there is formed a back side insertion/withdrawal hole 45 formed as an opening portion of dimensions which permit only one disc cartridge 320 or 321 to be passed therethrough as shown in FIG. 17. This back side insertion/withdrawal hole 45 is formed at the back wall 41c of the vertical movement guide body 41 in the state located at the position facing to the upper side of the recording/ reproduction unit 114. This back side insertion/withdrawal hole 45 is an opening portion for allowing the disc cartridge 320 or 321 carried (transferred) on the recording/ reproduction unit to be passed therethrough.

Further, at a front wall 41d of the vertical movement guide body 41, a front side insertion/withdrawal hole 42 is formed. This front side insertion/withdrawal hole 42 is formed at the front wall 41d of the vertical movement guide body 41 in the state located at the position opposite to the cartridge insertion/withdrawal hole 110 provided at the outer casing 104. This front side insertion/withdrawal hole 42 serves to allow the disc cartridge 320 or 321 inserted into the outer casing 104 through the cartridge insertion/withdrawal hole 110 provided at the outer casing 104 to be passed therethrough so that it is inserted into the accommodating body 62, and serves to allow the disc cartridge 320 or 321 within the accommodating body 62 to be passed therethrough so that it is ejected toward the outward of the outer casing 104 through the cartridge insertion/withdrawal hole 110. Further, the front side insertion/withdrawal hole 42 is formed so as have dimensions sufficient to allow only one disc cartridge 320 or 321 to be passed therethrough, and is formed in the state positioned at the upper side by one step of the supporting projecting piece 102 with respect to the back side insertion/withdrawal hole 45.

Moreover, at the periphery of the front side insertion/ withdrawal hole 42, plural projecting pieces 43, 126 for connecting the front side opening portion 42 and the cartridge insertion/withdrawal hole 110 are projected. These projecting pieces 43, 126 are adapted to allow the front end portions thereof to be in contact with the back side of the front panel 105 positioned at the periphery of the cartridge insertion/withdrawal hole 110.

Further, the accommodating body 62 is caused to undergo movement operation extending over the position where one side surface of the disc cartridge 320 or 321 mounted on the supporting projecting piece 102 of the lowermost position within the accommodating body 62 is opposed to the front side insertion/withdrawal hole 42 and the position where the other side surface of the disc cartridge 320 or 321 mounted on the supporting projecting piece 102 of the uppermost position within the accommodating body 62 is opposed to the back side insertion/withdrawal hole 45.

Furthermore, at one side wall 41a of the vertical movement guide body 41, there is opened an insertion hole 46 corresponding to the respective opening portions 103 for movement operation of the accommodating body 62 at the height position equal to the height where the front side insertion/withdrawal hole 42 is positioned. Moreover, at the other side wall 41b of the vertical movement guide body 41, a cartridge taking-out mechanism 48 which will be described corresponding to the insertion hole 46 is attached. Further, at the other side wall 41b of the vertical movement guide body 41, a cut hole 44 corresponding to the respective opening portions 200 for carrying provided at the accommodating body 62 is formed at the height position equal to the height where the back side insertion/withdrawal hole 45 is positioned. This cut hole 44 is formed in such a manner that it becomes continuous to the back side insertion/ withdrawal hole 45 in the state where the back wall 41c side is opened. Furthermore, at the back wall 41c of the vertical movement guide body 41, a pair of left and right lock pins 47, 47 projected toward the backward side are projected toward the backward side in the state positioned at the upper side of the back side insertion/withdrawal hole 45. In addition, at the outside surface of both side walls 41a, 41b of the vertical movement guide body 41, respective pairs of supporting plates 3 and cam plate 4 constituting the vertical movement operation mechanism 401 are attached.

4 Configuration of the vertical movement operation mechanism (see FIGS. 10, 12, 13, 17, 20 to 35)

The vertical operation mechanism 401 for allowing the accommodating body 62 to undergo vertical movement operation in upper and lower directions is provided with respective pairs of supporting plates 3 and cam plates 4 attached at the outside surfaces of the both side walls 41a, 41b of the vertical movement guide body 41 as shown in FIGS. 10 and 17. The supporting plate 3 and the cam plate 4 are supported so that they can be moved in the direction indicated by arrow $S_1$ and the direction indicated by arrow $S_2$ in FIG. 17 extending over forward and backward directions of the vertical movement guide body 41. The supporting plate 3 and the cam plate 4 are formed so as to take flat plate shape which is substantially rectangular. In this example, supporting pieces 7, 7 are projected toward the outward side at the both sides of the upper edge side of the supporting plate 3. These supporting pieces 7, 7 support the upper edge portion of the cam plate 4 to support the cam plate 4 so that it can be moved in the direction indicated by arrow $S_1$ and the direction indicated by arrow $S_2$ in FIG. 17 so that it can be moved.

Further, the cam plates 4, 4 respectively attached at respective side walls 41a, 41b are formed so as to take bilateral symmetrical shape. At these cam plates 4, cam grooves 38 are formed in the state positioned substantially at the central portion. Within the cam grooves 38, plural horizontal portions 38a, 38b are respectively formed in multi-step form over the height direction in a manner opposite to each other. The horizontal portion 38a formed at the front side which is one side of the cam plate 4 and the horizontal portion 38b formed at the back side which is the other side are formed in the state shifted in height so as to take a staggered structure. Further, at the front end side of the respective horizontal portions 38a, 38b, inclined surface portions 38c, 38d which allow the horizontal portion 38a formed at the front side and the horizontal portion 38b formed at the back side to be continuous are formed. Namely, the horizontal portion 38a formed at the front side and the horizontal portion 38b formed at the back side are caused to be continuous respectively through the inclined surface portions 38c, 38d.

These cam plates 4, 4 are caused to undergo movement operation in the direction indicated by arrow $S_1$ and the direction indicated by arrow $S_2$ in FIG. 17 extending over the position at which they are moved to the backward side where the respective horizontal portions 38a of the front side are caused to overlap with the second vertical movement guide grooves 8, 8 provided at the vertical movement guide body 41 and the operation position at which they are moved to the position where the respective horizontal portions 38b of the backward side are caused to overlap with the second vertical movement guide grooves 8, 8.

On the other hand, supporting plates 3, 3 respectively attached at the respective side walls 41a, 41b are formed so as to take flat plate shape which is rectangular shape having dimensions substantially equal to the cam plate 4. These supporting plates 3, 3 are also formed so as to take bilateral symmetrical shape. These supporting plates 3, 3 are disposed on those respective side walls 41a, 41b in such a manner that they are positioned between the cam plates 4, 4 and respective side walls 41a, 41b of the vertical movement guide body 41. This supporting plate 3 is such that plural supporting pieces 31 are formed in multi-step form extending over height direction within an opening portion 31a formed substantially at the central portion. Namely, plural supporting pieces 31 formed at the supporting plate 3 are formed so as to take comb shape in the state where the bottom end portion side is connected to the supporting plate 3. The upper surface sides of these supporting piece 31 are caused to serve as supporting surface, and are formed at the height position in correspondence with the respective horizontal portions 38a, 38b of the cam plate 4 when the supporting plates 3, 3 are attached on the respective side wall side plates 41a, 41b. These supporting plates 3, 3 are supported, similarly to the cam plates 4, 4, so that they can be moved in the direction indicated by arrow $T_1$ and the direction indicated by arrow $T_2$ extending over forward and backward directions of the vertical movement guide body 41.

Further, the supporting plates 3, 3 are also subjected to movement operation in the direction indicated by arrow $T_1$ and the direction indicated by arrow $T_2$ in FIG. 17 extending over the supporting position at which they are moved to the position of the front side where the respective supporting pieces 31 are caused to overlap with the second vertical movement guide grooves 8, 8 and the non-supporting position at which they are withdrawn from the second vertical movement guide grooves 8, 8 to the backward side.

Moreover, at the lower side of the supporting plate 3, there is provided, as shown in FIGS. 12 and 13, a cam follower 40 engaged with a cam groove 27 of a rotational cam body 25 which will be described below and caused to follow.

Further, the accommodating body 62 is supported by the vertical movement guide body 41 so that it can be moved in upper and lower directions in the state where the respective supporting pins 12, 12 are inserted through the second vertical movement guide grooves 8, 8, and are inserted through the opening portions 31a of the respective supporting plates 3, 3 and the respective cam grooves 38, 38 of the respective cam plates 4, 4, and the guide pins 13 are inserted through the first vertical movement guide grooves 9, 9.

The vertical movement operation mechanism 401 is provided with a drive mechanism for allowing the accommodating body 62 to undergo vertical movement operation with respect to the vertical movement guide body 41. This drive mechanism is composed, as shown in FIG. 17, of a pair of left and right rotational cam bodies 25, 25 rotatably supported through a support shafts 24 on the vertical movement guide body 41, and vertical movement drive motor (not shown) for allowing these rotation cam bodies 25, 25 to undergo rotation operation. The respective rotation cam bodies 25, 25 are rotationally driven in the same direction when the vertical movement drive motor is rotationally driven. It is to be noted that the respective rotation cam bodies 25, 25 are rotated in directions opposite to each other when viewed from the side of the respective support shafts 24.

The respective rotation cam bodies 25, 25 are disposed in such a manner that they are positioned between the cam plates 4 and the supporting plates 3. Moreover, at the respective rotation cam bodies 25, 25, drive pins 26 are vertically provided on the surface portion opposite to the back portions of the cam plates 4. Each drive pin 26 is inserted and engaged with respect to an engagement groove 36 formed in upper and lower directions at the back edge side portion of the cam plate 4. Namely, when the respective rotation cam bodies 25, 25 make one rotation, the respective cam plates 4, 4 are caused to undergo one reciprocation in forward and backward directions which are the direction indicated by arrow $S_1$ and the direction indicated by arrow $S_2$ in FIG. 17 extending over the position where they are moved to the backward side and the position where they are moved to the front side.

Moreover, at the back portions opposite to the surface portions of the respective supporting plates 3, 3 of the rotation cam bodies 25, 25, cam grooves 27, 27 which take elliptical shape are formed. Namely, these cam grooves 27, 27 are formed so as to take elliptical shape having two far focal points spaced by 180 degrees to each other in the circumferential direction and two near focal points spaced by 180 degrees to each other at the angular position of 90 degrees with respect to these far focal points, and follower 40 is engaged with each cam groove. Namely, when the rotation cam bodies 25, 25 make one rotation, the supporting plates 3, 3 are caused to undergo two reciprocating movement operations in the direction indicated by arrow $S_1$ and the direction indicated by arrow $S_2$ in FIG. 17.

Further, when the rotation cam bodies 25 are caused to undergo rotational operation, respective pairs of cam plates 4 and supporting plates 3 attached to the respective side walls 41a, 41b of the vertical movement guide body 41 are caused to periodically undergo reciprocating movement operation in the state where they have predetermined phase difference therebetween. Explanation will be given in more practical sense in connection with the cam plate 4 and the supporting plate 3 disposed at one side wall 41a side of the vertical movement guide body 41. In this case, the rotation cam body 25 is assumed to be rotated in the right-handed rotation direction which is the clockwise direction in FIG. 17 with the support shaft 24 being as center. Under such condition, when the cam plate 4 is moved to the maximum degree in the direction indicated by arrow $S_1$ or the direction indicated by arrow $S_2$ in FIG. 17, i.e., is moved to the position where it moved to the position where it has been moved to the front side or has been moved to the backward, and the supporting plate 3 is located at the non-supporting position where the supporting plate 3 is moved to the maximum degree in the right direction of the direction indicated by arrow $T_1$ in FIG. 17, a phase difference such that delay of 45 degrees takes place is given as rotational angle of the rotation cam body 25.

On the other hand, explanation will be given in more practical sense in connection with the cam plate 4 and the supporting plate 3 disposed at the other side wall 41b side of the vertical movement guide body 41. In this case, the rotation cam body 15 is assumed to be rotated in the left-handed rotation direction which is the counterclockwise direction with the support shaft 24 being as center. Under such condition, when the cam plate 4 is moved to the position where it is moved to the forward side or it is moved to the backward side, and the supporting plate 3 is located at the non-supporting position where it is moved to the maximum degree in the left direction, a phase difference such that lead of 45 degrees takes place is given as rotational angle of the rotation cam body 25.

Figure 37:
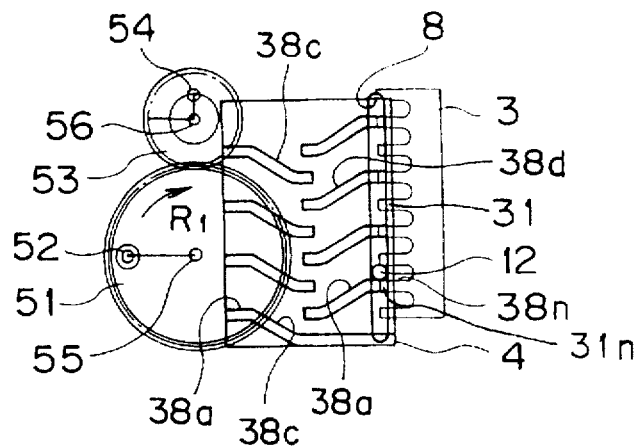
FIG. 37 is a side view showing the state of supporting plate and cam plate in the initial state of vertical movement operation mechanism.

Meanwhile, the drive mechanism which allows the accommodating body 62 of the vertical movement operation mechanism 401 constituted as described above may be constituted by providing first and second operation gears 51, 53 meshed with each other in which respective drive pins 52, 54 are vertically provided at the position eccentric with respect to the center of rotation in place of the rotation cam body 25 as shown in FIGS. 37 to 49. In this case, the cam plate 4 is caused to periodically undergo reciprocating movement operation by the drive pin 52 vertically provided on the first operation gear 51. Moreover, the supporting plate 3 is caused to periodically undergo reciprocating movement operation by the drive pin 54 vertically provided on the second operation gear 53. In this case, the second operation gear 53 has the number of teeth which is one half of that of the first operation gear 51, and is rotated at the period which is one half of that of the first operation gear 51. Accordingly, also in this case, as the operation of the cam plate 4 and the supporting plate 3, operation similar to the above-described drive mechanism provided with the rotation cam body 25 is carried out. It is to be noted that, in this case, since rotation directions of the first operation gear 51 and the second operation gear 53 are opposite to each other, with respect to the cam plate 4 and the supporting plate 3, there is given a phase difference such that when rotation direction of the first operation gear 51 is the right-handed rotation direction which is the clockwise direction in FIG. 37, the cam plate 4 is moved to the position where it is moved to the front side or the position where it is moved to the backward side, and the supporting plate 3 is located at the non-supporting position where it does not support the supporting pin 12 inserted into the second vertical movement guide groove 8, which is the position where the supporting plate 17 is moved to the maximum degree in the right direction which is the direction indicated by arrow $T_1$ in FIG. 17, delay of 45 degrees takes place as rotation angle of the first operation gear 51.

Figure 38:
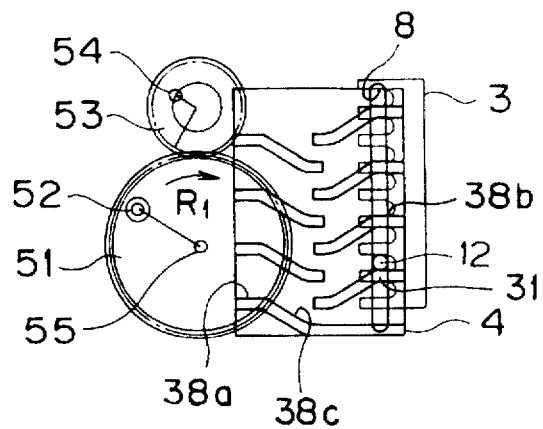
FIG. 38 is a side view showing the state of respective supporting plates and cam plate when drive gear is rotated by 30 degrees from the initial position.
Figure 39:
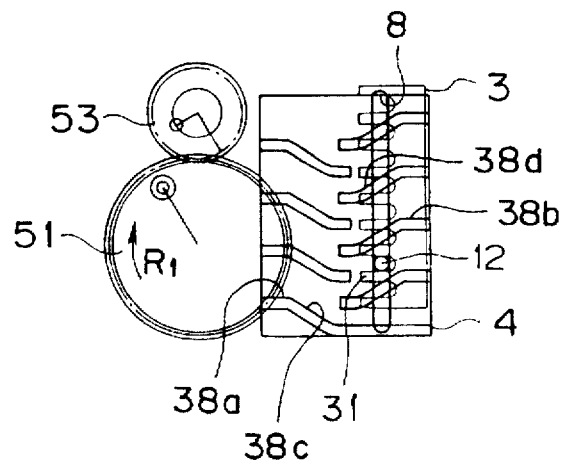
FIG. 39 is a side view showing the state of respective supporting plates and cam plate when the drive gear is rotated by 60 degrees from the initial position in the vertical movement operation mechanism.

As described above, in the vertical movement operation mechanism 401 provided with respective pairs of supporting plates 3 and cam plates 4, it is possible to allow the accommodating body 62 to undergo rising operation or falling operation in dependency upon whether the rotational drive direction of the vertical movement drive motor is forward rotation or reverse rotation. Namely, in the case where the first operation gear 51 is located at the initial rotation position, the position shown in FIG. 37 that the cam plate 4 is moved in the direction indicated by arrow $S_2$ in FIG. 17 so that the supporting pin 12 of the accommodating body 62 is supported on the n-th portion of the horizontal portions 38b of the backward side within the cam groove 38 is assumed to be the initial operation position. It is to be noted that the positional state where the first operation gear 51 is located at the initial rotation position is assumed to be rotation position of 0 degrees. When the first operation gear 51 starts rotation in the direction indicated by arrow $R_1$ in FIG. 37 from this state so that it is located at the rotational position of 30 degrees where it is rotated by 30 degrees in the clockwise direction which is the direction indicated by arrow $R_1$ in FIG. 38, the supporting plate 3 is located at the supporting position where it supports the supporting pin 12 on the supporting piece 31 as shown in FIG. 38. Namely, the supporting pin 12 of the accommodating body 62 is supported on the supporting piece 31 located at the n-th height position. Further, when the first operation gear 51 is located at the 60 degrees rotation position where it is further rotated by 60 degrees, the supporting plate 3 still remains to be located at the supporting position where it supports the supporting pin 12 on the supporting piece 31 as shown in FIG. 39. At this time, the supporting pin 12 is positioned between two upper and lower horizontal portions 38b, 38b, but is supported on the n-th supporting piece 31 so that it is placed in the state where movement thereof is prevented.

Figure 40:
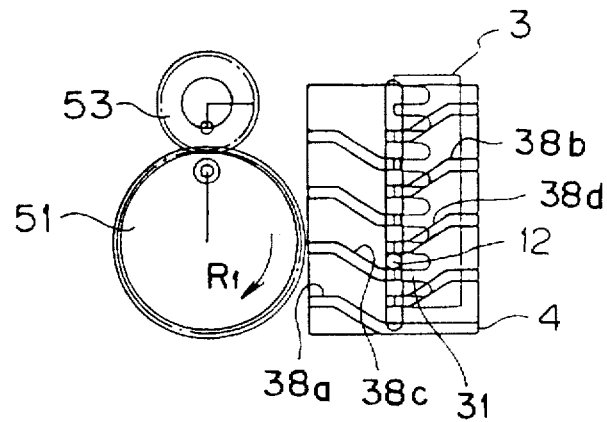
FIG. 40 is a side view showing the state of respective supporting plates and cam plate when the drive gear is rotated by 90 degrees from the initial position.
Figure 41:
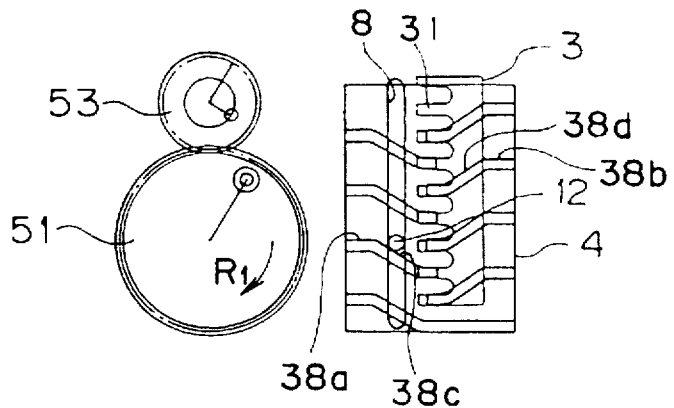
FIG. 41 is a side view showing the state of respective supporting plates and cam plate when the drive gear is rotated by 120 degrees from the initial position.
Figure 42:
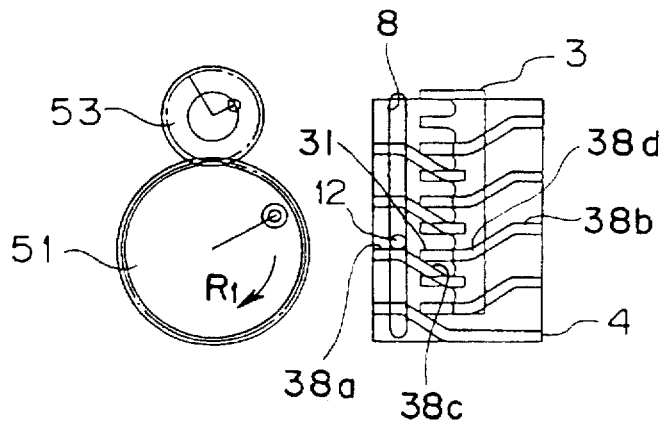
FIG. 42 is a side view showing the state of respective supporting plates and cam plate when the drive gear is rotated by 150 degrees from the initial position.

When the first operation gear 51 is rotated by 90 degrees in the direction indicated by arrow $R_1$ in FIG. 40 so that it is located at the 90 degrees rotation position, the supporting plate 3 attempts to move from the supporting position where it supports the supporting pin 12 to the non-supporting position as shown in FIG. 40, and the supporting pin 12 is about to be reached from inclined surface portion 38d continuous to the horizontal portion 38b of the backward side onto inclined surface portion 38c continuous to the horizontal portion 38a of the front side. When the first operation gear 51 has been located at the 120 degrees rotation position where it is rotated by 120 degrees in the direction indicated by arrow $R_1$ in FIG. 41, the supporting pin 12 reaches the position on the inclined surface portion 38c continuous to the horizontal portion 38a of the front side. At this time, since the supporting pin 12 is detached (away) from on the supporting piece 31 and is located at the non-supporting position where it is positioned within the second vertical movement guide groove 8, it is caused to undergo movement operation toward the upper side along the inclined surface portion 38c. When the first operation gear 51 is rotated by 150 degrees in the direction indicated by arrow $R_1$ in FIG. 42 so that the first operation gear 51 is located at the 150 degrees rotation position, the supporting pin 12 is brought into the state where it is supported on the horizontal portion 38a of the front side as shown in FIG. 42. The horizontal portion 38a at this time corresponds to the (n+1)-th horizontal portion above by one step from the n-th horizontal portion 38b (counted) from the bottom which has been supported in the initial state.

Figure 43:
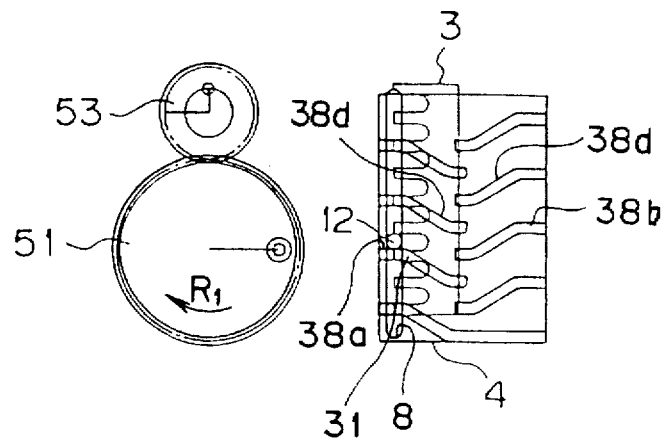
FIG. 43 is a side view showing the state of respective supporting plates and cam plate when the drive gear is rotated by 180 degrees from the initial position.
Figure 44:
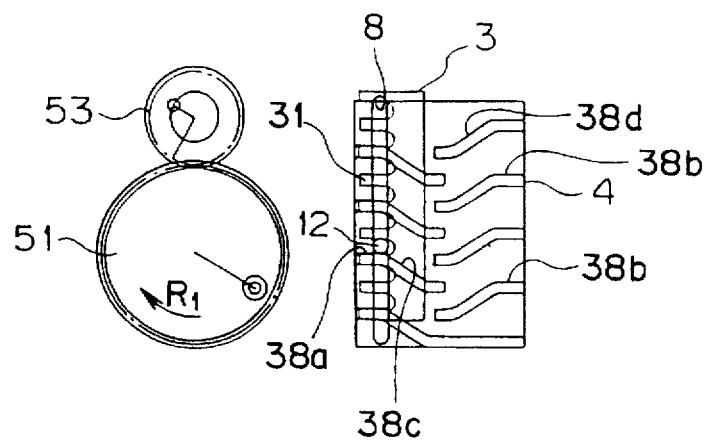
FIG. 44 is a side view showing the state of respective supporting plates and cam plate when the drive gear is rotated by 210 degrees from the initial position.
Figure 45:
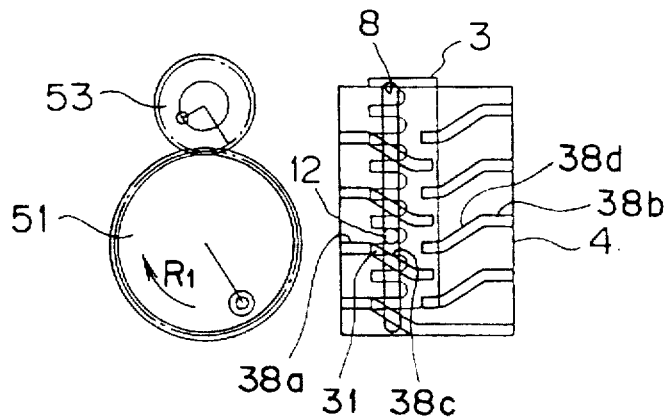
FIG. 45 is a side view showing the state of respective supporting plates and cam plate when the drive gear is rotated by 240 degrees from the initial position.

Further, when the first operation gear 51 is located at the 180 degrees rotation position where it is rotated by 180 degrees in the direction indicated by arrow $R_1$ in FIG. 43, the cam plate 4 is brought into the state where it can be moved in forward direction of the direction indicated by arrow $S_2$ in FIG. 17. At this time, the supporting pin 12 is placed in the state where it is supported on the horizontal portion 38a of the front side. When the first operation gear 51 is further rotated so that it is located at the 210 degrees rotation position, there results the state where the supporting pin 12 is supported on the supporting piece 31 by the supporting plate 3 as shown in FIG. 44. Further, when the first operation gear 51 is further rotated so that it is located at the 240 degrees rotation position, it is positioned between horizontal portions 38a, 38a of the front side as shown in FIG. 45, but the supporting pin 12 is supported so that it is placed in the state where movement toward the lower side is prevented.

Figure 46:
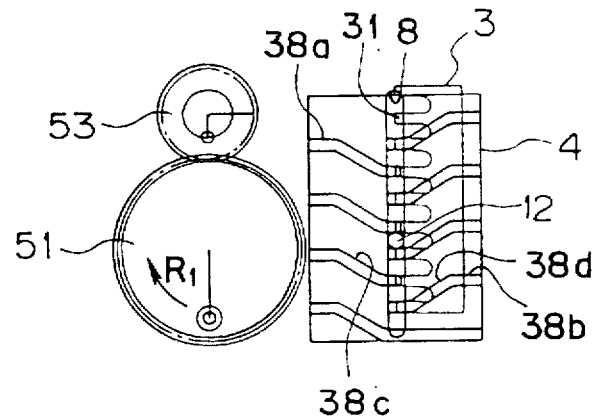
FIG. 46 is a side view showing the state of respective supporting plates and cam plate when the drive gear is rotated by 270 degrees from the initial position.
Figure 47:
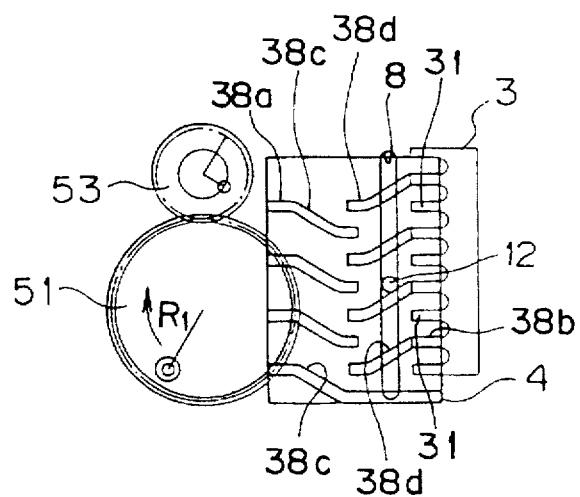
FIG. 47 is a side view showing the state of respective supporting plates and cam plate when the drive gear is rotated by 300 degrees from the initial position.
Figure 48:
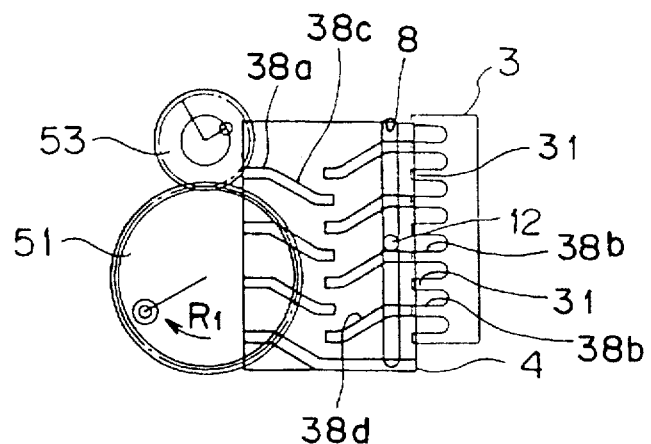
FIG. 48 is a side view showing the state of respective supporting plates and cam plate when the drive gear is rotated by 330 degrees from the initial position.
Figure 49:
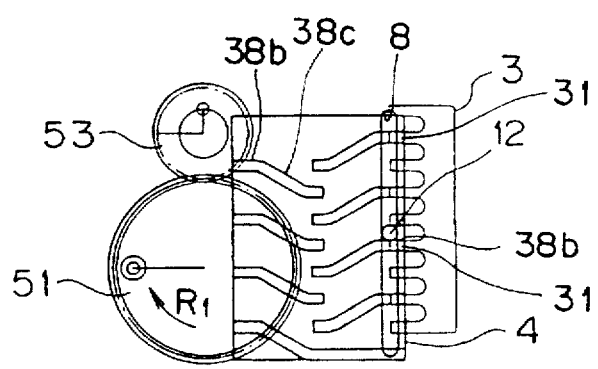
FIG. 49 is a side view showing the state of respective supporting plates and cam plate when the drive gear is rotated by 360 degrees from the initial position so that it is returned to the initial position.
Figure 50:
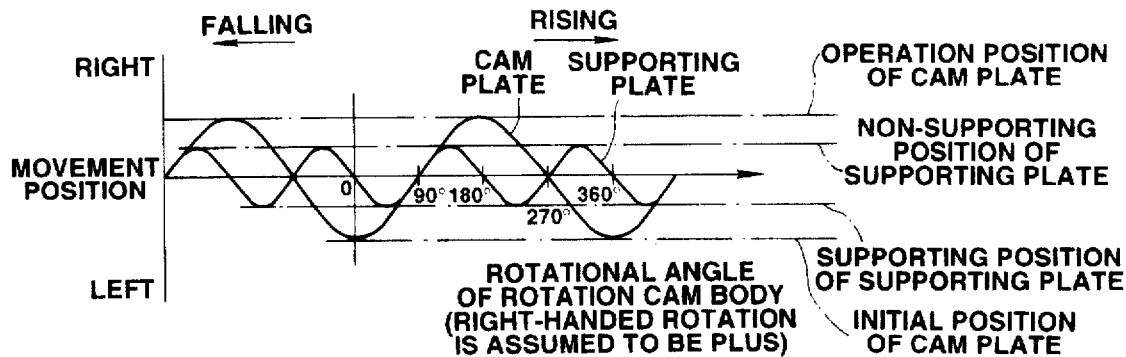
FIG. 50 is a graph showing movement operation state of supporting plate and cam plate of the vertical movement operation mechanism.
Figure 51:
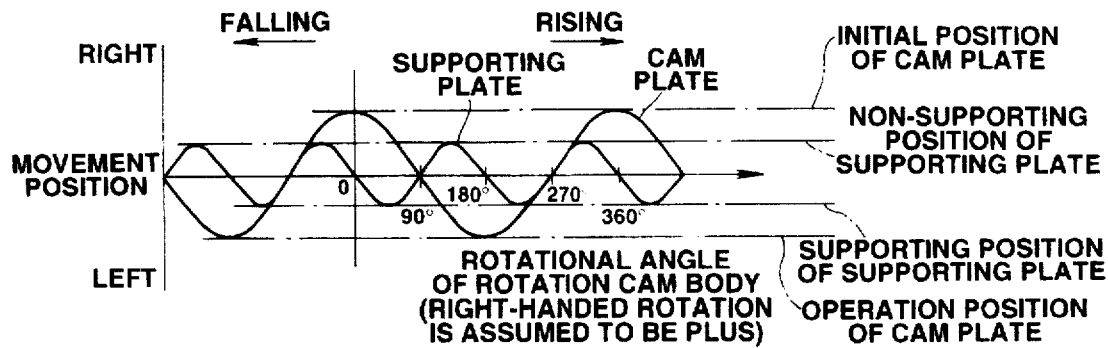
FIG. 51 is a graph showing the movement operation state of supporting plate and cam plate where phase is shifted.
Figure 52:
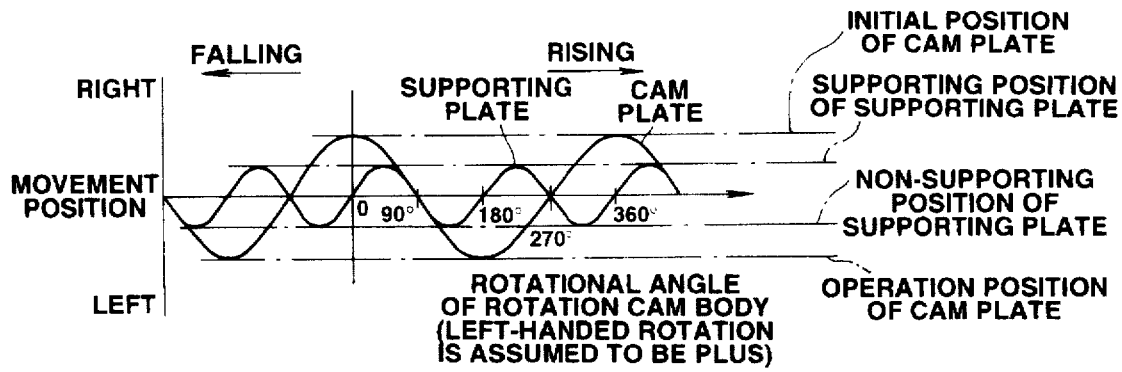
FIG. 52 is a graph showing the movement operation state of supporting plate and cam plate where phase is further shifted.

Further, when the first operation gear 51 is located at the 270 degrees rotation position where it is rotated by 270 degrees in the direction indicated by arrow $R_1$ in FIG. 46, the supporting plate 3 attempts to move from the position where it supports the supporting pin 12 to the non-supporting position where it is detached (away) from the supporting pin 12 with respect to the supporting position, but the supporting pin 12 is brought into the state where it reaches the position on the inclined surface portion 38d continuous to the horizontal portion of the back side. Further, when the first operation gear 51 is located at the 300 degrees rotation position where it is rotated by 300 degrees in the direction indicated by arrow $R_1$ in FIG. 47, the supporting plate 3 is placed at the non-supporting position where it does not support the supporting pin 12 as shown in FIG. 47, but the supporting pin 12 reaches the position on the inclined surface 38 portion. When the first operation gear 51 is located at the 330 degrees rotation position, the supporting pin 12 is positioned in the vicinity of the horizontal portion 38b of the backward side. When the first operation gear 51 is further rotated by 30 degrees so that it returns to the 360 degrees rotation position, i.e., the initial position as shown in FIG. 49, the cam plate 4 is also returned to the initial position. Thus, the supporting pin 12 is placed in the state supported on the (n+2)-th horizontal portion 38b above by two steps from the n-th horizontal portion 38b from the bottom where it is supported in the initial state.

Namely, when the first operation gear 51 makes one rotation in the direction indicated by arrow $R_1$ in respective figures as shown in FIGS. 37 to 49, the supporting pin 12 is moved from the n-th horizontal portion 38b from the bottom of the cam groove 38 onto the horizontal portion 38b directly (immediately) above the horizontal portion 38b. As the result of the fact that the first operation gear 51 is continued to rotate in the direction indicated by arrow $R_1$ in the respective figures, the accommodating body 62 is moved in succession toward the upper side.

Further, when the first operation gear 51 is rotated in a direction opposite to that in the previously described case, the supporting pin 12 is moved so as to trace, in an opposite manner, the process shown in FIGS. 37 to 49, i.e., is moved from the initial position to the position shown in FIG. 49. At this time, this supporting pin 12 is placed in the state where it is supported by the (n−2)-th horizontal portion 38b below by two steps. Thus, the accommodating body 62 is moved toward the lower side. Accordingly, the accommodating body 62 is moved in succession toward the lower side as the result of the fact that the first operation gear 51 is continued to rotate in a direction opposite to the direction indicated by arrow $R_1$.

In a manner stated above, the vertical movement operation mechanism 401 allows the accommodating body 62 to undergo vertical movement operation to thereby selectively move any one of disc cartridges 320, 321 accommodated within the accommodating body 62 to the position opposite to the back side insertion/withdrawal hole 45.

Moreover, the vertical movement operation mechanism 401 allows the accommodating body 62 to undergo vertical movement operation to thereby allow disc cartridges 320, 321 above by one of disc cartridges caused to be located at the position opposite to the back side insertion/withdrawal hole 45 of the disc cartridges 320, 321 accommodated within the accommodating body 62 to be located at the position corresponding to the front side insertion/withdrawal hole 42.

It is to be noted that the vertical movement operation mechanism 401 allows the accommodating body 62 to undergo movement biasing in one direction by utilizing biasing force or magnetic force by elastic member like spring, whereby this mechanism is not limited to the mechanism for allowing the accommodating body 62 to undergo vertical movement as in the above-described embodiment, but can be also constituted as a mechanism for allowing the accommodating body 62 to undergo movement operation in a lateral direction or in an oblique direction. Namely, in the above-described vertical movement operation mechanism 401, the accommodating body is caused to undergo movement biasing toward the lower side to thereby allow the accommodating body 62 to securely undergo movement operation in a predetermined direction corresponding to the rotation direction of the vertical movement drive motor also in the state where it is fallen in a lateral direction.

5 Configuration of the recording/reproduction unit (see FIGS. 53 to 60)

The recording/reproduction unit 114 constituting the recording/reproducing apparatus includes attachment base 11 formed so as to take substantially flat plate shape as shown in FIGS. 53 to 60.

This attachment base 11 is formed so as to take rectangular shape which is substantially equal to plane surface shape of the disc cartridges 320, 321. On the attachment base 11, there are disposed disc table 64 on which the magneto-optical disc 301 or the optical disc 331 is mounted, optical pick-up device 65 for carrying out write or read operation of information signals with respect to the magneto-optical disc 301, or the optical disc 331, and the like.

The optical pick-up device 65 is of a structure including, within the optical block portion, light source like semiconductor laser, optical device for guiding light beams from the light source, object lens (objective) for converging light beams to irradiate them onto the magneto-optical disc 301 or the optical disc 331, photo-detector for detecting return light from the object lens, and the like.

The disc table 64 constituting the rotational operation mechanism of the magneto-optical disc 301 or the optical disc 331 is formed to be substantially disc shaped, and includes, at the central portion of the upper surface side, a truncated cone shaped projected portion fitted into center hole 304 of the magneto-optical disc 301 or the optical disc 331. Within the projected portion, magnet for attracting chucking plate 302 is included. This disc table 64 is positioned substantially at the central portion of the attachment base 11, and is caused to undergo rotation operation by a spindle motor 196 attached at the lower surface portion of the attachment base 11.

Figure 53:
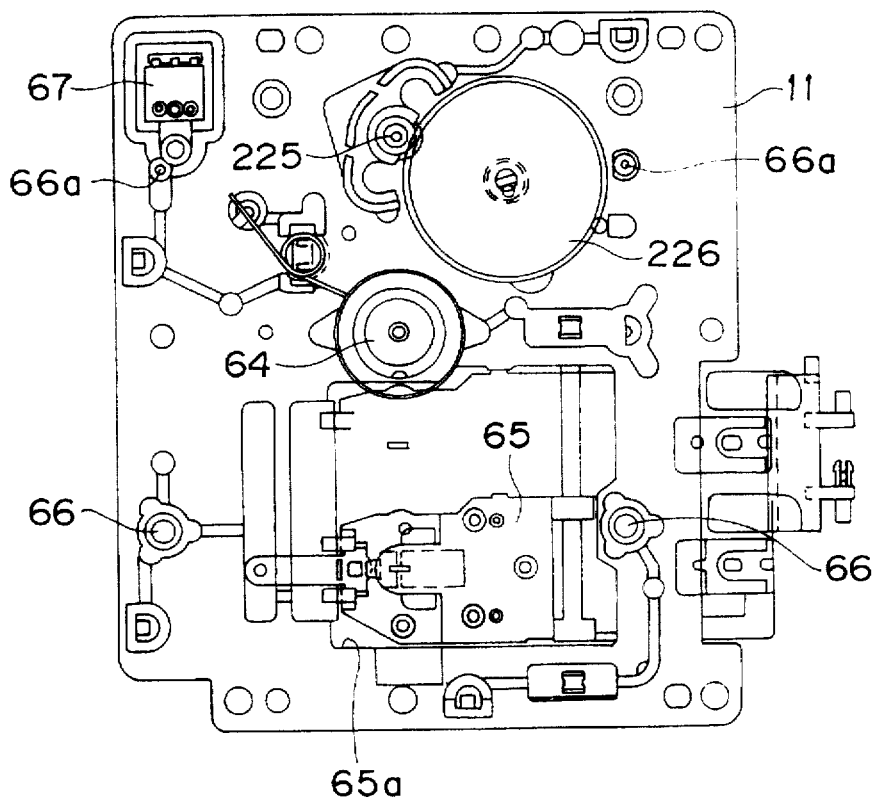
FIG. 53 is a plan view showing a recording/reproduction unit according to this invention.
Figure 55:
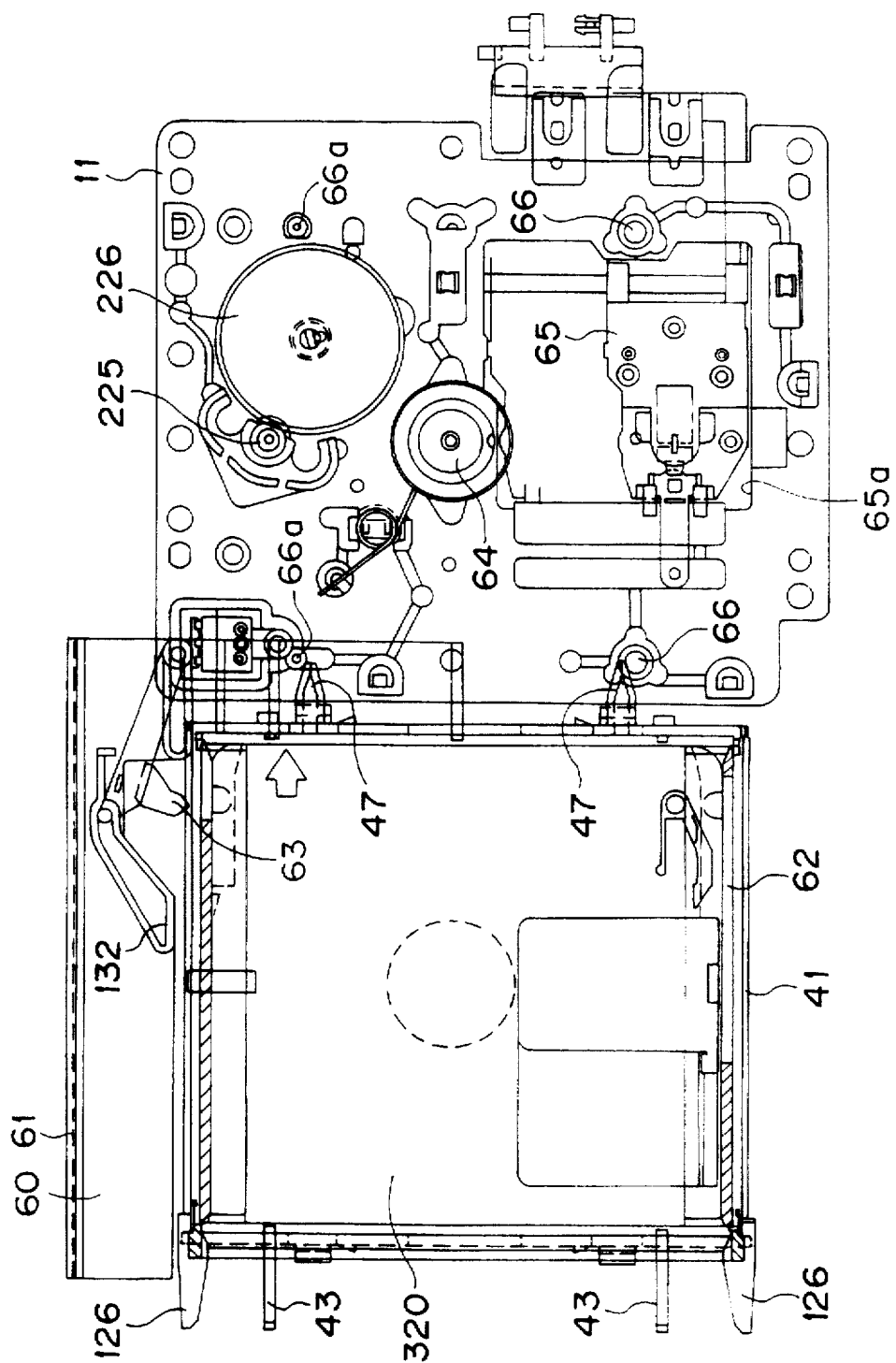
FIG. 55 is a plan view showing the positional relationship between the recording/reproduction unit and the accommodating body.
Figure 56:
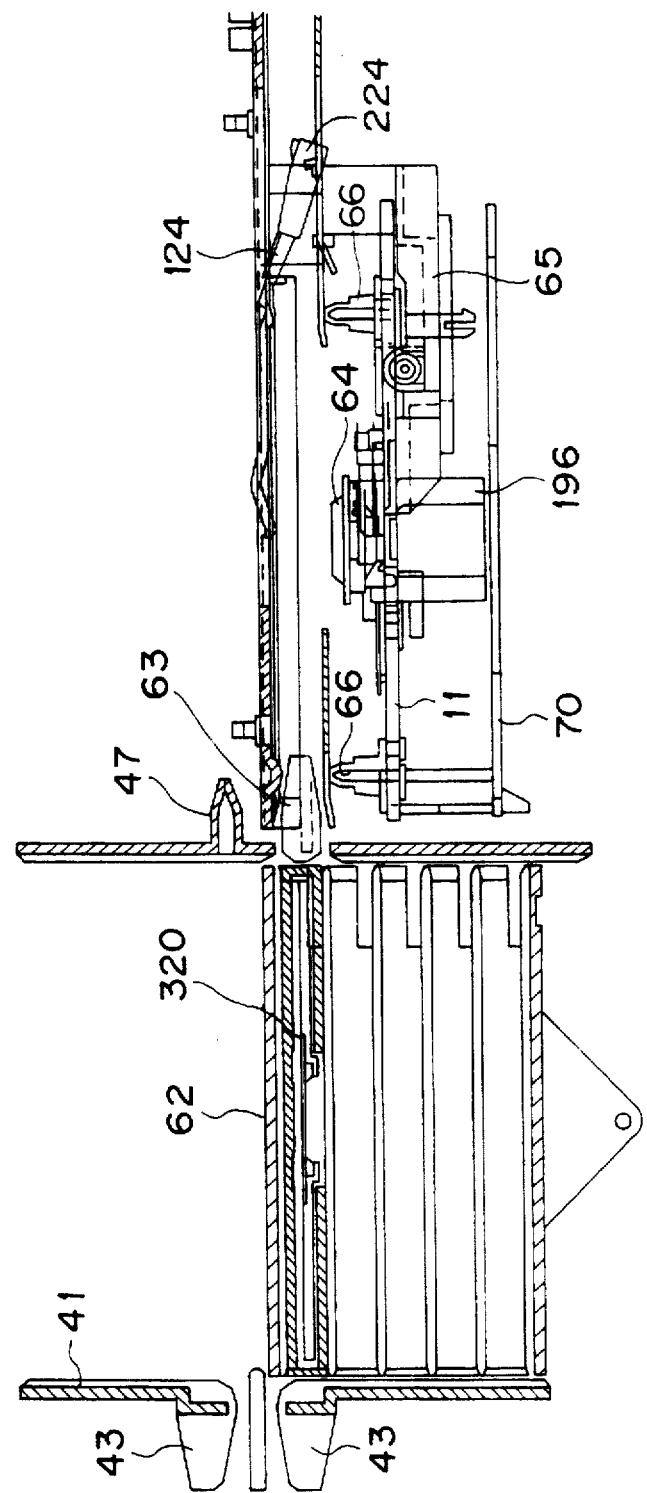
FIG. 56 is a side view showing the positional relationship between the recording/reproduction unit and the accommodating body.
Figure 57:
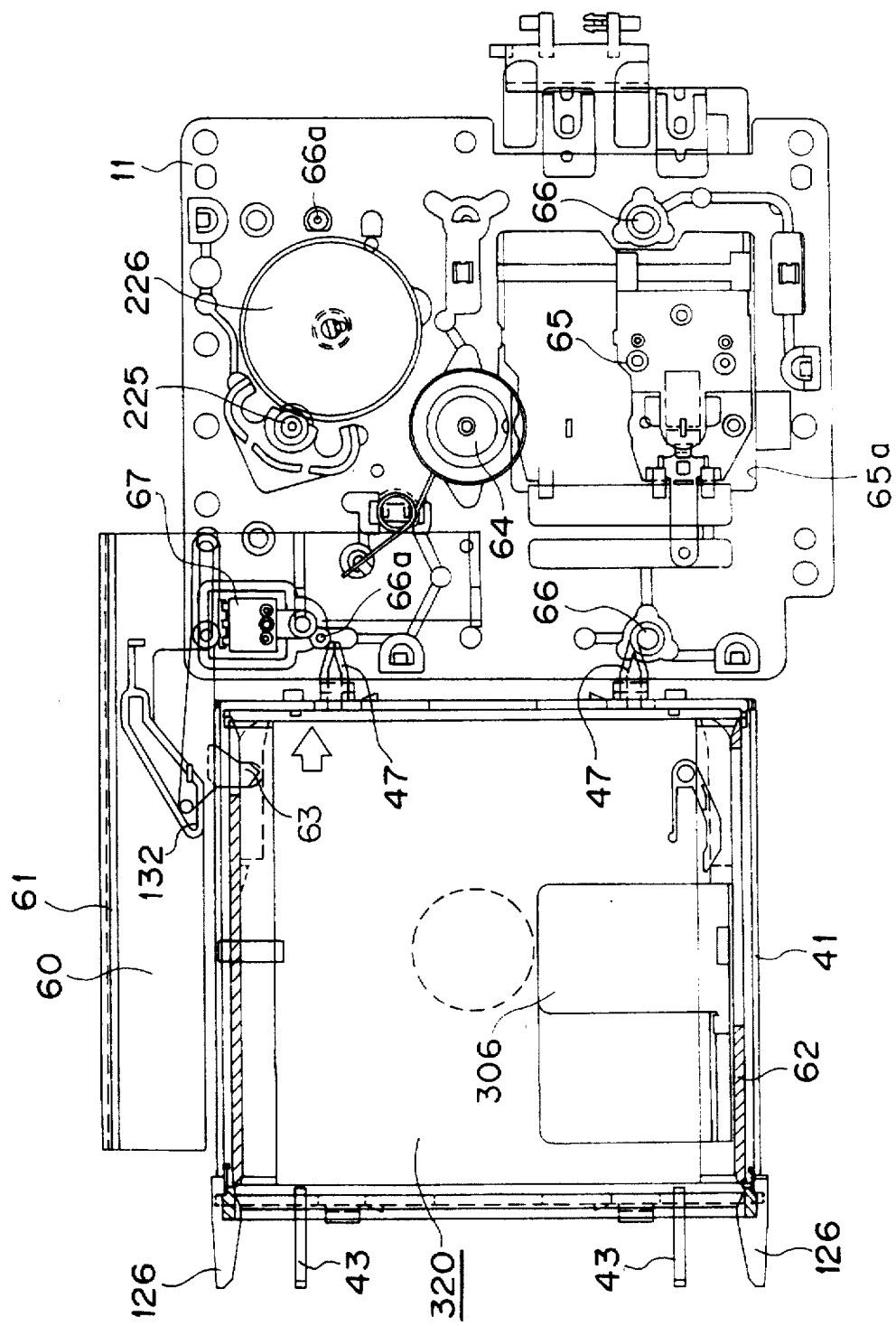
FIG. 57 is a plan view showing the state where engagement pawl of cartridge carrying mechanism is engaged with disc cartridge.
Figure 58:
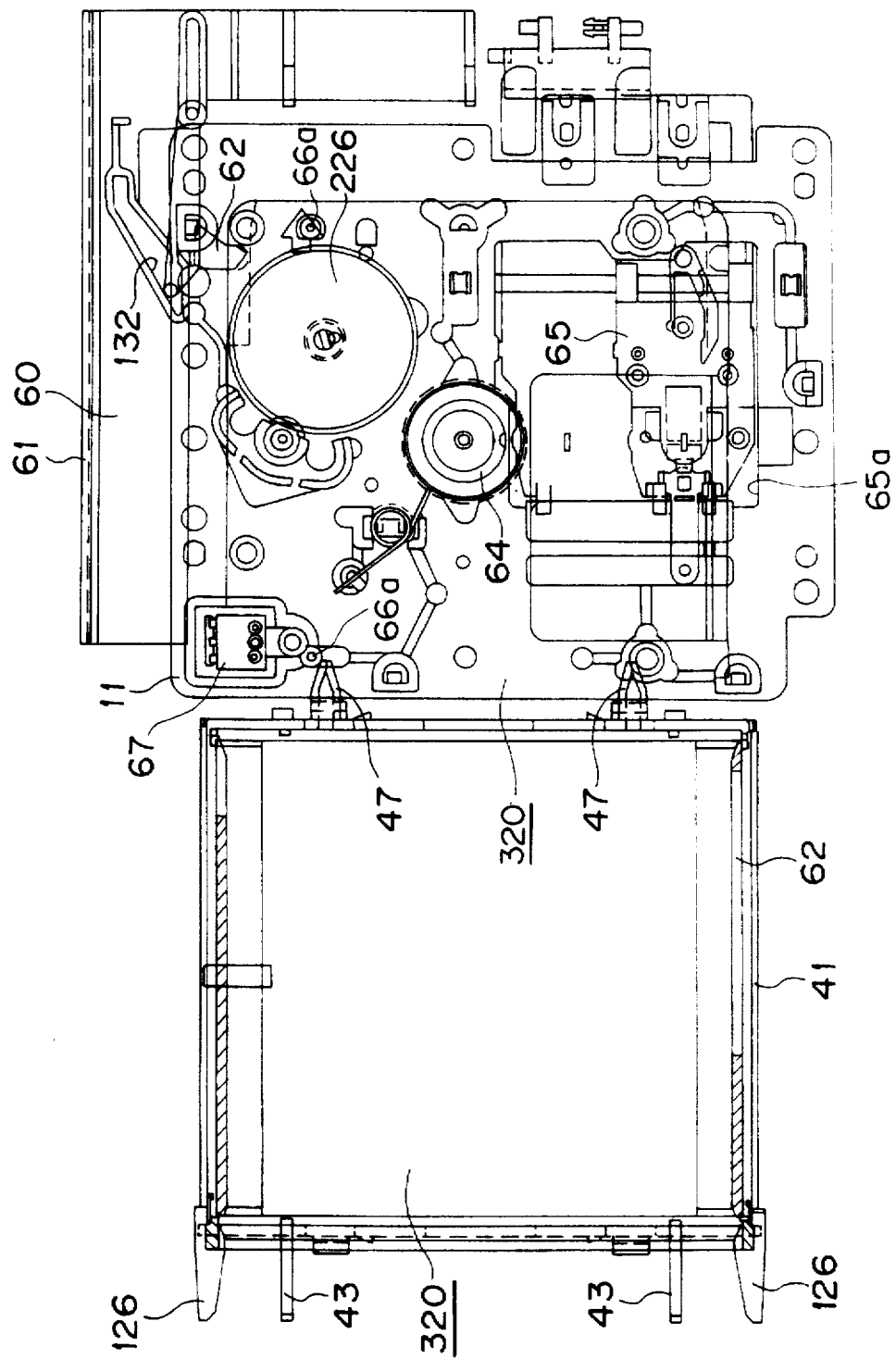
FIG. 58 is a plan view showing the state where cartridge carrying mechanism has carried disc cartridge.
Figure 59:
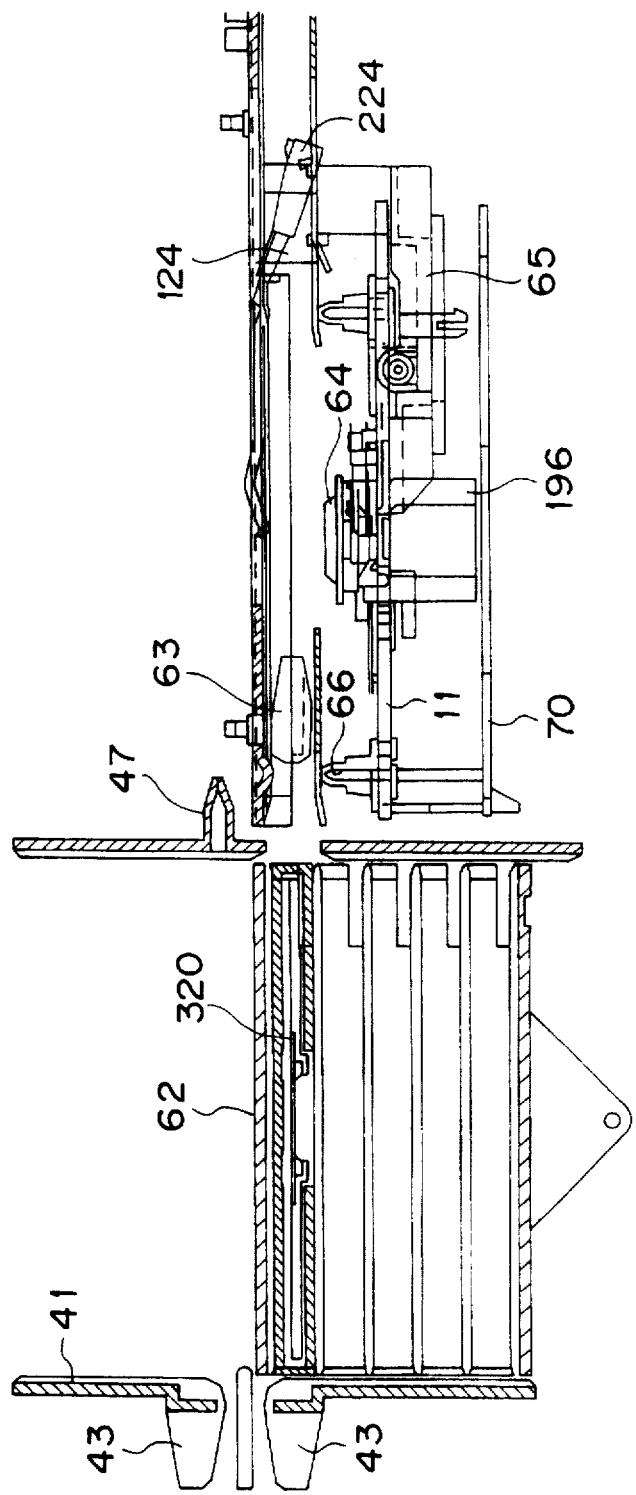
FIG. 59 is a side view showing the state where engagement pawl of the cartridge carrying mechanism is engaged with disc cartridge.
Figure 60:
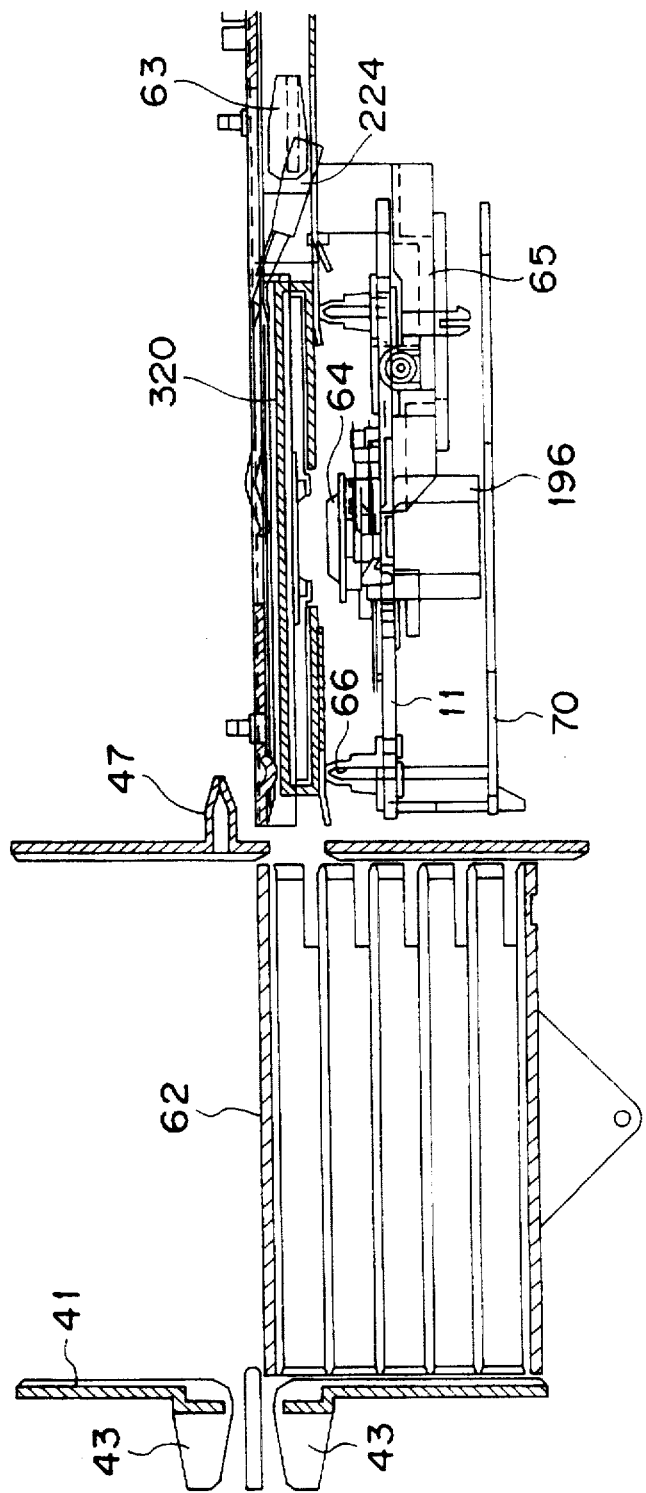
FIG. 60 is a side view showing the state where cartridge carrying mechanism has carried disc cartridge.

The optical pick-up device 65 is disposed at the lower surface side of the attachment base 11, and allows the object lens for irradiating light beams onto the magneto-optical disc 301 or the optical disc 331 to be faced to the upper surface side of the attachment base 11 through an opening portion 65a opened at the attachment base 11 as shown in FIGS. 53 and 55. This optical pick-up device 65 is positioned at the lateral side of the disc table 64, and is supported on the attachment base 11 so that it is permitted to undergo linear movement extending over radial direction of the magneto-optical disc 301 or the optical disc 331 mounted on the disc table 64 along the attachment base 11.

Moreover, at respective corner portions of the upper surface side of the attachment base 11 on which the cartridge loading portion into which the disc cartridge 320 or 321 is loaded is constituted, positioning pins 66 and positioning projections 66a for carrying out positioning of loading position of the disc cartridge 320 or 321 are projected as shown in FIGS. 53 and 55. The disc cartridge 320 or 321 is adapted so that the positioning pins 66, 66 are engaged with positioning holes 309, 310 provided at the lower surface of the front side and the lower surface of the back side is supported by the positioning projections 66a, 66a, whereby the disc cartridge is loaded onto the cartridge loading portion constituted on the upper surface side of the attachment base 11 after undergone positioning. At this time, the magneto-optical disc 301 or the optical disc 331 is adapted so that the projected portion of the disc table 64 is fitted into the center hole 304 and the chucking plate 302 is attracted by magnet, whereby the corresponding disc is held after undergone positioning. In addition, a detection switch 67 for detecting depth of discrimination hole 324 provided at the disc cartridge 320 or 321 is disposed on the attachment base 11.

Figure 54:
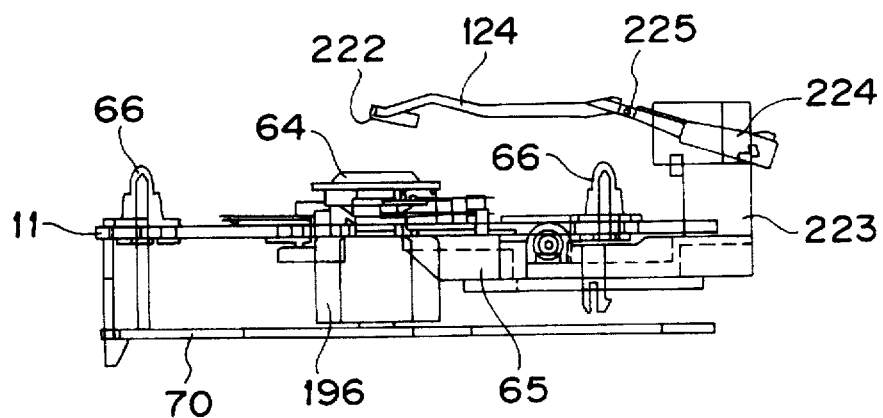
FIG. 54 is a side view of the configuration of the recording/reproduction unit.

As shown in FIG. 54, a magnetic head 222 is attached to the optical pick-up device 65 through a head arm 124. The head arm 124 is adapted so that its base end portion 223 is attached with respect to the optical pick-up device 65. This head arm 124 includes a flexible displacement portion 225 between the base end portion 223 and the front end portion. This head arm 124 is adapted so that magnetic head 222 is attached to the front end side, whereby when the flexible displacement portion 225 is caused to undergo displacement, it allows the magnetic head 222 to be moved in directions to become close to the object lens and become away therefrom. The head arm 124 is supported in the state where the base end portion 223 is positioned at the backward side with respect to the back edge portion of the attachment base 11 and the front end side is directed forward. At the front end side portion of the head arm 124, a contact piece 224 is attached. This contact piece 224 is extended toward the backward side with respect to the flexible displacement portion 225. Accordingly, when the contact piece 224 is pressed toward the lower side, the head arm 124 moves the magnetic head 222 toward the upper side where the magnetic head 222 is caused to be away from the object lens as shown in FIG. 54. Further, when pressing with respect to the contact piece 224 is released, this head arm 124 moves the magnetic head 222 toward the lower side where it becomes closer to the object lens.

In this recording/reproducing apparatus, when the disc cartridge 321 of the reproduction only type is loaded in the recording/reproducing unit 114, execution of the reproduction mode can be carried out, and when the disc cartridge 320 of the recording type which permits re-recording of information signals is loaded in the recording/reproducing unit 114, execution of the reproduction mode and the recording mode can be carried out. Further, in the case where the operational mode of the recording/reproducing apparatus is set to the recording mode, the magnetic head 222 is admitted into the cartridge 305 through the opening portion 323 for recording/reproduction provided at the upper surface side of the disc cartridge 320, and is caused to be slidably in contact with the magneto-optical disc 301.

6 Configuration of the cartridge holder (see FIGS. 10, 16 and 61, and FIGS. 67 to 74)

The cartridge holder 118 which constitutes the recording/reproduction apparatus and allows the disc cartridge 320 or 321 drawn out from the accommodating body 62 to undergo loading or detachment (unloading) with respect to the recording/reproduction unit 114 is adapted so that disc cartridges 320, 321 are inserted from the front side thereinto to hold those disc cartridges 320, 321 to allow the bottom surface side of the disc cartridges 320, 321 to be opposite to the recording/reproduction unit 114. This cartridge holder 118 is supported in a direction to become close to the recording/reproduction unit 114 or become away therefrom, i.e., in upper and lower directions so that they are permitted to undergo movement operation.

Figure 61:
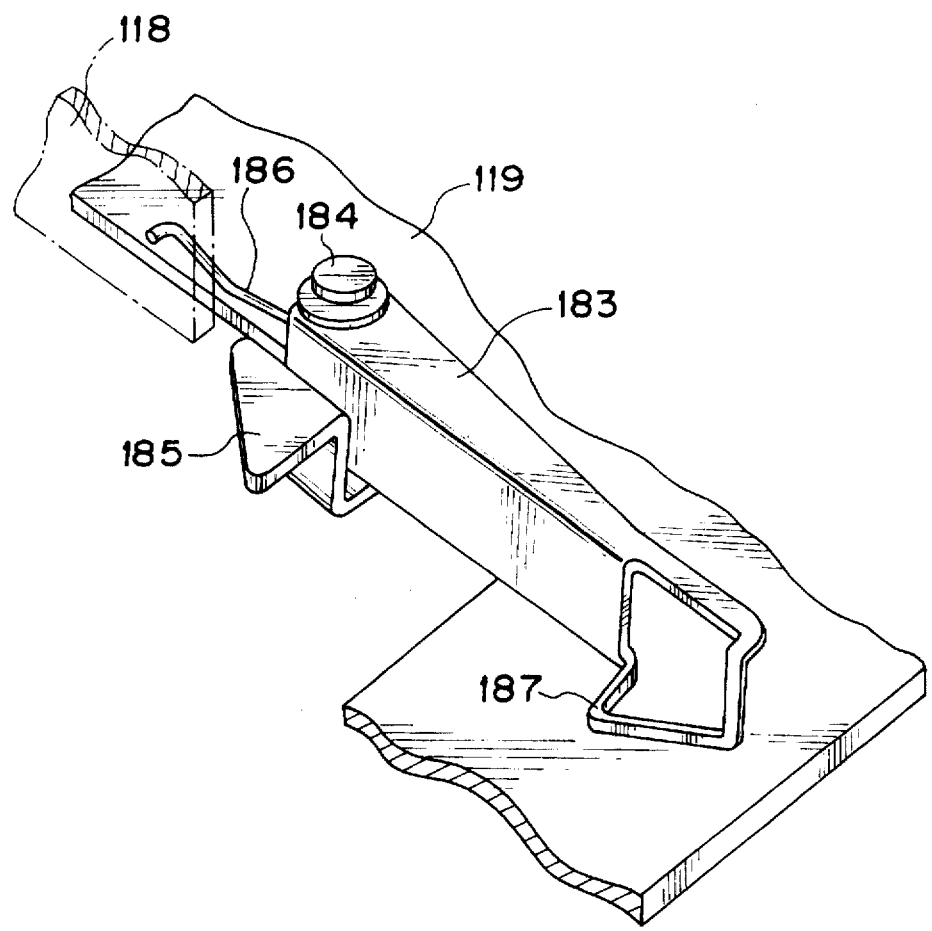
FIG. 61 is a perspective view showing shutter closing operation lever and shutter opening operation piece provided at cartridge holder.
Figure 68:
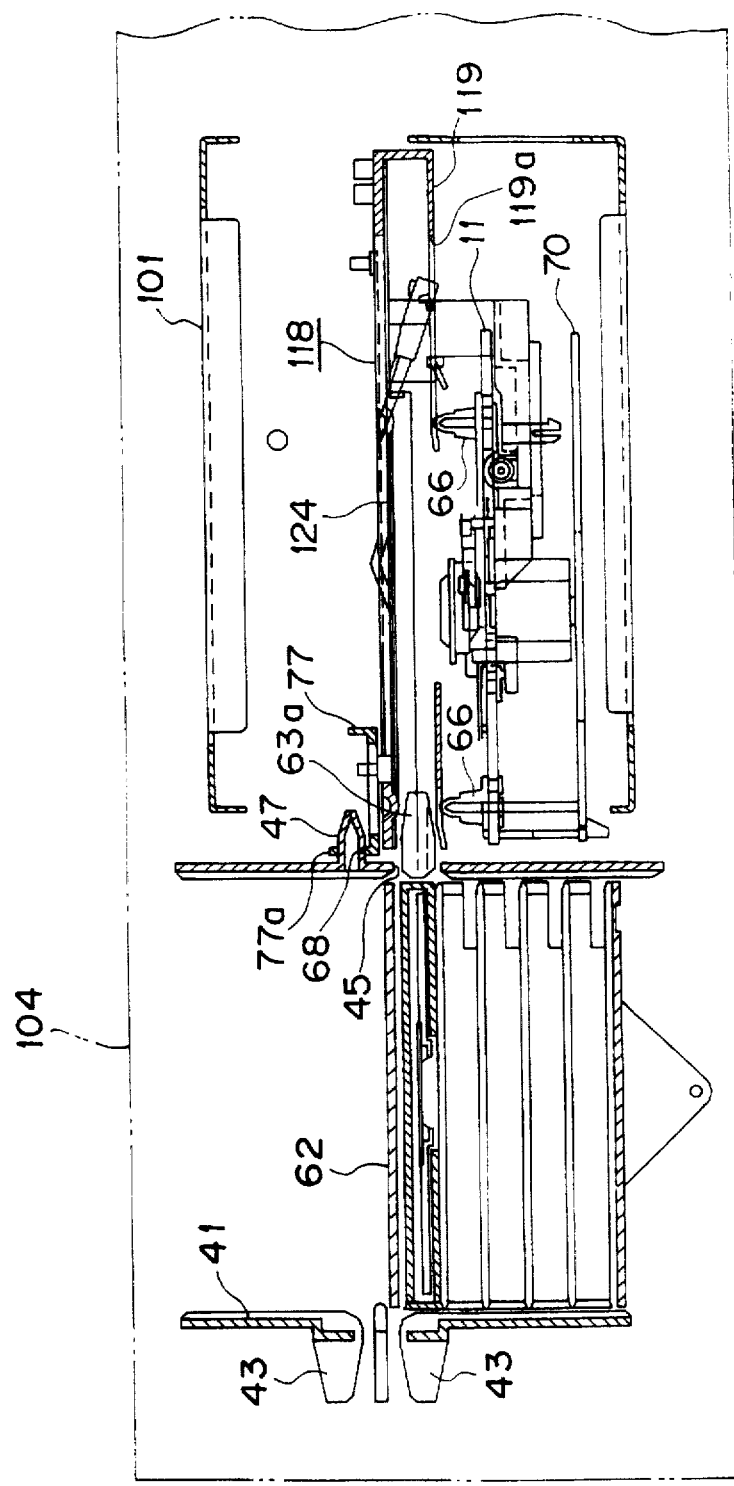
FIG. 68 is a longitudinal cross sectional view showing the state where cartridge holder is spaced from the recording/reproduction unit.
Figure 69:
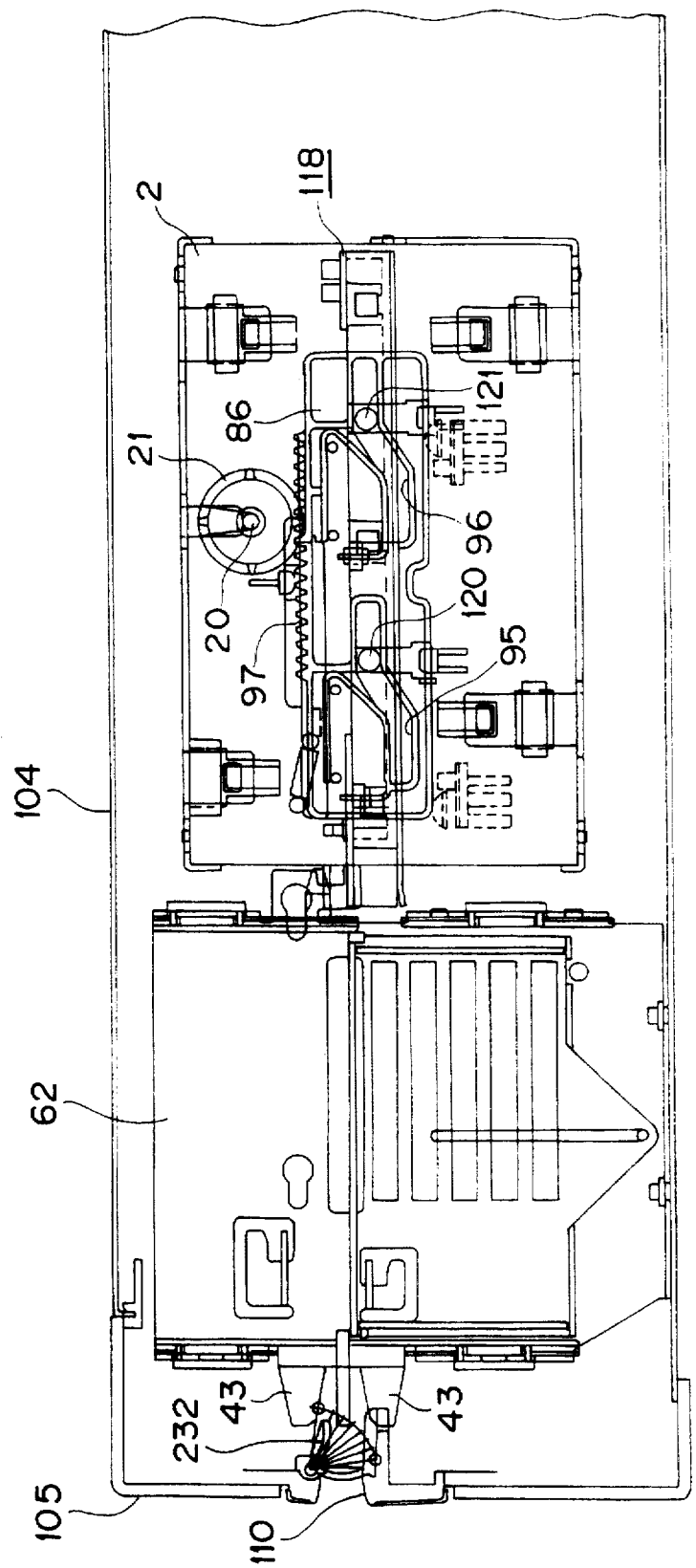
FIG. 69 is a side view showing the state where disc cartridge is inserted into the cartridge holder and the cartridge holder is caused to undergo movement operation in a direction closer to the recording/reproduction unit.
Figure 70:
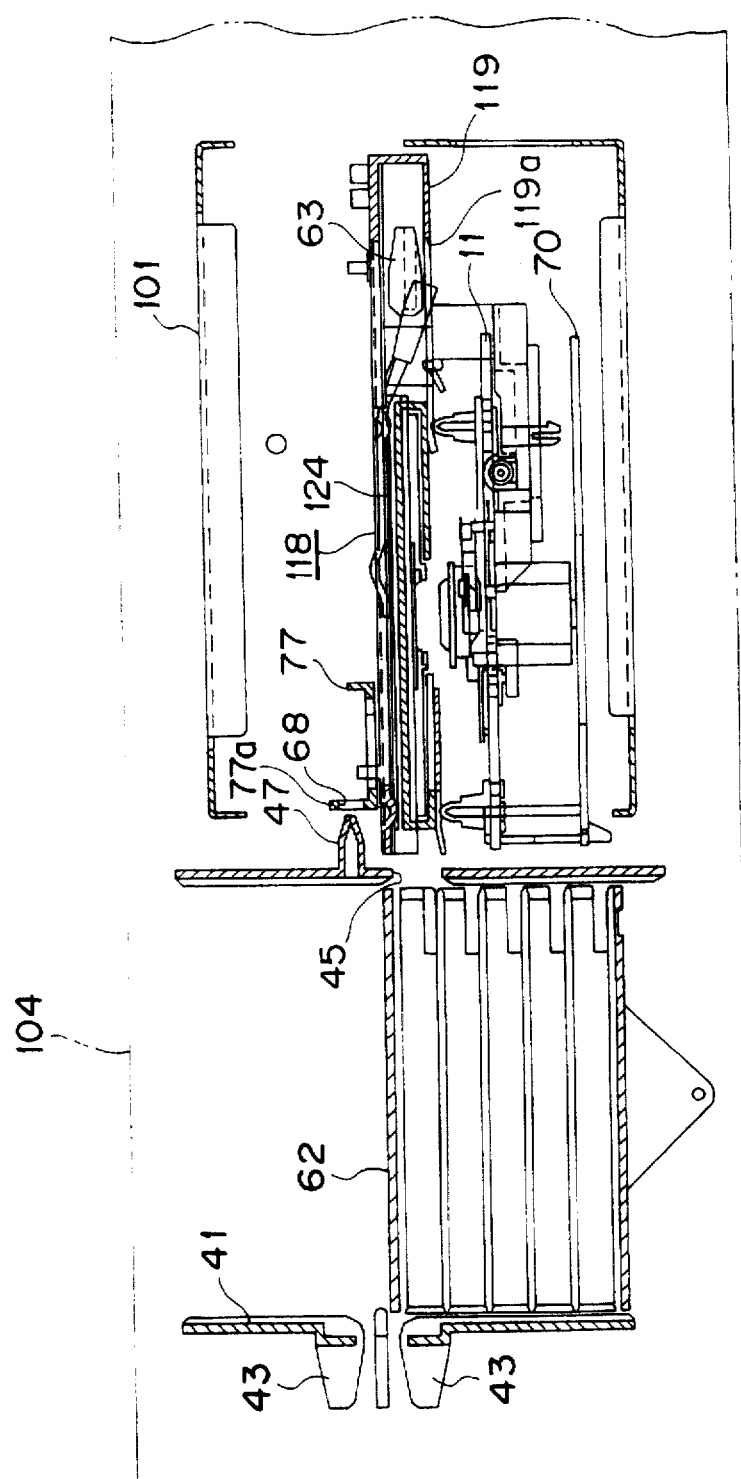
FIG. 70 is a longitudinal cross sectional view showing the state where the cartridge holder is caused to undergo movement operation in a direction closer to the recording/reproduction unit.
Figure 71:
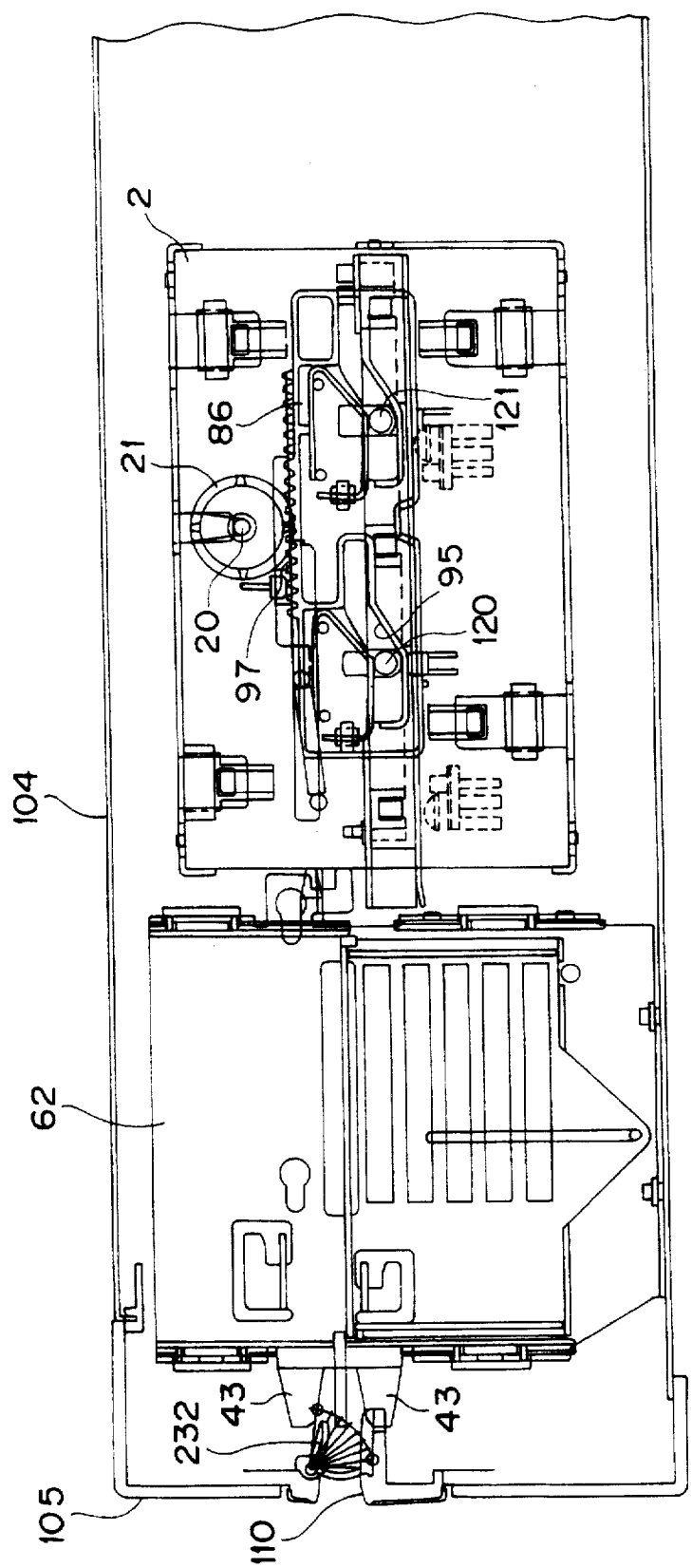
FIG. 71 is a side view showing the state where the cartridge holder is caused to become closer to the recording/reproduction unit.
Figure 72:
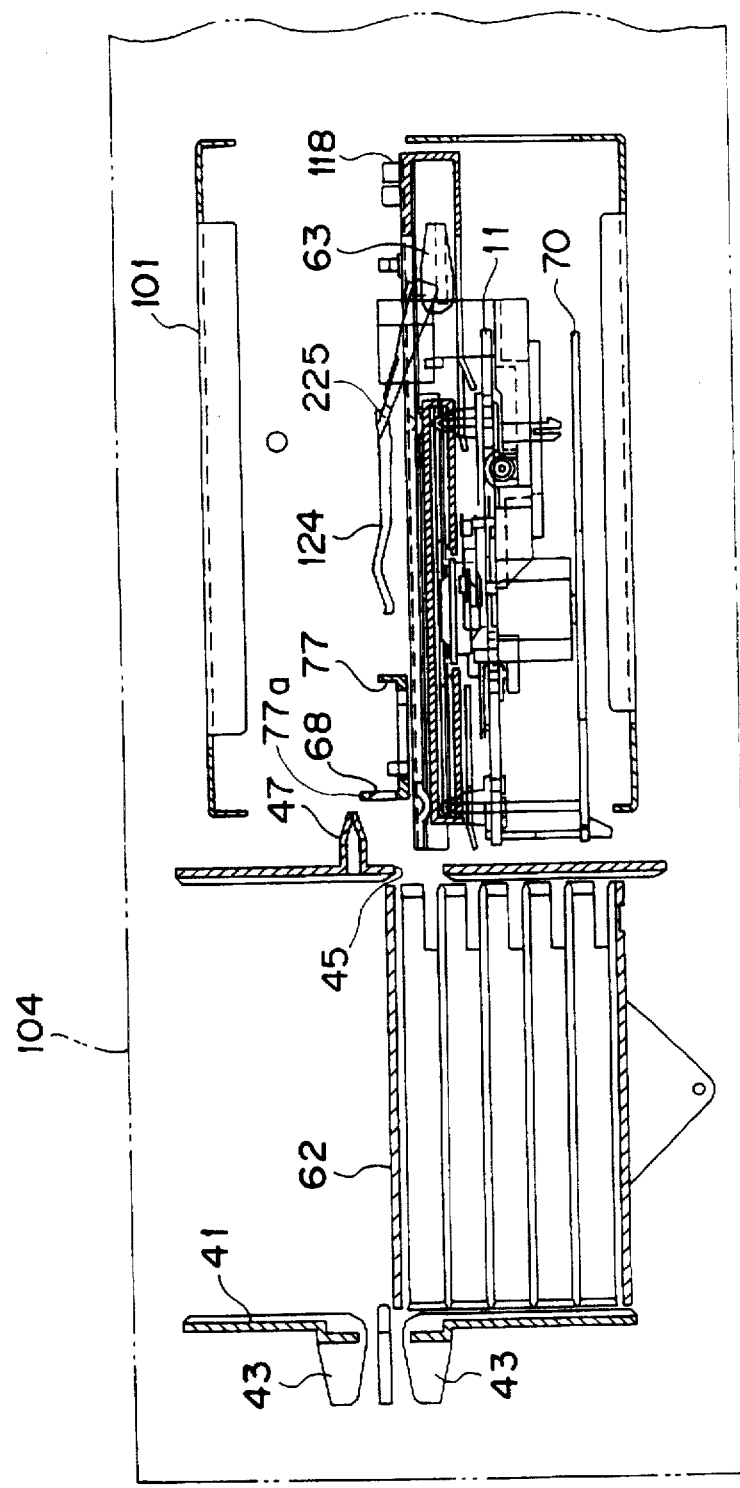
FIG. 72 is a longitudinal cross sectional view showing the state where the disc cartridge is loaded into the recording/reproduction unit.

This cartridge holder 118 is formed as shown in FIGS. 10 and 16 so as to take substantially casing shape which can hold the disc cartridges 320, 321, and is adapted so that the front side is opened so as to permit insertion/withdrawal of the disc cartridges 320, 321. This cartridge holder 118 is provided, at bottom plate portion 119, as shown in FIGS. 61, 68 and 70, with an opening potion 119a which permits opening portion 322 for recording/reproduction of the lower surface side of the disc cartridges 320, 321, central opening portion 313, respective positioning holes 309, 310 and discrimination hole 324 to be faced to the lower side. In addition, this cartridge holder 118 is provided, at the upper side thereof, as shown in FIG. 16, an opening portion 119b which permits opening portion 323 for magnetic head for recording/reproduction of the upper surface side of the disc cartridges 320, 321 to be faced to the upper side.

Moreover, within the cartridge holder 118, a shutter opening operation piece 185 and a shutter closing operation lever 183 are disposed as shown in FIGS. 16 and 61 in the state positioned at the front side which serves as the side of the shutter member 306 or 317 when the disc cartridge 320 or 321 is caused to undergo insertion operation into the cartridge holder 118 from one side surface serving as insertion end. The shutter opening operation piece 185 is a fixed piece integrally projected from the bottom plate portion 119 of the cartridge holder 118, whereby when the disc cartridge 320 or 321 is inserted into the cartridge holder 118, it comes into contact with the front end portion of the connecting portion or the supporting portion of the shutter member 306 or 317 to allow the shutter member 306 or 317 to undergo movement operation in accordance with movement of the disc cartridge 320 or 321 to close the opening portions 322, 323 for recording/reproduction. On the other hand, the shutter closing operation lever 183 is rotatably supported at the bottom end side thereof with respect to bottom plate portion 119 of the cartridge holder 118 through support shaft 184 as shown in FIG. 61. At the front end side of the shutter closing operation lever 183, there is formed a projection portion 187 for engagement with the engagement hole 308 bored at the front end surface of the shutter member 306 or 317 toward to inner side of the cartridge holder 118. This projection portion 187 is positioned at the forward side with respect to the shutter opening operation piece 185, and is located at the position where it is engaged with the engagement hole 308 when the shutter opening operation piece 185 comes into contact with the front end portion of the shutter member 306 or 317. Further, this shutter closing operation lever 183 is caused to undergo rotational biasing by torsional coil spring 186 wound on the support shaft 184 in a direction to move the projected portion 187 toward the inward side of the cartridge holder 118, i.e., in a direction to engage the projected portion 187 with the engagement hole 308 of the disc cartridge 320 or 321 inserted into the cartridge holder 118. Further, the shutter closing operation lever 183 is adapted so that when the disc cartridge 320 or 321 inserted within the cartridge holder 118 is pulled or drawn out toward the front side from the cartridge holder 118, it engages the projected portion 187 with the engagement hole 308 to thereby close the shutter member 306 or 317 in accordance with movement of the disc cartridge 320 or 321. When the shutter member 306 or 317 is caused to undergo movement operation so that the opening portions 322, or 323 for recording/reproduction is closed, and the disc cartridge 320 or 321 is then further pulled or drawn out from the cartridge holder 118, the shutter closing operation lever 183 is rotated in the outward side direction of the cartridge holder 118 against biasing force of the torsional coil spring 186, thus to detach the projected portion 187 from the engagement hole 308.

Moreover, this cartridge holder 118 is disposed, as shown in FIG. 16, between a pair of left and right side walls 1, 2 vertically provided in a manner opposite to each other in the state parallel to each other on the supporting base 70. In addition, this cartridge holder 118 is disposed in the state positioned between the optical pick-up device 65 and the magnetic head 222 as shown in FIGS. 10, 54.

Further, at the outside surfaces of the both sides opposite to each other of the cartridge holder 118, respective pairs of movement guide pins 120, 121 and 120, 121 are projected as shown in FIG. 16. On the other hand, at respective side walls 1, 2, respective pairs of vertical movement guide grooves 72, 73 and 72, 73 before and after (in forward and backward directions) are formed. These vertical movement guide grooves 72, 73 and 72, 73 are linearly formed so as to take linear shape in upper and lower directions. The movement guide pins 120, 121 and 120, 121 are inserted through vertical movement guide grooves 72, 73 and 72, 73 respectively in correspondence therewith. Namely, the cartridge holder 118 can be moved in upper and lower directions within the range where respective movement guide pins 120, 121 and 120, 121 are caused to be moved within the vertical movement guide grooves 72, 73 and 72, 73.

Further, at the outside surface of the respective side walls 1, 2, a pair of left and right cam plates 86, 87 are attached as shown in FIG. 16. These cam plates 86, 87 are supported at upper and lower edge portions by plural supporting pawls 74, 75, 76 projected toward the outward side from the outside surface of the respective side walls 1, 2, and are supported so that they can be caused to undergo movement operation in directions perpendicular to directions to become close to the recording/reproduction unit 114 or become away therefrom, i.e., in forward and backward directions.

The cam plates 86, 87 are respectively provided at the backward side portion of the upper edge portion with rack gears 97, 89. A pair of left and right pinion gears 21, 22 are correspondingly meshed with these rack gears 97, 89. These pinion gears 21, 22 are attached in the state fixed on the both end sides of the support shaft 20 rotatably supported in the state bridging across respective side walls 1, 2. Namely, the respective cam plates 86, 87 are connected through the respective pinion gears 21, 22 and the support shaft 20, whereby they are caused to undergo movement operation in synchronism with each other. In addition, the respective cam plates 86, 87 are caused to movement biasing toward the front side of the direction indicated by arrow B in FIGS. 10 and 16 by extension coil spring 94 stretched between the cam plate 87 disposed at one side wall 1 side and the side wall 1.

Figure 62:
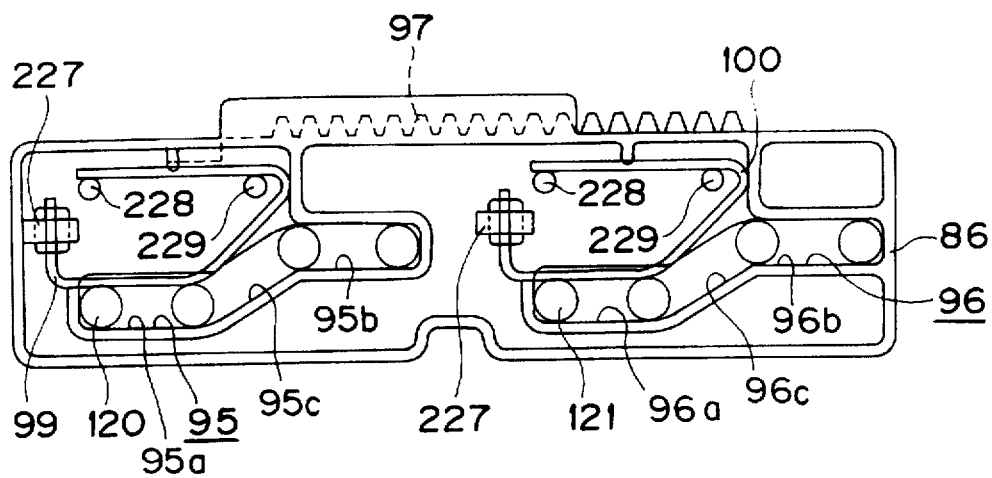
FIG. 62 is a side view showing cam plate for chucking.
Figure 63:
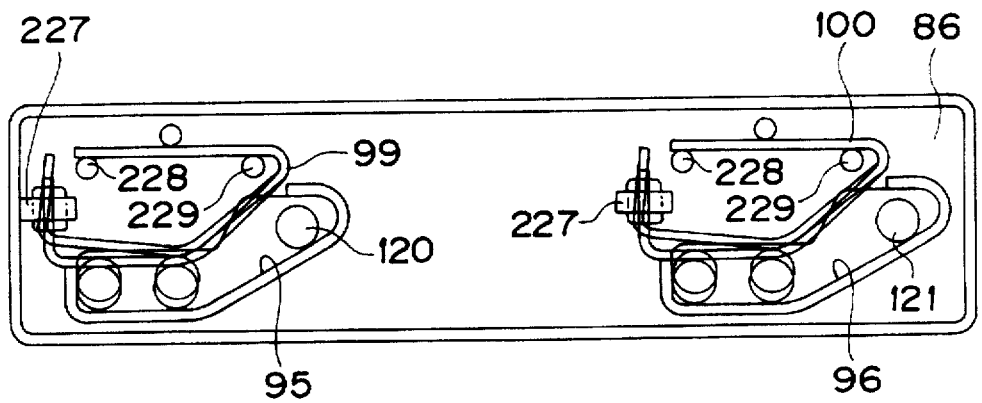
FIG. 63 is a side view showing the state where movement guide pin has been moved with respect to the cam plate for chucking.
Figure 64:
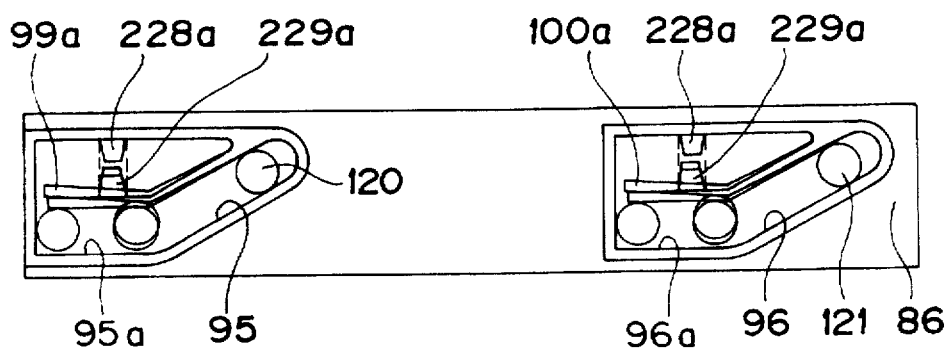
FIG. 64 is a side view showing another example of the configuration of the cam plate for chucking.
Figure 67:
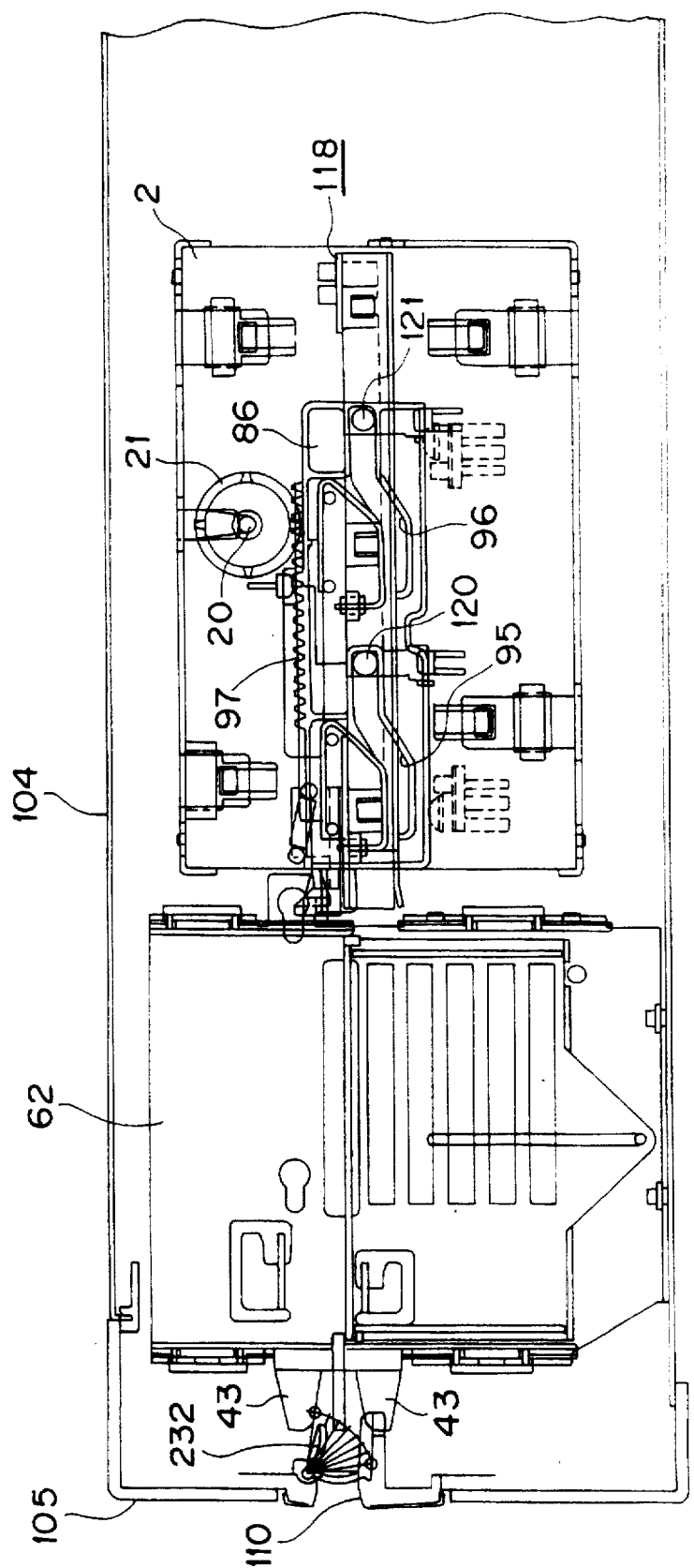
FIG. 67 is a side view showing the state where cartridge holder is spaced from the recording/reproduction unit.
Figure 73:
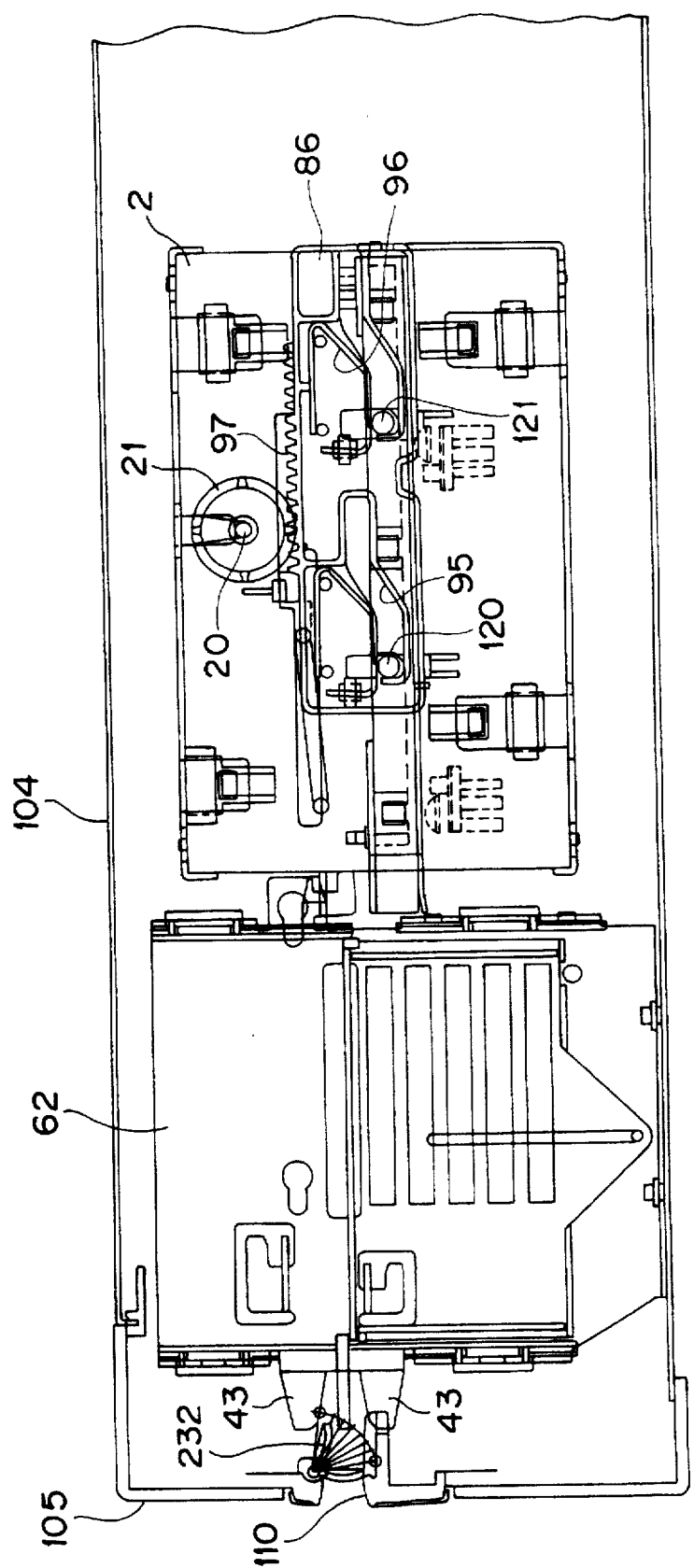
FIG. 73 is a side view showing the state where the cartridge holder is caused to become close the recording/reproduction unit to allow disc cartridge to undergo loading into the recording/reproduction unit.
Figure 74:
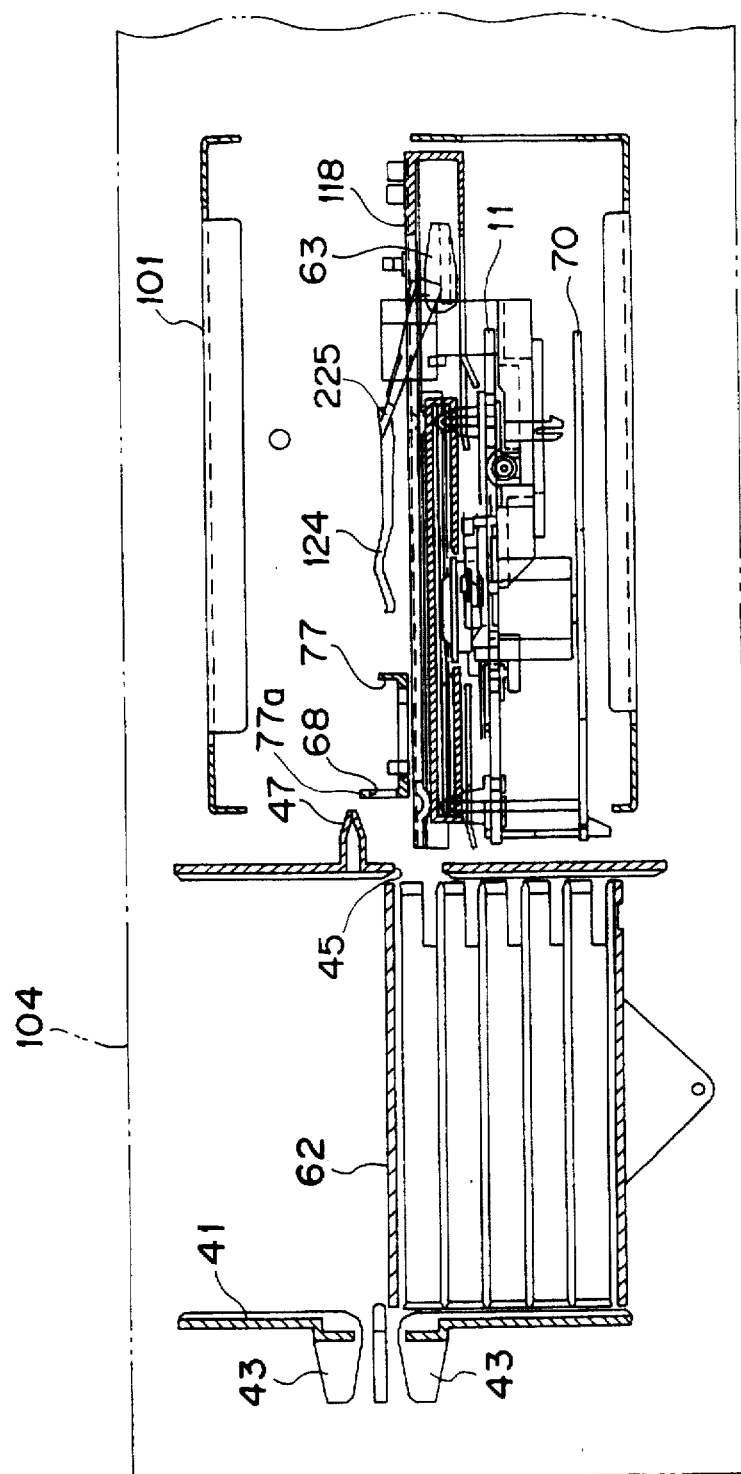
FIG. 74 is a longitudinal cross sectional view showing the state where proximity to the recording/reproduction unit of the cartridge has been completed, and disc cartridge is loaded into the recording/reproduction unit so that spring member presses and supports disc cartridge.

Further, at respective cam plates 86, 87, as shown in FIGS. 62 to 64, there are formed a pair of cam grooves 95, 96 before and after (in forward and backward directions) inclined with respect to the direction to permit these cam plates 86, 87 to undergo movement operation. Movement guide pins 120, 121 are respectively inserted into these cam grooves 95, 96. These movement guide pins 120, 121 are caused to undergo movement operation in upper and lower directions along the respective cam grooves 95, 96 followed by movement in forward and backward directions of the cam plates 86, 87. Moreover, the respective cam grooves 95, 96 respectively include horizontal portions 95a, 95b and 96a, 96b at the front side portion and the back side portion. The portions between these horizontal portions 95a, 95b and 96a, 96b are caused to serve as inclined surfaces 95c, 96c so that the backward portion is located at the upper side with respect to the forward portion. Namely, when the respective cam plates 86, 87 are moved to the front side, the cartridge holder 118 is moved toward the upper side, and is thus located at the release position spaced toward the upper side from the recording/reproduction unit 114 as shown in FIGS. 67 and 68. When the respective cam plates 86, 87 are moved toward the back side, they are moved toward the lower side, and are thus located at chucking position close to the recording/reproduction unit 114 as shown in FIGS. 73 and 74. Further, when the cartridge holder 118 is located at the chucking position, the disc cartridge 320 or 321 held by the cartridge holder 118 is loaded into the recording/reproduction unit 114. Moreover, when the cartridge holder 118 is located at the release position, the front end portion of the cartridge holder 118 is opposite to the back side insertion/withdrawal hole 45 of the vertical movement guide body 41. Thus, the disc cartridge 320 or 321 held by the cartridge holder 118 is permitted to undergo insertion/withdrawal with respect to the accommodating body 62 through the back side insertion/withdrawal hole 45 of the vertical movement guide body 41.

Figure 65:
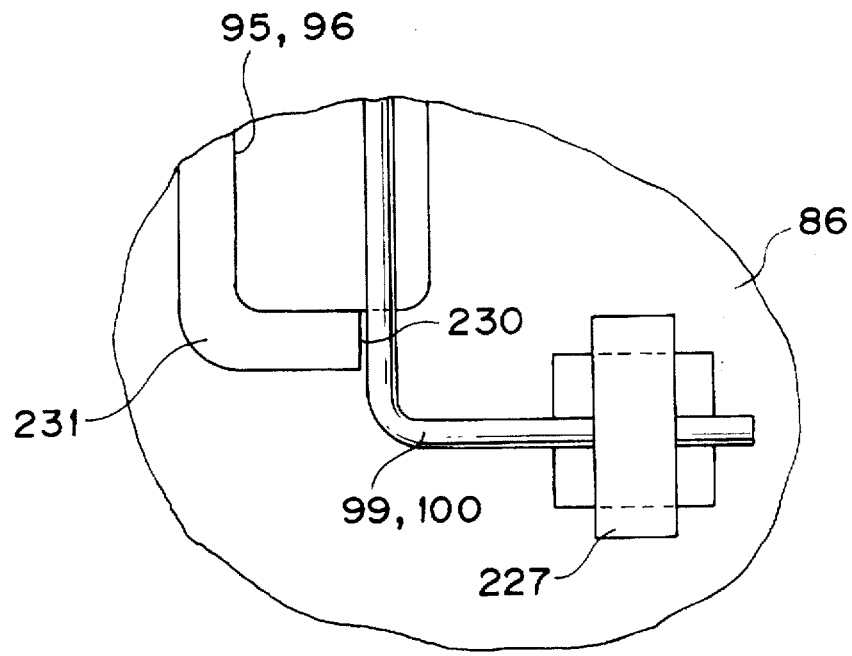
FIG. 65 is a side view showing attachment portion of spring member in the cam plate for chucking.
Figure 66:
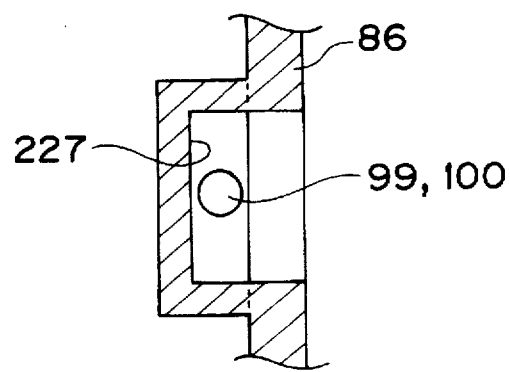
FIG. 66 is a longitudinal cross sectional view showing attachment portion of the spring member in the cam plate for chucking.

Moreover, spring members 99, 100 serving as elastic member provided so as to face to the upper edge portions of respective cam grooves 95, 96 are attached to the respective cam plates 86, 87. These spring members 99, 100 are formed so as to take linear shape by metal material, and are attached in correspondence with respective cam grooves 95, 96 with respect to the cam plates 86, 87. These spring members 99, 100 are bent so as to take substantially annular shape having substantially linear portion along the horizontal portions 95a, 96a of the front side of the cam grooves 95, 96. These spring members 99, 100 are attached to the cam plates 86, 87, as shown in FIGS. 62, 65 and 66, by engaging one end side serving as the portion in the vicinity of the linear portion with the engagement portion 227 provided at the cam plates 86, 87 and engaging the other end side with holding projections 228, 229 provided at the cam plates 86, 87. As shown in FIG. 63, respective spring members 99, 100 are adapted so that when the cam plates 86, 87 are caused to undergo movement operation toward the backward side and these cam plates 86, 87 are move the cartridge holder 118 in a direction to allow it to become close to the recording/reproduction unit 114 through the cam grooves 95, 96 and the respective movement guide pins 120, 121, i.e., the respective movement guide pins 120, 121 are admitted into the horizontal portions 95a, 96a of the front side of the respective cam grooves 95, 96, the respective spring members 99, 100 press the respective movement guide pins 120, 121 toward the lower side. The respective spring members 99, 100 press the movement guide pins 120, 121 toward the lower side in this way to thereby press and support the disc cartridge 320 or 321 held by the cartridge holder 118 with respect to the recording/reproduction unit 114.

It is to be noted that respective elastic members 99, 100 may be formed by synthetic resin material, and may be integrally formed with respect to respective cam plates 86, 87 formed by synthetic resin material as shown in FIG. 64. In this case, the spring portions 99a, 100a serving as the respective elastic member are adapted so that their base end sides are supported by cam plates 86, 87, and their free end sides are caused to be along the upper edge portions of the horizontal portions 95a, 96a of the front side of the respective cam grooves 95, 96. Further, at the upper side portions of the front end side portions of the respective spring portions 99a, 10a, projections 229a opposite to contact projections 228a provided at the cam plates 86, 87 are provided. These contact projections 228a and projections 229a are caused to be in contact with each other to thereby prevent plastic deformation or breakage by excessive displacement of the respective spring portions 99a, 100a.

Moreover, at the upper surface side of the cartridge holder 118, a lock plate 77 is slidably attached in forward and backward directions as shown in FIG. 16. This lock plate 77 is disposed at the upper surface side of the cartridge holder 118 without covering the opening portion 119b for allowing the opening portion 323 for recording/reproduction of the disc cartridge 320 of the recording/reproduction type to be faced toward the upper side. This lock plate 77 includes plural engagement grooves 78 formed in forward and backward directions, and is supported on the cartridge holder 118 by respectively engaging plural supporting pieces 58 projected on the cartridge holder 118 with these engagement grooves 78. Moreover, at the front end edge of the lock plate 77, a rising wall 77a is formed in a rising manner (hereinafter simply referred to as rising-formed depending upon circumstances) toward the upper side as shown in FIG. 16. At the rising wall 77a, a pair of left and right lock holes 68, 68 are bored. When the lock plate 77 is slid to the front side on the cartridge holder 118, a pair of lock pins 47, 47 projected at the back portion of the vertical movement guide body 41 are correspondingly fitted into lock holes 68, 68 as shown in FIG. 68. These lock pins 47, 47 are adapted so that their front end sides are reduced in dimension so as to take taper shape. Even if the supporting base 70 is moved with respect to the base plate 10 by deformation of the dumpers 69, those lock pins 47, 47 draw the lock plate 77 toward their sides so that they are fitted into respective lock holes 68, 68. When respective lock pins 47, 47 are fitted into the respective lock holes 68, 68, deformation of the dumpers 69 is limited. Thus, the cartridge holder 118 is subjected to positioning such that it is located at a predetermined position with the vertical movement guide body 41 being as reference.

At the both sides of the front portion of the lock plate 77, a pair of left and right spring holding holes 77b, 77b are formed. Between the spring holding hole 77b of the other side and the spring holding hole 98a of the cam plate 86 of the other side, extension coil spring 93 is stretched. The spring holding hole 98a of the cam plate 86 of the other side is formed at the front end side of the projecting piece 98 projected at the side closer to the recording/reproduction unit 114 of the cam plate 86. This projecting piece 98 is admitted in a manner closer to the recording/reproduction unit 114 side with respect to the side wall 2 through cut hole 71 formed in forward and backward directions of the side wall 2 of the other side.

Moreover, between one spring holding hole 77b and a spring holding hole 92a of one cam plate 87, extension coil spring 79 is stretched. The spring holding hole 92a of the cam plate 87 of one side is formed at the front end side of the projection 92 projected at the side closer to the recording/production unit 114 of the cam plate 87. This projection 92 is projected at the side closer to the recording/reproduction unit 114 side with respect to the side wall 1 through cut holes 71 formed in forward and backward directions at the side wall 1 of one side. Namely, when respective cam plates 86, 87 are moved toward the back side, the lock plate 77 is biased by respective extension coil spring 93, 79 so that it is slid toward the backward side in the direction indicated by arrow A in FIG. 10. Thus, the lock plate 77 is away from the vertical movement guide body 41 as shown in FIGS. 69 to 74. Further, when the respective cam plates 86, 87 are moved toward the front side, the lock plate 77 is pressed with the both side portions being directed toward the front side by respective projecting pieces 98, 92 so that it is slid toward the front side.

Meanwhile, at the upper side of the contact piece 224 extended toward the backward side of the head arm 124, a head operation member 122 rotatably supported by the support shaft 20 where respective pinion gears 21, 22 are attached on the both end sides is positioned. This head operation member 122 allows the operation projecting piece 125 projected from the backward side portion to ward the lower side to be faced onto the contact piece 224, and allows the front side portion to be faced to the back end side portion of the cut hole 71.

Moreover, the head operation member 122 is caused to undergo rotation biasing in a direction to press the contact piece 224 toward the lower side by the operation projecting piece 125 in the direction indicated by arrow C in FIG. 10 by a torsional coil spring 123 attached on the support shaft 20. By biasing force of the torsional coil spring 123, the magnetic head 222 is caused to be away from the optical pick-up device 65 toward the upper side through the head operation member 122.

Further, when the cam plate 86 is moved toward the back side, the projecting piece 98 of the cam plate 86 presses the front side portion of the head operation member 122 toward the backward side, whereby this head operation member 122 is rotated against biasing force of the torsional coil spring 123 to release pressing with respect to the contact piece 224. At this time, the magnetic head 222 is moved toward the lower side, and is caused to be closer to the optical pick-up device 65.

Moreover, at the cam plate 87 disposed at one side wall 1 side, a pressed piece 88 is projected toward the recording/ reproduction unit 114 in the state positioned at the backward side of the cam plate 87. This pressed piece 88 is projected from the side wall 1 toward the recording/reproduction unit 114 side through cut holes 80 formed in forward and backward directions at the backward side portion of the side wall 1 of one side.

Further, respective cam plates 86, 87 are subjected to movement operation in forward and backward directions through the power transmission mechanism by drive force of loading motor 14 for driving cartridge carrying mechanism 410 to be described later, which allows the disc cartridge 320 or 321 to undergo carrying operation with respect to the recording/reproduction unit 114.

Figure 75:
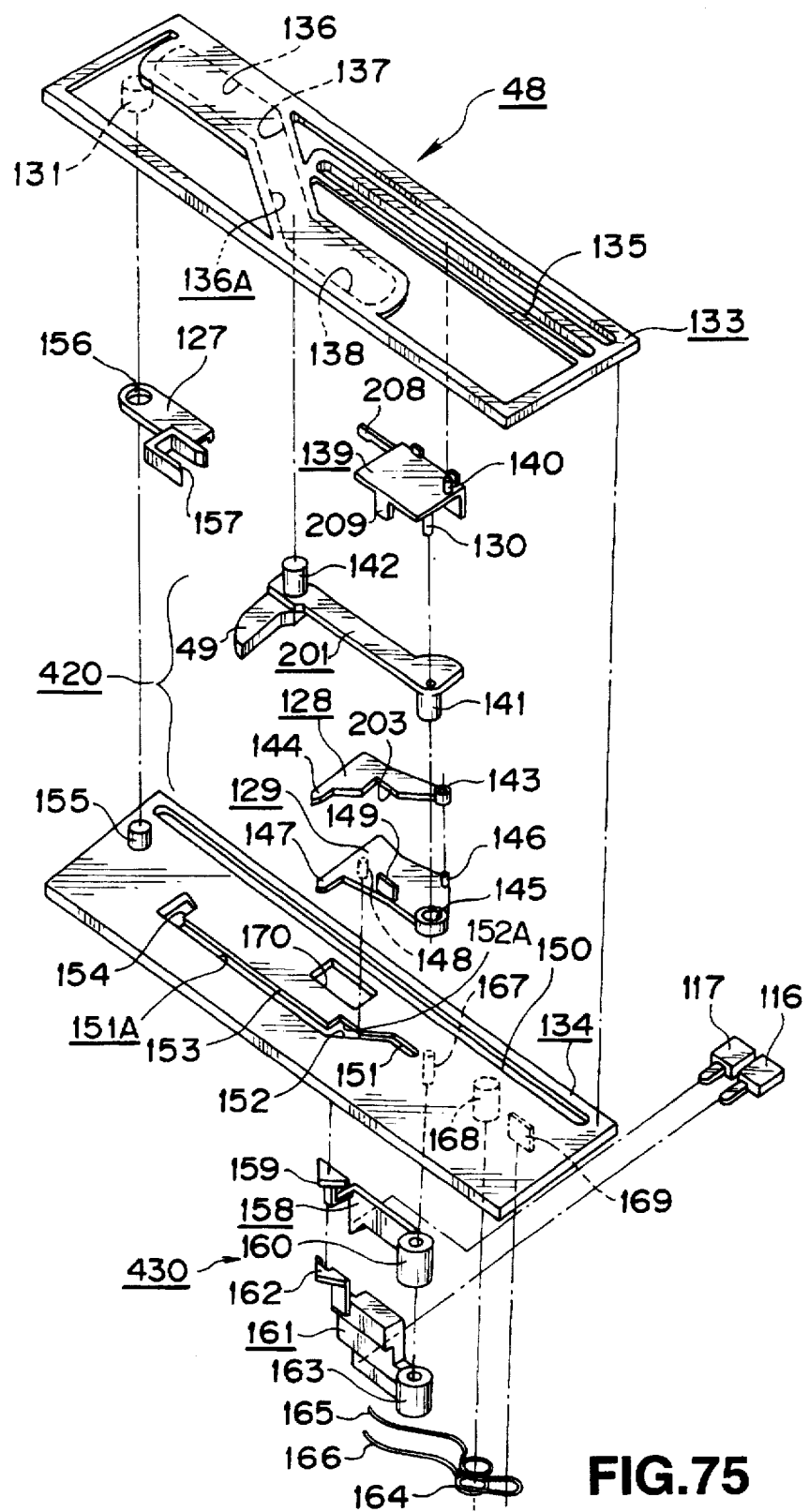
FIG. 75 is an exploded perspective view showing cartridge taking-out mechanism.

7 Cartridge taking-out mechanism and cartridge carrying mechanism (7-1) Cartridge taking-out mechanism (see FIGS. 75 to 150)

The cartridge taking-out mechanism 48 which selectively carries out taking-out operation of disc cartridges 320, 321 accommodated within the accommodating body 62 includes a first movement operation mechanism 420 for carrying out movement operation of the disc cartridge 320 or 321. This first movement operation mechanism 420 is constituted, as shown in FIG. 75, by a first detection lever 129 constituting the first detection member, a second detection lever 128 constituting the second detection member, and a stopper lever 201 constituting the stopper member.

This cartridge taking-out mechanism 48 includes an upper surface plate 133 and a lower surface plate 134 supported in parallel to each other in a manner opposite to the connecting plate 219, and supports, between the upper surface plate 133 and the lower surface plate 134, respective detection levers 129, 128 and the stopper lever 201 so that they can be moved.

Figure 95:
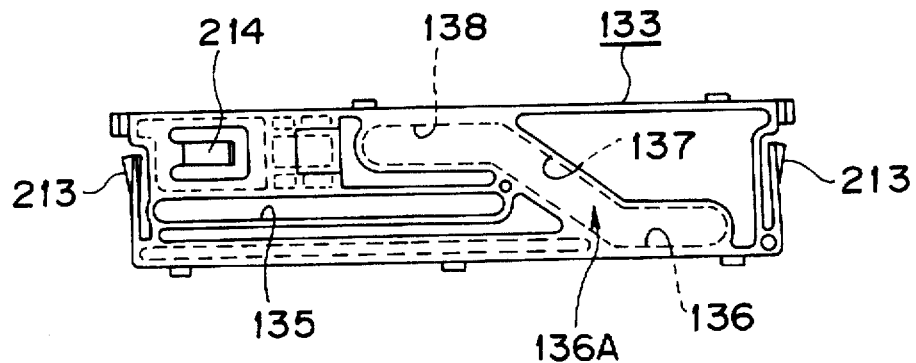
FIG. 95 is a plan view showing upper surface plate constituting cartridge taking-out mechanism.
Figure 96:
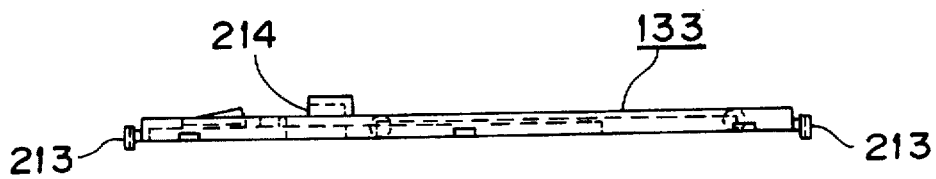
FIG. 96 is a side view of the upper surface plate.
Figure 97:
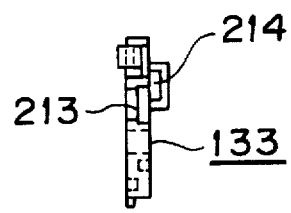
FIG. 97 is a front view of the upper surface plate.
Figure 98:
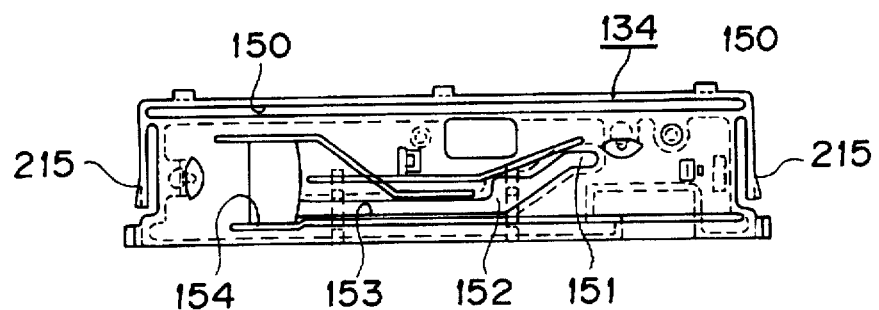
FIG. 98 is a plan view of lower surface plate constituting cartridge taking-out mechanism.

The connecting plate 219 which supports the upper surface plate 133 and the lower surface plate 134 is formed by bending thin metal plate as shown in FIGS. 107 to 110, and supporting pieces 221, 221 for supporting both the forward and backward end sides of the upper surface plate 133 and the lower surface plate 134 are provided at the both ends opposite to each other. The upper surface plate 133 is adapted as shown in FIGS. 95 to 97 so that engagement pawls 213, 213 for holding the connecting plate 219 are provided at the both forward and backward ends and a slide guide groove 135 and a cam groove 136A horizontal portions 136, 138 and an inclined surface portion 137 which connects these horizontal portions 136, 138 are formed extending over the length direction at the principal surface portion. On the other hand, the lower surface plate 134 is similarly adapted as shown in FIGS. 98 to 102 so that engagement pawls 215, 215 for holding with respect to the connecting plate 219 are provided at the both ends before and after (in forward and backward directions), and a slide guide groove 135, and a cam groove 151A composed of horizontal portions 151, 153 and an inclined surface portion 152 which connects these horizontal portions 151, 153 are formed extending over the length direction at the principal portion.

This cartridge taking-out mechanism 48 is attached to the outside surface side of one side wall 41a of the vertical movement guide body 41 as shown in FIG. 17, whereby this taking-out mechanism 48 is disposed at the position opposite to the front surface side where the shutter member 306 or 317 of the disc cartridge 320 or 321 insert ed into the accommodating body 62 is attach ed through the insertion hole 46 of the vertical movement guide body 41 and the opening portion 103 for movement operation of the accommodating body 62.

Further, between the upper surface plate 133 and the lower surface plate 134, a movement block 139 is disposed as shown in FIG. 75. This movement block 139 includes plural guide pieces 208, 209, 212, 140 as shown in FIGS. 91 to 94, and engages these guide pieces 208, 209, 212, 140 with respective slide guide grooves 135, 150, whereby the movement block 139 is supported so that it can be moved in forward and backward directions between the upper surface plate 133 and the lower surface plate 134. This movement block 139 is caused to undergo movement control by microcomputer 112 through drive mechanism (not shown). Moreover, at the movement block 139, there is provided a support shaft 130 for rotatably supporting first and second detection levers 129, 128 and a stopper lever 210 which constitute a detection mechanism to detect insertion attitude or insertion state of disc cartridges 320, 321 caused to undergo accommodating operation into the accommodating body 62 as described below to detect erroneous insertion, and which carry out movement operation of disc cartridges 320, 321.

Figure 79:
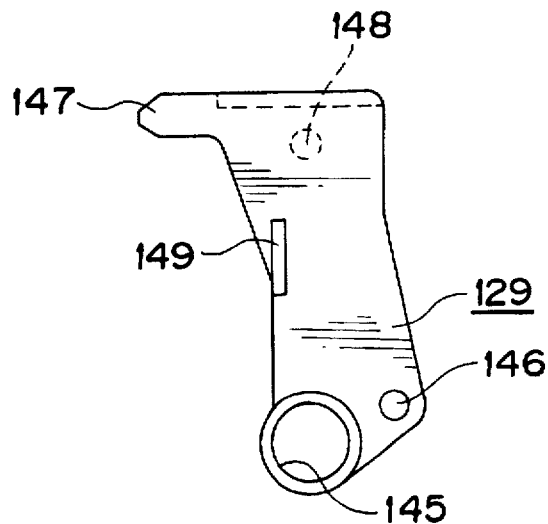
FIG. 79 is a plan view of first detection lever.
Figure 80:
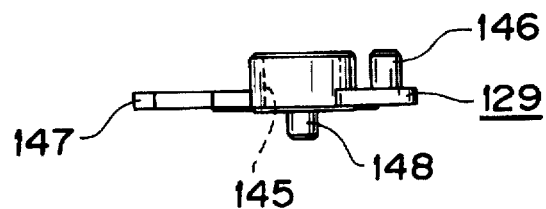
FIG. 80 is a front view showing shape of the first detection lever.
Figure 81:
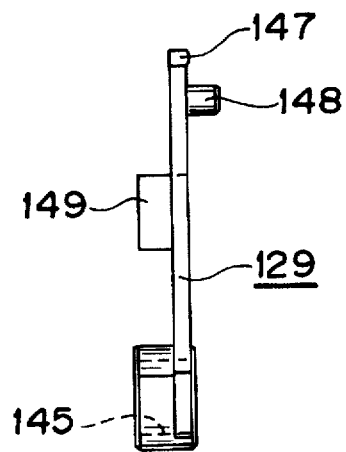
FIG. 81 is a side view of the first detection lever.
Figure 82:
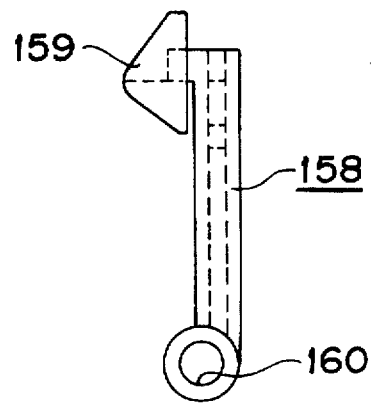
FIG. 82 is a plan view showing second transmission lever.
Figure 83:
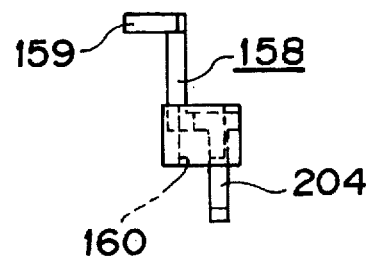
FIG. 83 is a front view showing the second transmission lever.
Figure 84:
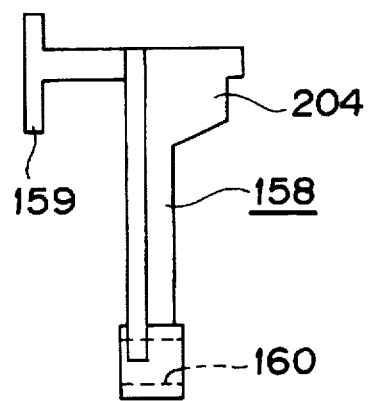
FIG. 84 is a side view showing the second transmission lever.
Figure 85:
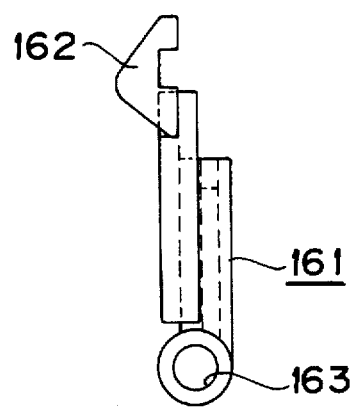
FIG. 85 is a plan view showing first transmission lever.
Figure 86:
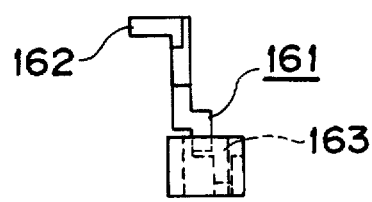
FIG. 86 is a front view showing the first transmission lever.
Figure 87:
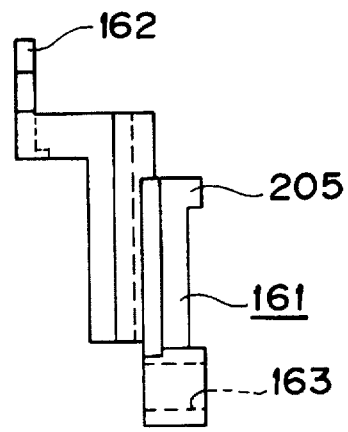
FIG. 87 is a side view showing the first transmission lever.
Figure 88:
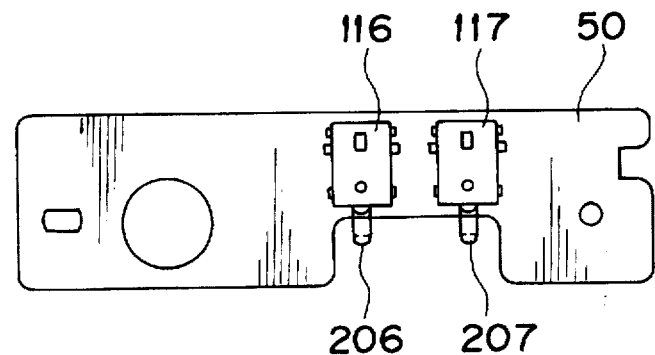
FIG. 88 is a plan view showing attachment state onto base (substrate) of first and second detection switches.
Figure 89:
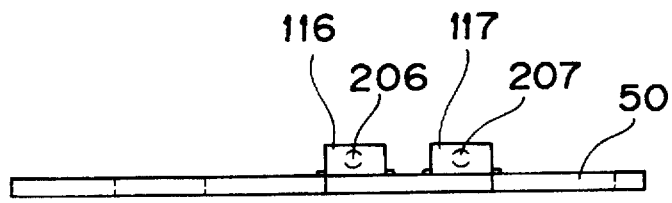
FIG. 89 is a front view showing attachment state onto base of the first and second detection switches.
Figure 90:
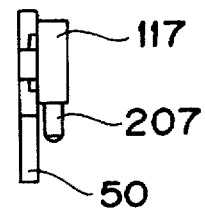
FIG. 90 is a side view showing attachment state onto base of the (first and) second detection switches.
Figure 91:
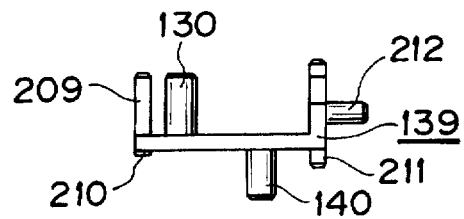
FIG. 91 is a front view showing movement block.
Figure 92:
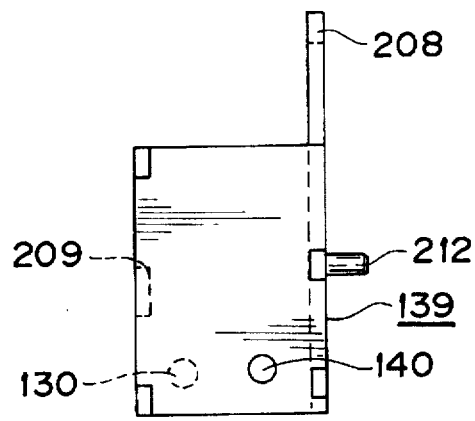
FIG. 92 is a plan view showing the movement block.
Figure 93:
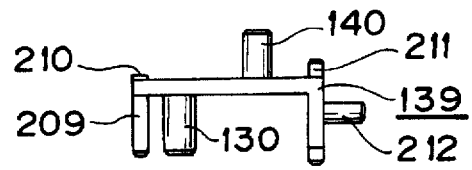
FIG. 93 is a back view showing the movement block.
Figure 94:
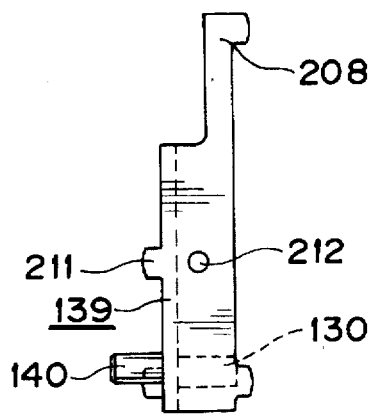
FIG. 94 is a side view showing the movement block.

The first detection lever 129 is adapted as shown in FIGS. 79 to 81 so that a supporting hole 145 is bored at the base end side and an engagement projection 147 is provided at the front end side. Moreover, a pressing piece 149 is provided at the upper surface side of the first detection lever 129, and an engagement pin 148 adapted to be engaged with the cam groove 151A of the lower surface plate 134 is provided at the lower surface side. This first detection lever 129 is attached in the state where the engagement projection 147 is directed toward the inward side of the vertical movement guide body 41 and the supporting hole 145 is supported by the support shaft 130 of the movement block 139. Further, the first detection lever 129 is rotated with the support shaft 130 being as center. It is to be noted that the first detection lever 129 is supported with the front end side thereof being directed backwardly of the recording/reproduction unit 114.

Figure 76:
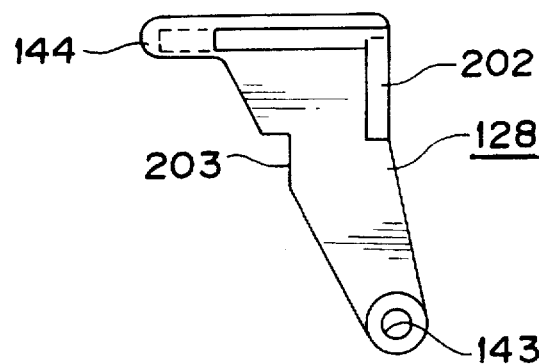
FIG. 76 is a plan view showing second detection lever.
Figure 77:
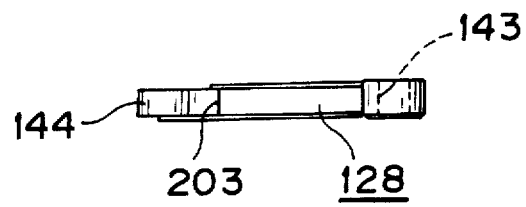
FIG. 77 is a front view of the second detection lever.
Figure 78:
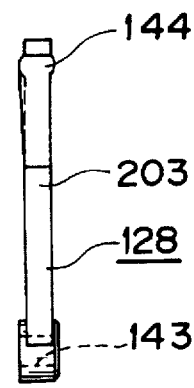
FIG. 78 is a side view of the second detection lever.

On the other hand, the second detection lever 128 is adapted as shown in FIGS. 76 to 78 so that a supporting hole 143 is bored at the base end side thereof and a contact projection 144 is provided at the front-end side thereof. Moreover, at the side surface portion of the second detection lever 128, a pressed portion 203 adapted to be pressed by the pressing piece 149 of the first detection lever 129 is provided. This second detection lever 128 is attached in the state where the supporting hole 143 is supported by the support shaft 130 of the movement block 139 in such manner that the contact projection 144 is directed toward the inward side of the vertical movement guide body 41. Further, the second detection lever 128 is rotated with the support shaft 130 for supporting the first detection lever 129 being as center. This second detection lever 128 is supported by the support shaft 130 in the state caused to overlap with the first detection lever 129 in such a manner that the front end side thereof is directed toward the backward of the recording/reproduction unit 114 side. In addition, the contact projection 144 of the second detection lever 128 and the engagement projection 147 of the first detection lever 129 overlap with each other in upper and lower directions.

The operation of the first detection lever 129 and the second detection lever 128 will now be described. When the first detection lever 129 is rotated in a direction to withdraw the engagement projection 147 from the vertical movement guide body 41, the pressing piece 149 of the first detection lever 129 presses the pressed portion 203 of the second detection lever 128 to rotate the second detection lever 128 following the first detection lever 129. Further, when the second detection lever 128 is rotated in a direction to withdraw the contact projection 144 from the vertical movement guide body 41, the second detection lever 128 allows the pressed portion 203 to be away from the pressing piece 149. As a result, the second detection lever 128 is rotated independently of the first detection lever 129.

Moreover, the stopper lever 201 is as shown in FIG. 134 such that a supporting portion 141 is provided at the base end side and a stopper piece 49 in a hook form is provided at the front end side. At this stopper lever 201, an engagement pin 142 adapted to be engaged with the cam groove 136A of the upper surface plate 133 is projected. This stopper lever 201 is adapted so that the supporting portion 141 is supported by the support shaft 130 of the movement block 139 in the state where the stopper piece 49 is directed toward the inward side of the vertical movement guide body 41. Further, this stopper lever 120 is also rotated with the support shaft 130 being as center similarly to the first and second detection levers 129, 128. The stopper piece 49 provided at the stopper lever 201 is located at the backward side with respect to the engagement projection 147 and the contact piece 144 of the first and second detection levers 129, 128, i.e., at the position far distant or away from the support shaft 130 in the state where the stopper lever 201 is supported by the support shaft 130.

Figure 111:
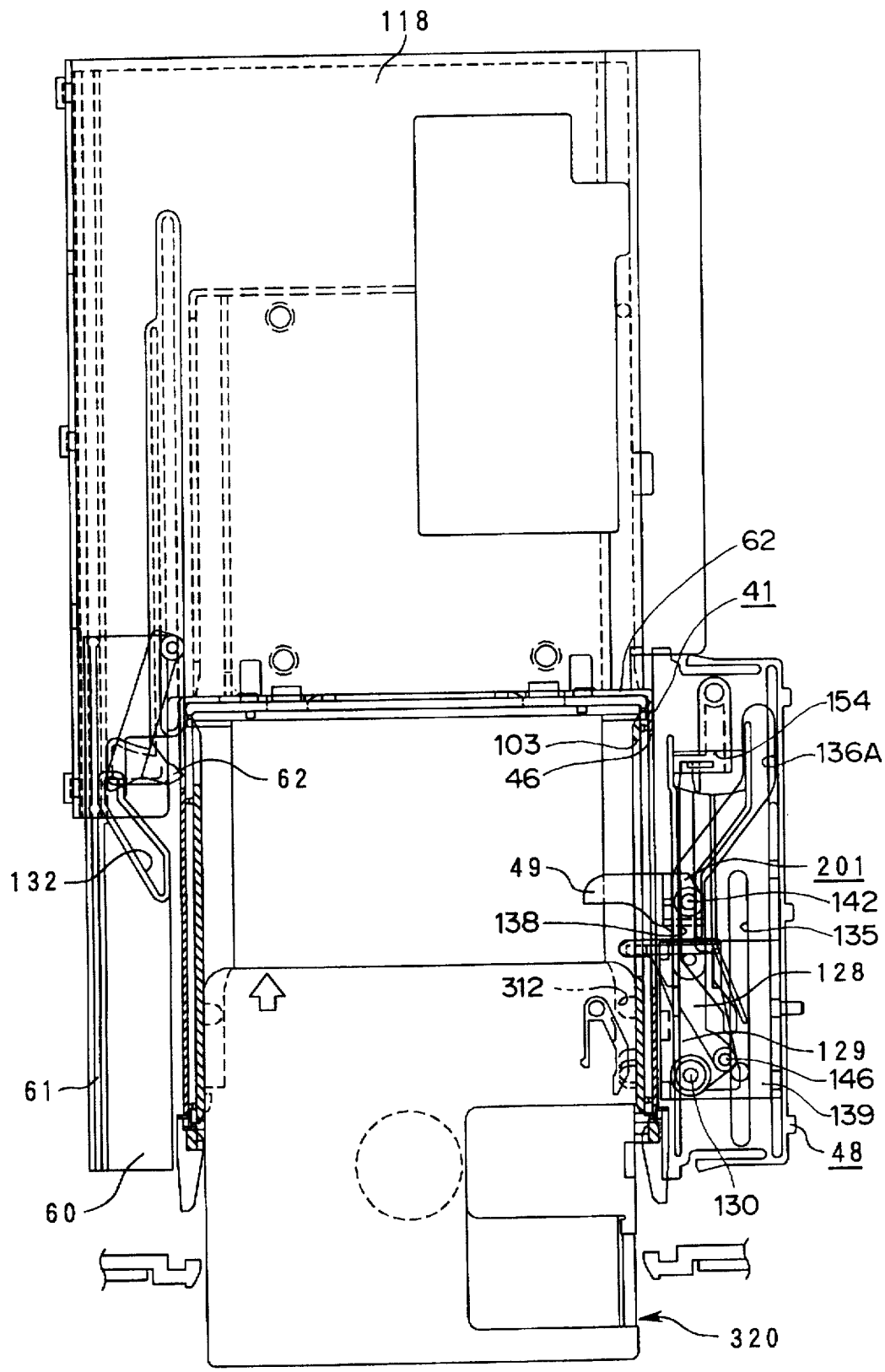
FIG. 111 is a plan view showing the state of first and second detection levers when insertion operation into the accommodating body of disc cartridge is started.
Figure 112:
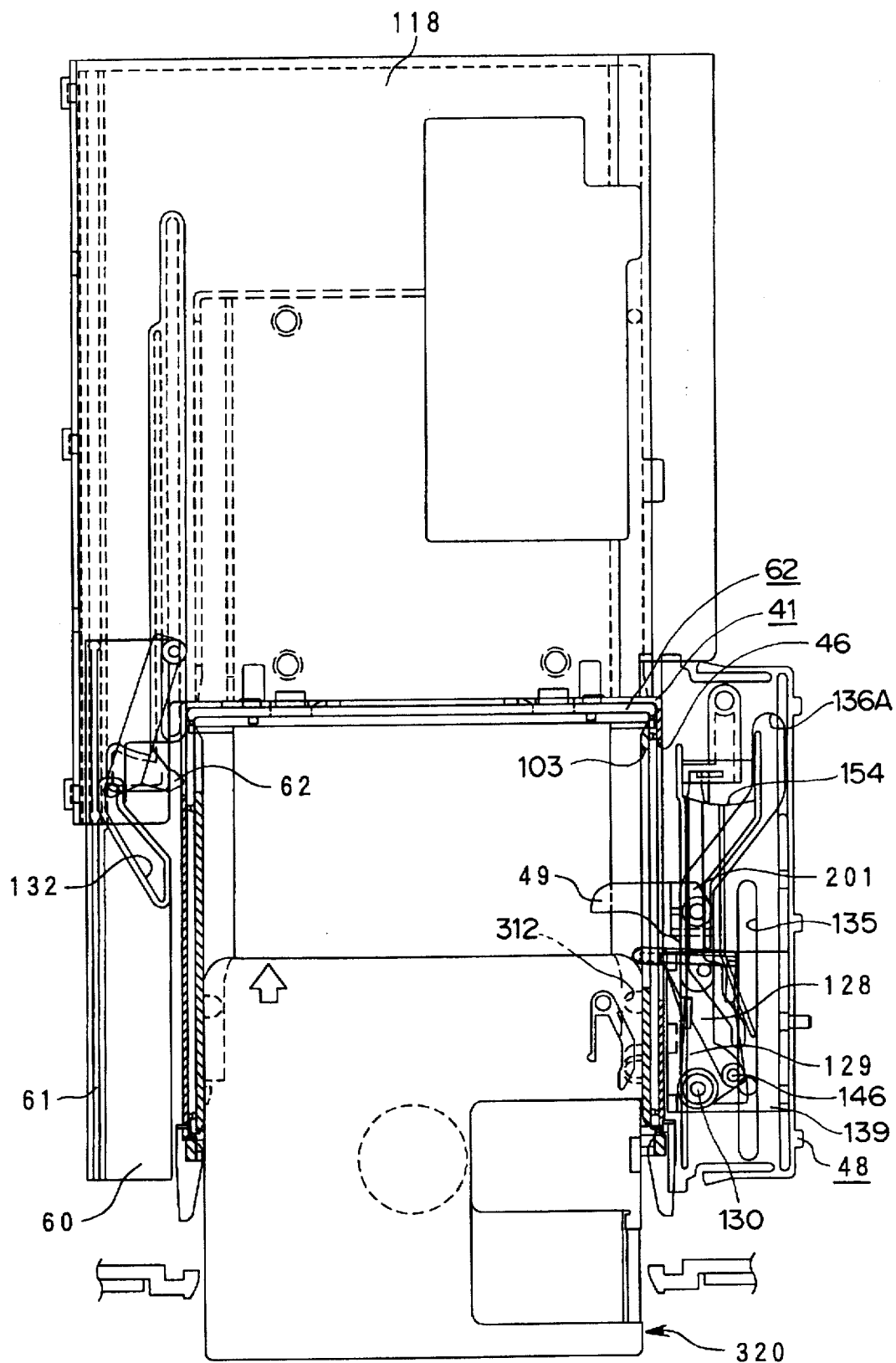
FIG. 112 is a plan view showing the state where disc cartridge is in contact with first and second detection levers.
Figure 113:
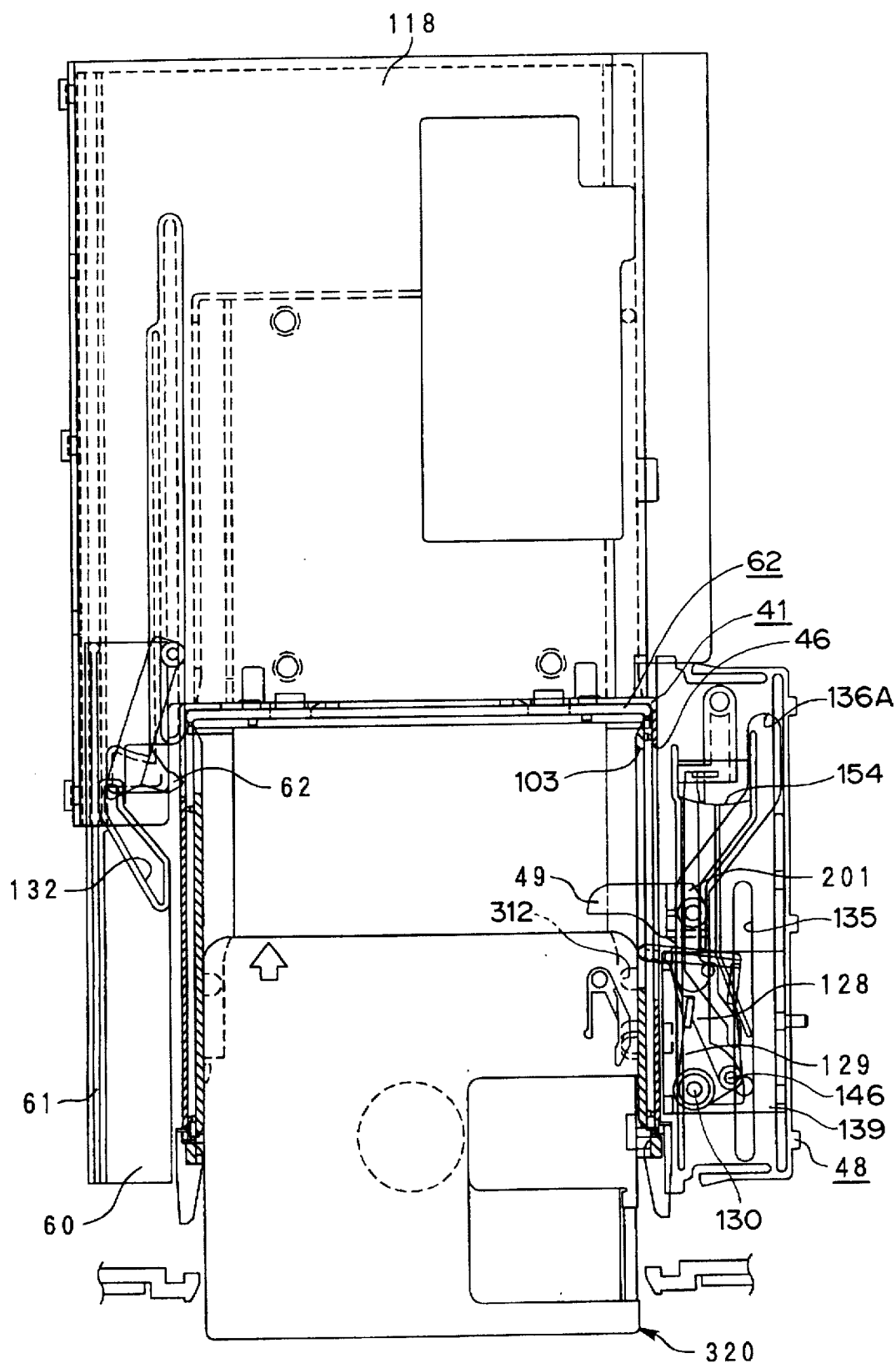
FIG. 113 is a plan view showing the state where disc cartridge is caused to undergo insertion operation into accommodating body so that first and second detection levers are rotated.

Further, when the movement block 139 is caused to undergo movement operation in forward and backward directions, the first and second detection levers 129, 128 and the stopper lever 201 are moved following the movement block 139 in the state where they maintain mutual positional relationship. At this time, since the first detection lever 129 allows the engagement pin 148 to be engaged with the cam groove 151A of the lower surface plate 134, the first detection lever 129 is moved toward the front side as shown in FIG. 111. When the first detection lever 129 engages the engagement pin 148 with the horizontal portion 151 of the front side of the cam groove 151A, it withdraws the engagement projection 147 toward the outward side from within the vertical movement guide body 41. At this time, the engagement projection 147 is moved toward the front side with respect to the front end edge of the insertion hole 46 of the vertical movement guide body 41. In addition, at this time, the second detection lever 128 is rotated following the first detection lever 129.

When the first detection lever 129 is located at the intermediate position which is the initial position as shown in FIG. 111, it allows the engagement pin 148 to be located within the cut portion 152a in which a portion of the cam groove 151A corresponding to the inclined surface portion 152 of the cam groove 151A is caused to be broad in width so that it is engaged therewith. Further, the first detection lever 129 allows the engagement projection 147 to be admitted into the vertical movement guide body 41, and can be rotated in a direction to withdraw the engagement projection 147 within the range where the engagement pin 148 can be moved within the cut portion 152a of the cam groove 151A. Also at this time, when the first detection lever 129 is rotated in a direction to withdraw the engagement projection 147, the second detection lever 128 is rotated following the first detection lever 129.

Moreover, when the first detection lever 129 is moved toward the backward side with respect to the initial position shown in FIG. 111 as shown in FIGS. 114 to 118, it engages the engagement pin 148 with the horizontal portion 153 positioned at the backward side of the cam groove 151A, and allows the engagement projection 147 to be admitted into the vertical movement guide body 41 through the insertion hole 46.

Figure 119:
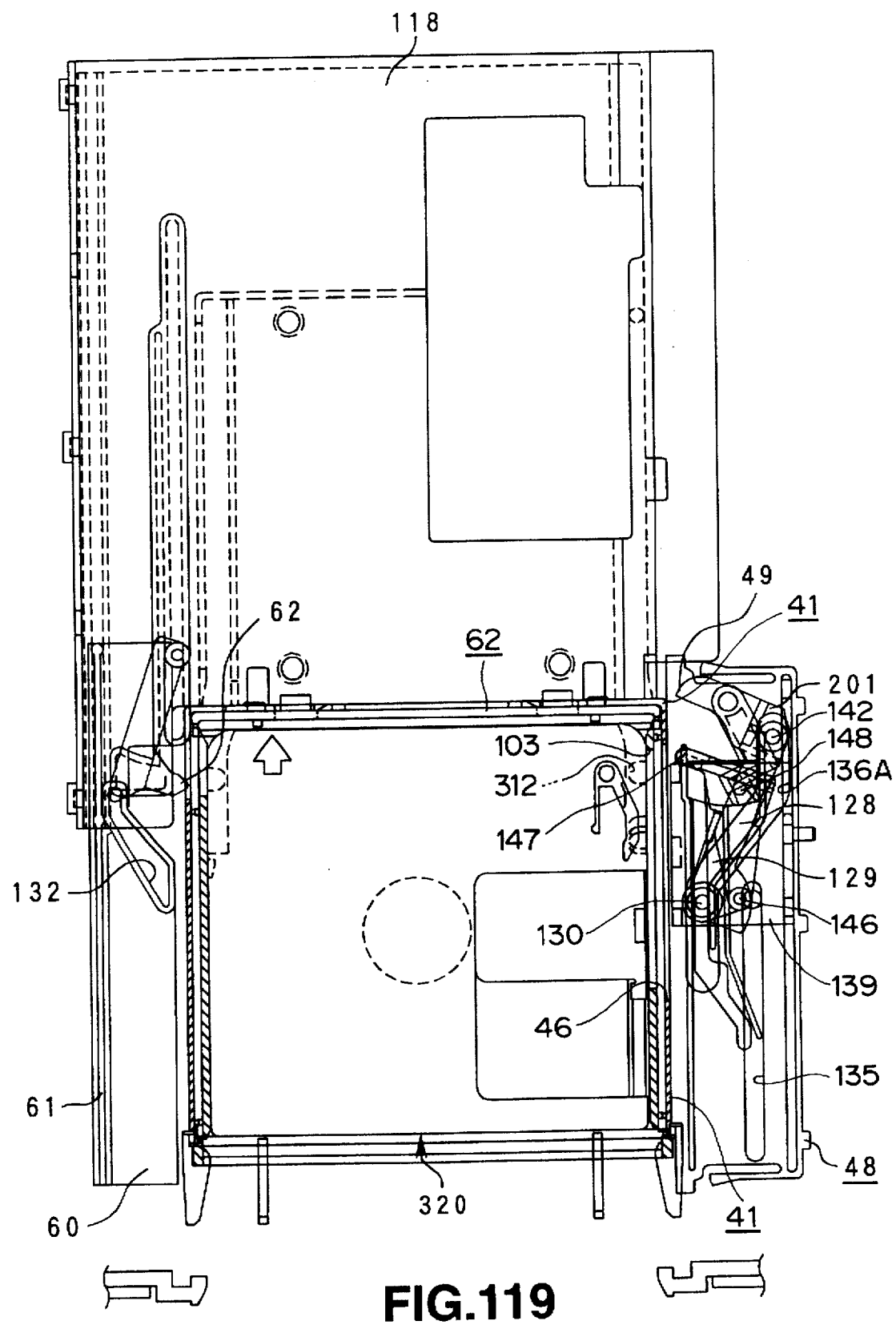
FIG. 119 is a plan view showing the state where accommodation into the accommodating body of the disc cartridge is completed and the first and second detection levers are withdrawn by operation lever.
Figure 120:
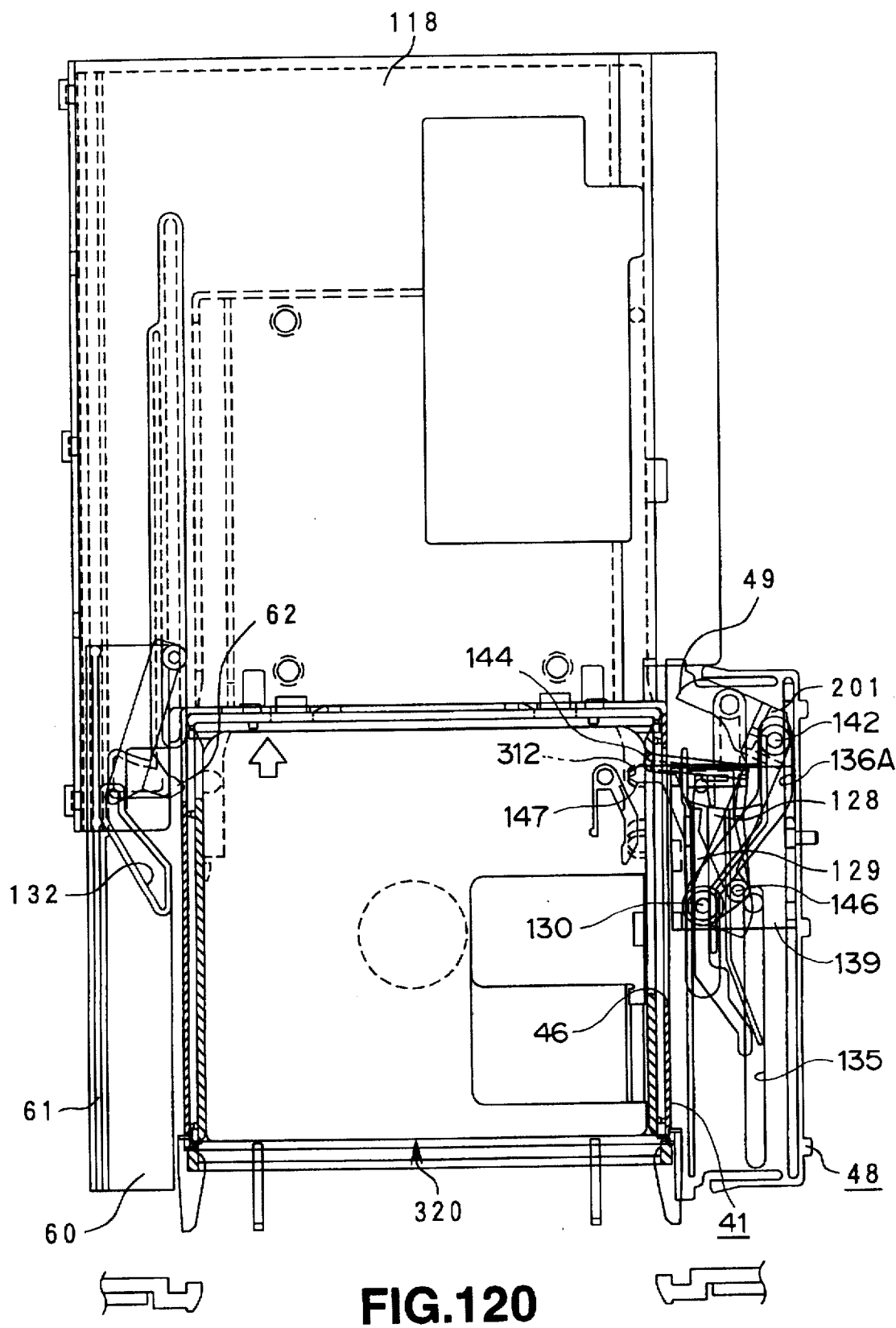

Further, when the engagement pin 148 is moved toward the backward side until it reaches the backward end portion of the cam groove 151A as shown in FIG. 119, the first detection lever 129 allows the engagement pin 148 to be admitted into a through-hole 154 connected to the backward end portion of the cam groove 151A, and can be rotated extending over the position where the engagement projection 147 is caused to be admitted into the vertical movement guide body 41 and the position where the engagement projection 147 is caused to be withdrawn from the vertical movement guide body 41.

Moreover, at the surface sides opposite to each other of the lower surface plate 134 and the upper surface plate 133, support shafts 155, 131 are projected in such a manner that they are coaxial in the state opposite to each other as shown in FIG. 75. The operation lever 127 is rotatably attached to these support shafts 155, 131. This operation lever 127 is caused to undergo rotation operation as the result of the fact that drive mechanism (not shown) is driven by a drive control signal from the microcomputer 112. This operation lever 127 is adapted as shown in FIGS. 103 to 106 so that a supporting hole 156 is bored at the base end side, and respective support shafts 155, 131 are caused to be inserted through the supporting hole 156. This operation lever 127 is adapted so that an engagement recessed portion 157 opened toward the direction of the front end is formed at the front end side, and this front end side is caused to be directed to the front side.

Figure 114:
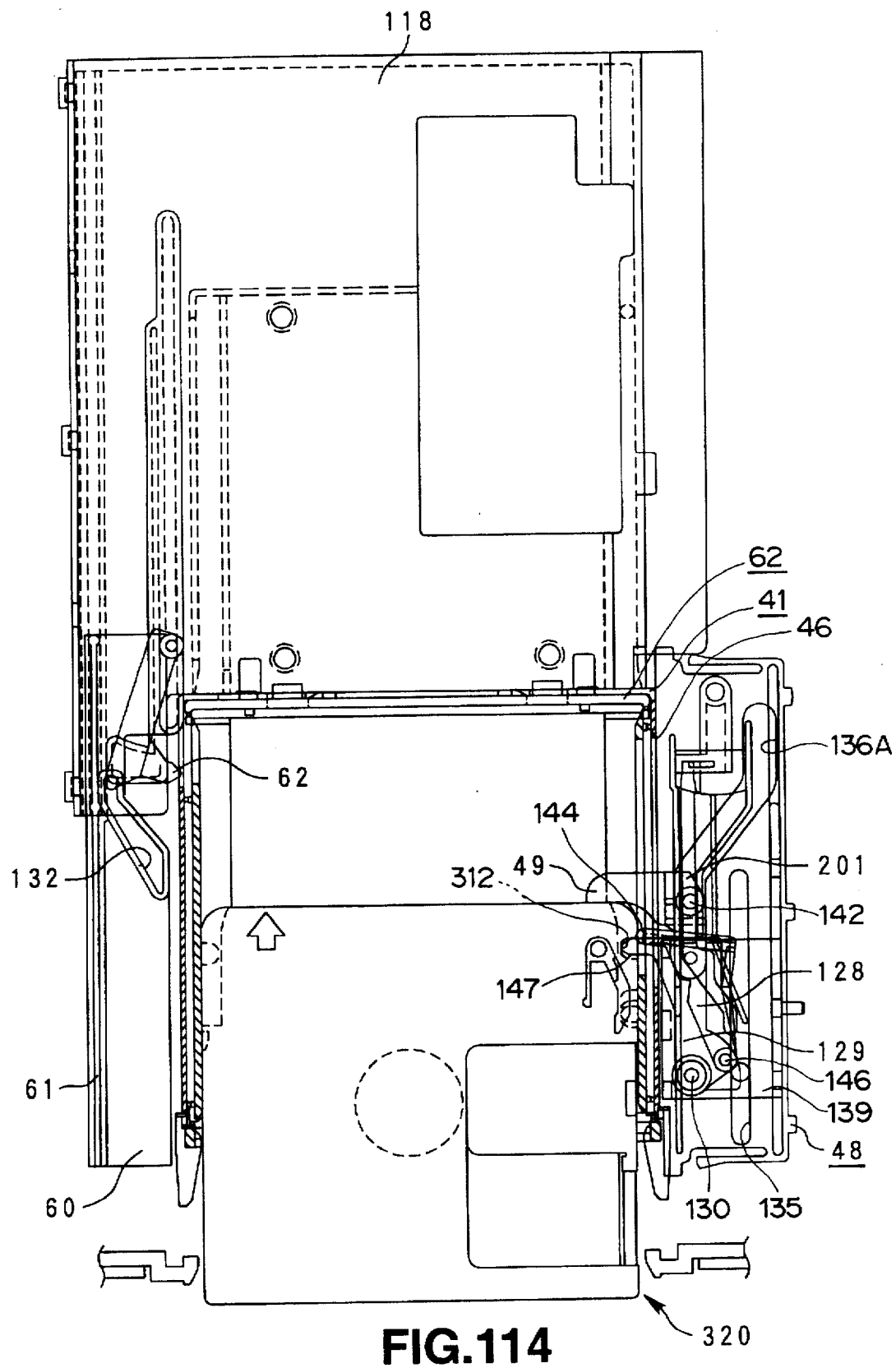
FIG. 114 is a plan view showing the state where first detection lever is engaged with engagement recessed portion of the disc cartridge.

When the engagement pin 148 is admitted into the through-hole 154 as shown in FIG. 114, the first detection lever 129 allows the engagement pin 148 to be admitted into the engagement recessed portion 157 of the operation lever 127. Namely, at this time, the first detection lever 129 is caused to undergo rotation operation through the operation lever 127 as the result of the fact that the drive mechanism is driven in accordance with a drive control signal from the microcomputer 112.

Figure 115:
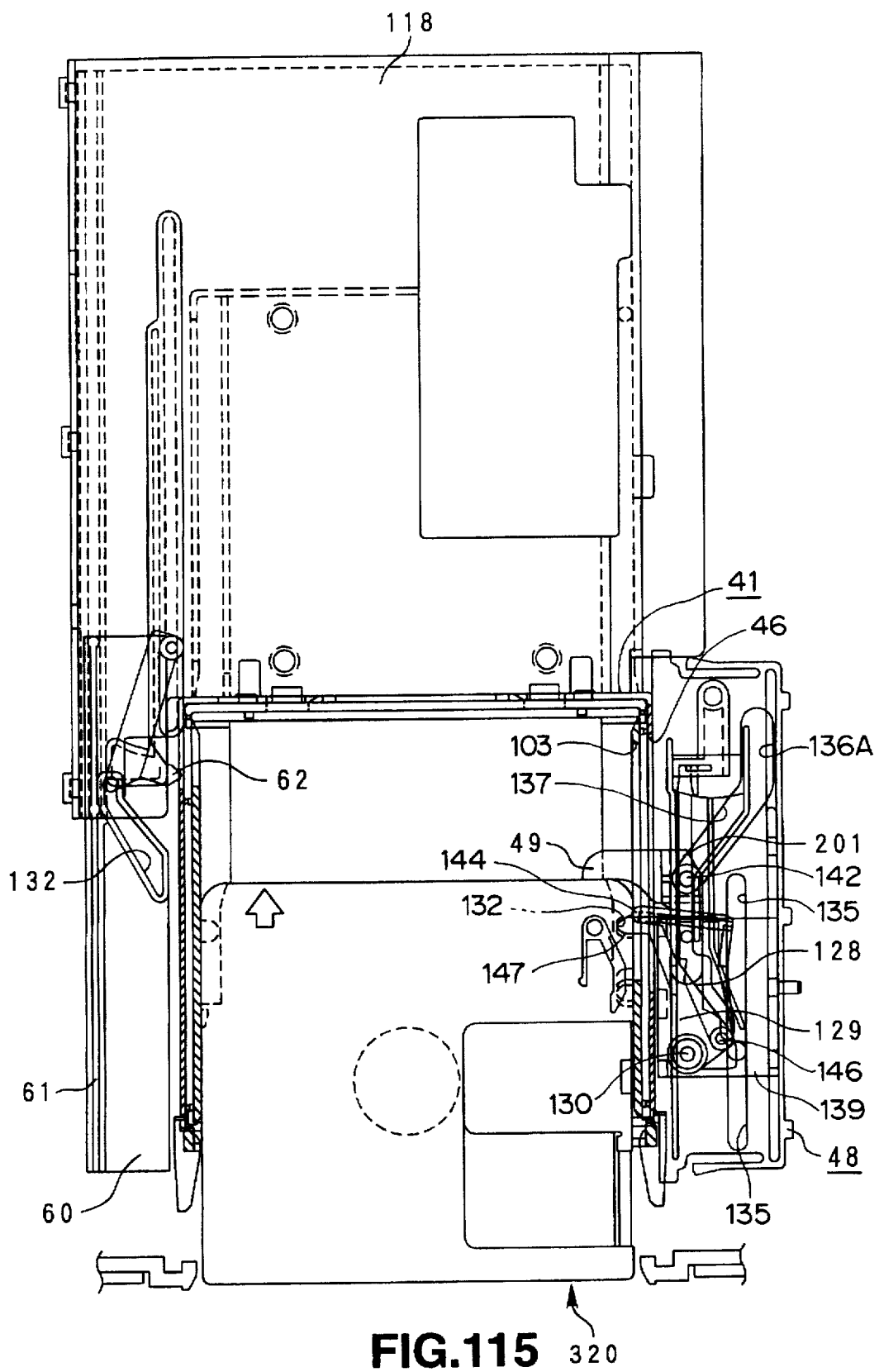
FIG. 115 is a plan view showing the state where disc cartridge is caused to undergo movement operation into the accommodating body.

Moreover, since the stopper lever 201 engages the engagement pin 142 with the cam groove 136A of the upper surface plate 133, it is moved toward the front side as shown in FIG. 115. When the stopper lever 201 engages the engagement pin 142 with the horizontal portion 138 of the front side of the cam groove 136A, it allows the stopper piece 49 to be admitted into the vertical movement guide body 41. At this time, the stopper piece 49 is moved to the position in the vicinity of the front end edge of the insertion hole 46 of the vertical movement body 41.

When the stopper lever 201 is located at the intermediate portion which is the initial position as shown in FIG. 115, it still remains to engage the engagement pin 142 with the horizontal portion 138 of the front side of the cam groove 136A to allow the stopper piece 49 to be admitted into the vertical movement guide body 41 through the insertion hole 46.

Figure 116:
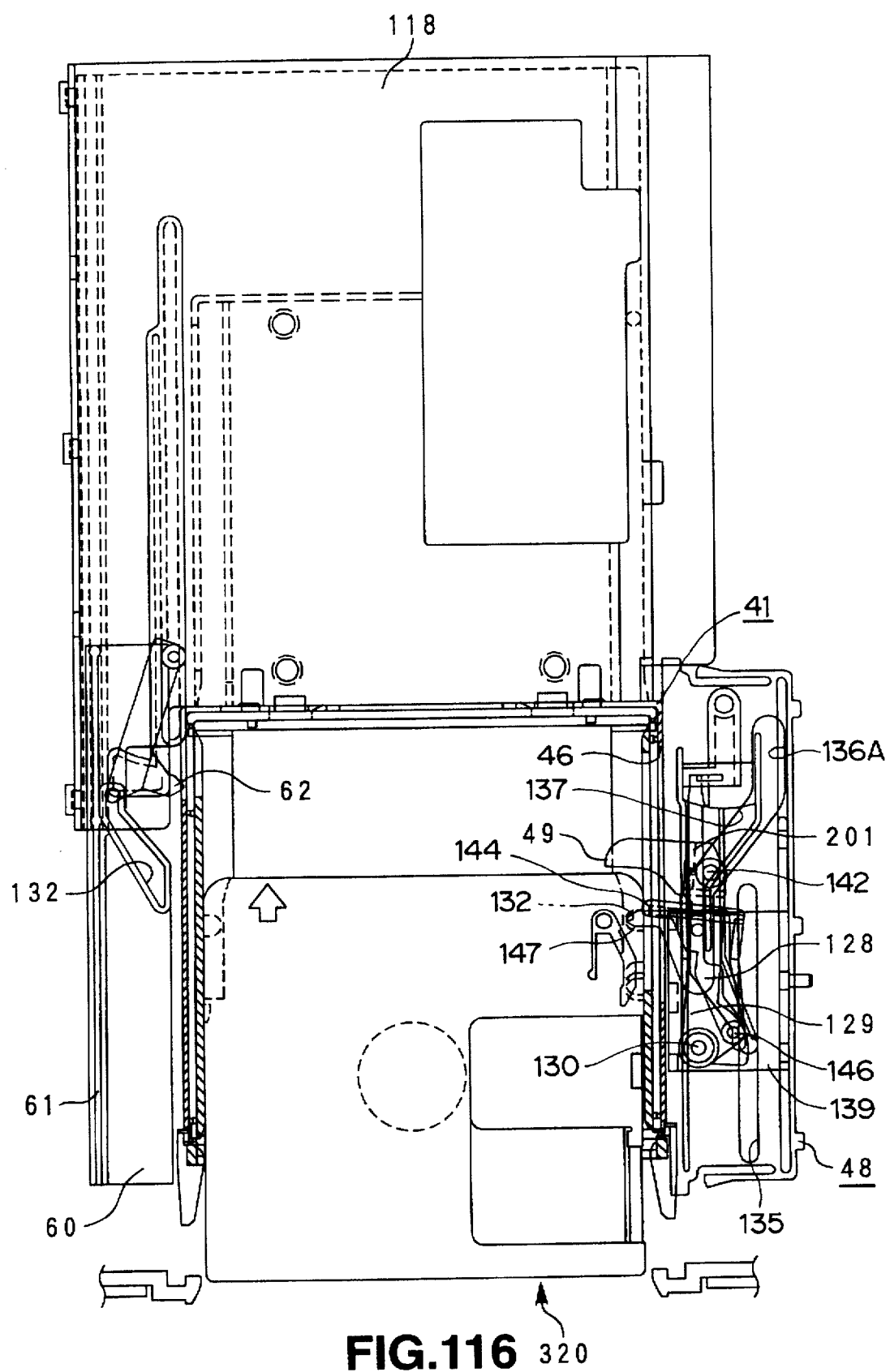
FIG. 116 is a plan view showing the state where disc cartridge is moved into the accommodating body so that second detection lever begins withdrawing from the accommodating body.
Figure 117:
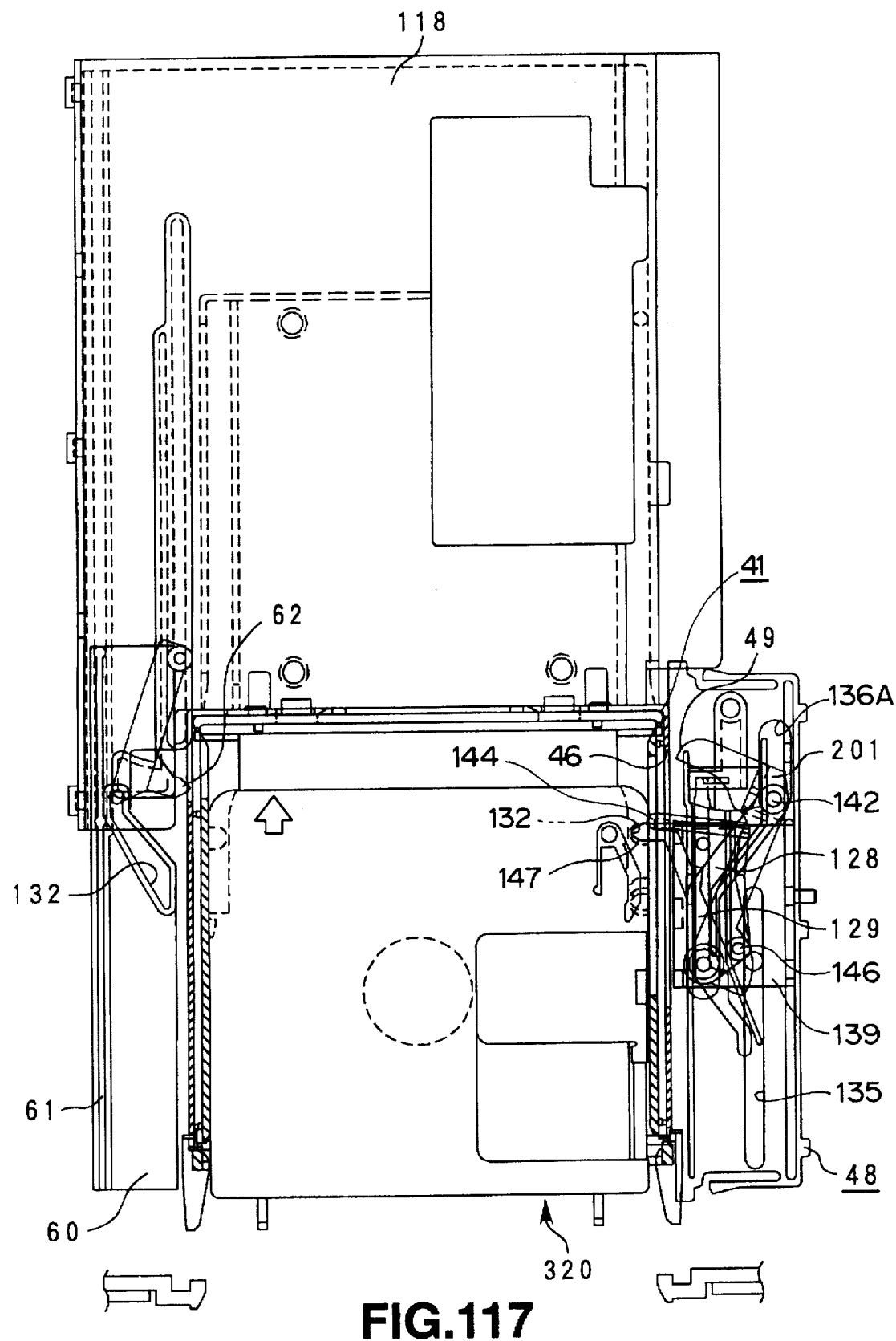
FIG. 117 is a plan view showing the state where first detection lever moves disc cartridge into accommodating body so that second detection lever is withdrawn from the accommodating body.
Figure 118:
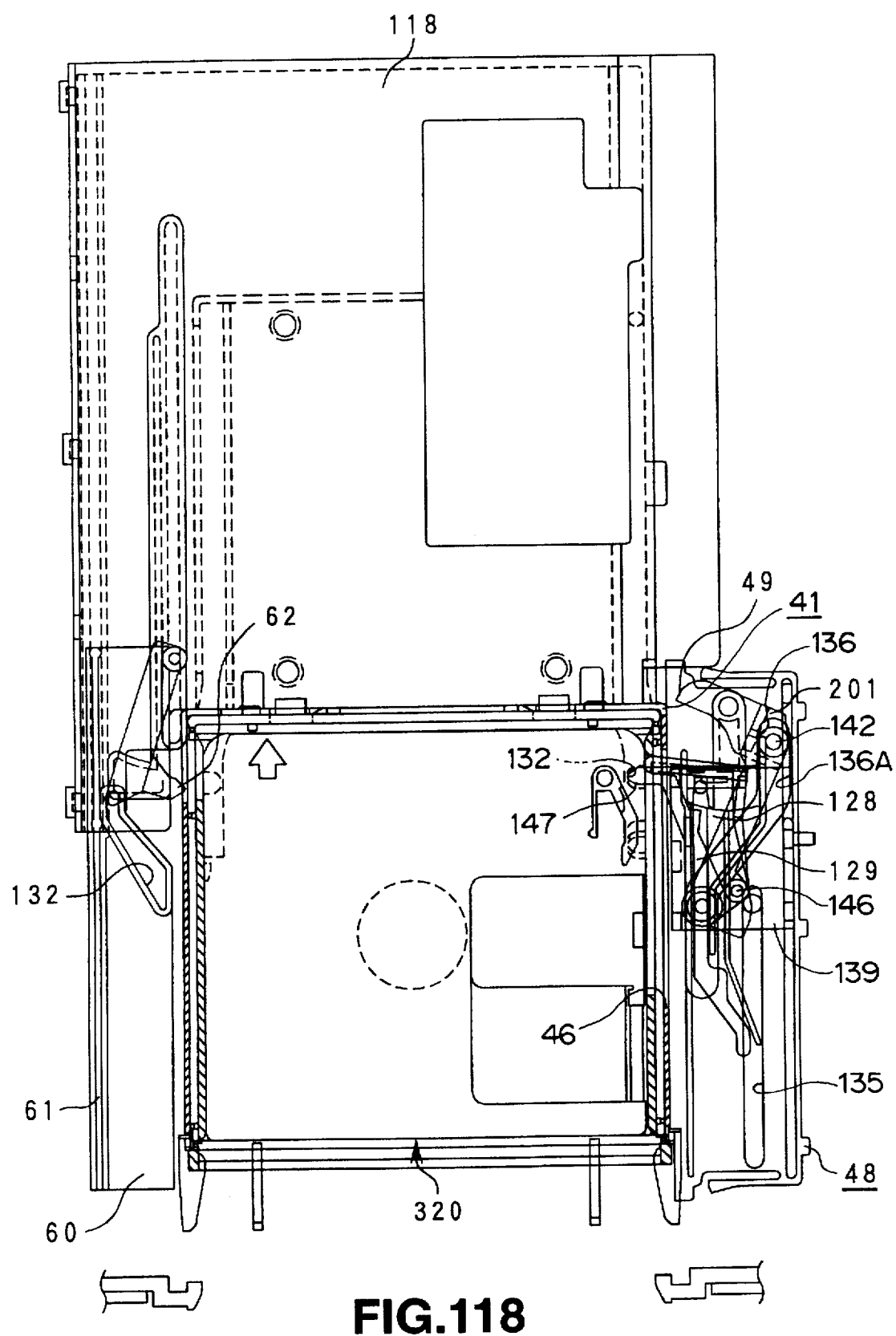
FIG. 118 is a plan view showing the state where disc cartridge is accommodated into accommodating body.

When the stopper lever 201 is moved to the position closer to the backward side with respect to the initial position as shown in FIGS. 116–118, it is rotated as the result of the fact that the engagement pin 142 is caused to be engaged with the horizontal portion 136 of the backward side via the inclined portion 137 which is the middle portion of the cam groove 136A to withdraw the stopper piece 49 from within the vertical movement guide body 41 through the insertion hole 46. At this time, the stopper piece 49 is moved to the position closer to the backward side with respect to the back end edge of the insertion hole 46 of the vertical movement guide body 41.

This cartridge taking-out mechanism 48 is caused to undergo an operation to draw out, from within the accommodating body 62, any one of disc cartridges 320, 321 of which front surface side is opposed of the disc cartridges 320, 321 accommodated within the accommodating body 62, or is caused to undergo to draw back the drawn out disc cartridges 320, 321 into the accommodating body 62 as the result of the fact that the vertical movement operation mechanism 401 carries out vertical movement of the accommodating body 62.

Namely, the first detection lever 129 is adapted so that it is admitting the engagement projection 147 with respect to the inside of the accommodating body 62 through opening portion 103 for movement operation, the first detection lever 129 is engaged with the engagement recessed portion 312 of the disc cartridges 320, 321 within the accommodating body 62 through the opening portion 103 for movement operation provided at the accommodating body 62 to allow the disc cartridges 320, 321 to undergo movement operation in forward and backward directions.

Figure 124:
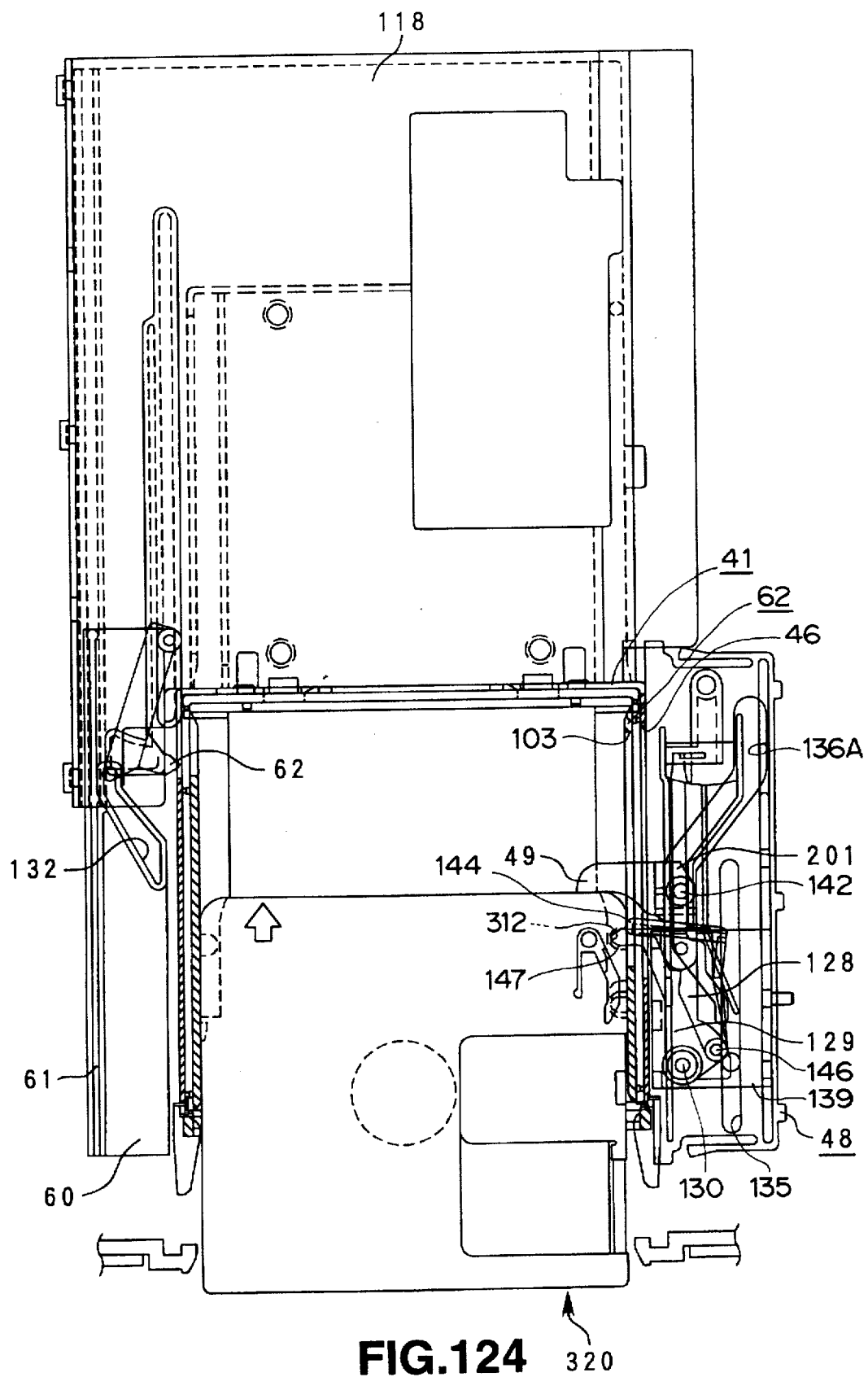
Figure 125:
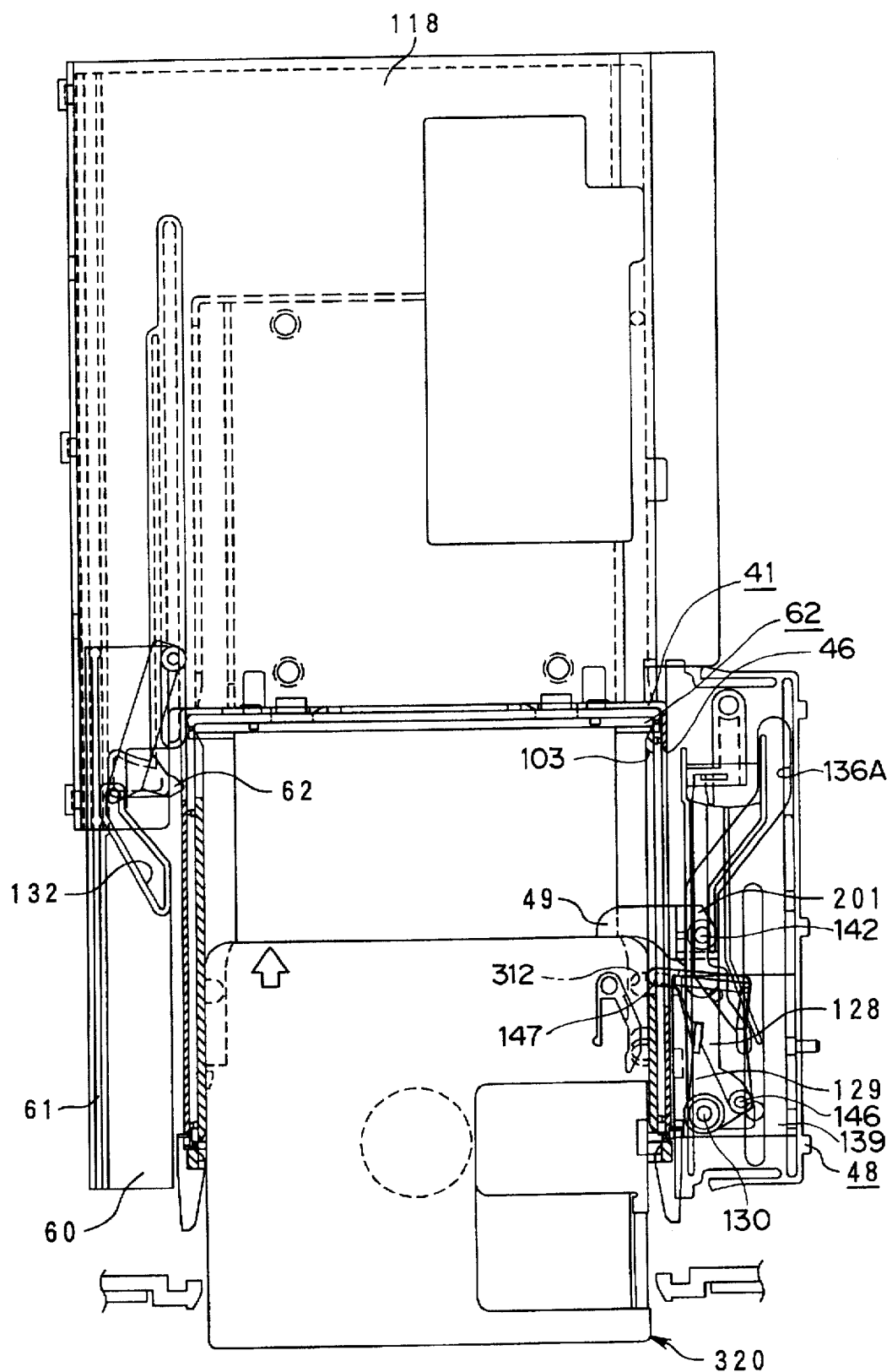
Figure 126:
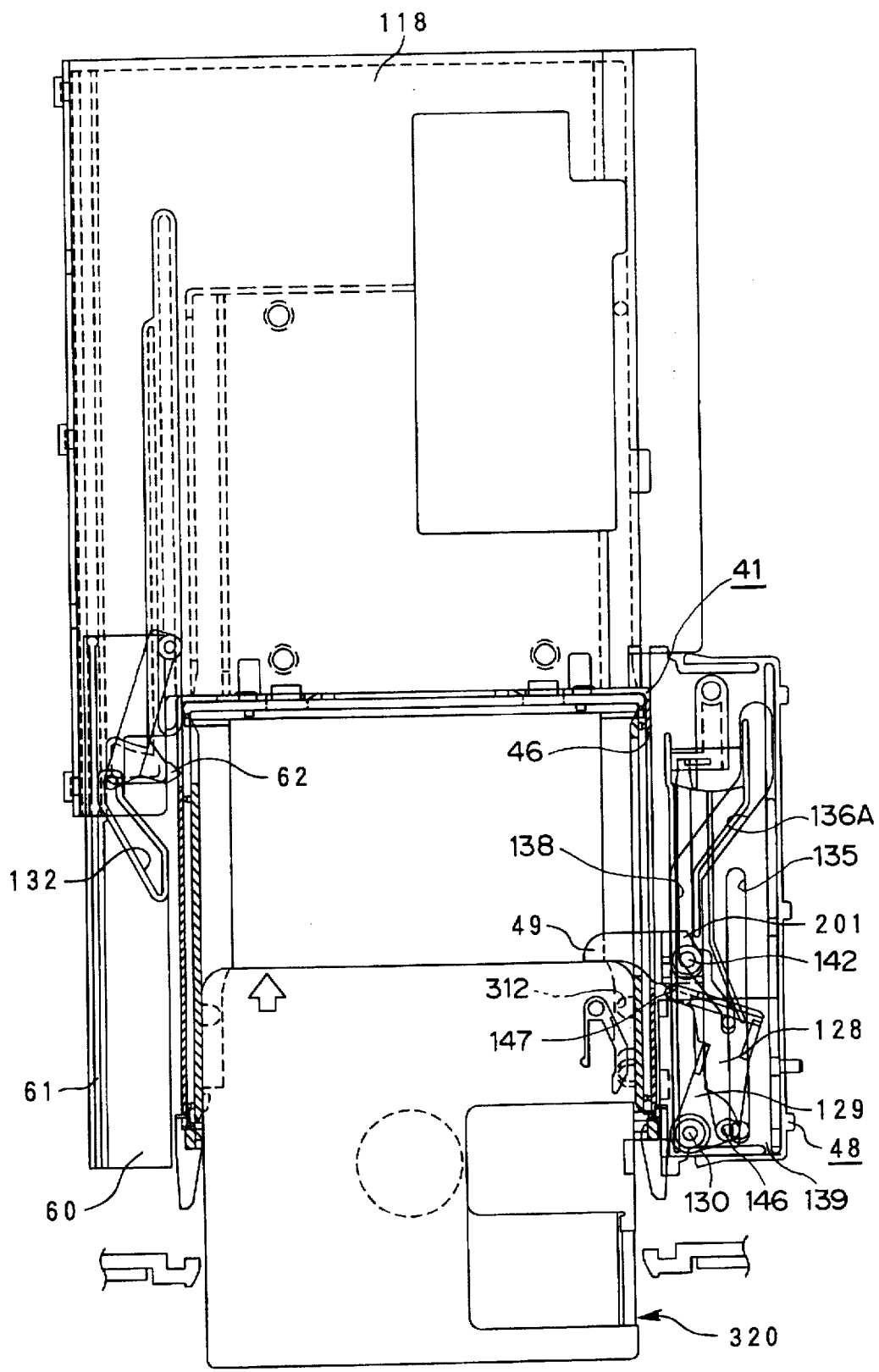
Figure 127:
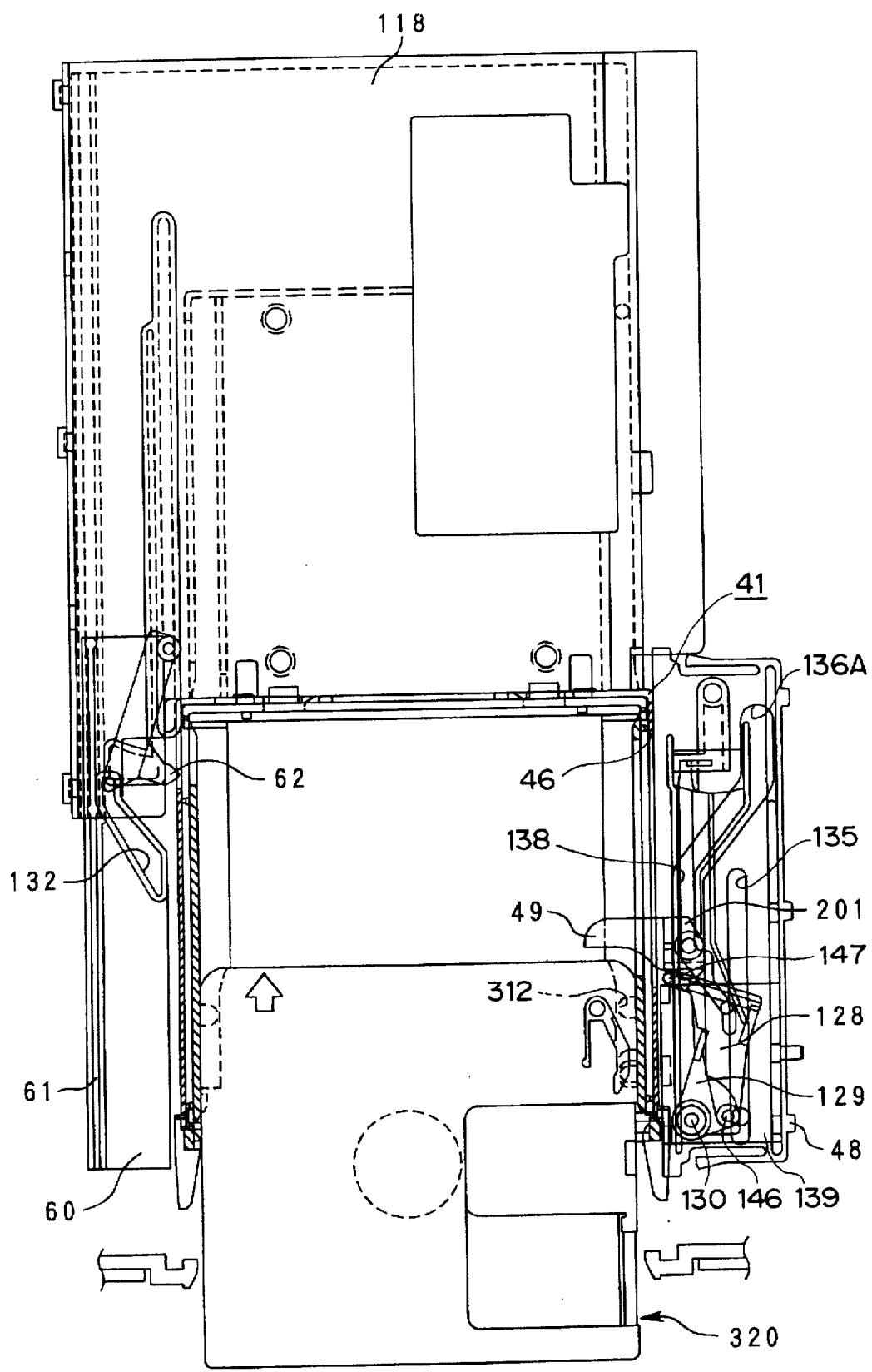
Figure 128:
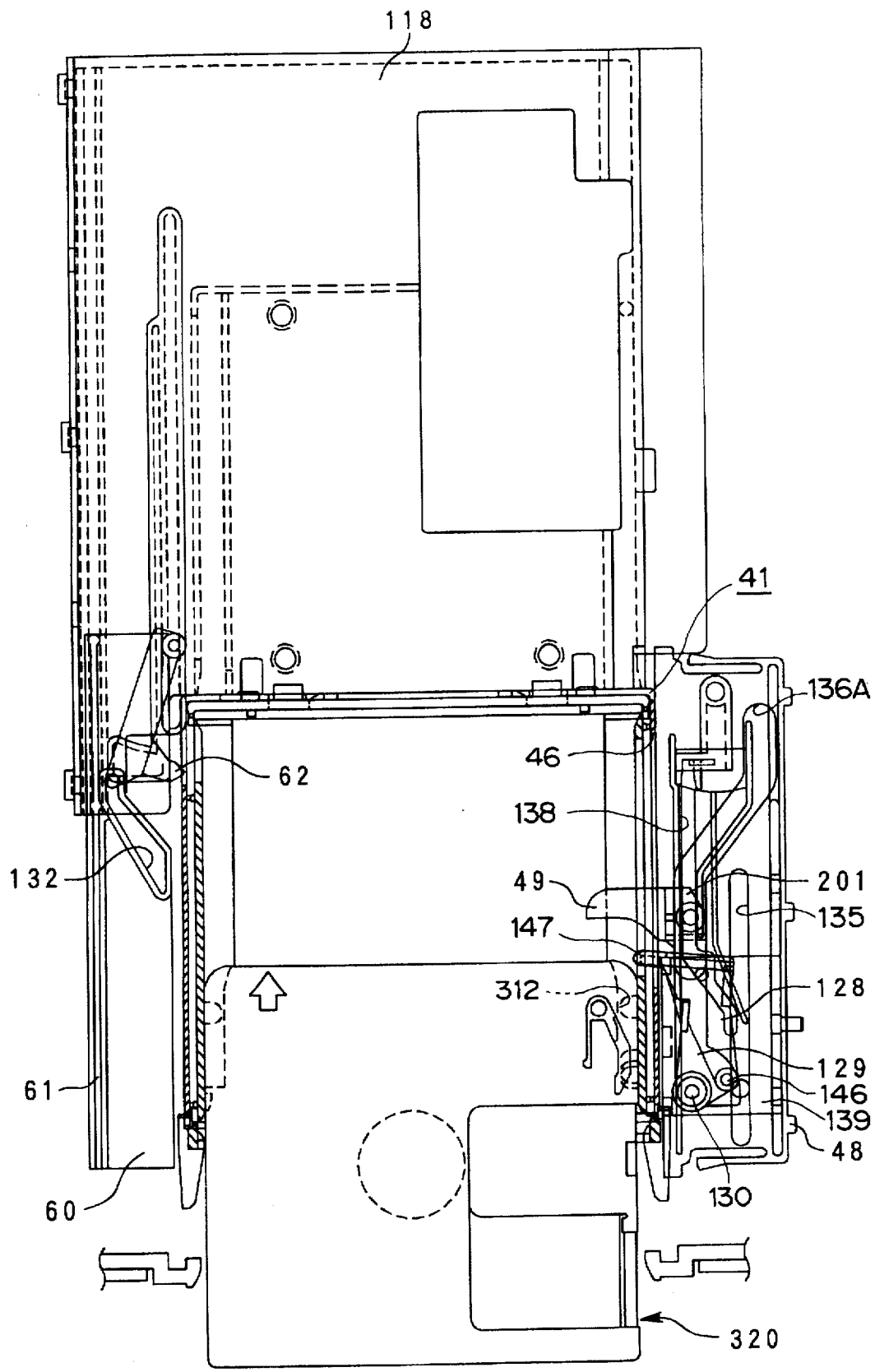
Figure 129:
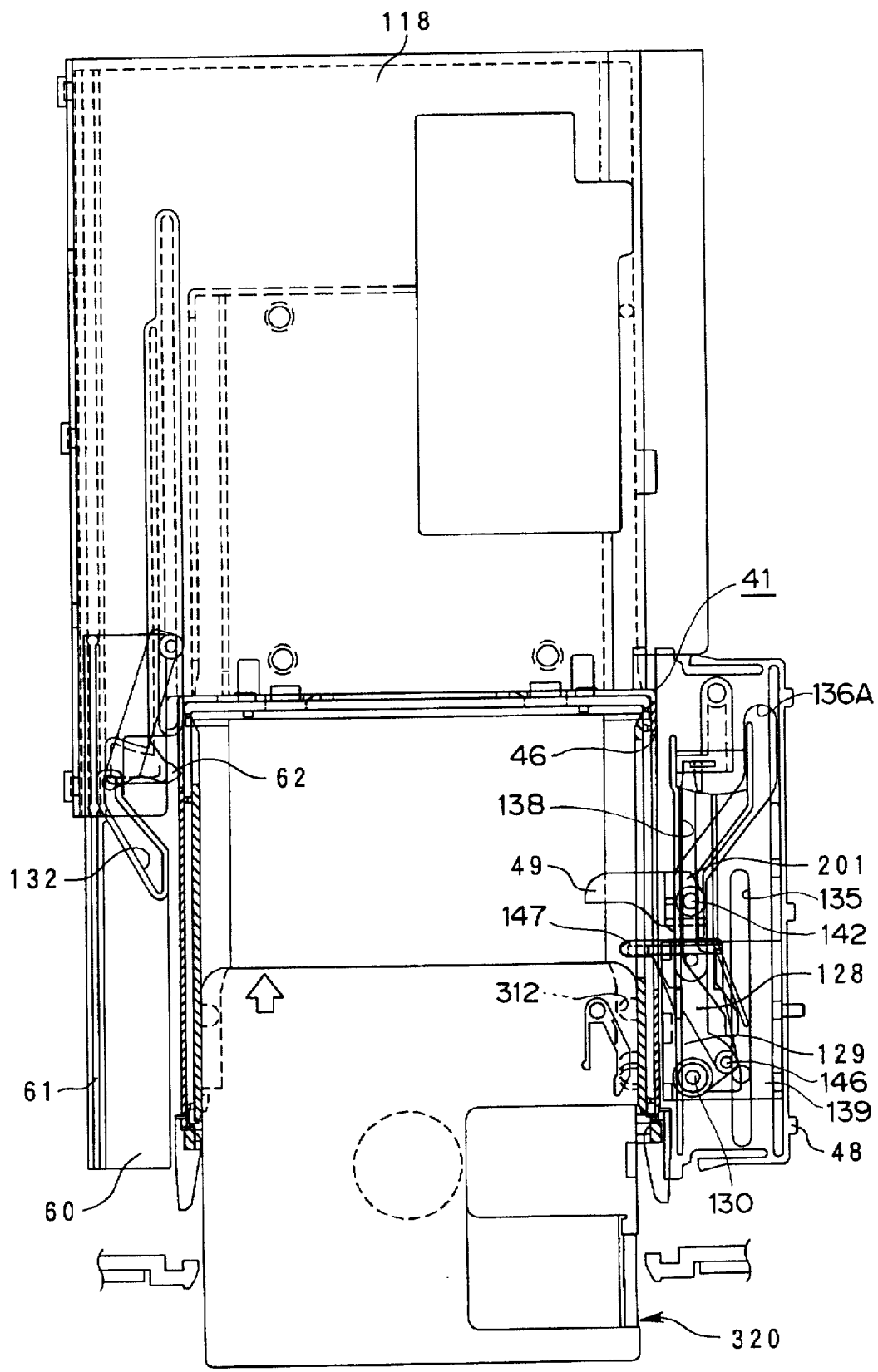

Further, when the stopper lever 201 is admitting the stopper piece 49 with respect to the inside of the accommodating body 62 through the opening portion 103 for movement operation as shown in FIG. 124, it allows the stopper piece 49 to be opposite to one side surface of the insertion direction side with respect to the accommodating body 62 of the disc cartridges 320, 321 held by the accommodating body 62. Moreover, when the stopper lever 201 is moved toward the front side in synchronism with the first detection lever 129, it presses one side surface of the disc cartridges 320, 321 toward the front side to allow the disc cartridges 320, 321 to undergo movement operation toward the front and outward side of the accommodating body 62.

Figure 108:
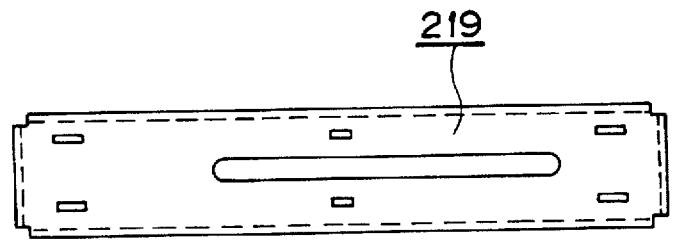
FIG. 108 is a side view of the connecting plate.
Figure 109:
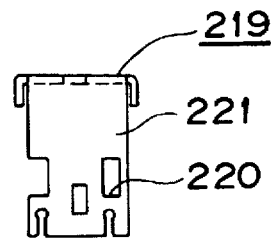
FIG. 109 is a front view of the connecting plate.
Figure 110:
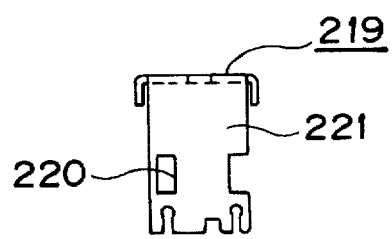
FIG. 110 is a back view of the connecting plate.

When the engagement projection 147 reaches the front end portion of the opening portion 103 for movement operation while allowing the disc cartridges 310, 321 to undergo movement operation toward the front side, the first detection lever 129 withdraws the engagement projection 147 toward the outward side of the accommodating body 62. For this reason, as shown in FIGS. 108 to 109, until the first detection lever 129 withdraws the engagement projection 147 toward the outward of the accommodating body 62, and the stopper piece 49 then reaches the front end portion of the opening portion 103 for movement operation, the stopper lever 201 allows the disc cartridges 320, 321 to undergo movement operation toward the front side.

The first and second detection levers 129, 128 and the stopper lever 201 are adapted so that when the vertical movement operation mechanism 401 allows the accommodating body 62 to undergo vertical movement operation, they are driven in accordance with a drive control signal from the microcomputer 112. Thus, they are caused to undergo movement operation and rotation operation by the drive mechanism, whereby the engagement projection 147, the contact projection 144 and the stopper piece 49 are withdrawn to the position where they are not caused to be in contact with the accommodating body 62 and the disc cartridges 320, 321 accommodated within the accommodating body 62 as shown in FIG. 119.

Further, at the lower surface side of the lower surface plate 134, there is disposed a position detection mechanism 430 for detecting position with respect to the accommodating body 62 of the first and second detection levers 129, 128. This position detection mechanism 430 includes, as shown in FIG. 75, a first transmission lever 161 rotatably supported by the support shaft 167 projected toward the lower direction at the lower surface side of the lower surface plate 134, and a second transmission lever 158 rotatably supported coaxially with respect to the first transmission lever 161 by the support shaft 167. The first transmission lever 161 is rotatably supported with the supporting portion 163 provided at the base end side being supported by the support shaft 167. At this time, the first transmission lever 161 is disposed at the lower surface plate 134 with the first pressing portion 162 provided at the front end side being directed toward the backward side. Moreover, the second transmission lever 158 is rotatably attached with the supporting portion 160 provided at the base end side being supported by the support shaft 167. At this time, the second transmission lever 158 is disposed at the lower surface plate 134 with the second pressing portion 159 provided at the front end side thereof being directed toward the backward side.

The first pressing portion 162 and the second pressing portion 159 respectively provided at the first transmission lever 161 and the second transmission lever 158 are projected toward the upper side of the lower surface plate 134 through the through-hole 170 formed in the vicinity of the cut portion 152 of the cam groove 151A provided at the lower surface plate 134, and are arranged in such a manner that they overlap with each other in upper and lower directions. These first and second pressing portions 162, 159 are positioned at the outside of the first and second detection levers 129, 128 located at the initial position.

The first and second transmission levers 161, 158 are rotationally biased in a direction to respectively independently move the first and second pressing portions 162, 159 toward the vertical movement guide body 41 side, i.e., the first and second detection lever 129, 128 side located at the initial position by arm portions 165, 166 on the both sides of the torsional coil spring 164 supported by the shaft portion 168 projected at the lower surface side of the lower surface plate 134. Namely, when the first and second detection levers 129, 128 are located at the initial position, they are rotationally biased in a direction to allow the engagement projection 147 and the contact projection 144 to be admitted into the accommodating body 62 by the torsional coil spring 164 through the first and second transmission levers 161, 158.

Figure 99:
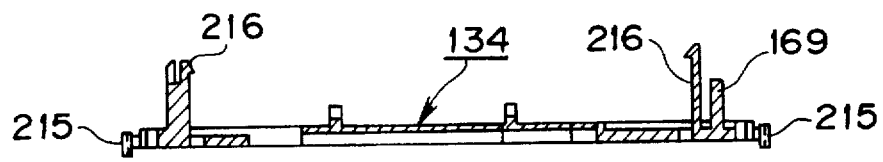
FIG. 99 is a side cross sectional view of the lower surface plate.
Figure 100:
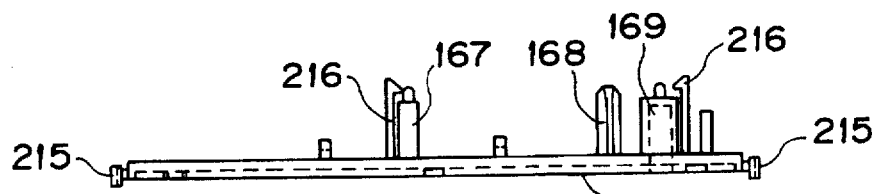
FIG. 100 is a side view of the lower surface plate.
Figure 101:
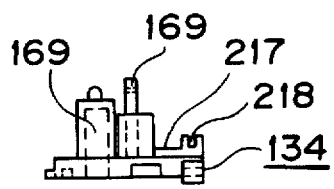
FIG. 101 is a front view of the lower surface plate.
Figure 102:
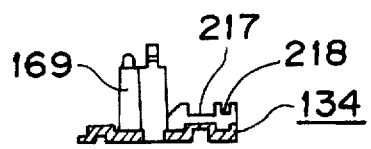
FIG. 102 is a longitudinal cross sectional view of the lower surface plate.
Figure 103:
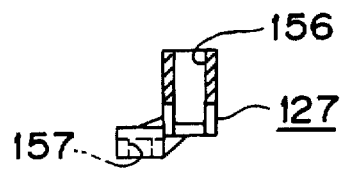
FIG. 103 is a longitudinal cross sectional view of operation lever for rotationally operating second detection lever.
Figure 104:
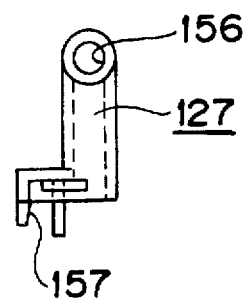
FIG. 104 is a plan view of the operation lever.
Figure 105:
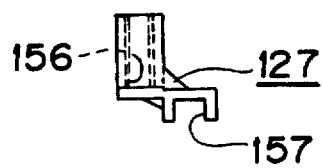
FIG. 105 is a back view of the operation lever.
Figure 106:
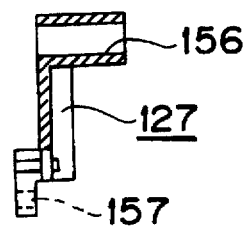
FIG. 106 is a longitudinal cross sectional view of the operation lever.
Figure 107:
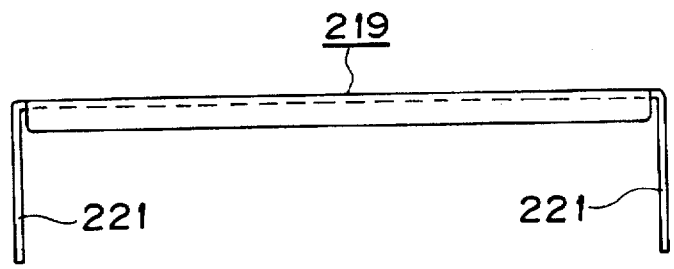
FIG. 107 is a plan view of connecting plate for connecting the upper surface plate and the lower surface plate.
Figure 130:
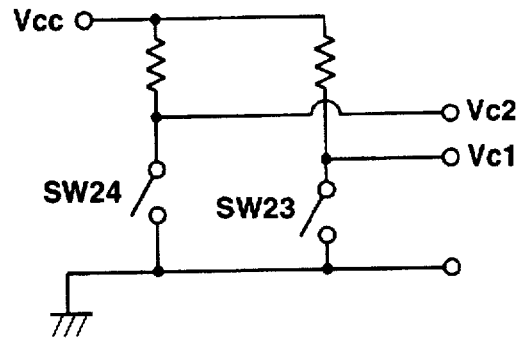

At the outside of the first and second transmission levers 161, 158, first and second detection switches 116, 117 corresponding to the first and second transmission levers 161, 158 are disposed. The first and second detecting switches 116, 117 are attached on a printed wiring board 50 as shown in FIGS. 10, and 88 to 90. This printed wiring board 50 is held by a pair of holding pawls 216, 216 projected at the lower surface side of the lower surface plate 134 as shown in FIGS. 99 and 100, whereby they are disposed at the outside of the first and second transmission levers 161, 158. The first and second transmission levers 161, 158 and the first and second detection switches 116, 117 detect rotational positions of the first and second detection levers 129, 128. The first and second detection switches 116, 117 are adapted as shown in FIG. 130 so that reference voltage $V_{CC}$ is applied through resistor from one end side and the other end side is grounded. Further, potential of one end side of the first detection switch 116 (SW23 in FIG. 130) corresponding to the first transmission lever 161 is delivered to the microcomputer 112 as first output $V_{c1}$. Moreover, potential of one end side of the second detection switch 117 (SW24 in FIG. 130) corresponding to the second transmission lever 158 is delivered to the microcomputer 112 as second output $V_{c2}$. This microcomputer 112 detects rotational positions of the first and second detection levers 129, 128 on the basis of respective outputs $V_{c1}$, $V_{c2}$ detected by the first and second detection switches 116, 117 to detect insertion state of disc cartridges 320, 321 with respect to the accommodating body 62.

Further, when the disc cartridges 320, 321 are inserted with respect to the accommodating body 62 in a regular (normal) direction, one detection lever 129 engages the engagement recessed portion 312 of the disc cartridges 320, 321 with the engagement projection 147. At this time, the second detection lever 128 allows the contact projection 144 to be in contact with the position which is the front side of the disc cartridges 320, 321 and is not located on the movement locus of the engagement recessed portion 312 at the time of insertion into the accommodating body 62 of the disc cartridges 320, 321, i.e., the front position of the portion closer to the upper side with respect to the engagement recessed portion 312.

Figure 131:
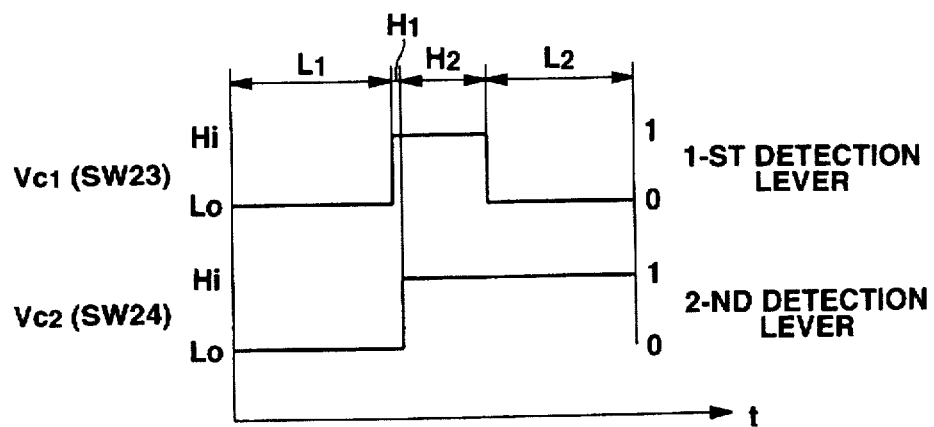

Accordingly, the microcomputer 112 is operative so that in the case where only first output $V_{c1}$ is caused to be at L level (time period of "L2" in FIG. 114) within several seconds, e.g., about five seconds after respective outputs $V_{c1}$, $V_{c2}$ are both caused to be at "H" level (time periods of "$H_1$", "$H_2$" in FIG. 131) from the time when respective outputs $V_{c1}$, $V_{c2}$ are both at "L" level (time period "$L_1$" in FIG. 131), i.e., the first and second detection levers 129, 128 are both moved toward the outward side of the accommodating body 62, namely., only the first detection lever 129 is moved toward the inward side of the accommodating body 62, the microcomputer 112 discriminates that the disc cartridges 320, 321 have been inserted with respect to the accommodating body 62 in the regular (normal) direction. Moreover, when the disc cartridges 320, 321 are inserted with respect to the accommodating body 62 in the regular direction, and the engagement projection 147 of the first detection lever 129 is engaged with the engagement recessed portion 312, the stopper lever 201 stops movement in the insertion direction into the accommodating body 62 of the disc cartridges 320, 321. At this time, by securely maintaining the time of the time period "$L_2$" in FIG. 131, discrimination by the microcomputer 112 is precisely carried out on the basis of detection outputs of the first and second detection switches 116, 117. When the microcomputer 112 detects that the disc cartridges 320, 321 have been inserted in the regular direction with respect to the accommodating body 62, it allows the movement block 139 to undergo movement operation toward the backward side to move the disc cartridges 320, 321 into the accommodating body 62 through the engagement projection 147 of the first detection lever 129 as shown in FIGS. 94 to 101 thereafter to withdraw the engagement projection 147 from the accommodating body 62 as shown in FIG. 111.

Figure 121:
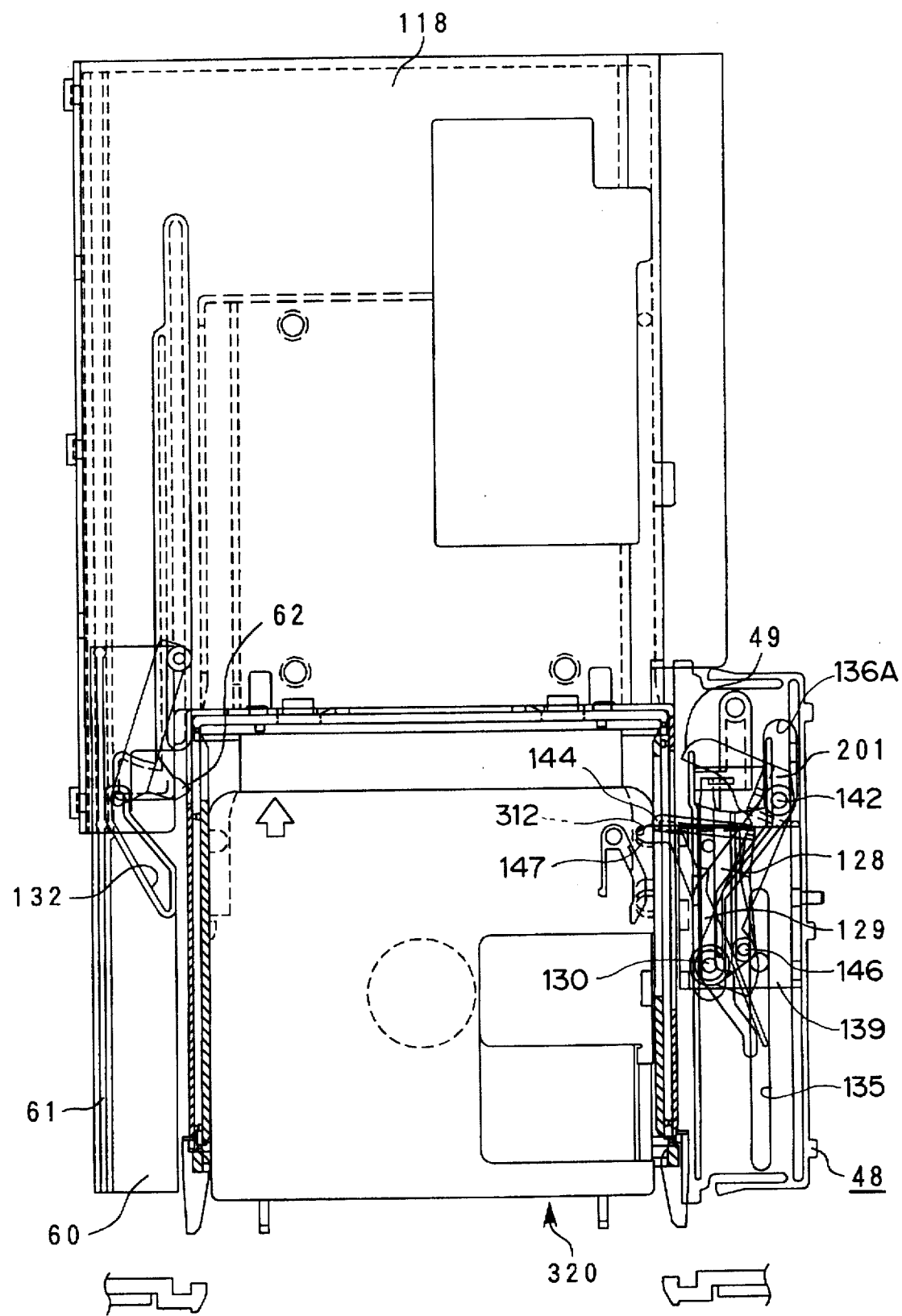
Figure 122:
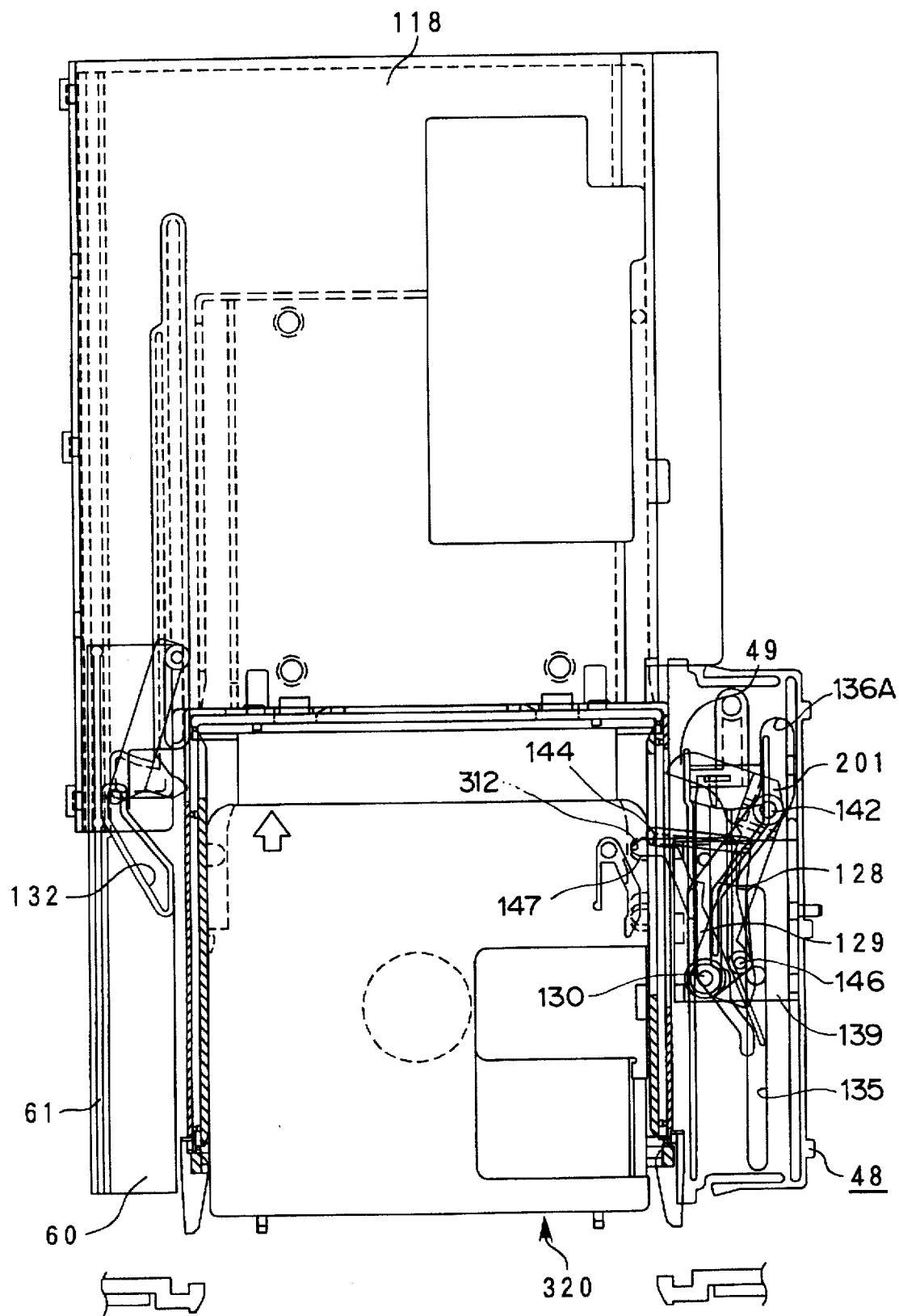
Figure 123:
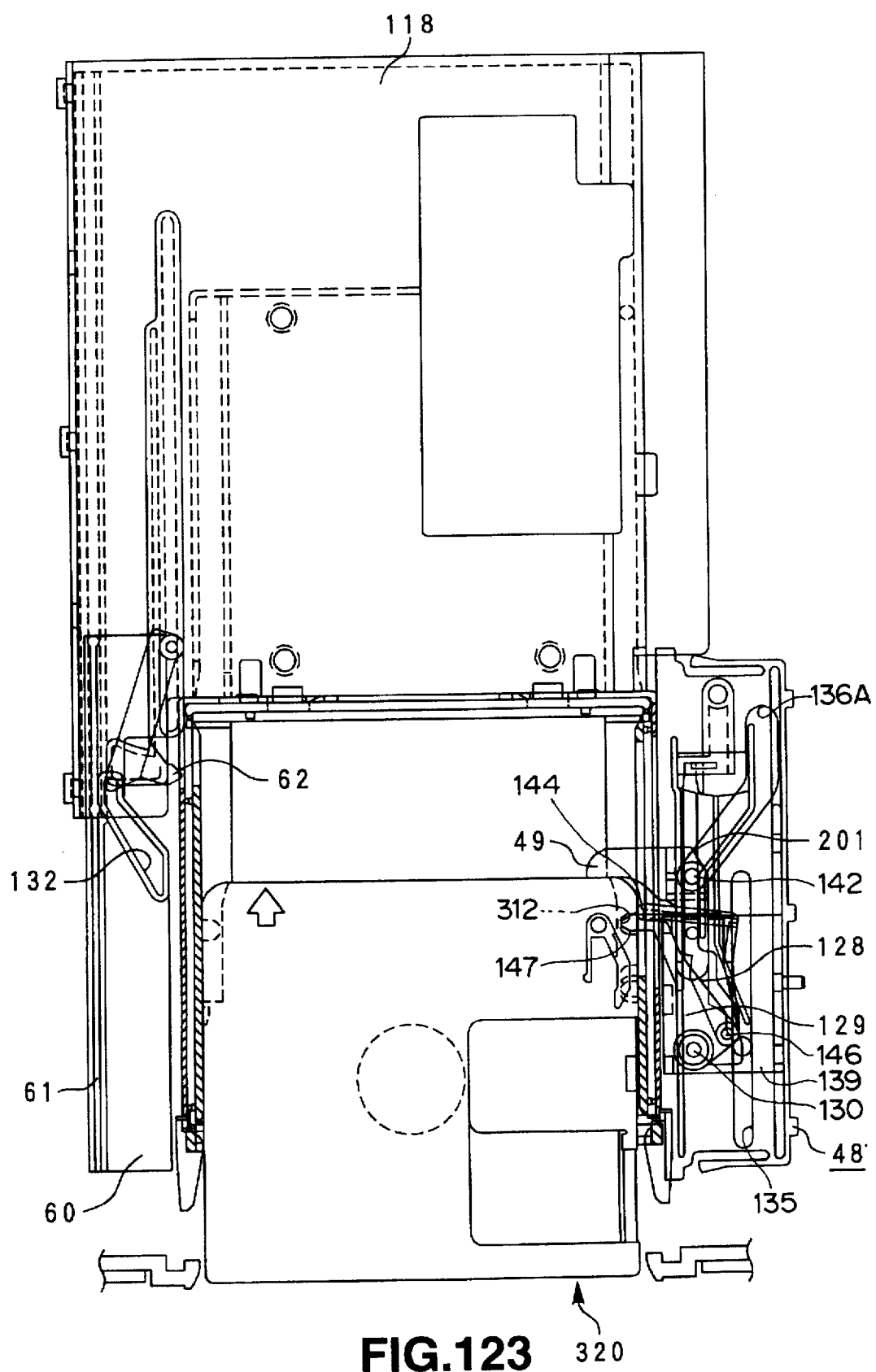

Moreover, when the disc cartridges 320, 321 within the accommodating body 62 are caused to be moved from the accommodating body 62 toward the front side, the movement block 139 is caused to be moved toward the front side as shown in FIGS. 121–122 to move the disc cartridges 320, 321 through the first detection lever 129 and the stopper lever 201.

Further, the microcomputer 112 controls the drive mechanism to further press the disc cartridges 320, 321 by the stopper piece 49 of the stopper lever 201 after the engagement projection 147 of the first detection lever 129 is withdrawn toward the outward side of the accommodating body 62 to move them to subsequently return the movement block 139 to the initial position as shown in FIGS. 123–126.

At the cartridge taking-out mechanism 48, when the length of the opening portion 103 for movement operation formed at the side surface of the accommodating body 62 is assumed to be $L_w$ as shown in FIG. 132, movable distance $L_H$ of the disc cartridges 320, 321 is longer than the length $L_w$ of the opening portion 103 for movement operation.

The reason why the above-mentioned length relationship is employed is as follows. Namely, in the case where single lever is used as the movement operation lever 233 or the stopper lever 201 as shown in FIGS. 133, 134 and 135, there is no possibility that the carryable distances $L_{s1}$, $L_{s2}$ of the disc cartridges 320, 321 is greater than the length obtained by subtracting the widths $W_1$, $W_2$ of the front end side of the movement operation levers 233, 201 from the length $L_w$ of the opening portion 103 for movement operation. Unlike the above-mentioned case, it becomes possible to allow the disc cartridges 320, 321 over the long distance.

(7-2) Cartridge carrying mechanism (see FIGS. 136 to 150)

The cartridge carrying mechanism 410 for carrying, to the recording/reproduction unit 114 side, the disc cartridge 320 or 321 which has been drawn out from the accommodating body 62 by the cartridge taking-out mechanism 48, or carrying it from the recording/reproduction unit 114 side toward the accommodating body 62 side will now be described.

This cartridge carrying mechanism 410 includes, as shown in FIG. 136, a movement operation lever 175 constituting the second movement operation means adapted to be engaged with the engagement recessed portion at the back side of the disc cartridge 320, or 321 accommodated within the accommodating body 62 to allow the disc cartridge 320, or 321 to undergo movement operation in a direction in parallel to the principal surface thereof. This movement operation lever 175 allows the disc cartridge 320 or 321 located at the position corresponding to the cut hole 44 of the accommodating body 62 of plural disc cartridges 320, 321 accommodated within the accommodating body 62 to undergo movement operation extending over the recording/reproduction unit 114 positioned at the backward side of the accommodating body 62 and the accommodating body 62 through the back side insertion/withdrawal hole 45 of the accommodating body 62.

The movement operation lever 175 is attached, as shown in FIG. 136, on a slider slidably disposed in forward and backward directions at the other side portion within the cartridge holder 118 so that it can be moved and rotated in the forward and backward directions. The slider 60 is formed as a linear rod like member having length substantially corresponding to the side edge portion of the cartridge holder 118, and is accommodated within the cartridge holder 118 in the state where length direction is caused to be the forward and backward directions. This slider 60 is movably disposed extending over the position where it is accommodated within the cartridge holder 118 and the position projected toward the front side of the cartridge holder 118.

At the movement operation lever 175 disposed on the slider 60, an upper side supporting pin 178 and a lower side supporting pin 177 are projected in upper and lower directions in a manner coaxial with each other at the back end side. Moreover, at the movement operation lever 175, an upper side limiting pin 174 is vertically provided on the upper surface side of the front end side and a lower side limiting pin 176 is vertically provided at the lower surface portion of the front end side in a manner hanging down. Further, at the side edge of the front end side of the movement operation lever 175, an engagement pawl 63 is projected toward the inward side of the cartridge holder 118. The lower side supporting pin 177 is engaged with an engagement groove 181 formed in forward and backward directions at the backward side portion of the slider 60. Namely, the lower side supporting pin 177 can be moved in the forward and backward directions over the range in length direction of the engagement groove 181 with respect to the slider 60. In addition, the lower side limiting pin 176 is engaged with a lower side limiting groove 132 formed in the state inclined with respect to the forward and backward directions at the position which is the backward side portion of the slider 60 and closer to the front side with respect to the engagement groove 181.

Further, the movement operation lever 175 is adapted so that when the lower side supporting pin 177 is located at the front end side of the engagement groove 181, the lower side limiting pin 176 is moved toward the inward side of the cartridge holder 118 in the state where it is caused to undergo position limitation into the lower side limiting groove 132 to thereby project the engagement pawl 63 toward the inward side of the cartridge holder 118. The movement operation lever 175 is adapted so that when the lower side supporting pin 177 is positioned at the back end side of the engagement groove 181, the lower side limiting pin 176 is moved toward the outside of the cartridge holder 118 in the state it is caused to undergo position limitation into the lower side limiting groove 132 as shown in FIG. 137 to thereby withdraw the engagement pawl 63 from within the cartridge holder 118. The upper side supporting pin 178 is engaged with the guide groove 172 formed at the top plate within the cartridge holder 118. This guide groove 172 is formed as shown in FIG. 136 so as to take linear shape, which has length substantially equal to lengths is forward and backward directions of the cartridge holder 118 extending from the front end side of the cartridge holder 118 until the back end side in the forward and backward directions of the cartridge holder 118. This guide groove 172 is closed at end portions positioned before and after. The upper side limiting pin 174 is engaged with the upper side limiting groove 171 formed at the top plate portion within the cartridge holder 118 as shown in FIG. 136. This upper side limiting groove 171 has substantially the same length as the guide groove 172 and is formed in parallel to the guide groove 172. At the end portion of the front side of the upper side limiting groove 171, there is formed a width broadened portion 173 which permits the engagement pawl 63 of the movement operation lever 175 to rotate in a direction to withdraw it from within the cartridge holder 118.

Moreover, at the upper surface side of the slider 60, a rack gear 61 is formed extending over the length direction. This rack gear 61 is adapted as shown in FIG. 10 so that a portion thereof is faced toward the upper side through slit 57 positioned at the upper surface portion front side of the other side of the cartridge holder 118.

Further, when the slider 60 is slid toward the front side, the upper side supporting pin 178 is positioned at the front end side of the guide groove 172 and the lower side supporting pin 177 is positioned at the back end side of the engagement groove 181 as shown in FIGS. 137, and 140 to 145. Accordingly, the movement operation lever 175 is adapted so that the lower side limiting pin 176 is caused to undergo position limitation by the lower side limiting groove 132 to withdraw the engagement pawl 63 from within the cartridge holder 118. When the slider 60 begins sliding toward the backward side, since this movement operation lever 175 is caused to undergo limitation of movement toward the backward side in the state where the upper side limiting pin 174 is held by the width broadened portion 173 of the upper side limiting groove 171, it is moved with the lower side limiting pin 186 being guided by the inclined portion of the lower side limiting groove 132, and is caused to undergo rotational operation in a direction to project the engagement pawl 63 into the cartridge holder 118. Moreover, the front end side of the engagement groove 181 becomes closer to the lower side supporting pin 177. At this time, the engagement pawl 63 is admitted through the cut hole 44 into the vertical movement guide body 41 through the cut hole 44, and is engaged with the engagement recessed portion 312 of the back side of the disc cartridges 320, 321 within the vertical movement guide body 41.

Further, when the slider 60 is slid toward the backward side, the movement operation lever 175 is placed in the state where holding by the width broadened portion 173 of the upper side limiting groove 171 with respect to the upper side limiting 174 is released so that movement toward the backward side can be made. Moreover, the lower side supporting pin 177 is positioned at the front end side of the engagement groove 181. Accordingly, the movement operation lever 175 is moved toward the backward side in such a manner that the upper side supporting pin 178 is caused to be along the guide groove 172 and the upper side limiting pin 174 is caused to be along the upper side limiting groove 171 while maintaining the state where the engagement pawl 63 is projected toward the inward side of the cartridge holder 118.

At this time, the disc cartridge 320 or 321 is caused to undergo movement operation toward the backward side from the vertical movement guide body 41 through the back side insertion/withdrawal hole 45 of the vertical movement guide body 41, and is inserted into the cartridge holder 118. When the slider 60 is slid from the backward side toward the front side, the disc cartridge 320 or 321 is caused to undergo movement operation toward the front side by the movement operation lever 175 from within the cartridge holder 118 in a manner opposite to the above-described order, and is thus returned into the vertical movement guide body 41. In addition, when the slider 60 is further slid toward the front side after the disc cartridge 320 or 321 is returned into the vertical movement guide body 41, the movement operation lever 175 is caused to undergo rotational operation to detach (withdraw) the engagement pawl 63 from the engagement recessed portion 312 of the back side of the disc cartridge 320 or 321.

In this cartridge carrying mechanism 410, at the cartridge taking-out mechanism 48, the engagement projection 147 engages the engagement pawl 63 with the engagement recessed portion 312 of the back side of the disc cartridge 320 or 321. For this reason, as shown in FIG. 150, unlike in such cases where the detection lever 129 of the cartridge taking-out mechanism 48 and the movement operation lever 175 of the cartridge carrying mechanism 410 are provided at the same side with respect to the disc cartridge 320 or 321, there is no necessity of ensuring distance in forward and backward directions between the detection lever 129 and the movement operation lever. Thus, the apparatus can become compact.

Meanwhile, at the slider 60, a closing member 63a moved interlocking with the movement operation lever 175 is attached. When the movement operation lever 175 allows the disc cartridge 320 or 321 to undergo movement operation into the vertical movement guide body 41, this closing member 63a is positioned at the front end portion of the cartridge holder 118 as shown in FIG. 136 to close the back side insertion/withdrawal hole 45 of the vertical movement guide body 41. At this time, the closing member 63a prevents the disc cartridge 320 or 321 from passing through the back side insertion/withdrawal hole 45. Moreover, when the movement operation lever 175 allows the disc cartridge 320 or 321 to undergo movement operation from within the vertical movement guide body 41 toward the recording/ reproducing unit 114 side, the closing member 63a is moved toward the backward side in synchronism with the movement operation lever 175 within the cartridge holder 118 as shown in FIG. 148 thus thus to permit the disc cartridge 320 or 321 to undergo movement operation.

Since this closing lever 63 is caused to undergo movement operation following the slider 60, control is easy as compared to the configuration in which a rotatable cover body 243 is provided at the back wall portion of the vertical movement guide body 41 as shown in FIG. 151, for example, to allow this cover body 243 to undergo rotational operation in synchronism with slide of the slider 60.

(7-3) Vertical movement mechanism of cartridge holder (FIGS. 12, 13, 16 and FIGS. 67 to 74)

The mechanism for allowing the cartridge holder 118 and the slider 60 within the cartridge holder 118 to undergo vertical movement operation will now be described.

This mechanism includes loading motor 14 for allowing the previously described cam plates 86, 87 to undergo movement operation. This loading motor 14 is attached to one side wall 1 constituting the recording/reproduction unit 114. This loading motor 14 is controlled by the microcomputer 112 so that it is rotationally driven.

Moreover, a drive pulley 15 is attached to the drive shaft of the loading motor 14 as shown in FIG. 16. An endless drive belt 16 is wound across the drive pulley 15 and a driven pulley 17 rotatably disposed at the side wall 1. Further, the driven pulley 17 is rotationally operated by the loading motor 14. A first transmission gear 197 is integrally and coaxially attached to the driven pulley 17. The first transmission gear 197 is meshed with a second transmission gear 81 rotatably supported at the side wall 1. A third transmission gear 198 having diameter smaller than the second transmission gear 81 is integrally coaxially attached to the second transmission gear 81. This third transmission gear 198 is meshed with a fourth transmission gear 82 rotatably supported at the side wall 1. A fifth transmission gear 199 having diameter smaller than that of the fourth transmission gear 82 is integrally coaxially attached to the fourth transmission gear 82. The fifth transmission gear 199 is meshed with a sixth transmission gear 83 rotatably supported at the side wall 1. A seventh transmission gear 85 having diameter smaller than that of the sixth transmission gear 83 is integrally coaxially attached to the sixth transmission gear 83. The seventh transmission gear 85 is disposed in a manner penetrated through the side wall 1. This seventh transmission gear 85 is meshed with an eighth transmission gear 190 rotatably supported at the side wall 1 at the outside surface side of the side wall 1, and is meshed with a ninth transmission gear 84 rotatably supported at the side wall 1 at the inside surface side of the side wall 1.

In the initial state, the eighth transmission gear 190 is opposite to a tooth missing portion 91 formed at the upper edge portion of the cam plate 87 disposed at the outside surface of the side wall 1. Moreover, in this initial state, the ninth transmission gear 84 is meshed with the rack gear 61 of the slider 60 through the slit 57. In this initial state, as shown in FIGS. 67 and, the cam plate 87 is positioned at the front side and the slider 60 is slid toward the front side. When the loading motor 14 is rotationally driven in this initial state, the slider 60 is first slid to the backward side. When this slider 60 is slid toward the backward side up to the position where the disc cartridge 320 or 321 is caused to undergo movement operation into the cartridge holder 118, the slider 60 presses the pressed piece 88 provided at one cam plate 87 toward the backward side by pressing piece 180 formed on the upper surface portion of the slider 60 as shown in FIG. 136 to move the cam plate 87 toward the backward side. At the pressed portion 88, a pressed portion 189 is bent and formed at the front end side thereof as shown in FIG. 16. This pressed portion 189 is admitted into the cartridge holder 118 through the slit 59 formed at the backward side of the cartridge holder 118.

When the cam plate 87 is moved toward the backward side by the slider 60, the eighth transmission gear 190 is meshed with the rack gear 90 formed at the portion closer to the front side with respect to the tooth missing portion 91 of the upper edge portion of the cam plate 87. Accordingly, when the loading motor 14 is rotationally driven, the cam plate 87 is caused to undergo movement operation toward backward side. When one cam plate 87 is caused to undergo movement operation, the other cam plate 86 is also moved synchronously therewith through a pair of pinion gears 21, 22.

When respective cam plates 86, 87 are moved toward the backward side, the cartridge holder 118 is moved toward the lower side so that it becomes close to the recording/reproduction unit 114. At this time, the rack gear 61 of the slider 60 is away from the ninth transmission gear 84. As a result, the slider 60 is stopped.

Further, when the disc cartridge 320 or 321 is loaded into the recording/reproduction unit 114, the loading motor 14 is stopped. When the loading motor 14 is rotationally driven in a manner opposite to the above-described loading process in the state where the disc cartridge 320 or 321 is loaded into the recording/reproduction unit 114, respective cam plates 86, 87 are caused to first undergo movement operation toward the front side. As a result, the cartridge holder 118 is moved toward the upper side. At this time, the disc cartridge 320 or 321 is detached from the recording/reproduction unit 114.

Further, when the respective cam plates 86, 87 are moved toward the front side so that the cartridge holder 118 is raised, the eighth transmission gear 190 is placed in the state opposite to the tooth missing portion 91 of one cam plate 87. As a result, the respective cam plates 86, 87 reach the forefront side position, at which they are stopped. At this time, the ninth transmission gear 84 is meshed with the rack gear 61 of the slider 60 to begin sliding the slider 60 toward the front side. When the slider 60 reaches the forefront side position, disc cartridge 320 or 321 which has been inserted in the cartridge holder 118 is returned into the accommodating body 62.

8 Operation of the recording/reproducing apparatus
(8-1) Operation of recording and reproduction (See FIGS. 67 to 74, 111 to 129 and 140 to 149)

The operation in which the recording/reproducing apparatus constituted as described above is used to select an arbitrary one of disc cartridges 320, 321 accommodated within the accommodating body 62 to carry out recording and/or reproduction of information signals such as music signal, etc. will now be described.

Initially, in order to carry out recording and/or reproduction of information signals such as music signal, etc., plural disc cartridges 320, 321 are accommodated in advance within the accommodating body 62.

Then, the disc cartridge 320 or 321 which has been caused to undergo insertion operation from the cartridge insertion/withdrawal hole 110 is moved up to the accommodating position within the accommodating body 62 by the cartridge taking-out mechanism 48 as shown in FIGS. 111 to 119, and FIGS. 140 to 149. An approach is then employed to operate respective operation switches 106, 107, 108 on the front panel 105 to thereby allow the accommodating body 62 to undergo vertical movement operation by the vertical movement operation mechanism 401, thus making it possible to select one disc cartridge from plural disc cartridges 320, 321. The selected disc cartridge 320 or 321 is inserted into the cartridge holder 118 by the cartridge carrying mechanism 410 as shown in FIGS. 146 to 149, and is further loaded into the recording/reproduction unit 114 as shown in FIGS. 67 to 74. In this state, it is possible to carry out recording or reproduction of information signals with respect to the magneto-optical disc 301 or the optical disc 331 accommodated within the disc cartridge 320 or 321.

It is to be noted that the vertical movement operation with respect to the magneto-optical disc 301 of the magnetic head 222 is carried out by moving respective cam plates 86, 87 in forward and backward directions while maintaining the loading state into the recording/reproduction unit 114 of the disc cartridge 320 of the recording type.

When the cartridge 321 of the reproduction type is loaded into the recording/reproduction unit 114, the microcomputer 112 detects that the loaded cartridge is the disc cartridge 321 of the reproduction type to control positions of the respective cam plates 86, 87 so as not to fall the magnetic head 222 with respect to the disc cartridge 321.

When recording and/or reproduction of desired information signal has been completed, the disc cartridge 320 or 321 is returned into the accommodating body 62 for a second time by the cartridge carrying mechanism 410 as described above.

(8-2) Detection of error insertion of the disc cartridge (see FIGS. 152 to 186)

The microcomputer 112 is operative as described above so that when only the first detection lever 129 is moved toward the inward side of the accommodating body 62 after the first and second detection levers 129, 128 are both moved toward the outward side of the accommodating body 62, it discriminates that the disc cartridge 320 or 321 has been inserted in the regular (normal) direction with respect to the accommodating body 62. Accordingly, when the disc cartridge 320 or 321 is caused to undergo an erroneous insertion such that it is inserted into opposite state with respect to forward and backward directions as shown in FIGS. 152 and 153, the microcomputer detects this erroneous insertion as shown in FIGS. 155 to 158 to eject the disc cartridge 320 or 321 from the accommodating body 62. This eject operation is carried out by the cartridge taking-out mechanism 48.

When such an erroneous insertion is carried out, respective outputs $V_{c1}$, $V_{c2}$ from the respective detection switches 116, 117 both remain to be at "H" level as shown in the FIG. 183 mentioned above.

In the case where there takes the state where the first output $V_{c1}$ is not caused to be at "L" level within several seconds, e.g., about 5 seconds after respective outputs $V_{c1}$, $V_{c2}$ are caused to be at "H" level (time period "$H_1$" in FIG. 183), i.e., the first and second detection levers 129, 128 are both moved toward the outward side of the accommodating body 62, the microcomputer 112 discriminates this state as erroneous insertion.

Moreover, when an erroneous insertion such that the disc cartridge 320 or 321 is inserted in reversed state is made as shown in FIGS. 159 and 160, the microcomputer detects this erroneous insertion as shown in FIGS. 163 to 166 to eject the disc cartridge 320 or 321 from the accommodating body 62.

When such an erroneous insertion is carried out, respective outputs $V_{c1}$, $V_{c2}$ from the respective detection switches 116, 117 both remain to be at "H" level as shown in FIG. 183. In the case where there takes place the state where the first output $V_{c1}$ is not caused to be at "L" level within several seconds, e.g., about five seconds after respective outputs $V_{c1}$, $V_{c2}$ are both caused to be at "H" level (time period "$H_1$" in FIG. 183), i.e., the first and second detection levers 129, 128 are both moved toward the outward side of the accommodating body 62, the microcomputer 112 discriminates this state as erroneous insertion.

It is to be noted that in the case where the second detection lever 128 can be rotated by itself without following the first detection lever 129, respective outputs $V_{c1}$, $V_{c2}$ from the first and second detection switches 116, 117 are both caused to be at "H" level as shown in FIG. 185, and only the second output $V_{c2}$ is then caused to be at "L" level as shown in FIG. 185.

Even in this case, when there takes place the state where the first output $V_{c1}$ is not caused to be at "L" level within several seconds, e.g., about five seconds after respective outputs $V_{c1}$, $V_{c2}$ are caused to be both at "H" level, i.e., the first and second detection levers 129, 128 are both moved toward the outward side, the microcomputer 112 discriminates this state as erroneous insertion.

Moreover, when an erroneous operation such that the disc cartridge 320 or 321 is inserted in a manner disposed sideways is carried out as shown in FIGS. 167 to 182, the microcomputer detects this erroneous insertion as shown in FIGS. 167 to 182 to eject the disc cartridge 320 or 321 from the accommodating body 62.

When such an erroneous insertion is carried out, respective outputs $V_{c1}$, $V_{c2}$ from the detection switches 116, 117 are caused to be both at "H" level or "L" level as shown in FIG. 186. The reason way such phenomenon takes place is as follows. Since the lateral width of the disc cartridge 320, 321 is longer tan the length in forward and backward directions, if the disc cartridge is inserted sideways, any clearance (gap) takes place in left and right directions within the accommodating body 62, with the result that the disc cartridge irregularly moves in left and right directions.

When there takes place the state where only the first output $V_{c1}$ is not caused to be at "L" level within several seconds, e.g., about 5 seconds after respective outputs $V_{c1}$, $V_{c2}$ are both caused to be at "H" level, i.e., the first and second detection levers 129, 128 are both moved toward the outward side of the accommodating body 62, the microcomputer 112 this states as erroneous insertion.

It is to be noted that there may be employed a configuration in which prevention of erroneous insertion with respect to the accommodating body 62 as described above is carried out by erroneous insertion preventing members 237, 240 which are movably supported and can be advanced and withdrawn with respect to the accommodating body 62 as shown in FIGS. 187 and 188. However, in this case, when the accommodating body 62 is caused to undergo vertical movement by the vertical movement mechanism 401, the respective erroneous insertion preventing members 237, 240 must be withdrawn from the accommodating body 62. Accordingly, control is troublesome. In addition, since the movable type erroneous insertion preventing member has low mechanical strength, there is the possibility that erroneous insertion cannot be securely prevented.

(8-3) Continuous recording and continuous reproduction operations (see FIGS. 189 to 198)

The microcomputer 112 which controls the vertical movement operation mechanism 401 and the cartridge carrying mechanism 410 is operative so that when recording of information signals with respect to first disc cartridge 320a at the recording/reproduction unit 114 as shown in FIGS. 189 to 193, it conducts a control to carry (transfer) this first disc cartridge 320a into the accommodating body 62 by the cartridge carrying mechanism 410 to subsequently move the first disc cartridge 320a to the position where the front side thereof is opposed to the cartridge taking-out mechanism 48 by the vertical movement operation mechanism 401 to further eject the first disc cartridge 320a toward the front side of the accommodating body 62 by the cartridge taking-out mechanism 48, and to carry (transfer), at this time, second disc cartridge 320b of which front side is opposed to the cartridge carrying mechanism 410 by the cartridge carrying mechanism 410 to allow it to undergo loading into the recording/reproduction unit 114.

Namely, this recording/reproducing apparatus is of a structure to convert audio (speech) signals into digital signals to write them onto the recording disc, and is constituted to implement signal compression processing to digital signals converted from audio signals thereafter to write them onto the magneto-optical disc 301. Accordingly, in this recording/reproducing apparatus, at the time of recording, an approach is employed to temporarily store signals obtained by converting audio signals of analog signals into digital signals into the memory 113 to sequentially read out the signals from the memory 113 to carry out signal compression processing thereof. Moreover, at the time of reproduction, an approach is employed to intermittently read out the signals which have been caused to undergo compression processing from the magneto-optical disc 301 to implement expansion processing thereto to temporarily store them into the memory 113 to sequentially read out the signals from the memory 113 to convert them into analog signals to carry out reproduction. Accordingly, in this recording/reproducing apparatus, writing of information signals onto the magneto-optical disc 301 can be interrupted by the time corresponding to the capacity of the memory 113 while allowing signals to be continuously inputted to the memory 113.

Moreover, in this recording/reproducing apparatus, even if read-out operation of information signals from the magneto-optical disc 301 is interrupted by the time corresponding to the capacity of the memory 113, it is possible to continuously output signals from the semiconductor memory.

Namely, in this recording/reproducing apparatus, since an approach is employed to carry out write operation of signals with respect to the first disc cartridge to immediately exchange the first disc cartridge for the second disc cartridge when write operation up to the limitation of the recording capacity of the first disc cartridge is completed to start write operation of signals with respect to the second disc cartridge. Accordingly, continuous recording of information signals can be carried out.

Similarly, in this recording/reproducing apparatus, continuous reproduction can be carried out with respect to plural disc cartridges.

The memory 113 has a capacity sufficient to store audio (speech) signals for a time period during which write or read operation of signals with respect to the magneto-optical disc 301 is interrupted, i.e., for a time period from the time when write or read operation of signals with respect to the first disc cartridge 320a has been completed up to the time when this first disc cartridge 320a is ejected from the recording/ reproduction unit 114, and the second disc cartridge 320b is loaded into the recording/reproduction unit 114 so that write or read operation of signals is started.

In this recording/reproducing apparatus, as shown in FIG. 189, plural disc cartridges 320 or 321 are held in a stacked form by the accommodating body 62. Initially, as shown in FIG. 190, the first disc cartridge 320a is inserted into the cartridge holder 118 and is located on the recording/reproduction unit. Then, this first disc cartridge 320a is loaded into the recording/reproduction unit 114 as shown in FIG. 191. Thus, recording of information signals is carried out.

Then, the first disc cartridge 320a is returned into the accommodating body 62 as shown in FIG. 189. Subsequently, the accommodating body 62 is moved toward the upper side by one step as shown in FIG. 192. At this time, as shown in FIG. 193, the first disc cartridge 320a can be moved toward the front side with respect to the accommodating body 62, and the second disc cartridge 320b is caused to undergo movement operation into the cartridge holder 118 of the backward side with respect to the accommodating body 62 so that it can be loaded into the recording/reproduction unit 114.

In this recording/reproducing apparatus, since the height position of the disc cartridges 320, 321 caused to undergo insertion/withdrawal from the outward side with respect to the accommodating body 62 and the height position of the disc cartridges 320, 321 caused to undergo movement operation from the accommodating body 62 toward the cartridge holder 118 side are different from each other, these two operations can be carried out at the same time with respect to different disc cartridges 320, 321.

With respect to the recorded disc cartridge 320, when there is a need to carry out check of the recording state by other equipment or reproduction of recorded signals, it is necessary to immediately take out such recorded disc cartridge after recording of desired information signal is completed. In this recording/reproducing apparatus, as described above, the recorded disc cartridge can be immediately taken out from the recording/reproducing apparatus after completion of recording, and recording of information signals can be continuously carried out with respect to other disc cartridge 320.

It is to be noted that in the case where the height position of the disc cartridge caused to undergo insertion/withdrawal operation from the outward side with respect to the accommodating body 62 and the height position of the disc cartridges 320, 321 caused to undergo carrying operation from the accommodating body 62 toward the recording/reproduction unit 114 are caused to be the same as shown in FIGS. 194 to 198, these two operations cannot be carried out at the same time with respect to different disc cartridges 320, 321. Namely, in this case, when the second disc cartridge 320b is loaded into the recording/reproduction unit 114 immediately after recording of signals with respect to the first disc cartridge 320a is completed, it is required for taking out the recorded first disc cartridge 320a from the accommodating body 62 toward the outward side to move the accommodating body 62 for a second time as shown in FIG. 197. Namely, in this case, since a time for allowing the accommodating body 62 to undergo movement operation after the second disc cartridge 320b is loaded into the recording/reproduction unit 114 is required, it is impossible to immediately take out the recorded first disc cartridge 320a.

In addition, in this case, when there is assumed to be employed, as shown in FIG. 198, an approach to return the recorded first disc cartridge 320a into the accommodating body 62 thereafter to immediately take out the first disc cartridge from the accommodating body 62, if this disc cartridge 320a is not completely taken out from the accommodating body 62, loading into the recording/reproduction unit of the second disc cartridge 320b cannot be carried out. At this time, in the case where taking-out operation of the disc cartridge 320 from the accommodating body 62 is carried out by manual operation, if such taking-out operation is not securely and rapidly carried out, continuous recording of information signals cannot be carried out.

It is to be noted that while explanation has been given by taking the example where the recording/reproducing apparatus using both the disc cartridge of the recording/reproduction type and the disc cartridge of the reproduction only type is employed, this invention can be similarly applied also to the disc player exclusively using the disc cartridge of the reproduction only type, and advantages as previously described can be thus obtained.

Industrial Applicability

The recording/reproducing apparatus according to this invention is provided with the taking-out mechanism caused to undergo insertion operation into the accommodating body within which plural disc cartridges are accommodated to allow one disc cartridge to undergo movement operation, and the cartridge carrying mechanism for carrying the disc cartridge which has been caused to undergo movement operation by the taking-out mechanism toward the recording/reproduction unit side. Accordingly, there can be employed a configuration in which the taking-out mechanism and the accommodating body are disposed in parallel and the cartridge carrying mechanism is disposed on the recording/reproduction unit. Thus, miniaturization of the apparatus itself can be attained.

In addition, since selection of disc cartridges accommodated within the accommodating body is carried out by relative movement between the accommodating body and the taking-out mechanism, the arrangement position of the taking-out mechanism and the carrying mechanism can be fixed. Accordingly, simplification of respective mechanisms can be realized.

I claim:

1. A recording and/or reproducing apparatus comprising:

recording and/or reproducing means for carrying out recording and/or reproduction of information signals with respect to plural recording media respectively accommodated within plural cartridges;

an accommodating body within which the plural cartridges are accommodated in such a manner that the principal surfaces of the respective cartridges are parallel to each other, opening portions for allowing any one of the cartridges to undergo movement operation in a direction parallel to the principal surfaces thereof being provided at plane surfaces of the accommodating body that are opposite to each other;

taking-out means for selectively taking out the disc cartridges from the accommodating body, which includes first movement operation means that inserts into the accommodating body through any one of the opening portions provided at the accommodating body for moving any one of the cartridges accommodated within the accommodating body in a direction parallel to the principal surfaces of the cartridge;

carrying means including a portion for loading the disc cartridge into the recording and/or reproducing means, which includes second movement operation means for insertion into the accommodating body through an opening portion provided at the accommodating body opposing the one opening portion to allow the cartridge which has been caused to undergo movement operation by the first movement operation means to further undergo movement operation in a direction parallel to the principal surfaces of the cartridge; and vertical movement means for vertically moving the accommodating body relative to the taking-out means wherein the carrying means includes preventing means such that when the second movement operation means allows the cartridge to undergo movement operation from the accommodating body in a direction parallel to the principal surfaces of the cartridges the preventing means prevents the taking-out means from taking out any other cartridge from the accommodating body.

2. A recording and/or reproducing apparatus as set forth in claim 1, wherein the taking-out means includes operation means such that when the cartridge is moved in a direction parallel to the principal surfaces of the cartridge from the accommodating body by the second movement operation means, the operation means withdraws the first movement operation means from the opening portion of the accommodating body.

3. A recording and/or reproducing apparatus as set forth in claim 2, wherein the operation means includes position detecting means for carrying out position detection of the first movement operation means.

4. A recording and/or reproducing apparatus as set forth in claim 3, which further comprises control means for detecting on the basis of a detection output from the position detecting means whether or not a cartridge is correctly inserted to allow the inserted cartridge to undergo a movement operation in a direction to eject it from the accommodating body on the basis of the detection result.

5. A recording and/or reproducing apparatus as set forth in claim 1, wherein the carrying means further comprises further vertical movement means for allowing the carrying means to undergo movement in a horizontal direction and vertical movement with respect to the recording and/or reproducing means.

6. A recording and/or reproducing apparatus as set forth in claim 5, wherein the recording and/or reproducing means comprises a head for carrying out recording or reproduction of information signals onto a recording medium of the recording media accommodated within the cartridge, and wherein the further vertical movement means allows the carrying means to undergo loading into the recording and/or reproducing means to allow the head of the recording and/or reproducing means to undergo movement operation to a recordable or reproducible position.

7. A recording and/or reproducing apparatus comprising:

recording and/or reproducing means for carrying out recording and/or reproduction of information signals with respect to plural recording media respectively accommodated within plural cartridges;

an accommodating body within which the plural cartridges are accommodated in such a manner that the principal surfaces of the respective cartridges are parallel to each other opening portions for allowing any one of the cartridges to undergo movement operation in a direction parallel to the principal surfaces thereof being provided at plane surfaces of the accommodating body that are opposite to each other;

taking-out means for selectively taking out the disc cartridges from the accommodating body, which includes first movement operation means that inserts into the accommodating body through any one of the opening portions provided at the accommodating body for moving any one of the cartridges accommodated within the accommodating body in a direction parallel to the principal surfaces of the cartridge;

carrying means including a portion for loading the disc cartridge into the recording and/or reproducing means, which includes second movement operation means for insertion into the accommodating body through an opening portion provided at the accommodating body opposing the one opening portion to allow the cartridge which has been caused to undergo movement operation by the first movement operation means to further undergo movement operation in a direction parallel to the principal surfaces of the cartridge;

vertical movement means for vertically moving the accommodating body relative to the taking-out means;

elastic supporting means for elastically supporting the recording and/or reproducing means with respect to an apparatus body; and limiting means for limiting movement of the recording and/or reproducing means relative to the apparatus body by the elastic supporting means in the state where the cartridge is drawn out by the first and/or second movement operation means from the accommodating body.

8. A recording and/or reproducing apparatus as set forth in claim 7, wherein the limiting means is composed of at least one engagement projection provided at either one of the accommodating body and the carrying means, and an engaged portion provided at the other, whereby the engagement projection and the engaged portion are engaged with each other so that relative movement between the accommodating body and the carrying means is limited.

9. A recording and/or reproducing apparatus as set forth in claim 8, wherein engagement between the engagement projection and the engaged portion is released by allowing the carrying means to be moved in a direction parallel to the principal surfaces of the cartridge with respect to the accommodating body.

10. A loading device for cartridges comprising:

an accommodating body within which plural cartridges having plural recording media therein are respectively accommodated so that the principal surfaces of the respective cartridges are parallel to each other, opening portions for allowing the cartridges to undergo movement operation in a direction parallel to the principal surfaces thereof being provided at plane surfaces of the accommodating body that are opposite to each other;

taking-out means for selectively taking out the disc cartridges from the accommodating body, which includes first movement operation means adapted to be inserted into the accommodating body through one of the opening portions provided at the accommodating body to allow any one of the cartridges accommodated within the accommodating body movement in a direction parallel to the principal surfaces of the cartridge;

carrying means which includes a portion for loading the disc cartridge into the recording and/or reproducing means, which includes second movement operation means adapted to be inserted into the accommodating body through an opening portion provided at the accommodating body opposing the one opening portion to allow the cartridge which has been caused to undergo movement operation by the first movement operation means of the taking-out means to further undergo movement operation in a direction parallel to the principal surfaces of the cartridge;

vertical movement means for vertically moving the accommodating body relative to the taking-out means; and the carrying means is further provided with the second movement operation means having further drawing-out means movably provided with respect to the carrying means, wherein the further drawing-out means comprises preventing means for preventing taking-out operation of any other cartridge from the accommodating body when the second movement operation means allows the cartridge of the accommodating body to undergo movement operation from the accommodating body.

11. A loading device as set forth in claim 10, wherein the first movement operation means comprises a first movement operation member engaged with an engaged portion of the cartridge accommodated within the accommodating body, and a second movement operation member in contact with a side surface of the cartridge for inserting the first and second movement operation members from the one opening portion to thereby selectively engage with the cartridge within the accommodating body to allow the cartridge to undergo movement operation in the direction parallel to the principal surfaces of the cartridge.

12. A loading device as set forth in claim 11, wherein the taking-out means includes operation means such that when the cartridge is caused to undergo movement operation in the direction parallel to the principal surfaces of the cartridge from the accommodating body by the second movement operation means, the operation means withdraws the first movement operation means from the opening portion of the accommodating body.

13. A loading device as set forth in claim 12, wherein the operation means includes position detecting means for carrying out position detection of the first movement operation means.

14. A loading device as set forth in claim 13, which further comprises control means for detecting on the basis of a detection output from the position detecting means whether or not a cartridge inserted into the accommodating body is correctly inserted to allow the inserted cartridge to undergo a movement operation in a direction to eject it from the accommodating body on the basis of the detection result.

15. A loading device for cartridges comprising:

an accommodating body within which plural cartridges having plural recording media therein are respectively accommodated so that the principal surfaces of the respective cartridges are parallel to each other, opening portions for allowing the cartridges to undergo movement operation in a direction parallel to the principal surfaces thereof being provided at plane surfaces of the accommodating body that are opposite to each other, taking-out means for selectively taking out the disc cartridges from the accommodating body, which includes first movement operation means adapted to be inserted into the accommodating body through one of the opening portions provided at the accommodating body to allow any one of the cartridges accommodated within the accommodating body movement in a direction parallel to the principal surfaces of the cartridge;

carrying means which includes a portion for loading the disc cartridge into the recording and/or reproducing means, which includes second movement operation means adapted to be inserted into the accommodating body through an opening portion provided at the accommodating body opposing the one opening portion to allow the cartridge which has been caused to undergo movement operation by the first movement operation means of the taking-out means to further undergo movement operation in a direction parallel to the principal surfaces of the cartridge;

vertical movement means for vertically moving the accommodating body relative to the taking-out means; and the carrying means is further provided with the second movement operation means having further drawing-out means movably provided with respect to the carrying means, wherein the further drawing-out means comprises preventing means for preventing taking-out operation of any other cartridge from the accommodating body when the second movement operation means allows the cartridge of the accommodating body to undergo movement operation from the accommodating body;

wherein the accommodating body comprises a further opening portion formed at the side surface perpendicular to both plane surfaces where the opening portions are respectively formed and adapted so that insertion/withdrawal of the cartridge is carried out, and wherein the preventing means is comprised of a movement preventing portion for closing at least one portion of the further opening portion.

* * * * *